US010670813B2

United States Patent
Ootorii

(10) Patent No.: US 10,670,813 B2
(45) Date of Patent: Jun. 2, 2020

(54) PHOTOELECTRIC CONNECTOR

(71) Applicant: SONY CORPORATION, Tokyo (JP)

(72) Inventor: Hiizu Ootorii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/580,304

(22) PCT Filed: Mar. 30, 2016

(86) PCT No.: PCT/JP2016/060360
§ 371 (c)(1),
(2) Date: Dec. 7, 2017

(87) PCT Pub. No.: WO2016/203806
PCT Pub. Date: Dec. 22, 2016

(65) Prior Publication Data
US 2018/0172917 A1 Jun. 21, 2018

(51) Int. Cl.
*G02B 6/32* (2006.01)
*H01R 13/46* (2006.01)
(Continued)

(52) U.S. Cl.
CPC ............... *G02B 6/32* (2013.01); *G02B 6/40* (2013.01); *H01R 13/46* (2013.01); *H01R 13/629* (2013.01)

(58) Field of Classification Search
CPC ............ G02B 6/32; G02B 6/40; H01R 13/46
See application file for complete search history.

(56) References Cited

U.S. PATENT DOCUMENTS 4,186,999 A * 2/1980 Harwood ............. G02B 6/3835
257/98
6,450,697 B1 9/2002 Ngo
(Continued)

FOREIGN PATENT DOCUMENTS

| AT | 347118 T | 12/2006 |
|---|---|---|
| AT | 469366 T | 6/2010 |

(Continued)

OTHER PUBLICATIONS

International Search Report and Written Opinion of PCT Application No. PCT/JP2016/060360, dated Jul. 5, 2016, 12 pages of ISRWO.

*Primary Examiner* — Chris H Chu
(74) *Attorney, Agent, or Firm* — Chip Law Group

(57) ABSTRACT

A photoelectric connector includes a plug and a receptacle. The plug includes a plug housing 200, a first guide pin 220, a first signal transmitting/receiving member 230, a first electrode unit 260, and a plug housing biasing means 250. The receptacle includes a receptacle housing 300, a second signal transmitting/receiving member 330, a second electrode unit 360, and a second signal transmitting/receiving member biasing means 321. In a state in which the plug is fitted to the receptacle, the first electrode unit 260 and the second electrode unit 360 come into contact with each other and are electrically connected to each other; an opposite surface of the first signal transmitting/receiving member 230 and an opposite surface of the second signal transmitting/receiving member 330 come into contact with each other in a state in which the opposite surfaces are not movable relative to each other; the first and second signal transmitting/receiving members 230 and 330 are biased to a rear side of the plug by the second signal transmitting/receiving member biasing means 231; and the plug housing 200 is (Continued)

biased in a direction perpendicular to the axis line of the plug by the plug housing biasing means 250 and the second electrode unit 360.

21 Claims, 68 Drawing Sheets

(51) Int. Cl.
 *G02B 6/40* (2006.01)
 *H01R 13/629* (2006.01)

(56) References Cited

U.S. PATENT DOCUMENTS

| | | | |
|---|---|---|---|
| 7,458,732 B2 * | 12/2008 | Harano | G02B 6/3817 |
| | | | 385/14 |
| 2008/0090450 A1 | 4/2008 | Harano et al. | |
| 2009/0310921 A1 | 12/2009 | Kurita | |
| 2015/0316731 A1 | 11/2015 | Takahashi et al. | |

FOREIGN PATENT DOCUMENTS

| | | |
|---|---|---|
| CA | 2353169 A1 | 2/2002 |
| CA | 2709390 A1 | 2/2002 |
| CN | 1914535 A | 2/2007 |
| CN | 101666894 A | 3/2010 |
| DE | 60124827 T2 | 6/2007 |
| EP | 1182478 A1 | 2/2002 |
| EP | 1659433 A1 | 5/2006 |
| EP | 1182478 B1 | 11/2006 |
| EP | 1659433 B1 | 5/2010 |
| JP | 57-126082 A | 8/1982 |
| JP | 60-112083 U | 7/1985 |
| JP | 63-058408 A | 3/1988 |
| JP | 63-58408 A | 3/1988 |
| JP | 2002-090583 A | 3/2002 |
| JP | 10-2007-0011285 A | 1/2007 |
| JP | 2007-121859 A | 5/2007 |
| JP | 4082440 B2 | 4/2008 |
| JP | 2008-145855 A | 6/2008 |
| JP | 2009-058848 A | 3/2009 |
| JP | 2009-229504 A | 10/2009 |
| JP | 2010-060793 A | 3/2010 |
| JP | 2014-063177 A | 4/2014 |
| JP | 2014-109655 A | 6/2014 |
| JP | 5621070 B1 | 11/2014 |
| JP | 2015-053210 A | 3/2015 |
| JP | 2015-103502 A | 6/2015 |
| JP | 2015-153609 A | 8/2015 |
| TW | 278675 B | 4/2007 |
| TW | 201525550 A | 7/2015 |
| WO | 2006/068045 A1 | 6/2006 |
| WO | 2014/080694 A1 | 5/2014 |
| WO | 2015/033613 A1 | 3/2015 |
| WO | 2015/046488 A1 | 3/2015 |
| WO | 2015/046488 A1 | 4/2015 |

\* cited by examiner

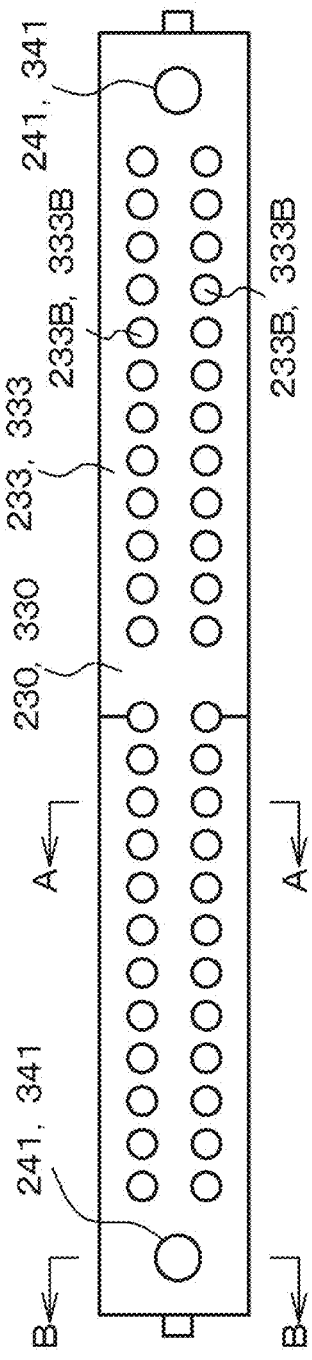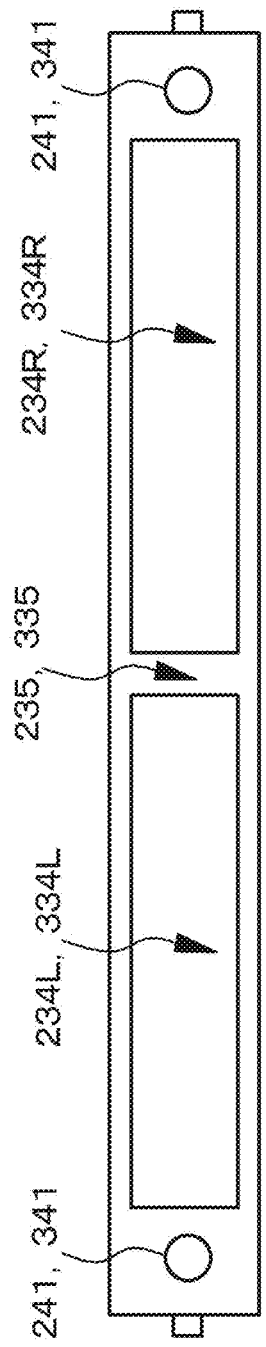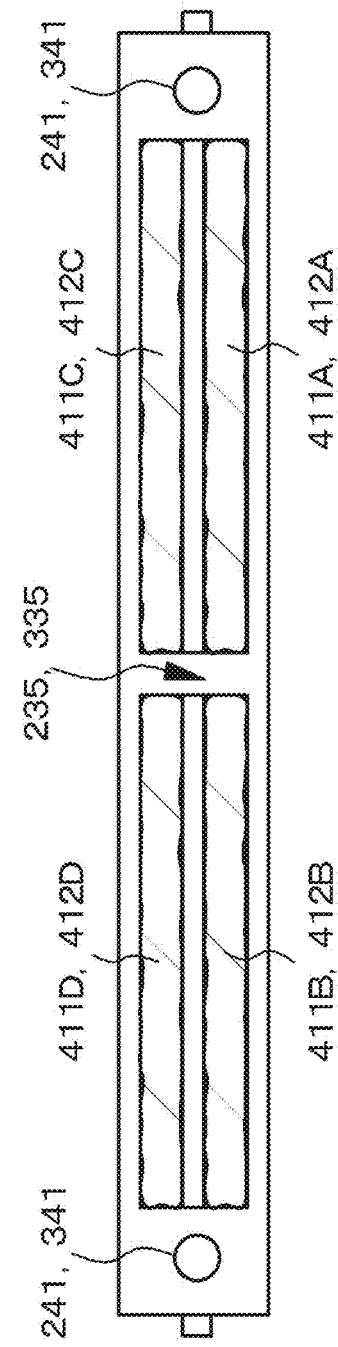

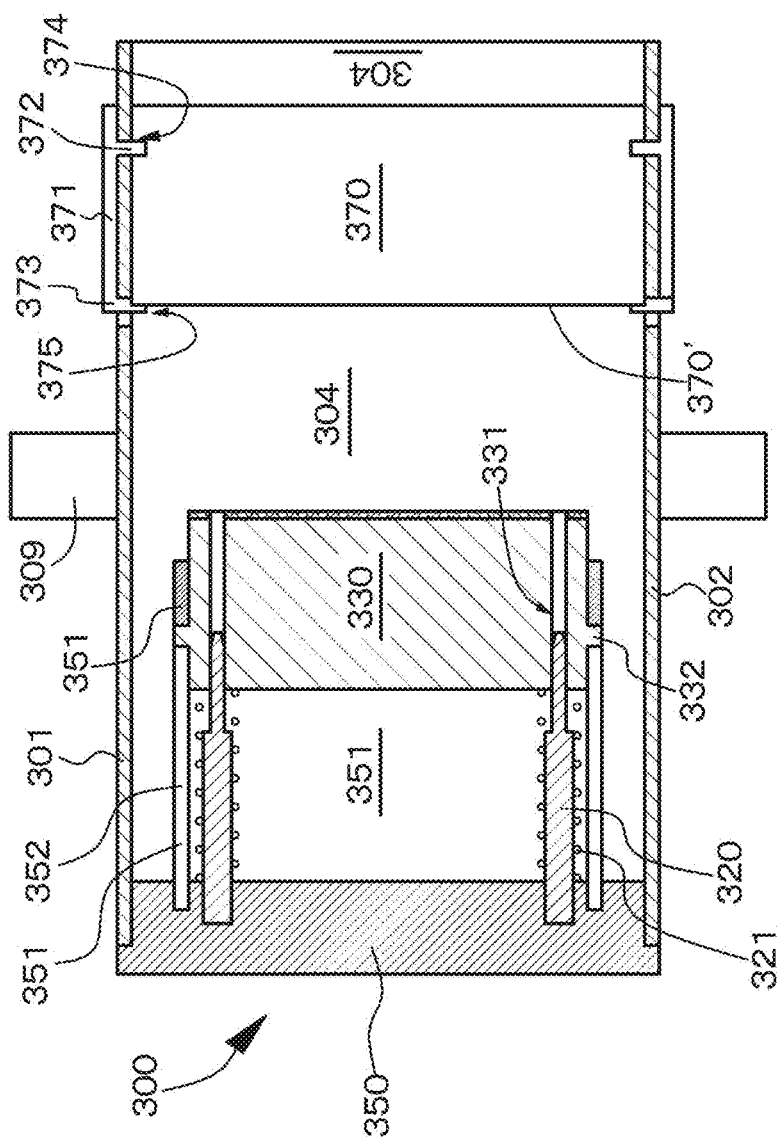
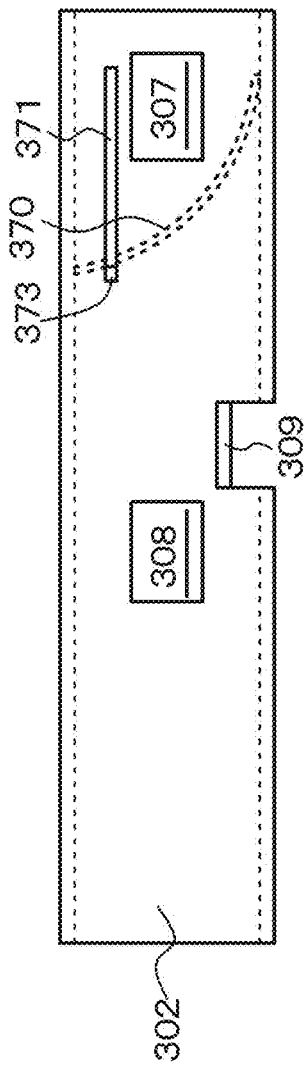
FIG. 17A
FIG. 17B

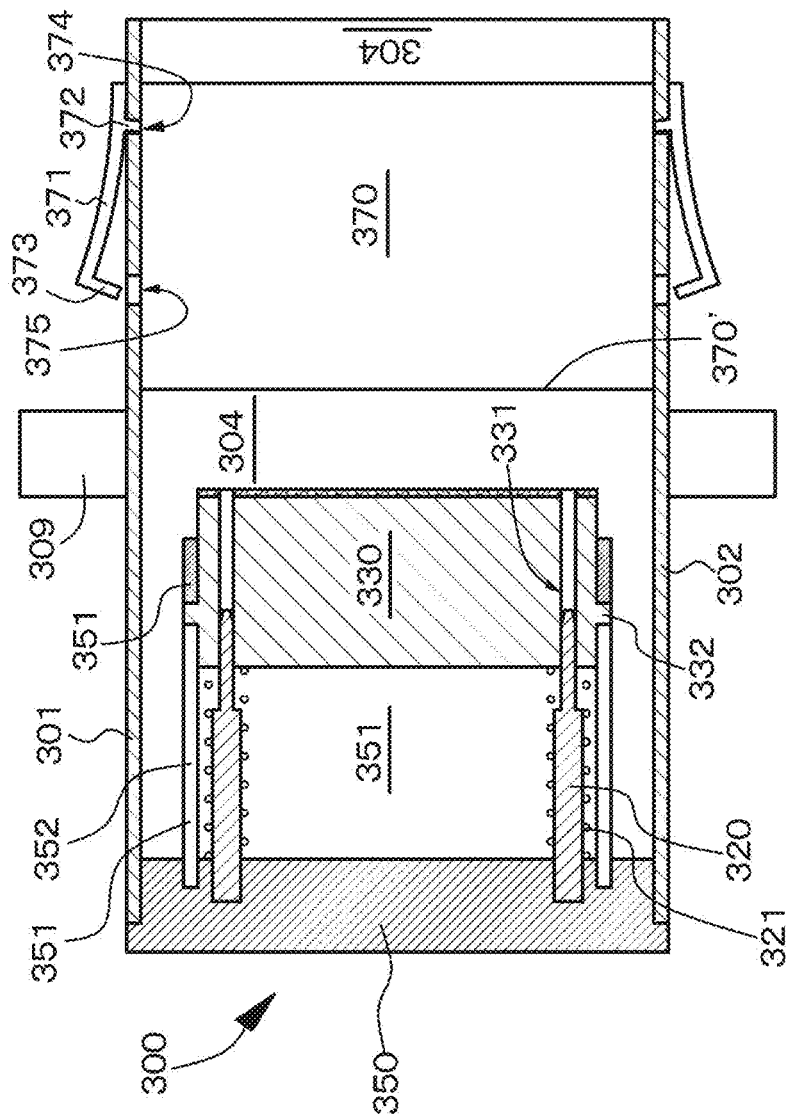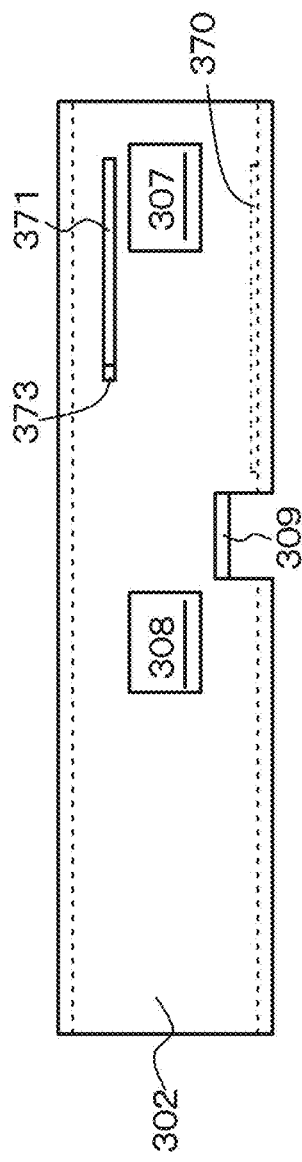
FIG. 18A
FIG. 18B

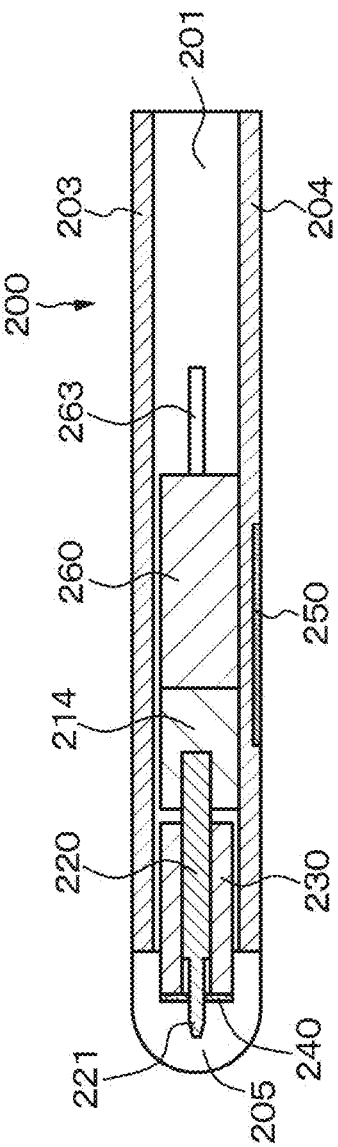
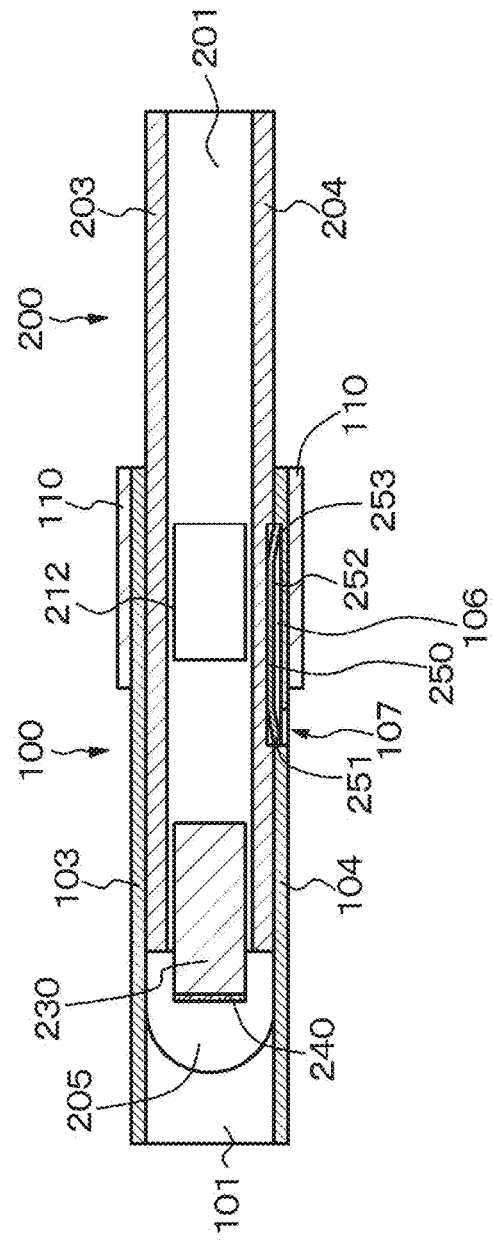
FIG. 23A
FIG. 23B

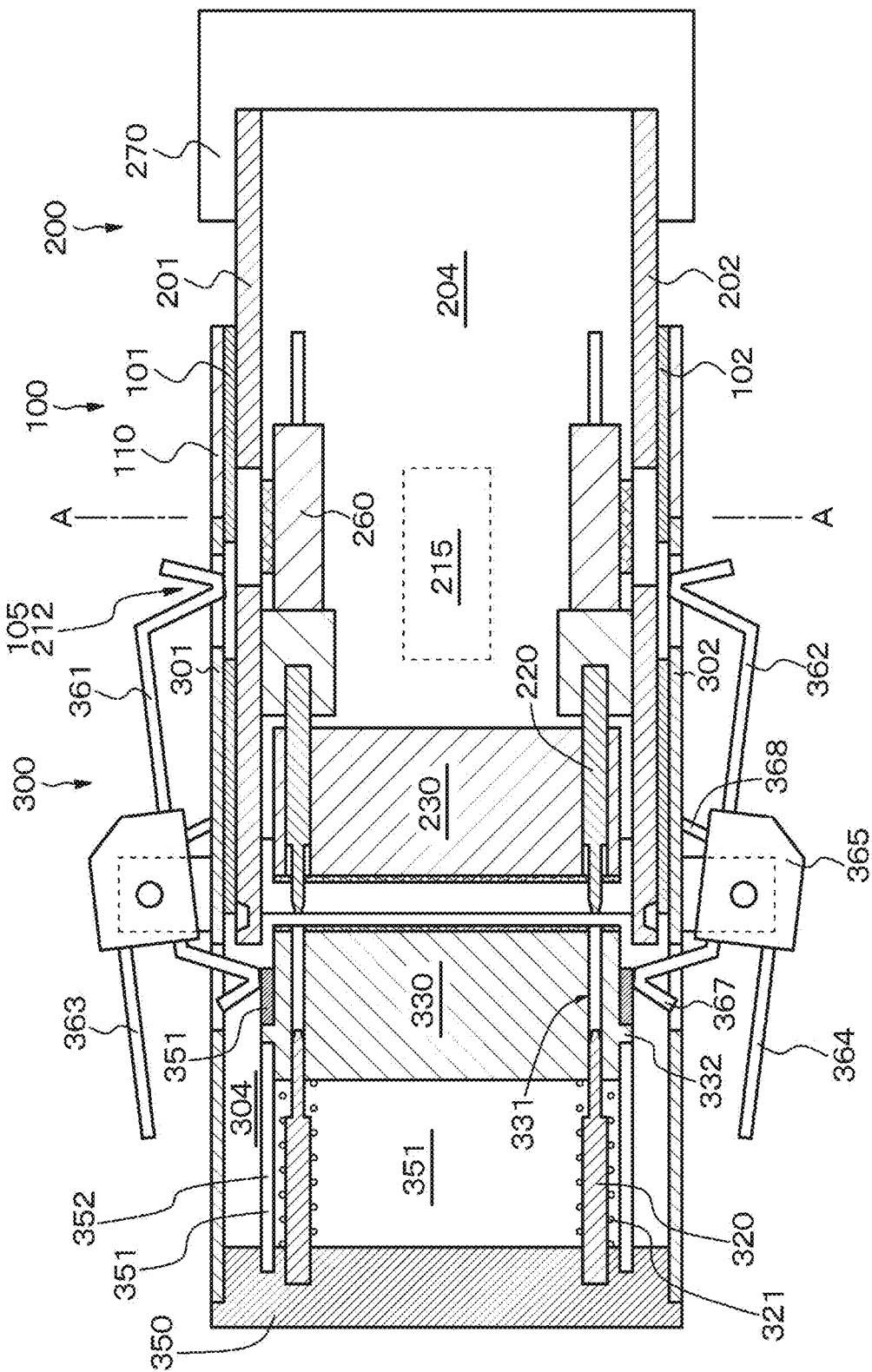

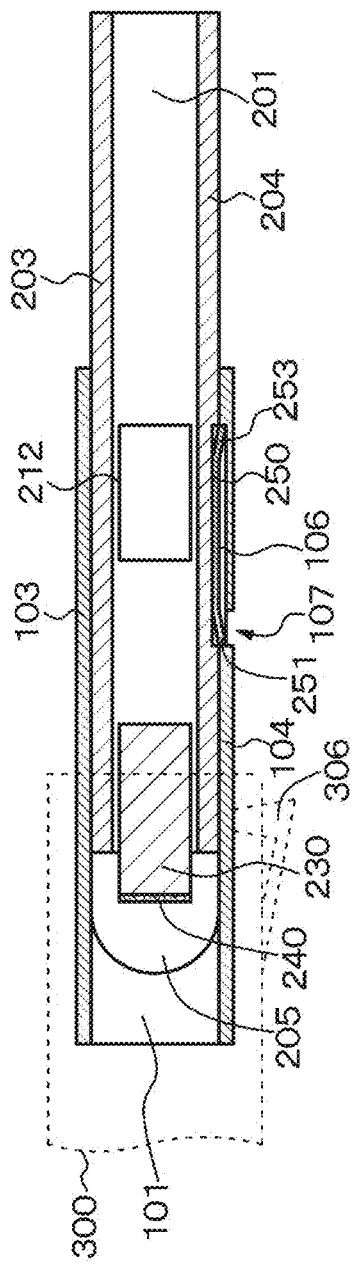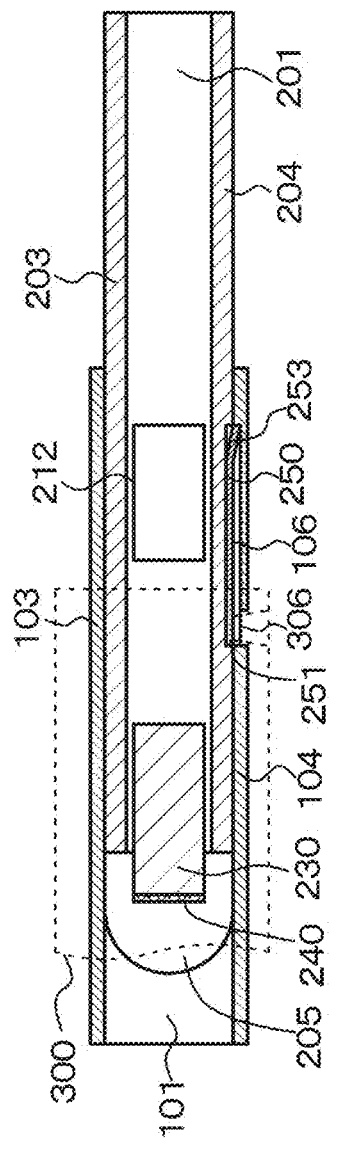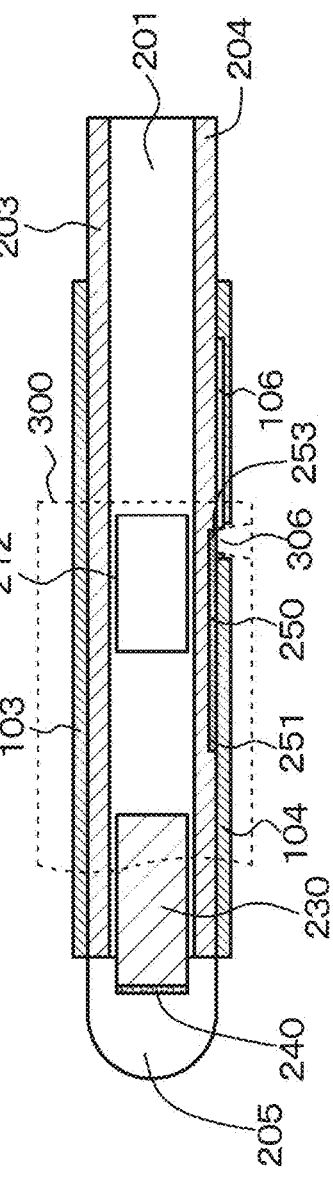

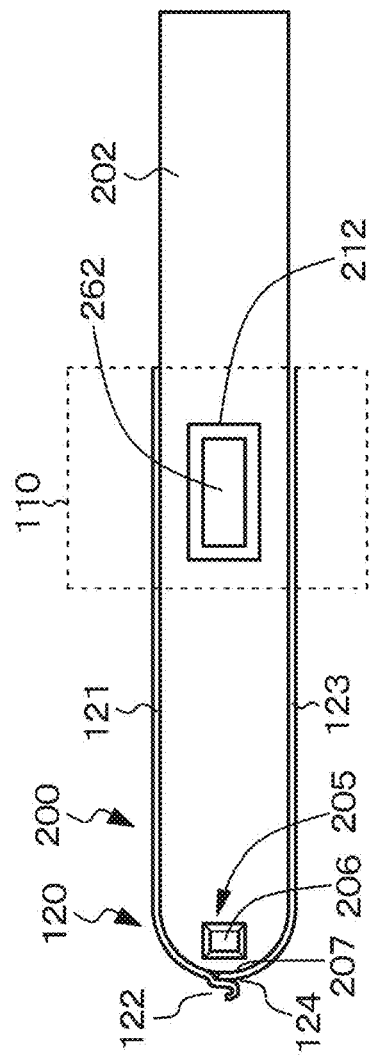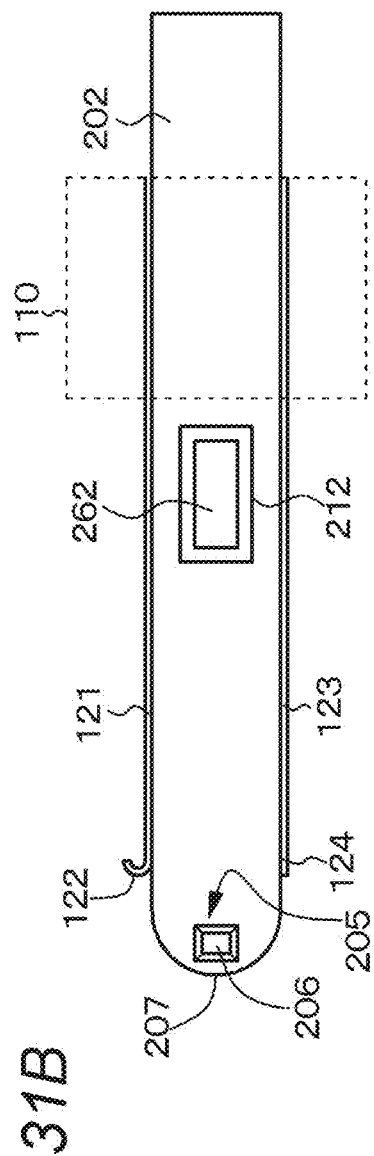
FIG. 31A
FIG. 31B

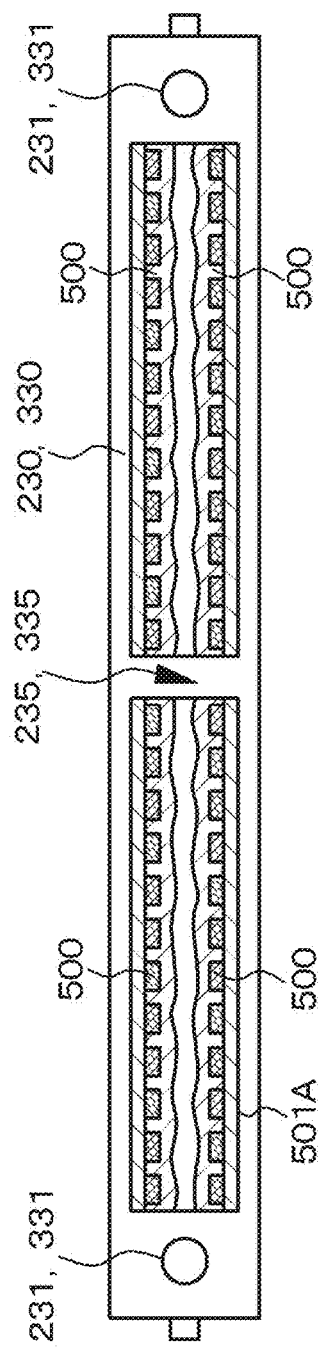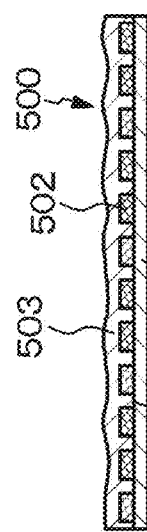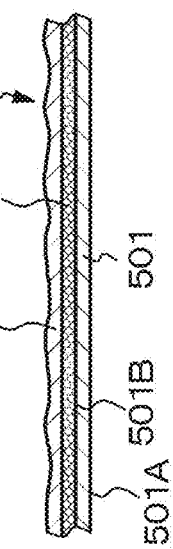
FIG. 32A
FIG. 32B
FIG. 32C

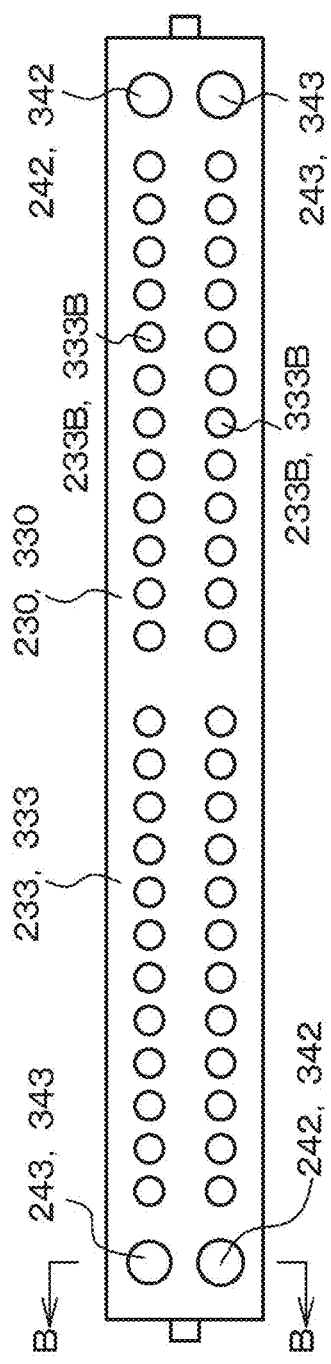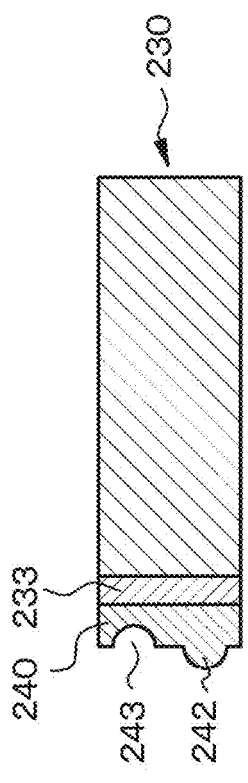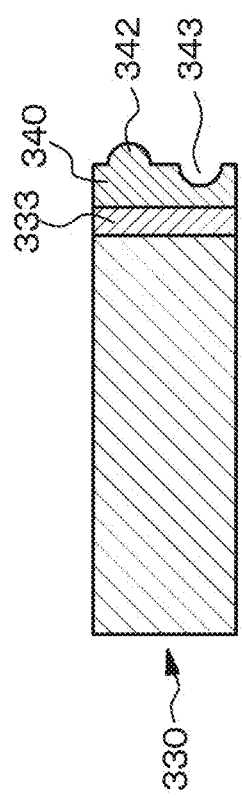
FIG. 34A
FIG. 34B
FIG. 34C

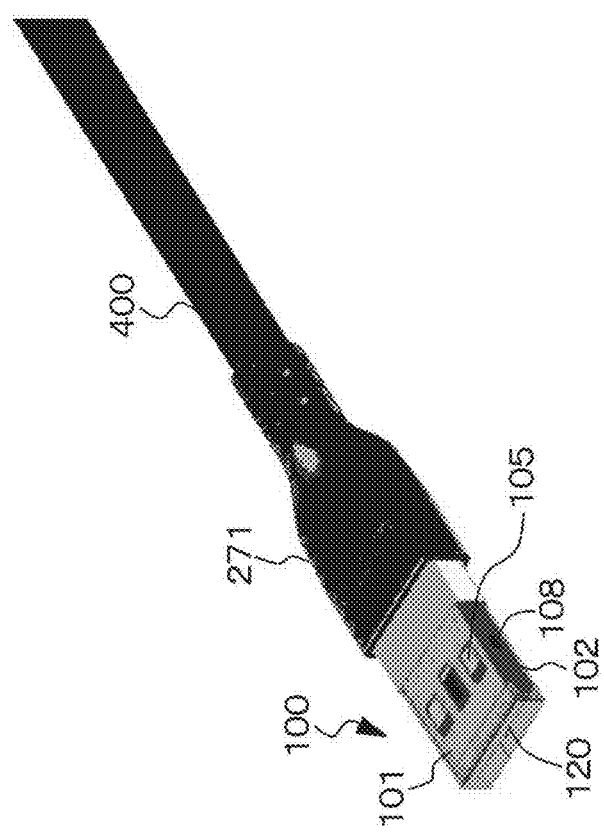
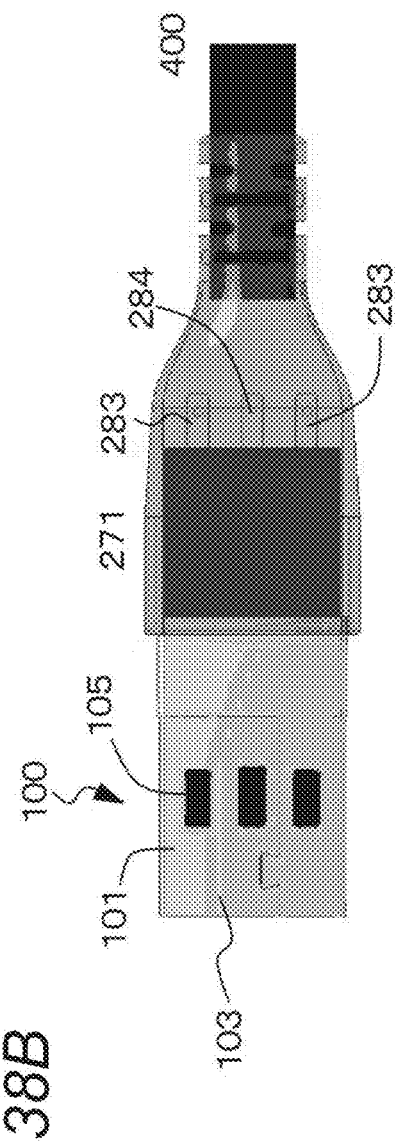
FIG. 38A
FIG. 38B

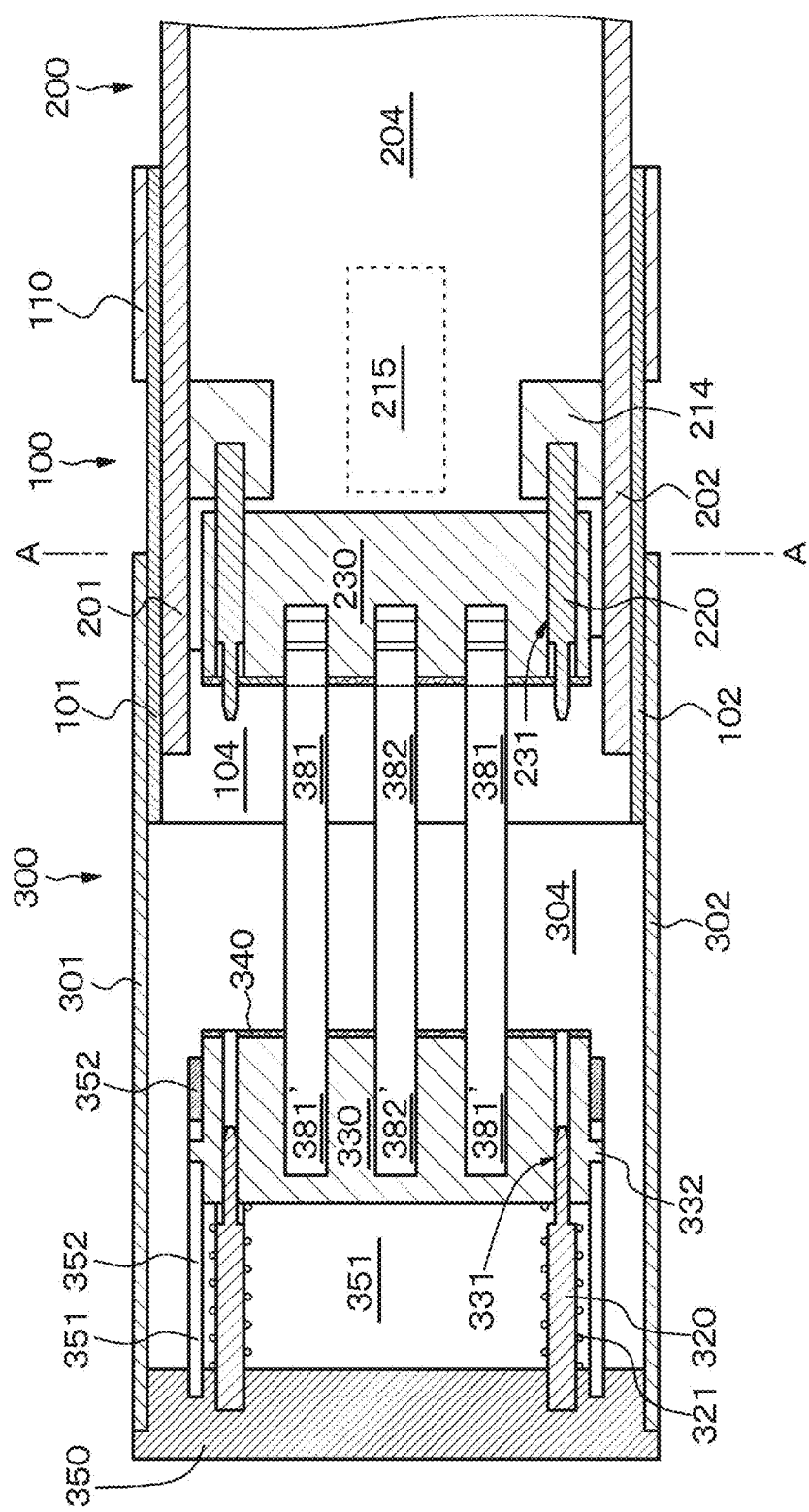

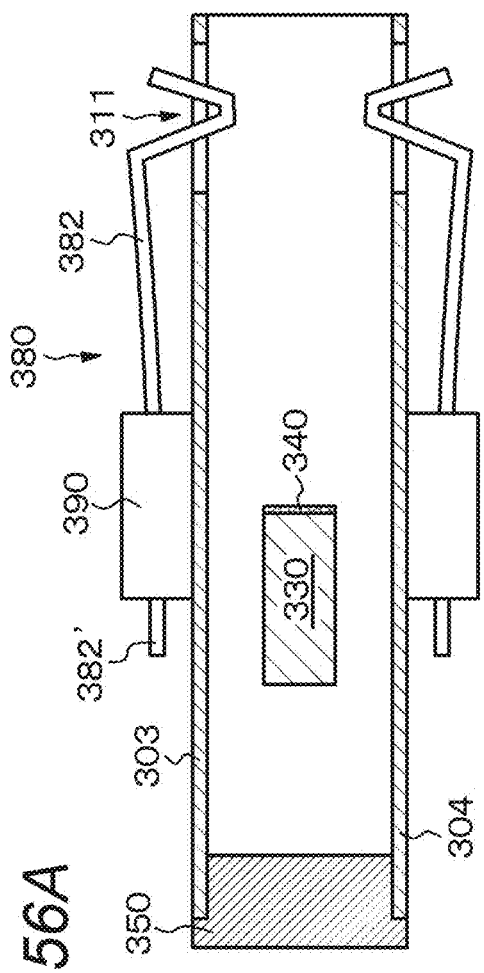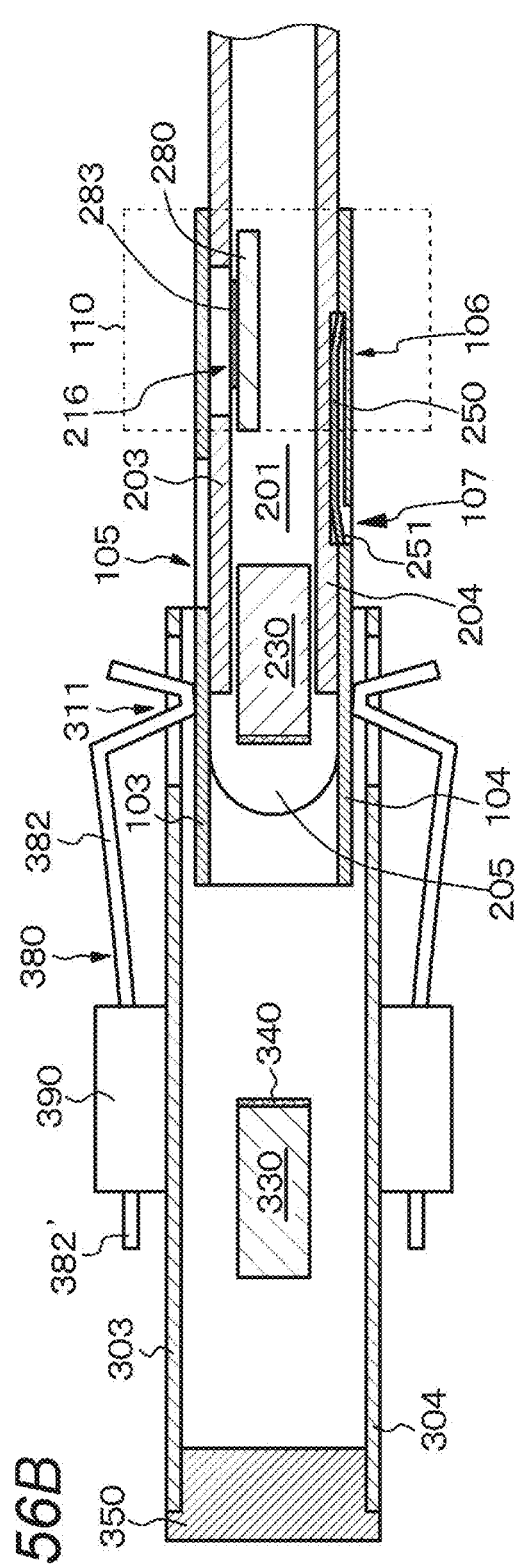
FIG. 56A
FIG. 56B

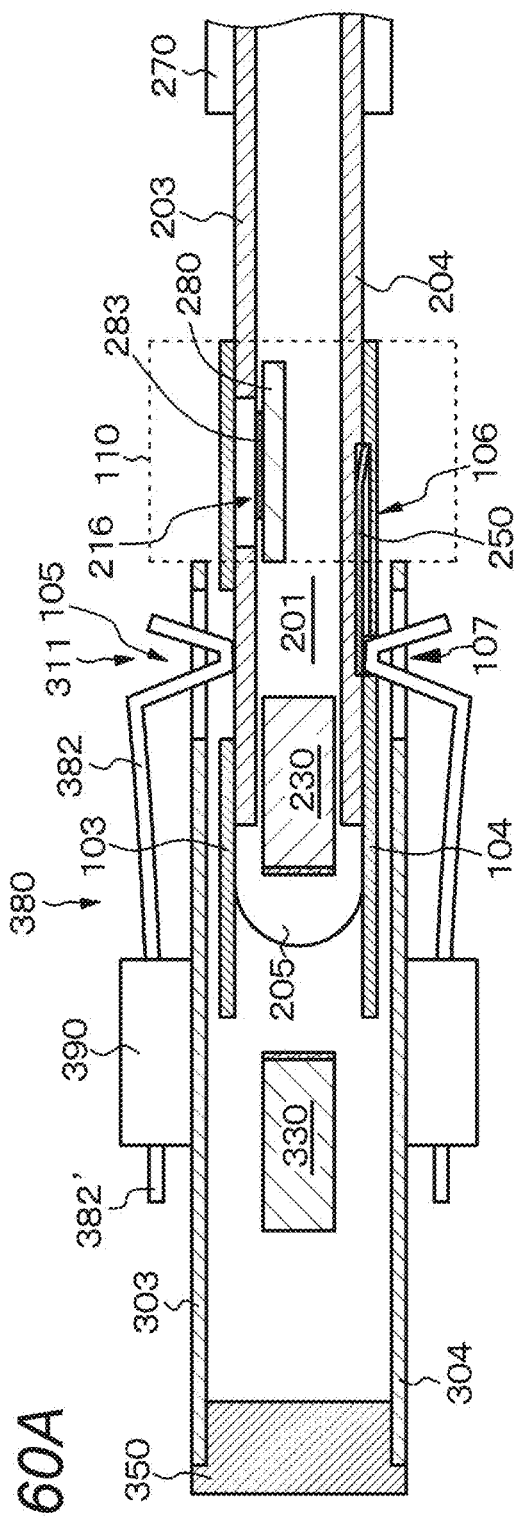
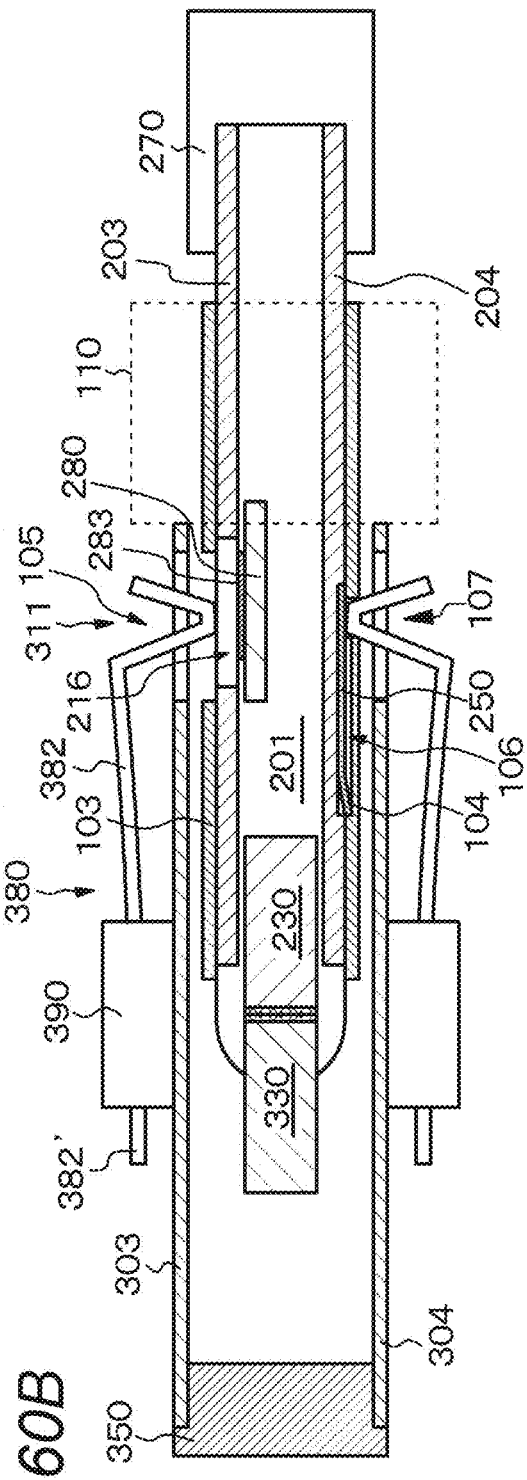
FIG. 60A
FIG. 60B

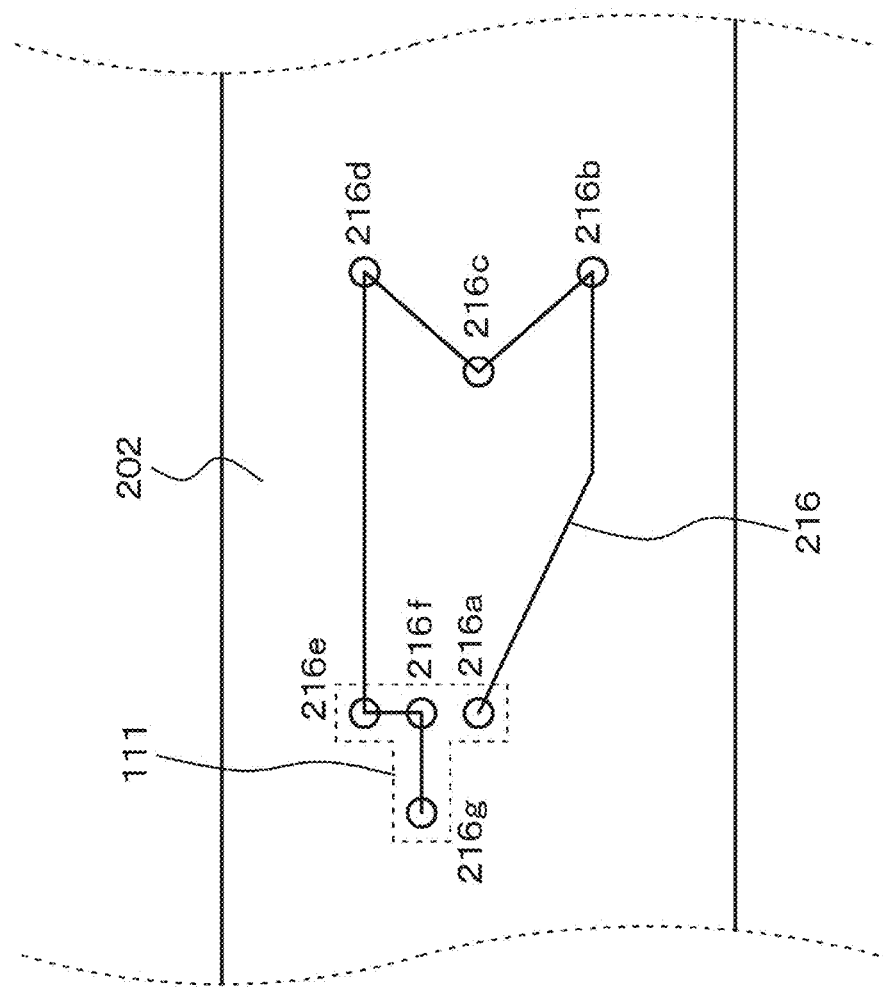

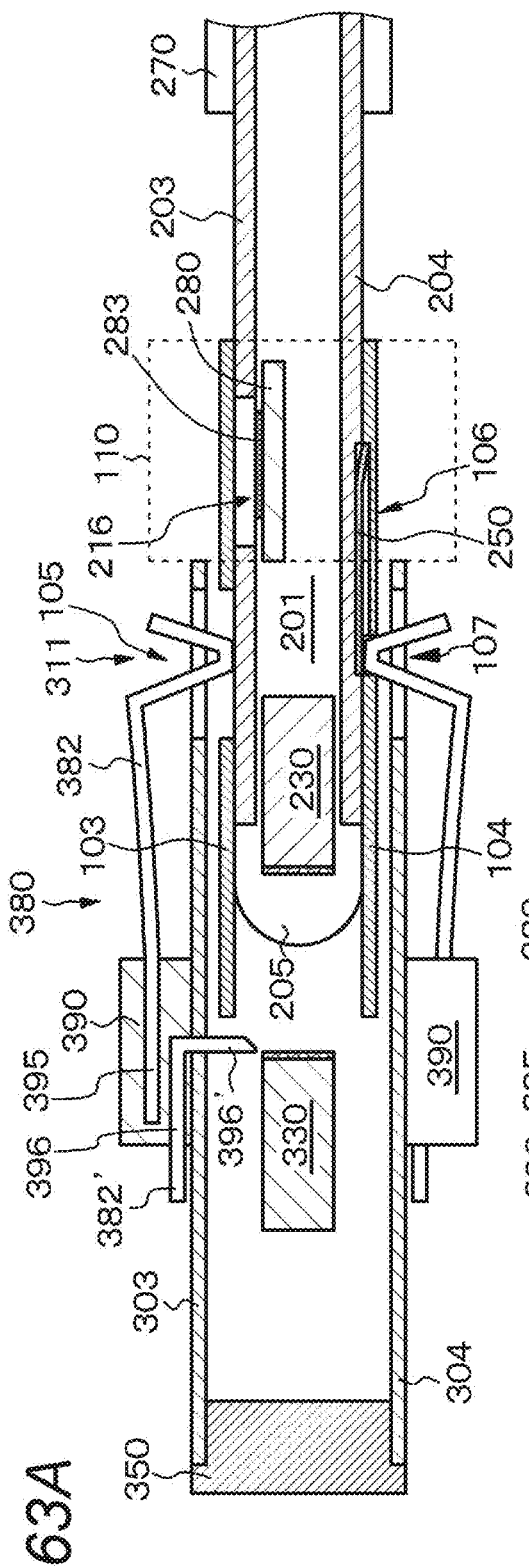
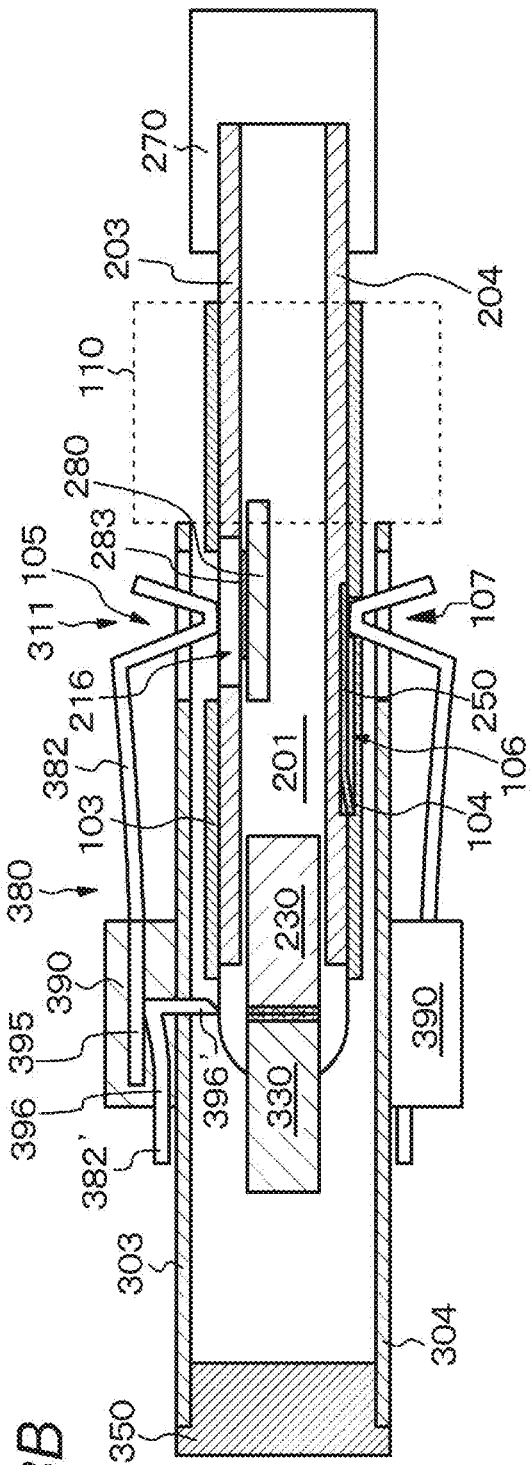

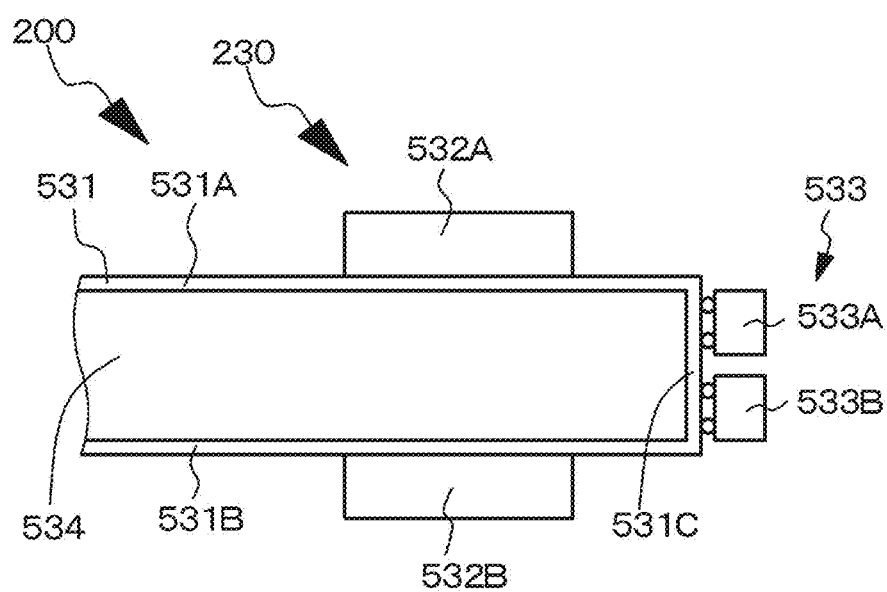
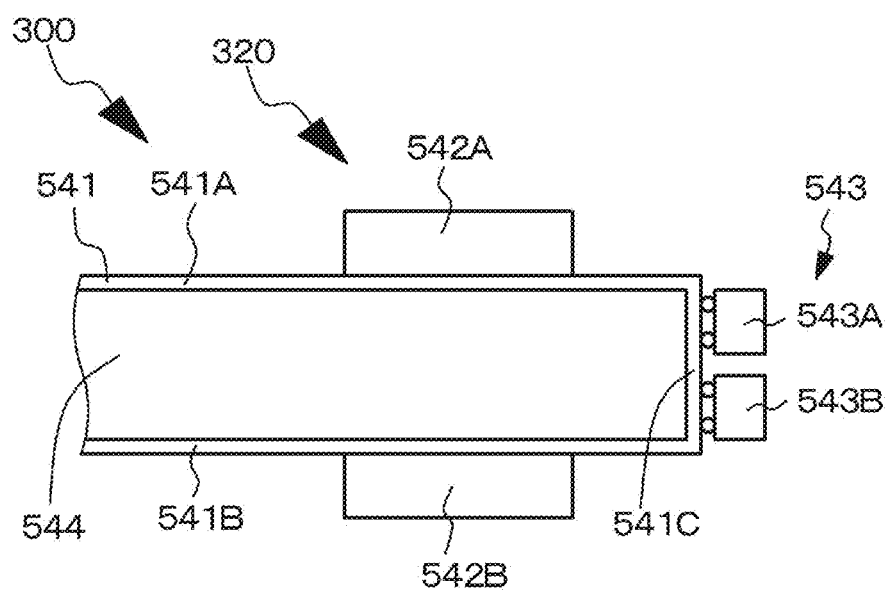

PHOTOELECTRIC CONNECTOR

CROSS REFERENCE TO RELATED APPLICATIONS

This application is a U.S. National Phase of International Patent Application No. PCT/JP2016/060360 filed on Mar. 30, 2016, which claims priority benefit of Japanese Patent Application No. JP 2015-120775 filed in the Japan Patent Office on Jun. 16, 2015. Each of the above-referenced applications is hereby incorporated herein by reference in its entirety.

TECHNICAL FIELD

The present disclosure relates to a photoelectric connector.

BACKGROUND ART

For example, Japanese Patent Application Laid-Open No. 2014-063177 discloses a photoelectric connector that can perform the transmission and reception of an optical signal and the supply of power at the same time. The device disclosed in Japanese Patent Application Laid-Open No. 2014-063177 includes:

a connector housing that provides a physical connection interface to a connector to be engaged; an electric contact assembly that is physically incorporated into the connector housing and provides an electrical input/output (I/O) interface; and an optical assembly that is physically incorporated into the connector housing and provides an optical I/O interface.

The optical assembly has an optical engine that actively generates an optical signal, receives an optical signal, and processes the optical signal.

An electric I/O, an optical I/O, or both the electric I/O and the optical I/O are transmitted through the connector housing by the connection interface.

CITATION LIST

Patent Document

Patent Document 1: Japanese Patent Application Laid-Open No. 2014-063177

SUMMARY OF THE INVENTION

Problems to be Solved by the Invention

However, the recent photoelectric connector needs to transmit optical signals at a high rate of several tens of gigabits per second to several hundreds of gigabits per second. Therefore, there is a strong demand for a photoelectric connector with high vibration resistance as the photoelectric connector including the plug and the receptacle. However, the inventors did not find any photoelectric connector that satisfied the demand with a simple structure.

Accordingly, an object of the present disclosure is to provide a photoelectric connector that has a simple structure and high vibration resistance.

Solutions to Problems

A photoelectric connector of the present disclosure to solve the object includes:

a plug that is attached to a first signal line and a first electric wire; and a receptacle that is attached to a second signal line and a second electric wire, is fitted to the plug, and is optically and electrically connected to the plug, in which the plug includes:
(A-1) a plug housing;
(A-2) a first guide pin that is provided in the plug housing, has a rear portion fixed to the plug housing, and extends in parallel to an axis line of the plug;
(A-3) a first signal transmitting/receiving member that is provided in the plug housing, is connected to the first signal line, has a first guide pinhole into which the first guide pin is inserted, and is attached to the first guide pin;
(A-4) a first electrode unit which is fixed to the plug housing and to which the first electric wire is attached; and
(A-5) a plug housing biasing means that is provided in the plug housing, the receptacle includes:
(B-1) a receptacle housing;
(B-2) a second signal transmitting/receiving member that is provided in the receptacle housing, is connected to the second signal line, and is movable with respect to the receptacle housing;
(B-3) a second electrode unit which is fixed to the receptacle housing and to which the second electric wire is attached; and
(B-4) a second signal transmitting/receiving member biasing means that biases the second signal transmitting/receiving member to a front side of the receptacle, and in a state in which the plug is fitted to the receptacle,
(a) the first electrode unit and the second electrode unit come into contact with each other and are electrically connected to each other;
(b) an opposite surface of the first signal transmitting/receiving member which faces the second signal transmitting/receiving member and an opposite surface of the second signal transmitting/receiving member which faces the first signal transmitting/receiving member come into contact with each other in a state in which the opposite surfaces are not movable relative to each other;
(c) the first signal transmitting/receiving member and the second signal transmitting/receiving member are biased to a rear side of the plug by the second signal transmitting/receiving member biasing means; and
(d) the plug housing is biased in a direction perpendicular to the axis line of the plug by the plug housing biasing means and the second electrode unit.

Effects of the Invention

In the photoelectric connector according to the present disclosure, in a state in which the plug is fitted to the receptacle, the opposite surface of the first signal transmitting/receiving member which faces the second signal transmitting/receiving member and the opposite surface of the second signal transmitting/receiving member which faces the first signal transmitting/receiving member come into contact with each other, without being movable relative to each other; the first signal transmitting/receiving member and the second signal transmitting/receiving member are biased to the rear side of the plug by the second signal transmitting/receiving member biasing means; and the plug housing is biased in the direction perpendicular to the axis line of the plug by the plug housing biasing means and the second electrode unit. Therefore, even in a case where vibration is applied to the plug and the receptacle, it is possible to reliably and stably transmit optical signals at a high rate of, for example, several tens of gigabits per second to several hundreds of gigabits per second with a simple structure, without a change in a fitting state between the plug and the receptacle. In addition, in a state in which the plug is fitted to the receptacle, the first electrode unit and the second electrode unit come into contact with each other and are electrically connected to each other. Therefore, it is possible to give a power supply function to the photoelectric connector. Note that, the effects described in the specification are just illustrative and the present disclosure is not limited thereto. In addition, the present disclosure may have additional effects.

BRIEF DESCRIPTION OF DRAWINGS

FIG. 14A is a diagram schematically illustrating a first signal transmitting/receiving member and a second signal transmitting/receiving member as viewed from an opposite surface, FIG. 14B is a diagram schematically illustrating the first signal transmitting/receiving member and the second signal transmitting/receiving member as viewed from a side opposite to the opposite surface (however, a state in which a signal line is removed), and FIG. 14C is a diagram schematically illustrating the first signal transmitting/receiving member and the second signal transmitting/receiving member as viewed from the side opposite to the opposite surface (however, a state in which the signal line is attached).

FIGS. 17A and 17B are diagrams illustrating the movement of a second shutter. FIG. 17A is a cross-sectional view schematically illustrating a receptacle housing forming the photoelectric connector according to Embodiment 1 taken along a virtual horizontal plane (however, a cross-sectional view illustrating the receptacle housing as viewed from the upper side) and FIG. 17B is a side view schematically illustrating the receptacle housing.

FIGS. 18A and 18B follow FIGS. 17A and 17B and are diagrams illustrating the movement of the second shutter. FIG. 18A is a cross-sectional view schematically illustrating the receptacle housing forming the photoelectric connector according to Embodiment 1 taken along a virtual horizontal plane (however, a cross-sectional view illustrating the receptacle housing as viewed from the upper side) and FIG. 18B is aside view schematically illustrating the receptacle housing.

FIG. 19, is a diagram illustrating the fitting between the plug and the receptacle, and is a cross-sectional view schematically illustrating the plug and the receptacle forming the photoelectric connector according to Embodiment 1 taken along a virtual horizontal plane.

FIG. 20, is a diagram illustrating the fitting between the plug and the receptacle, and is a cross-sectional view schematically illustrating the plug and the receptacle forming the photoelectric connector according to Embodiment 1 taken along a virtual horizontal plane.

FIG. 21, is a diagram illustrating the fitting between the plug and the receptacle, and is a cross-sectional view schematically illustrating the plug and the receptacle forming the photoelectric connector according to Embodiment 1 taken along a virtual horizontal plane.

FIGS. 23A and 23B are a cross-sectional view schematically illustrating the plug housing taken along a virtual vertical plane and a cross-sectional view schematically illustrating the plug cover and the plug housing taken along a virtual vertical plane, in the state illustrated in FIG. 22 in which the plug and the receptacle are being fitted to each other, respectively.

FIG. 24 follows FIG. 22, is a diagram illustrating the fitting between the plug and the receptacle, and is a cross-sectional view schematically illustrating the plug and the receptacle forming the photoelectric connector according to Embodiment 1 taken along a virtual horizontal plane.

FIG. 24, is a diagram illustrating the fitting between the plug and the receptacle, and is a cross-sectional view schematically illustrating the plug and the receptacle forming the photoelectric connector according to Embodiment 1 taken along a virtual horizontal plane.

FIG. 25, is a diagram illustrating a state in which the plug and the receptacle are fitted to each other, and is a cross-sectional view schematically illustrating the plug and the receptacle forming the photoelectric connector according to Embodiment 1 taken along a virtual horizontal plane.

FIG. 30A is a cross-sectional view schematically illustrating the plug cover and the plug housing taken along a virtual vertical plane in the state illustrated in FIG. 20 in which the plug and the receptacle are being fitted to each other, FIG. 30B is a cross-sectional view schematically illustrating the plug cover and the plug housing taken along a virtual vertical plane in the state illustrated in FIG. 22 in which the plug and the receptacle are being fitted to each other, and FIG. 30C is a cross-sectional view schematically illustrating the plug cover and the plug housing taken along a virtual vertical plane in the state illustrated in FIG. 27 in which the plug and the receptacle are fitted to each other.

FIGS. 31A and 31B are diagrams illustrating the movement of a first shutter. FIG. 31A is a side view schematically illustrating the first shutter and the plug housing in the state illustrated in FIG. 19 in which the plug and the receptacle are being fitted to each other and FIG. 31B is a side view schematically illustrating the first shutter and the plug housing in the state illustrated in FIG. 27 in which the plug and the receptacle are fitted to each other.

FIG. 32A is a diagram schematically illustrating a first signal transmitting/receiving member and a second signal transmitting/receiving member provided with signal lines with a waveguide unit structure in Embodiment 2 as viewed from the side opposite to the opposite surface, FIG. 32B is a cross-sectional view schematically illustrating one of the waveguide unit structures (however, a cross-sectional view taken along the YZ plane), FIG. 32C is a cross-sectional view schematically illustrating one of the waveguide unit structures (however, a cross-sectional view taken along the XZ plane).

FIG. 34A is a diagram schematically illustrating a first signal transmitting/receiving member and a second signal transmitting/receiving member in a photoelectric connector according to Embodiment 4 as viewed from an opposite surface, FIG. 34B is a cross-sectional view schematically illustrating the first signal transmitting/receiving member taken along an arrow B-B of FIG. 34A (however, a cross-sectional view taken along the YZ plane), and FIG. 34C is a cross-sectional view schematically illustrating the second signal transmitting/receiving member taken along the arrow B-B of FIG. 34A (however, a cross-sectional view taken along the YZ plane).

FIGS. 38A and 38B are a perspective view and a plan view illustrating the plug forming the photoelectric connector according to Embodiment 5, respectively.

FIGS. 49A and 49B, are diagrams illustrating the fitting between the plug and the receptacle, and are diagrams illustrating the plug and the receptacle forming the photoelectric connector according to Embodiment 5 as viewed from the side and the top, respectively.

FIGS. 50A and 50B, are diagrams illustrating the fitting between the plug and the receptacle, and are diagrams illustrating the plug and the receptacle forming the photoelectric connector according to Embodiment 5 as viewed from the side and the top, respectively.

FIG. 55 follows FIG. 54, is a diagram illustrating the fitting between the plug and the receptacle, and is a cross-sectional view schematically illustrating the plug and the receptacle forming the photoelectric connector according to Embodiment 6 taken along a virtual horizontal plane.

FIG. 56A is a cross-sectional view schematically illustrating the photoelectric connector taken along a virtual vertical plane in the state illustrated in FIG. 54 before the plug and the receptacle are fitted to each other and FIG. 56B is a cross-sectional view schematically illustrating the photoelectric connector taken along a virtual vertical plane in the state illustrated in FIG. 55 before the plug and the receptacle are fitted to each other.

FIG. 55, is a diagram illustrating the fitting between the plug and the receptacle, and is a cross-sectional view schematically illustrating the plug and the receptacle forming the photoelectric connector according to Embodiment 6 taken along a virtual horizontal plane.

FIG. 57, is a diagram illustrating the fitting between the plug and the receptacle, and is a cross-sectional view schematically illustrating the plug and the receptacle forming the photoelectric connector according to Embodiment 6 taken along a virtual horizontal plane.

FIG. 58, is a diagram illustrating the state in which the plug and the receptacle are fitted to each other, and is a cross-sectional view schematically illustrating the plug and the receptacle forming the photoelectric connector according to Embodiment 6 taken along a virtual horizontal plane.

FIG. 60A is a cross-sectional view schematically illustrating the photoelectric connector taken along a virtual vertical plane in the state illustrated in FIG. 57 in which the plug and the receptacle are being fitted to each other and FIG. 60B is a cross-sectional view schematically illustrating the photoelectric connector taken along a virtual vertical plane in the state illustrated in FIG. 59 in which the plug and the receptacle are fitted to each other.

FIG. 62 is a side view schematically illustrating a portion of the plug housing forming the photoelectric connector according to Embodiment 6 illustrated in FIG. 59.

FIG. 63A is a cross-sectional view schematically illustrating a photoelectric connector according to Embodiment 7 when the photoelectric connector is cut along a virtual vertical plane in the state illustrated in FIG. 57 in which the plug and the receptacle are being fitted to each other and FIG. 63B is a cross-sectional view illustrating the photoelectric connector according to Embodiment 7 when the photoelectric connector is cut along a virtual vertical plane in the state illustrated in FIG. 59 in which the plug and the receptacle are fitted to each other.

FIGS. 65A and 65B are conceptual diagrams illustrating a first signal transmitting/receiving member and a second signal transmitting/receiving member in a modification example of the photoelectric connector according to Embodiment 9, respectively.

MODE FOR CARRYING OUT THE INVENTION

Figure 1:
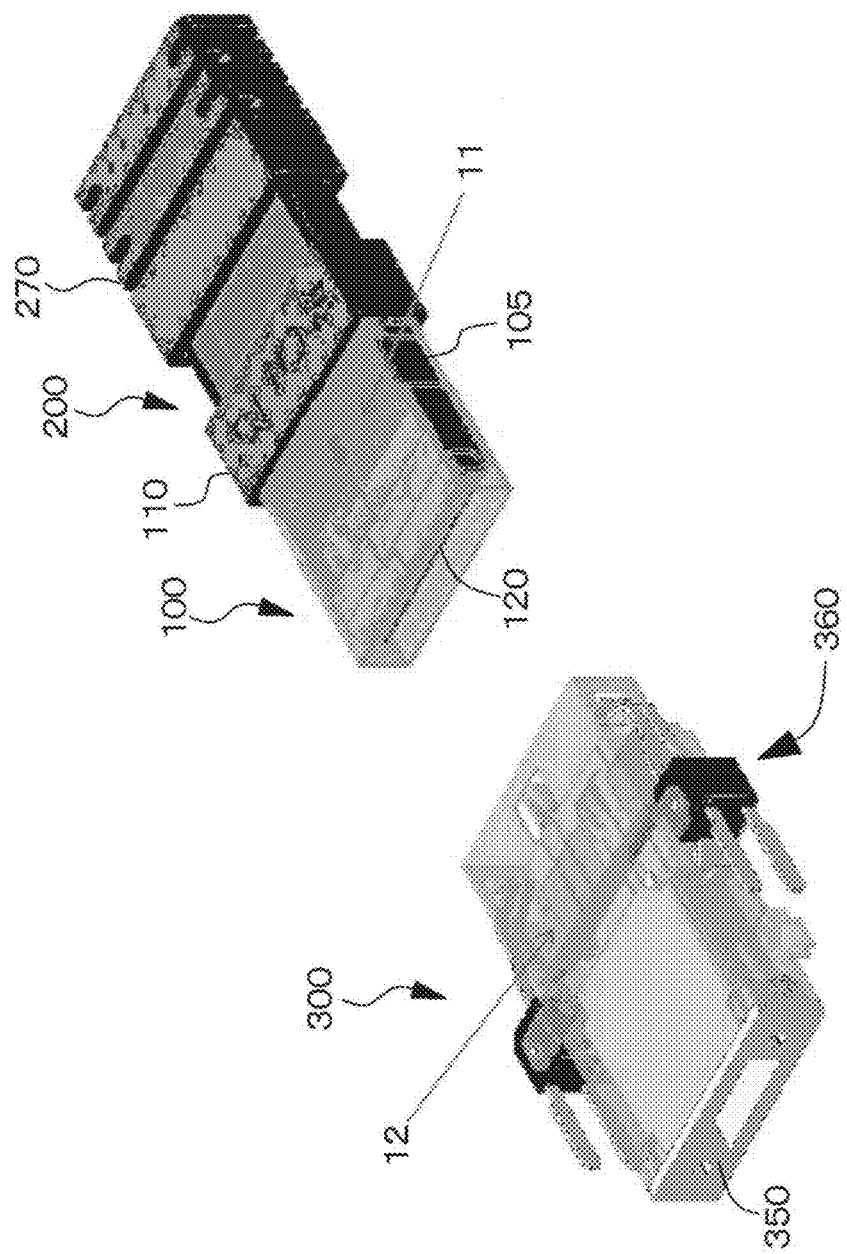
FIG. 1 is a perspective view illustrating a plug and a receptacle forming a photoelectric connector according to Embodiment 1.

Hereinafter, embodiments based on the present disclosure will be described with reference to the drawings. However, the present disclosure is not limited to the embodiments and various numerical values or materials in the embodiments are illustrative examples. Note that, the description will be made in the following order.

1. General Description of Photoelectric Connector According to the Present Disclosure
2. Embodiment 1 (Photoelectric Connector According to the Present Disclosure. Signal Transmitting/Receiving Member with Second Structure, Photoelectric Connector According to First Configuration, Photoelectric Connector According to 1'-th Configuration, Photoelectric Connector According to Second Configuration, Photoelectric Connector According to Fourth Configuration, Photoelectric Connector According to Fifth Configuration, Photoelectric Connector According to Sixth Configuration, Photoelectric Connector According to Eighth Configuration, Photoelectric Connector According to Ninth Configuration, Side Electrode Structure, and Photoelectric Connector Including Second Signal Transmitting/Receiving Member Biasing Means with Second Structure)
3. Embodiment 2 (Modification of Embodiment 1. Photoelectric Connector Having Waveguide Unit Structure)
4. Embodiment 3 (Modification of Embodiments 1 and 2. Photoelectric Connector Including Second Signal Transmitting/Receiving Member Biasing Means with First Structure)
5. Embodiment 4 (Modification of Embodiments 1 to 3. Photoelectric Connector Including Signal Transmitting/Receiving Member with First Structure)
6. Embodiment 5 (Modification of Embodiments 1 to 4. Photoelectric Connector with Upper/Lower Electrode Structure)
7. Embodiment 6 (Modification of Embodiment 5. Push-in/Push-out Fitting Method)
8. Embodiment 7 (Modification of Embodiments 5 and 6)
9. Embodiment 8 (Modification of Embodiments 1 to 7. Photoelectric Connector According to Seventh Configuration)
10. Embodiment 9 (Modification of Embodiments 1 to 8. Photoelectric Connector According to Tenth Configuration, Photoelectric Connector According to Eleventh Configuration)
11. Embodiment 10 (Modification of Embodiments 1 to 9. Photoelectric Connector According to 10'-th Configuration, Photoelectric Connector According to Eleventh Configuration)
12. Others <General Description of Photoelectric Connector According to the Present Disclosure>

<Signal Transmitting/Receiving Member with First Structure>

In the photoelectric connector according to the present disclosure, a protruding portion may be provided on one of an opposite surface of a first signal transmitting/receiving member and an opposite surface of a second signal transmitting/receiving member and a recessed portion may be provided in the other opposite surface.

When a plug is fitted to a receptacle, the protruding portion may be fitted to the recessed portion. Note that, the photoelectric connector according to this aspect is referred to as "a signal transmitting/receiving member with a first structure" for convenience. The use of this aspect makes it possible to easily position the first signal transmitting/receiving member and the second signal transmitting/receiving member and to reduce a size and costs since a component for positioning is not required.

<Signal Transmitting/Receiving Member with Second Structure>

Alternatively, in the photoelectric connector according to the present disclosure, the receptacle may further include a second guide pin that is provided in a receptacle housing, has a rear portion fixed to the receptacle housing, and extends in parallel to an axis line of the receptacle.

The second signal transmitting/receiving member may have a second guide pin hole into which the second guide pin is inserted.

When the plug is fitted to the receptacle, the first guide pin may pass through a first guide pin hole and may be inserted into the second guide pin hole. Note that, the photoelectric connector according to this aspect is referred to as "a signal transmitting/receiving member with a second structure" for convenience. The use of this aspect makes it possible to easily position the first signal transmitting/receiving member and the second signal transmitting/receiving member and to reduce a size and costs since a component for positioning is not required. Preferably, a leading end portion of the first guide pin is slightly tapered so as to be easily inserted into the second guide pin hole.

<Second Signal Transmitting/Receiving Member Biasing Means with First Structure>

In the signal transmitting/receiving member with the first structure or the signal transmitting/receiving member with the second structure in the photoelectric connector according to the present disclosure, the receptacle may further include a spring bush that is provided in the receptacle housing and is attached to a rear portion of the second signal transmitting/receiving member.

A second signal transmitting/receiving member biasing means may be a spring (compression spring) that has a rear end portion attached to the receptacle housing and a leading end portion attached to the spring bush. Note that, the photoelectric connector according to this aspect is referred to as "a second signal transmitting/receiving member biasing means with a first structure" for convenience. The use of this structure makes it possible to reliably bias the first signal transmitting/receiving member and the second signal transmitting/receiving member to the rear side of the plug with a simple structure in a state in which the plug is fitted to the receptacle.

<Second Signal Transmitting/Receiving Member Biasing Means with Second Structure>

In addition, in the signal transmitting/receiving member with the second structure in the photoelectric connector according to the present disclosure, the second signal transmitting/receiving member biasing means may be a spring (a pressing spring or a compression spring) that is provided between the second guide pin and the second signal transmitting/receiving member and surrounds the outer circumference of the second guide pin. Note that, the photoelectric connector according to this aspect is referred to as "a second signal transmitting/receiving member biasing means with a second structure" for convenience. The use of this aspect makes it possible to reliably bias the first signal transmitting/receiving member and the second signal transmitting/receiving member to the rear side of the plug with a simple structure in a state in which the plug is fitted to the receptacle.

In the photoelectric connector according to the present disclosure including the above-mentioned various preferred aspects, the plug may further include a plug cover and
a plug housing may be provided so as to be movable in the plug cover.

<Photoelectric Connector According to First Configuration>

In addition, in the photoelectric connector according to the present disclosure including the above-mentioned various preferred aspects, the plug cover may have four surfaces, that is, a first side surface and a second side surface that extend in parallel to the axis line of the plug, a first surface connecting one side of the first side surface and one side of the second side surface which extend in parallel to the axis line of the plug, and a second surface connecting the other side of the first side surface and the other side of the second side surface which extend in parallel to the axis line of the plug.

The plug housing may have four surfaces, that is, a first side surface and a second side surface that extend in parallel to the axis line of the plug, a first surface connecting one side of the first side surface and one side of the second side surface which extend in parallel to the axis line of the plug, and a second surface connecting the other side of the first side surface and the other side of the second side surface which extend in parallel to the axis line of the plug.

The receptacle housing may have four surfaces, that is, a first side surface and a second side surface that extend in parallel to the axis line of the receptacle, a first surface connecting one side of the first side surface and one side of the second side surface which extend in parallel to the axis line of the receptacle, and a second surface connecting the other side of the first side surface and the other side of the second side surface which extend in parallel to the axis line of the receptacle.

The plug housing may be movable in the receptacle housing. Note that, the photoelectric connector according to the present disclosure having this configuration is referred to as "a photoelectric connector according to a first configuration" for convenience.

Here, the direction of the axis line of the plug and the axis line of the receptacle is referred to as an X direction. The direction that connects the first side surface and the second side surface of the plug cover, connects the first side surface and the second side surface of the plug housing, and connects the first side surface and the second side surface of the receptacle housing is referred to as a Y direction. The direction that connects the first surface and the second surface of the plug cover, connects the first surface and the second surface of the plug housing, and connects the first surface and the second surface of the receptacle housing is referred to as a Z direction.

In the photoelectric connector according to the first configuration, a front end of the plug cover facing the receptacle and a rear end of the plug cover which is opposite to the front end of the plug cover may be opened.

A front end of the plug housing facing the receptacle housing and a rear end of the plug housing which is opposite to the front end of the plug housing may be opened.

A front end of the receptacle housing facing the plug housing and a rear end of the receptacle housing which is opposite to the front end of the receptacle housing may be opened.

<Photoelectric Connector According to 1'-th Configuration>

In the photoelectric connector according to the first configuration including the above-mentioned preferred configurations, a first electrode unit may include a contact portion and
a second electrode unit may include a contact piece that comes into contact with the contact portion of the first electrode unit.

In a state in which the plug is fitted to the receptacle, the plug housing may be biased in a direction perpendicular to the axis line of the plug by the contact piece of the second electrode unit which comes into contact with the contact portion of the first electrode unit. Note that, the photoelectric connector according to the present disclosure having this configuration is referred to as "a photoelectric connector according to a 1'-th configuration" for convenience.

<Photoelectric Connector with Upper/Lower Electrode Structure>

In addition, in the photoelectric connector according to the 1'-th configuration, the plug may include one first electrode unit and
the receptacle may include two second electrode units.

The first electrode unit may be attached to the first surface of the plug housing and the two second electrode units may be attached to the first surface and the second surface of the receptacle housing. Note that, the photoelectric connector according to the present disclosure having this configuration is referred to as "a photoelectric connector with an upper/lower electrode structure" for convenience. The use of this configuration makes it possible to achieve an electrode unit corresponding to a reversible structure. That is, the receptacle and the plug can be fitted to each other such that the first surface of the receptacle housing corresponds to the first surface of the plug housing. In addition, the receptacle and the plug can be fitted to each other such that the first surface of the receptacle housing corresponds to the second surface of the plug housing. The first electrode unit can be attached to the first surface of the plug housing by, for example, a screw, a snap-fit member, or an adhesive or can be directly attached to the first surface of the plug housing on the basis of an insert molding method. In addition, the second electrode units can be attached to the first surface and the second surface of the receptacle housing by, for example, screws, snap-fit members, or an adhesive or can be directly attached to the first surface and the second surface of the receptacle housing on the basis of an insert molding method.

In the photoelectric connector with the upper/lower electrode structure, in a state in which the plug is fitted to the receptacle, the first surface and the second surface of the plug housing may be biased by the contact pieces of the second electrode units (the first surface and the second surface may be biased in the Z direction). In addition, the photoelectric connector with the upper/lower electrode structure which includes this configuration, plug cover opening portions into which the contact pieces of the second electrode units are inserted may be provided in the first surface and the second surface of the plug cover.

In this case, in a state in which the plug is fitted to the receptacle, the contact piece of one of the second electrode units may come into contact with the contact portion of the first electrode unit through the plug cover opening portion provided in the first surface of the plug cover and may bias the plug housing to the second surface of the plug cover.

The contact piece of the other second electrode unit may come into contact with the second surface of the plug housing through the plug cover opening portion provided in the second surface of the plug cover and may bias the plug housing to the first surface of the plug cover (may bias the plug housing in the Z direction). In addition, in this configuration, the force of the contact piece of the one second electrode unit biasing the plug housing to the second surface of the plug cover may be different from the force of the contact piece of the other second electrode unit biasing the plug housing to the first surface of the plug cover.

Furthermore, in the photoelectric connector with the upper/lower electrode structure which includes these configurations, the first electrode unit may have three contact portions.

The three contact portions of the first electrode unit may be arranged in the order of a contact portion for a power source, a contact portion for grounding, and a contact portion for a power source.

The second electrode unit may have three contact pieces.

The three contact pieces of the second electrode unit may be arranged in the order of a contact piece for a power source, a contact piece for grounding, and a contact piece for a power source.

Alternatively, the first electrode unit may have four contact portions.

The four contact portions of the first electrode unit may be arranged in the order of a contact portion for a power source, a contact portion for grounding, a contact portion for grounding, and a contact portion for a power source or may be arranged in the order of a contact portion for grounding, a contact portion for a power source, a contact portion for a power source, and a contact portion for grounding.

The second electrode unit may have four contact portions.

The four contact portions of the second electrode unit may be arranged in the order of a contact portion for a power source, a contact portion for grounding, a contact portion for grounding, and a contact portion for a power source or may be arranged in the order of a contact portion for grounding, a contact portion for a power source, a contact portion for a power source, and a contact portion for grounding.

Further, in the photoelectric connector with the upper/lower electrode structure which includes these configurations, the second electrode unit may include a first portion and a second portion that faces the first portion with a gap therebetween.

When the plug is fitted to the receptacle, the second portion may come into contact with an outer surface (outside) of the plug housing and may be biased to the first portion, and the first portion and the second portion may come into contact with each other and may be electrically connected to each other. The use of this configuration makes it possible to reliably control the conduction/non-conduction of the contact piece for a power source and to prevent the occurrence of a short circuit. In addition, in this configuration, the second portion may be configured so as to come into contact with the side surface of the plug housing and furthermore a notched portion may be provided in a leading end of the side surface of the plug housing. The use of this configuration makes it possible to more reliably control the conduction/non-conduction of the contact piece for a power source and to more reliably prevent the occurrence of a short circuit. Alternatively, in this configuration, the second portion may have a protruding portion that protrudes to the inside of the receptacle housing. When the plug is fitted to the receptacle, the protruding portion of the second portion may come into contact with the first surface of the plug housing and the second portion may be biased to the first portion. The first portion and the second portion may come into contact with each other and may be electrically connected to each other.

<Push-In/Push-Out Fitting Method>

In addition, in the photoelectric connector with the upper/lower electrode structure which includes these configurations, a "T"-shaped hole portion may be provided in each of the first side surface and the second side surface of the plug cover.

A guide groove portion may be provided in each of an outer surface of a leading end portion of the first side surface and an outer surface of a leading end portion of the second side surface of the plug housing. Engaging bars that are engaged with the guide groove portions through the "T"-shaped hole portions provided in the first side surface and the second side surface of the plug cover may be provided on an outer surface of the first side surface and an outer surface of the second side surface of the receptacle housing. The use of this configuration makes it possible to achieve a push-in/push-out fitting method. A plug cover locking member and a plug cover locking member recessed portion in a photoelectric connector according to a third configuration which will be described below correspond to an engaging bar and a guide groove portion, respectively. In addition, in this configuration, a plurality of recessed portions may be provided in the guide groove portion. A step or an inclination may be provided in a side wall of the recessed portion. A leading end of the engaging bar may be movable only in a direction from a first recessed portion to a last recessed portion.

<Photoelectric Connector with Side Electrode Structure>

Alternatively, in the photoelectric connector according to the 1'-th configuration, the plug may include two first electrode units and the receptacle may include two second electrode units.

The two first electrode units may be fixed to the second surface of the plug housing along the first side surface and the second side surface of the plug housing and the two second electrode units may be fixed along the first side surface and the second side surface of the receptacle housing. Note that, the photoelectric connector according to the present disclosure having this configuration is referred to as "a photoelectric connector with a side electrode structure" for convenience. The fixation of the first electrode unit to the second surface of the plug housing and the fixation of the second electrode unit to the receptacle housing can be performed by, for example, screws, snap-fit members (elastic locking claw mechanism), an adhesive, or the like.

In the photoelectric connector with the side electrode structure, in a state in which the plug is fitted to the receptacle, the side surfaces of the plug housing may be biased by the contact pieces of the second electrode units (may be biased in the Y direction). In addition, in the photoelectric connector with the side electrode structure which includes this configuration, plug cover opening portions into which the contact pieces of the second electrode units are inserted may be provided in the first side surface and the second side surface of the plug cover.

Furthermore, in the photoelectric connector with the side electrode structure which includes these configurations, the contact piece of the second electrode unit may be rotated on a support point in a direction in which the contact piece becomes closer to the side surface of the receptacle housing and a direction in which the contact piece becomes further away from the side surface of the receptacle housing.

A contact piece biasing means that biases the contact piece of the second electrode unit in the direction in which the contact piece becomes further away from the side surface of the receptacle housing may be provided between the contact piece of the second electrode unit and the side surface of the receptacle housing.

A second electrode unit locking member may be provided in a portion of the second electrode unit which is opposite to the contact piece with the support point interposed therebetween.

A second electrode unit locking recessed portion may be provided in a leading end portion of each of the first side surface and the second side surface of the plug housing.

When the plug is fitted to the receptacle, the second electrode unit locking member and the second electrode unit locking recessed portion may be engaged with each other. The contact piece of the second electrode unit may be rotated to the contact portion of the first electrode unit on the support point and the contact piece of the second electrode unit and the contact portion of the first electrode unit may come into contact with each other. The use of this configuration makes it possible to reliably prevent the occurrence of a short circuit between the contact piece and the contact piece.

Further, in the photoelectric connector with the side electrode structure which includes these configurations, the first electrode unit may include two contact portions.

The two contact portions of the first electrode unit may be a contact portion for a power source and a contact portion for grounding.

The second electrode unit may include two contact pieces.

The two contact pieces of the second electrode unit may be a contact piece for a power source and a contact piece for grounding. The use of this configuration makes it possible to achieve an electrode unit corresponding to a reversible structure. That is, the receptacle and the plug may be fitted to each other such that the first surface of the receptacle housing corresponds to the first surface of the plug housing. In addition, the receptacle and the plug may be fitted to each other such that the first surface of the receptacle housing corresponds to the second surface of the plug housing.

<Photoelectric Connector According to Second Configuration>

In the photoelectric connector according to the first configuration including the photoelectric connectors according to the above-mentioned various preferred configurations and the 1'-th configuration (in the following description, the photoelectric connector according to the first configuration includes the photoelectric connector according to the 1'-th configuration), a plug housing biasing means is provided on the outer surface of the second surface of the plug housing. Note that, the photoelectric connector according to the present disclosure having this configuration is referred to as "a photoelectric connector according to a second configuration" for convenience. The plug housing biasing means may be provided as a separate component on the outer surface of the second surface of the plug housing, or may be provided integrally with the second surface of the plug housing, that is, may extend from the second surface of the plug housing.

In addition, in the photoelectric connector according to the second configuration, a plug housing recessed portion that is engaged with a biasing portion of the plug housing biasing means may be formed in the second surface of the plug housing and the plug housing biasing means may be accommodated in the plug housing recessed portion. In the photoelectric connector according to second configuration including this configuration, the plug housing biasing means may include a first portion, a second portion, and a third portion which are provided in this order from the front side of the plug along the direction of the axis line of the plug.

The second portion may come into contact with the plug housing recessed portion (or the second portion may come into contact with the outer surface of the second surface of the plug housing, or the second portion may extend from the second surface of the plug housing).

The first portion and the third portion may not come into contact with the plug housing recessed portion (or the first portion and the third portion may not come into contact with the outer surface of the second surface of the plug housing, or the second portion may be provided so as to be separated from the second surface of the plug housing) and may form the biasing portion. In addition, in the photoelectric connector according to the second configuration having this configuration, a plug cover recessed portion that is engaged with the biasing portion of the plug housing biasing means may be provided in the second surface of the plug cover and an opening portion that faces the plug housing biasing means may be provided in the plug cover recessed portion. In this case, when the plug cover recessed portion and the biasing portion of the plug housing biasing means are engaged with each other, the plug housing may be fixed to the plug cover.

In addition, in the photoelectric connector according to the second configuration including these various preferred configurations, unlocking claws may be provided in the first surface and the second surface of the receptacle housing.

When the plug cover is closest to the receptacle housing, the unlocking claw may be inserted into the opening portion provided in the plug cover recessed portion and may bias the first portion forming the biasing portion of the plug housing biasing means to the first surface of the plug housing to disengage the plug cover recessed portion from the biasing portion of the plug housing biasing means. In addition, in this case, the plug cover recessed portion and the biasing portion of the plug housing biasing means may be disengaged from each other such that the plug housing is movable with respect to the plug cover.

In the photoelectric connector with the upper/lower electrode structure, the second electrode unit may also be used as the unlocking claw and the unlocking claw may be provided independently of the second electrode unit. As such, since the unlocking claw is not provided in the first surface and the second surface of the receptacle housing, it is possible to prevent a reduction in the strength of the receptacle housing and to reduce the area of an opening. Therefore, it is possible to improve the dustproof performance of the receptacle housing.

Furthermore, in the photoelectric connector according to the second configuration including these various preferred configurations, in a state in which the plug is fitted to the receptacle, the biasing portion of the plug housing biasing means may come into contact with the second surface of the plug cover and may bias the plug housing to the first surface of the plug cover (may bias the plug housing in the Z direction).

<Photoelectric Connector According to Third Configuration>

In the photoelectric connectors according to the first and second configurations including the above-mentioned various preferred configurations, plug cover locking members may be provided in the first side surface and the second side surface of the receptacle housing and plug cover locking member recessed portions that lock the plug cover locking members may be provided in the first side surface and the second side surface of the plug cover.

When the plug cover is closest to the receptacle housing, the plug cover locking members may be locked to the plug cover locking member recessed portions. Note that, the photoelectric connector according to the present disclosure having this configuration is referred to as "a photoelectric connector according to a third configuration" for convenience.

<Photoelectric Connector According to Fourth Configuration>

In the photoelectric connectors according to the first to third configurations including the above-mentioned various preferred configurations, a first shutter may be provided in a front portion of the plug cover.

The first shutter may be opened when the plug is fitted to the receptacle and may be closed when the plug is pulled out of the receptacle. Note that, the photoelectric connector according to the present disclosure having this configuration is referred to as "a photoelectric connector according to a fourth configuration" for convenience.

Here, in the photoelectric connector according to the fourth configuration, a leading end of each of the first side surface and the second side surface of the plug housing may have a substantially semicircular shape.

A side end portion of the first shutter may be engaged with the leading end of each of the first side surface and the second side surface of the plug housing. In addition, in this case, the first shutter may include a first shutter upper component that extends from the first surface of the plug cover to the receptacle and a first shutter lower component that extends from the second surface of the plug cover to the receptacle. Furthermore, in this case, a leading end portion of the first shutter upper component may be rounded and a leading end portion of the first shutter lower component may be rounded so as to be engaged with the leading end portion of the first shutter upper component on the plug cover side. In addition, in these cases, the leading end portion of the first shutter upper component may be folded outward or may be folded back for reinforcement. Further, in the photoelectric connector according to the fourth configuration including the above-mentioned various preferred configurations, the tip of the leading end portion of the first shutter lower component may be notched such that the first shutter upper component and the first shutter lower component easily and reliably overlap each other. Furthermore, in the photoelectric connector according to the fourth configuration including the above-mentioned various preferred configurations, a rear end portion of the first shutter upper component and a rear end portion of the first shutter lower component may be integrally attached to the rear end portion of the plug cover. In this case, the rear end portion of the first shutter upper component and the rear end portion of the first shutter lower component may be integrally attached to the rear end portion of the plug cover on the basis of an insert molding technique.

<Photoelectric Connector According to Fifth Configuration>

In the photoelectric connectors according to the first to fourth configurations including the above-mentioned various preferred configurations, a second shutter that is opened to the second surface of the receptacle housing and to the rear side of the receptacle housing may be provided in a leading end portion of the receptacle housing. In addition, in this case, the second shutter may be opened when the plug is fitted to the receptacle and may be closed when the plug is pulled out of the receptacle. Furthermore, in these cases, second shutter pressing members may be attached to the outer surface of the first side surface and the outer surface of the second side surface of the receptacle housing.

When the second shutter is in a closed state, a leading end portion of the second shutter may be pressed by the second shutter pressing member so as not to be moved to the second surface of the receptacle housing.

When the plug is fitted to the receptacle, the pressing of the leading end portion of the second shutter by the second shutter pressing members may be released by the leading ends of the first side surface and the second side surface of the plug housing. The second shutter may be opened to the second surface of the receptacle housing and to the rear side of the receptacle housing. Note that, the photoelectric connector according to the present disclosure having this configuration is referred to as "a photoelectric connector according to a fifth configuration" for convenience.

<Photoelectric Connector According to Sixth Configuration>

In the photoelectric connectors according to the first to fifth configurations including the above-mentioned various preferred configurations, the rear end of the plug housing may be blocked by a plug protective member or a boot and the rear end of the receptacle housing may be blocked by a receptacle protective member or a boot. Note that, the photoelectric connector according to the present disclosure having this configuration is referred to as "a photoelectric connector according to a sixth configuration" for convenience. In addition, in this case, furthermore, the plug cover may be covered with the boot. With this configuration, when the plug is fitted to the receptacle and when the plug is pulled out of the receptacle, the user can be prevented from directly holding the plug cover and the plug can be safely fitted to the receptacle. The boot is made of, for example, a hard resin or rubber.

<Photoelectric Connector According to Seventh Configuration>

Alternatively, in the photoelectric connectors according to the first to fifth configurations including the above-mentioned various preferred configurations, a connector may be attached to the rear end of the plug housing. Note that, the photoelectric connector according to the present disclosure having this configuration is referred to as "a photoelectric connector according to a seventh configuration" for convenience. Alternatively, in the photoelectric connectors according to the first to fifth configurations including the above-mentioned various preferred configurations, a connector may be attached to the rear end of the receptacle housing. In this case, a connector may be attached to the rear end of the plug housing or the receptacle housing. As such, in the configuration in which the connector is attached to the rear end of the plug housing or the receptacle housing, the plug or the receptacle can be replaced with plugs or receptacles with different connectors to select a plurality of different types of functions.

<Photoelectric Connector According to Eighth Configuration>

Furthermore, in the photoelectric connectors according to the first to seventh configurations including the above-mentioned various preferred configurations, the receptacle housing may further include a second signal transmitting/receiving member guide member that is attached to the inside of the first side surface and the second side surface of the receptacle housing.

Notched portions may be provided in a first side surface of the second signal transmitting/receiving member guide member which faces the first side surface of the receptacle housing and a second side surface of the second signal transmitting/receiving member guide member which faces the second side surface of the receptacle housing so as to extend to the middle of each side surface in parallel to the axis line of the receptacle in a direction from the rear side of the receptacle to the front side of the receptacle.

Second signal transmitting/receiving member protruding portions that are fitted to the notched portions may be provided on the side surfaces of the second signal transmitting/receiving member. The use of this configuration makes it possible to stably move the second signal transmitting/receiving member with high accuracy. Note that, the photoelectric connector according to the present disclosure having this configuration is referred to as "a photoelectric connector according to an eighth configuration" for convenience.

<Photoelectric Connector According to Ninth Configuration>

Furthermore, in the photoelectric connectors according to the first to eighth configurations including the above-mentioned various preferred configurations, the first signal transmitting/receiving member and the second signal transmitting/receiving member may be ferrules.

The first signal transmitting/receiving member may include a first signal transmitting/receiving member insertion hole which is provided in a portion of the first signal transmitting/receiving member close to a rear end of the plug and into which the first signal line, which is an optical fiber assembly, is inserted and a lens for the first signal transmitting/receiving member which is provided in a portion of the first signal transmitting/receiving member close to a front end of the plug and collimates light emitted from optical fibers or light incident on the optical fibers.

The second signal transmitting/receiving member may include a second signal transmitting/receiving member insertion hole which is provided in a portion of the second signal transmitting/receiving member close to a rear end of the receptacle and into which the second signal line, which is an optical fiber assembly, is inserted and a lens for the second signal transmitting/receiving member which is provided in a portion of the second signal transmitting/receiving member close to a front end of the receptacle and collimates light emitted from optical fibers or light incident on the optical fibers. Note that, the photoelectric connector according to this aspect is referred to as "a photoelectric connector according to a ninth configuration" for convenience. Note that, only one of the first signal transmitting/receiving member and the second signal transmitting/receiving member may be a ferrule.

Here, in the photoelectric connector according to the ninth configuration, the first signal transmitting/receiving member may include a first lens protective member and the second signal transmitting/receiving member may include a second lens protective member.

The first lens protective member made of metal (including an alloy) may be attached to the opposite surface of the first signal transmitting/receiving member. The second lens protective member made of metal (including an alloy) may be attached to the opposite surface of the second signal transmitting/receiving member. The provision of the first lens protective member and the second lens protective member makes it possible to improve the durability and abrasion resistance of the first signal transmitting/receiving member and the second signal transmitting/receiving member.

In the photoelectric connector according to the ninth configuration including the above-mentioned various preferred configurations, the optical fiber assembly forming the first signal line may include four tape core wires, that is, a first tape core wire, a second tape core wire, a third tape core wire, and a fourth tape core wire.

The first signal transmitting/receiving member insertion hole may include a first signal transmitting/receiving member right insertion hole and a first signal transmitting/receiving member left insertion hole that is provided so as to be separated from the first signal transmitting/receiving member right insertion hole.

The first tape core wire, the second tape core wire, the third tape core wire, and the fourth tape core wire forming the first signal line may be attached to a bottom surface of the first signal transmitting/receiving member right insertion hole, a bottom surface of the first signal transmitting/receiving member left insertion hole, a top surface of the first signal transmitting/receiving member right insertion hole, and a top surface of the first signal transmitting/receiving member left insertion hole, respectively. There may be a gap between the first tape core wire and the third tape core wire and there may be a gap between the second tape core wire and the fourth tape core wire.

The optical fiber assembly forming the second signal line may include four tape core wires, that is, a first tape core wire, a second tape core wire, a third tape core wire, and a fourth tape core wire.

The second signal transmitting/receiving member insertion hole may include a second signal transmitting/receiving member right insertion hole and a second signal transmitting/receiving member left insertion hole that is provided so as to be separated from the second signal transmitting/receiving member right insertion hole.

The first tape core wire, the second tape core wire, the third tape core wire, and the fourth tape core wire forming the second signal line may be attached to the bottom surface of the second signal transmitting/receiving member right insertion hole, the bottom surface of the second signal transmitting/receiving member left insertion hole, the top surface of the second signal transmitting/receiving member right insertion hole, and the top surface of the second signal transmitting/receiving member left insertion hole, respectively. There may be a gap between the first tape core wire and the third tape core wire and there may be a gap between the second tape core wire and the fourth tape core wire. Here, the tape core wire is given as a representative example. Note that, all of the tape core wires may be core wires in a disassembled state or the tape core wires and the core wires in a disassembled state may be mixed.

In addition, in this configuration, the tape core wire may include:

a base resin sheet;

a plurality of core members that are provided side by side on the base resin sheet; and a covering member that covers the base resin sheet and the plurality of core members. Note that, this configuration is referred to as a "waveguide unit structure" for convenience.

<Photoelectric Connector According to Tenth Configuration>

Alternatively, in a photoelectric connector according to the present disclosure that includes the photoelectric connectors according to the first to eighth configurations including the above-mentioned various preferred configurations, the first signal transmitting/receiving member may include a light emitting element and a light receiving element and the second signal transmitting/receiving member may include a light emitting element and a light receiving element. Note that, the photoelectric connector according to this aspect is referred to as "a photoelectric connector according to a tenth configuration" for convenience. That is, the light emitting element and the light receiving element are mixed in each of the first signal transmitting/receiving member and the second signal transmitting/receiving member. Here, one light emitting element or a plurality of light emitting elements may be provided in the first signal transmitting/receiving member and one light receiving element or a plurality of light receiving elements may be provided in the first signal transmitting/receiving member. One light emitting element or a plurality of light emitting elements may be provided in the second signal transmitting/receiving member and one light receiving element or a plurality of light receiving elements may be provided in the second signal transmitting/receiving member.

In the photoelectric connector according to the tenth configuration, the plug housing and the receptacle housing may be provided with semiconductor chips for driving the light emitting element and the light receiving element. In addition, in this case, in the plug housing and the receptacle housing, the light emitting elements and the light receiving elements may include a first light emitting element/light receiving element group and a second light emitting element/light receiving element group. The first light emitting element/light receiving element group, the second light emitting element/light receiving element group, a first semiconductor chip for driving the first light emitting element/light receiving element group, and a second semiconductor chip for driving the second light emitting element/light receiving element group may be mounted on a printed board. In addition, furthermore, the printed board may be a double-sided rigid printed board. The first light emitting element/light receiving element group, the second light emitting element/light receiving element group, and the first semiconductor chip may be mounted on one surface of the double-sided rigid printed board. The second semiconductor chip may be mounted on the other surface of the double-sided rigid printed board. Alternatively, the printed board may be a flexible printed board. A first semiconductor chip for driving the first light emitting element/light receiving element group may be mounted on a first region of one surface of the flexible printed board. A second semiconductor chip for driving the second light emitting element/light receiving element group may be mounted on a second region of one surface of the flexible printed board. The first light emitting element/light receiving element group and the second light emitting element/light receiving element group may be mounted on a third region of one surface of the flexible printed board which is located between the first region and the second region.

<Photoelectric Connector According to 10'-th Configuration>

Alternatively, in a photoelectric connector according to the present disclosure that includes the photoelectric connectors according to the first to eighth configurations including the above-mentioned various preferred configurations, one of the first signal transmitting/receiving member and the second signal transmitting/receiving member may include a light emitting element and the other signal transmitting/receiving member may include a light receiving element. Note that, the photoelectric connector according to this aspect is referred to as "a photoelectric connector according to a 10'-th configuration" for convenience. One light emitting element or a plurality of light emitting elements may be provided and one light receiving element or a plurality of light receiving elements may be provided.

<Photoelectric Connector According to (10'-A)-th Configuration>/<Photoelectric Connector According to (10'-A-1)-th Configuration>/<Photoelectric Connector According to (10'-A-2)-th Configuration>

Here, in the photoelectric connector according to the 10'-th configuration, the plug housing or the receptacle housing including the light emitting elements may be provided with semiconductor chips for driving the light emitting elements. Note that, the photoelectric connector according to the present disclosure having this configuration is referred to as "a photoelectric connector according to a (10'-A)-th configuration" for convenience. In the photoelectric connector according to the (10'-A)-th configuration, an electric signal is converted into an optical signal or an optical signal is converted into an electric signal. Here, in this case, the light emitting elements (specifically, a plurality of light emitting elements) may include a first light emitting element group and a second light emitting element group.

The first light emitting element group, the second light emitting element group, a first semiconductor chip for driving the first light emitting element group, and a second semiconductor chip for driving the second light emitting element group may be mounted on a printed board.

Furthermore, the printed board may be a double-sided rigid printed board.

The first light emitting element group, the second light emitting element group, and the first semiconductor chip may be mounted on one surface of the double-sided rigid printed board.

The second semiconductor chip may be mounted on the other surface of the double-sided rigid printed board.

Alternatively, the printed board may be a flexible printed board.

The first semiconductor chip for driving the first light emitting element group may be mounted on a first region of one surface of the flexible printed board.

The second semiconductor chip for driving the second light emitting element group may be mounted on a second region of one surface of the flexible printed board.

The first light emitting element group and the second light emitting element group may be mounted on a third region of one surface of the flexible printed board which is located between the first region and the second region.

<Photoelectric Connector According to (10'-B)-th Configuration>/<Photoelectric Connector According to (10'-B-1)-th Configuration>/<Photoelectric Connector According to (10'-B-2)-th Configuration>

Furthermore, in the photoelectric connector according to the 10'-th configuration including the above-mentioned various preferred configurations (the photoelectric connector according to the (10'-A)-th configuration, the photoelectric connector according to the (10'-A-1)-th configuration, and the photoelectric connector according to the (10'-A-2)-th configuration), the plug housing or the receptacle housing including the light receiving elements may be provided with semiconductor chips for driving the light receiving elements. Note that, the photoelectric connector according to the present disclosure having this configuration is referred to as "a photoelectric connector according to a (10'-B)-th configuration" for convenience. In the photoelectric connector according to the (10'-B)-th configuration, an electric signal is converted into an optical signal or an optical signal is converted into an electric signal. Here, in this case, the light receiving elements (specifically, a plurality of light receiving elements) may include a first light receiving element group and a second light receiving element group.

The first light receiving element group, the second light receiving element group, a first semiconductor chip for driving the first light receiving element group, and a second semiconductor chip for driving the second light receiving element group may be mounted on a printed board.

In this case, the printed board may be a double-sided rigid printed board.

The first light receiving element group, the second light receiving element group, and the first semiconductor chip may be mounted on one surface of the double-sided rigid printed board.

The second semiconductor chip may be mounted on the other surface of the double-sided rigid printed board.

Alternatively, the printed board may be a flexible printed board.

The first semiconductor chip for driving the first light receiving element group may be mounted on a first region of one surface of the flexible printed board.

The second semiconductor chip for driving the second light receiving element group may be mounted on a second region of one surface of the flexible printed board.

The first light receiving element group and the second light receiving element group may be mounted on a third region of one surface of the flexible printed board which is located between the first region and the second region.

In addition, in the photoelectric connector according to the tenth configuration or the photoelectric connector according to the 10'-th configuration including the above-mentioned various preferred configurations, the light emitting element may a surface-emitting semiconductor laser element (vertical cavity surface emitting laser (VCSEL)).

<Photoelectric Connector According to (11-A)-th Configuration>/<Photoelectric Connector According to (11-B)-th Configuration>

Furthermore, in the photoelectric connector according to the tenth configuration or the photoelectric connector according to the 10'-th configuration including the above-mentioned various preferred configurations, the plug housing may include a first mirror unit.

The optical path of light emitted from the first signal transmitting/receiving member may be changed by the first mirror unit and the light may travel to the second signal transmitting/receiving member, or the optical path of light emitted from the second signal transmitting/receiving member may be changed by the first mirror unit and the light may travel to the first signal transmitting/receiving member (the photoelectric connector according to the present disclosure having this configuration is referred to as "a photoelectric connector according to a (11-A)-th configuration" for convenience). In addition, in the photoelectric connector according to the tenth configuration or the photoelectric connector according to the 10'-th configuration including the above-mentioned various preferred configurations, the receptacle housing may include a second mirror unit.

The optical path of light emitted from the first signal transmitting/receiving member may be changed by the second mirror unit and the light may travel to the second signal transmitting/receiving member, or the optical path of light emitted from the second signal transmitting/receiving member may be changed by the second mirror unit and the light may travel to the first signal transmitting/receiving member (the photoelectric connector according to the present disclosure having this configuration is referred to as "a photoelectric connector according to a (11-B)-th configuration" for convenience). The first mirror unit may include one mirror or a plurality of mirrors. Similarly, the second mirror unit may include one mirror or a plurality of mirrors.

Further, in the photoelectric connector according to the present disclosure that includes the photoelectric connectors according to the first to tenth configurations or the photoelectric connector according to the 10'-th configuration including the above-mentioned various preferred aspects and configurations, the plug housing, the receptacle housing, or the plug housing and the receptacle housing may include active electronic components. Specifically, examples of the active electronic components include a memory, a communication element, such as a Wi-Fi (registered trademark) element or a Bluetooth (registered trademark) element, and a light emitting element, such as an LED. The photoelectric connector may function as a small storage, a wireless module, or a display device. Alternatively, for example, a micro-adhesive or a brush may be provided to keep the first signal transmitting/receiving member or the second signal transmitting/receiving member clean.

Embodiment 1

Embodiment 1 relates to a photoelectric connector according to the present disclosure. In addition, the photoelectric connector according to Embodiment 1 relates to a signal transmitting/receiving member with a second structure, a photoelectric connector according to a first configuration, a photoelectric connector according to a 1'-th configuration, a photoelectric connector according to a second configuration, a photoelectric connector according to a fourth configuration, a photoelectric connector according to a fifth configuration, a photoelectric connector according to a sixth configuration, a photoelectric connector according to an eighth configuration, and a photoelectric connector according to a ninth configuration. Furthermore, the photoelectric connector according to Embodiment 1 relates to a photoelectric connector that has a side electrode structure and includes a second signal transmitting/receiving member biasing means with a second structure.

Figure 2:
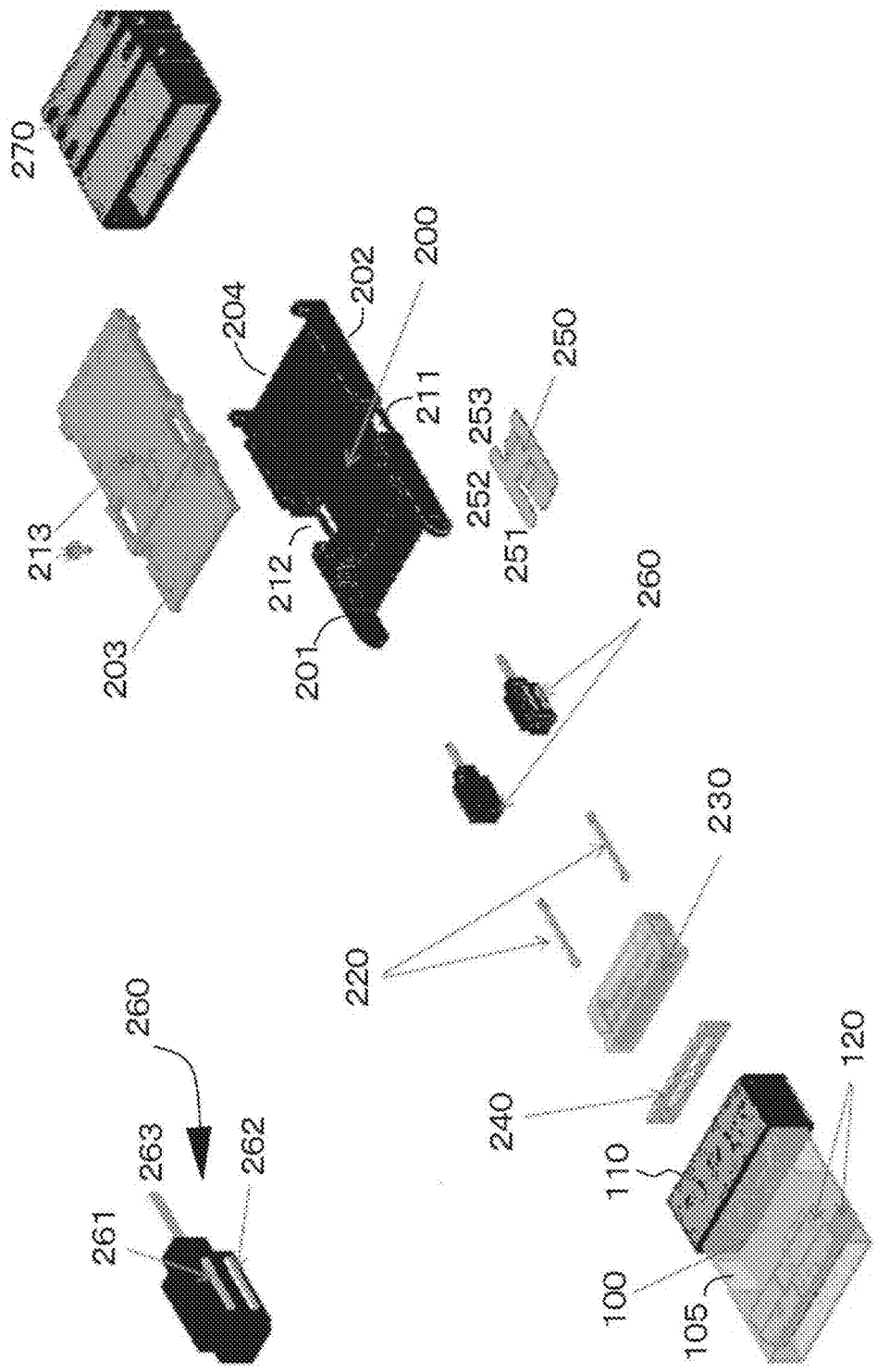
FIG. 2 is an exploded perspective view illustrating the plug (a plug cover and a plug housing) forming the photoelectric connector according to Embodiment 1.
Figure 3:
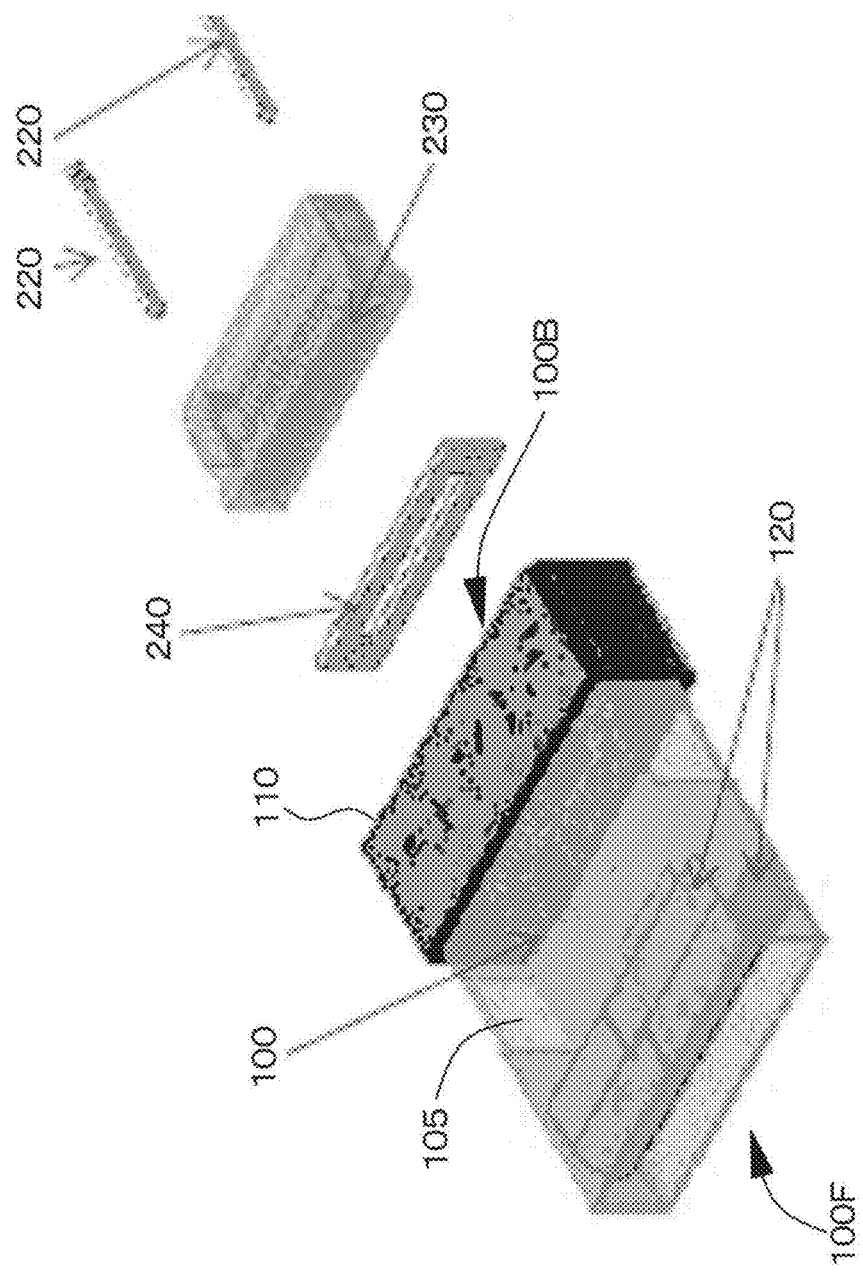
FIG. 3 is an exploded perspective view illustrating a portion of the plug (the plug cover and the plug housing) forming the photoelectric connector according to Embodiment 1.
Figure 4:
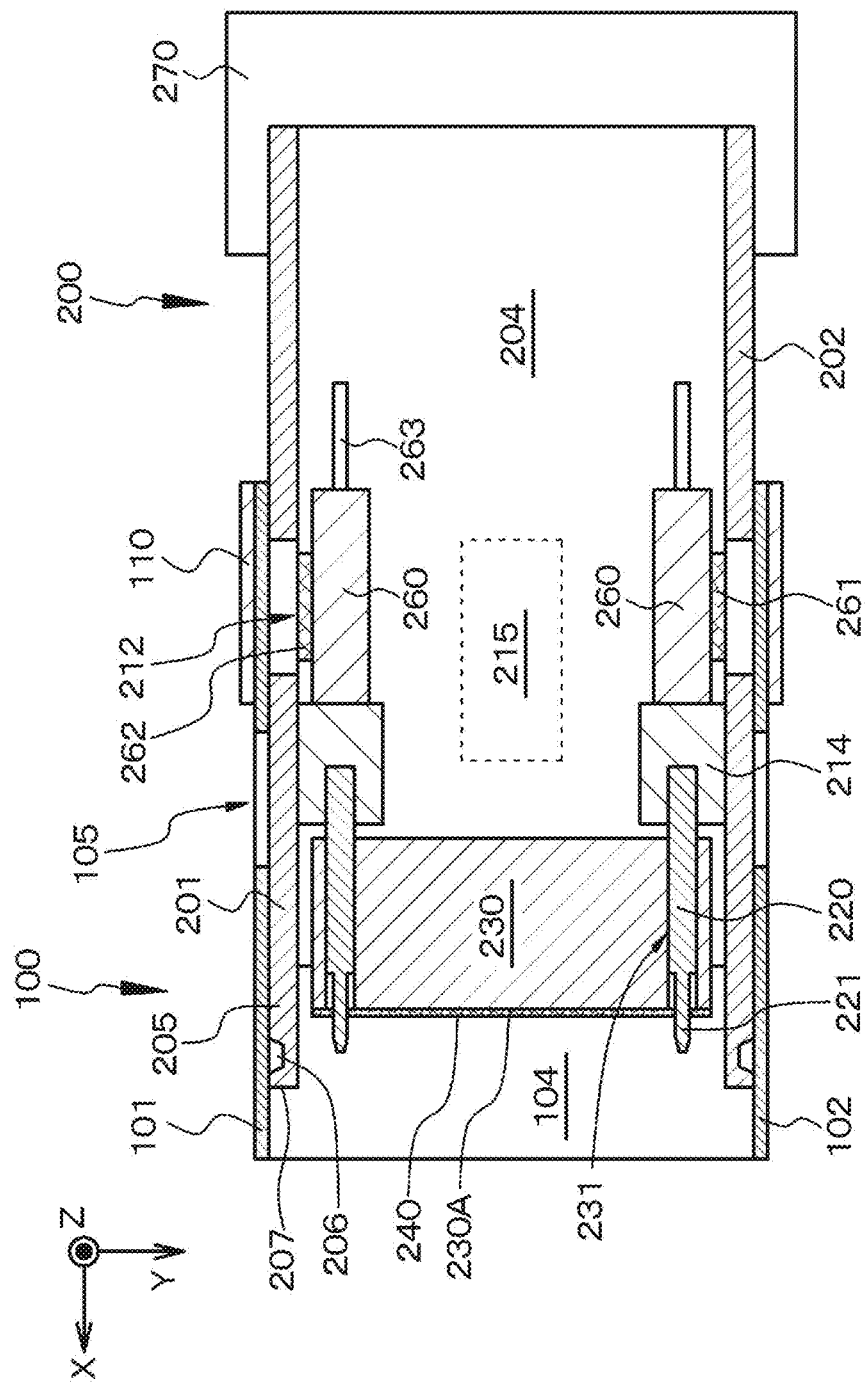
FIG. 4 is a cross-sectional view schematically illustrating the plug (the plug cover and the plug housing) forming the photoelectric connector according to Embodiment 1 taken along a virtual horizontal plane (however, a cross-sectional view illustrating the plug housing as viewed from the upper side).
Figure 5:
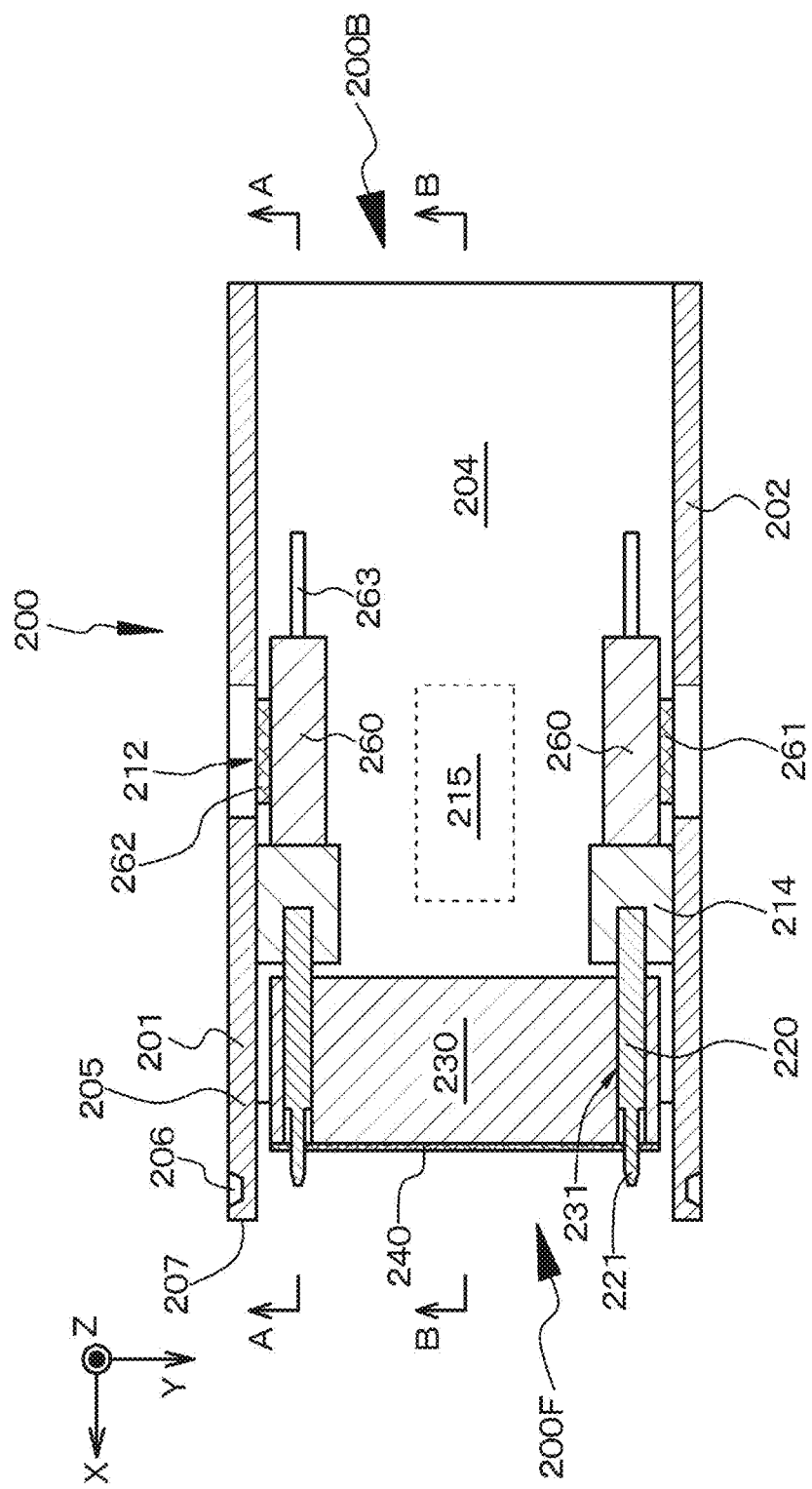
FIG. 5 is a cross-sectional view schematically illustrating the plug housing forming the photoelectric connector according to Embodiment 1 taken along a virtual horizontal plane (however, a cross-sectional view illustrating the plug housing as viewed from the upper side).
Figure 6:
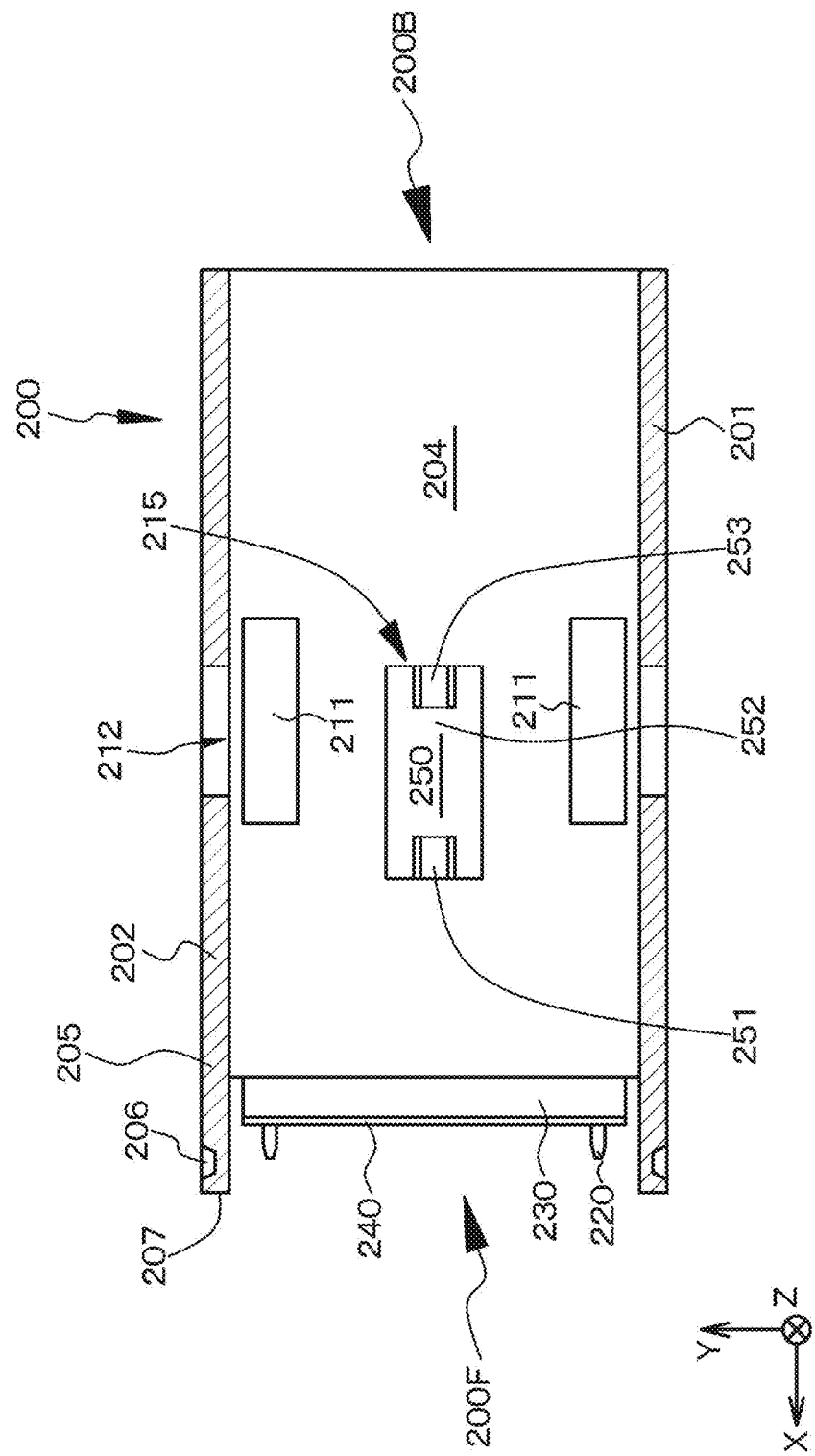
FIG. 6 is a cross-sectional view schematically illustrating the plug housing forming the photoelectric connector according to Embodiment 1 taken along a virtual horizontal plane (however, a cross-sectional view illustrating the plug housing as viewed from the lower side).
Figure 7:
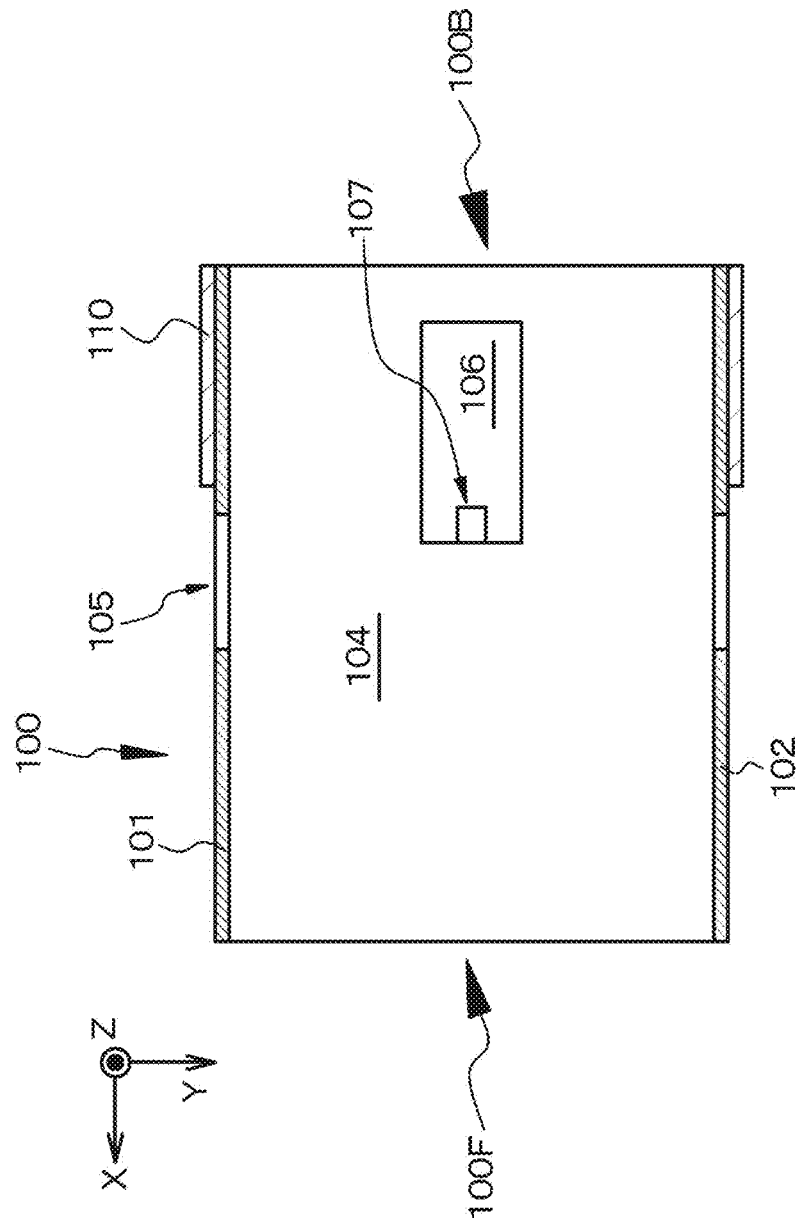
FIG. 7 is a cross-sectional view schematically illustrating the plug cover forming the photoelectric connector according to Embodiment 1 taken along a virtual horizontal plane (however, a cross-sectional view illustrating the plug cover as viewed from the lower side).
Figure 8A:
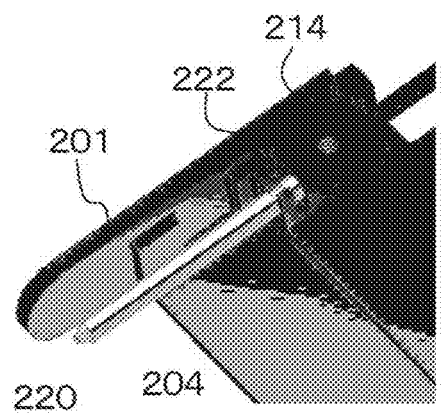
FIGS. 8A, 8B, and 8C are enlarged perspective views illustrating a first guide pin fixing portion and a first guide pin.
Figure 8B:
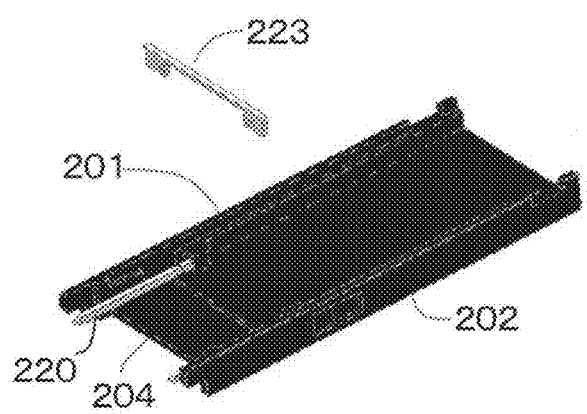
Figure 8C:
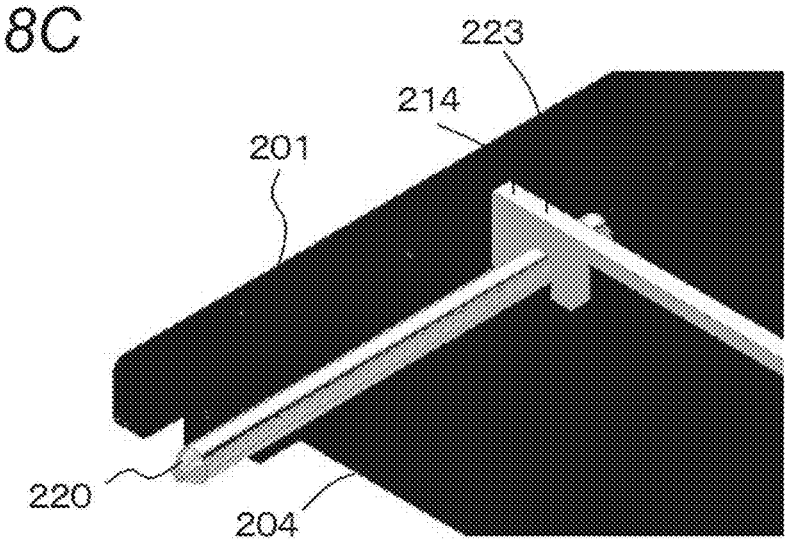
Figure 9:
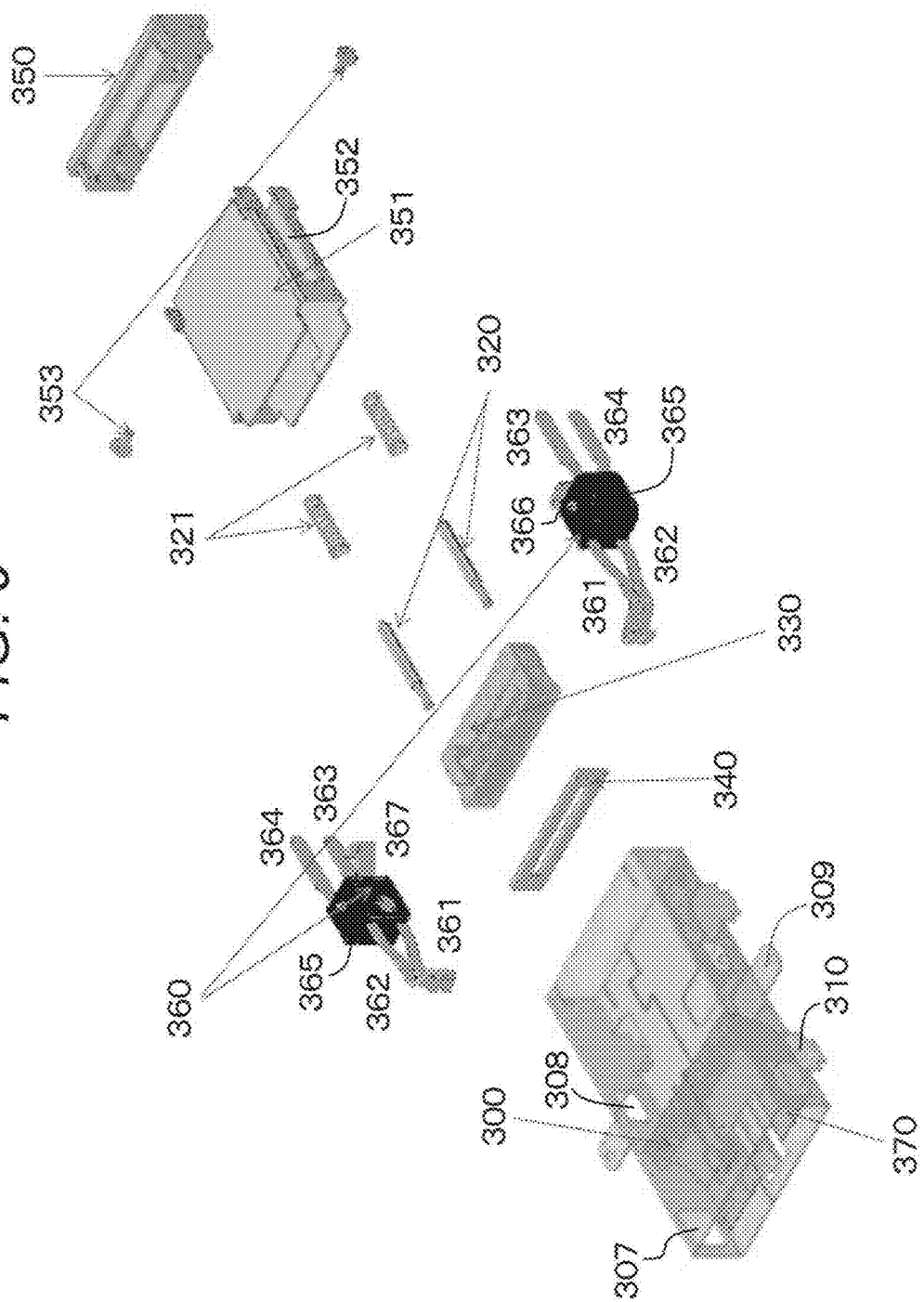
FIG. 9 is an exploded perspective view illustrating the receptacle forming the photoelectric connector according to Embodiment 1.
Figure 10:
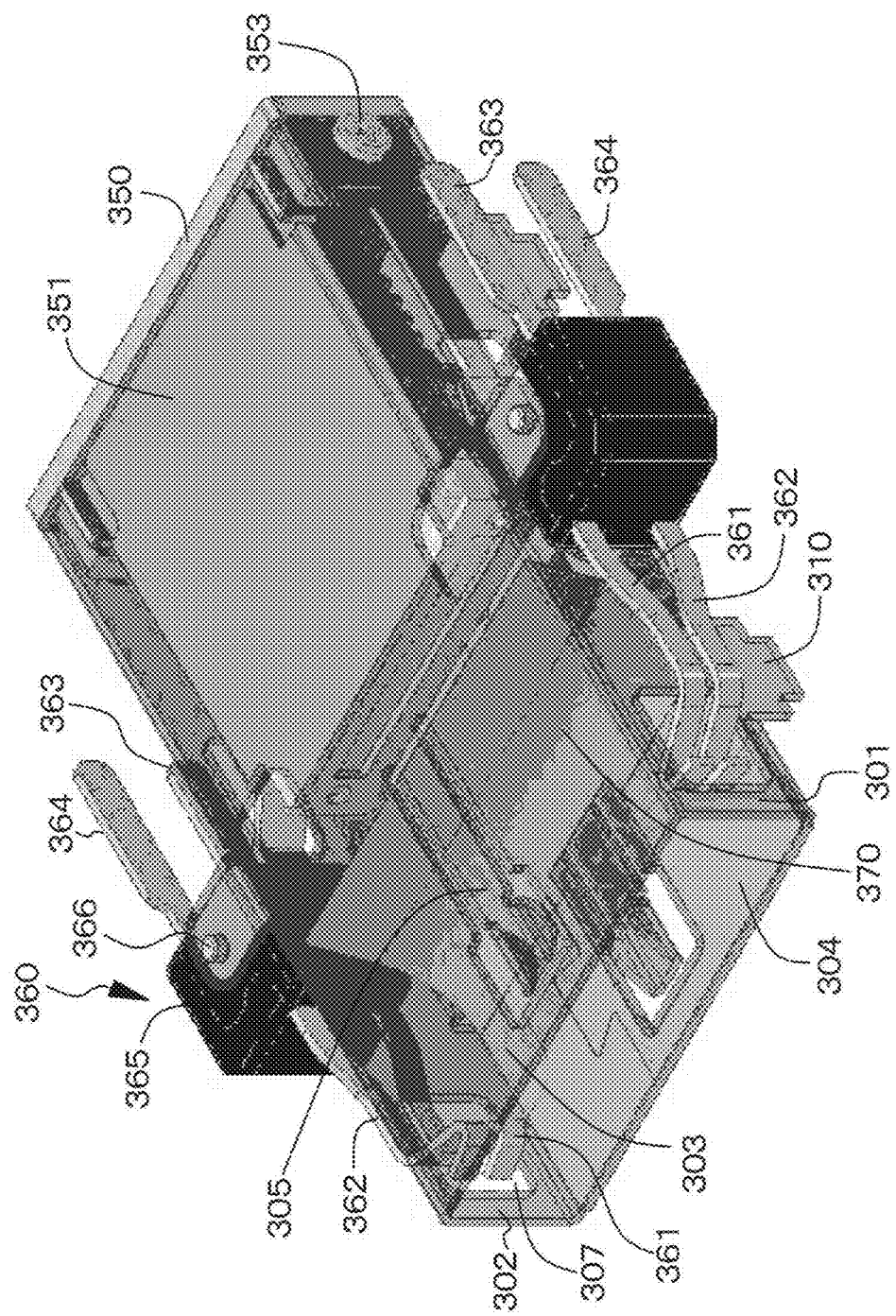
FIG. 10 is a perspective view illustrating the receptacle forming the photoelectric connector according to Embodiment 1 as obliquely viewed from the upper side.
Figure 11:
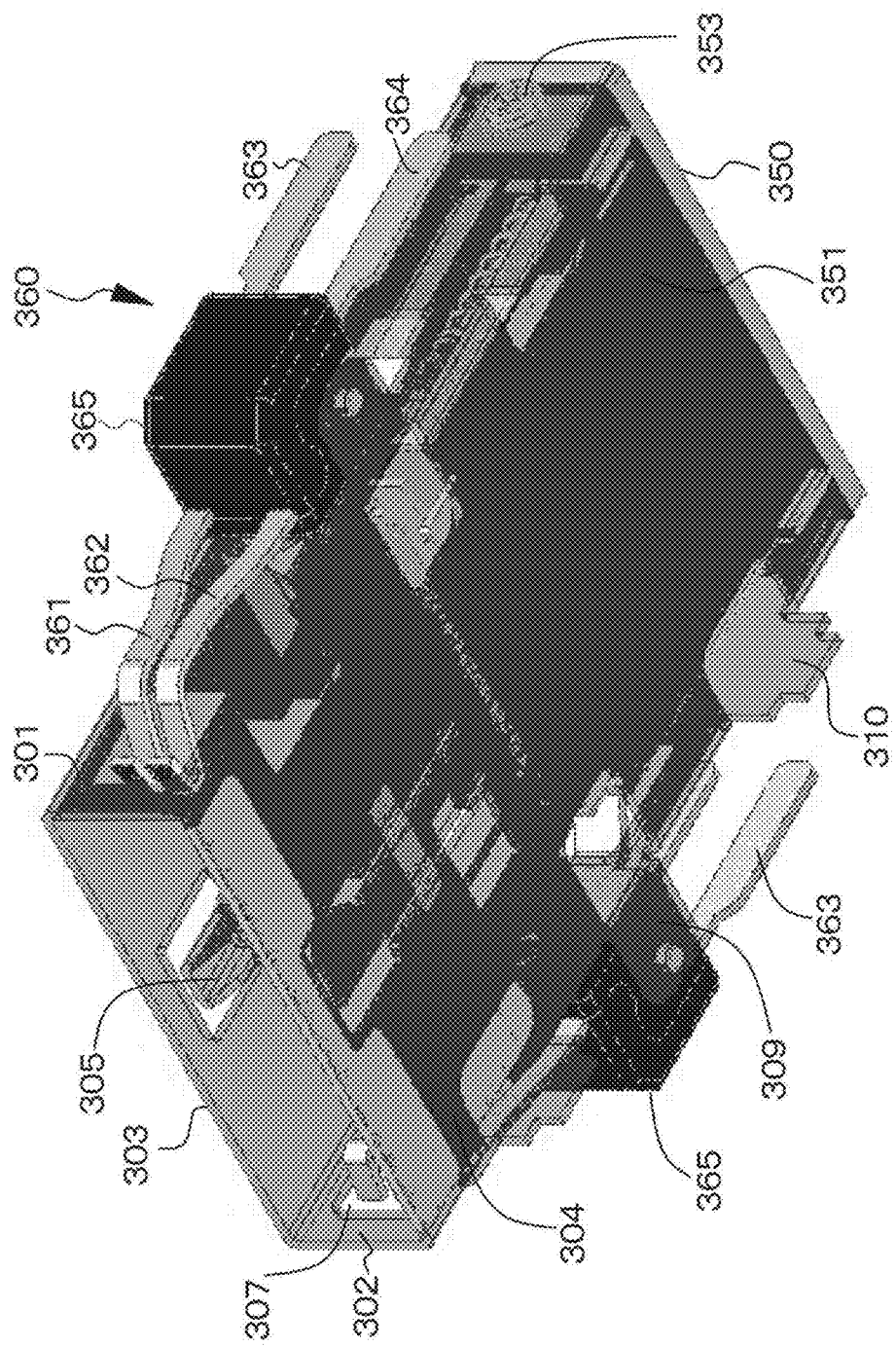
FIG. 11 is a perspective view illustrating the receptacle forming the photoelectric connector according to Embodiment 1 as obliquely viewed from the lower side.
Figure 12:
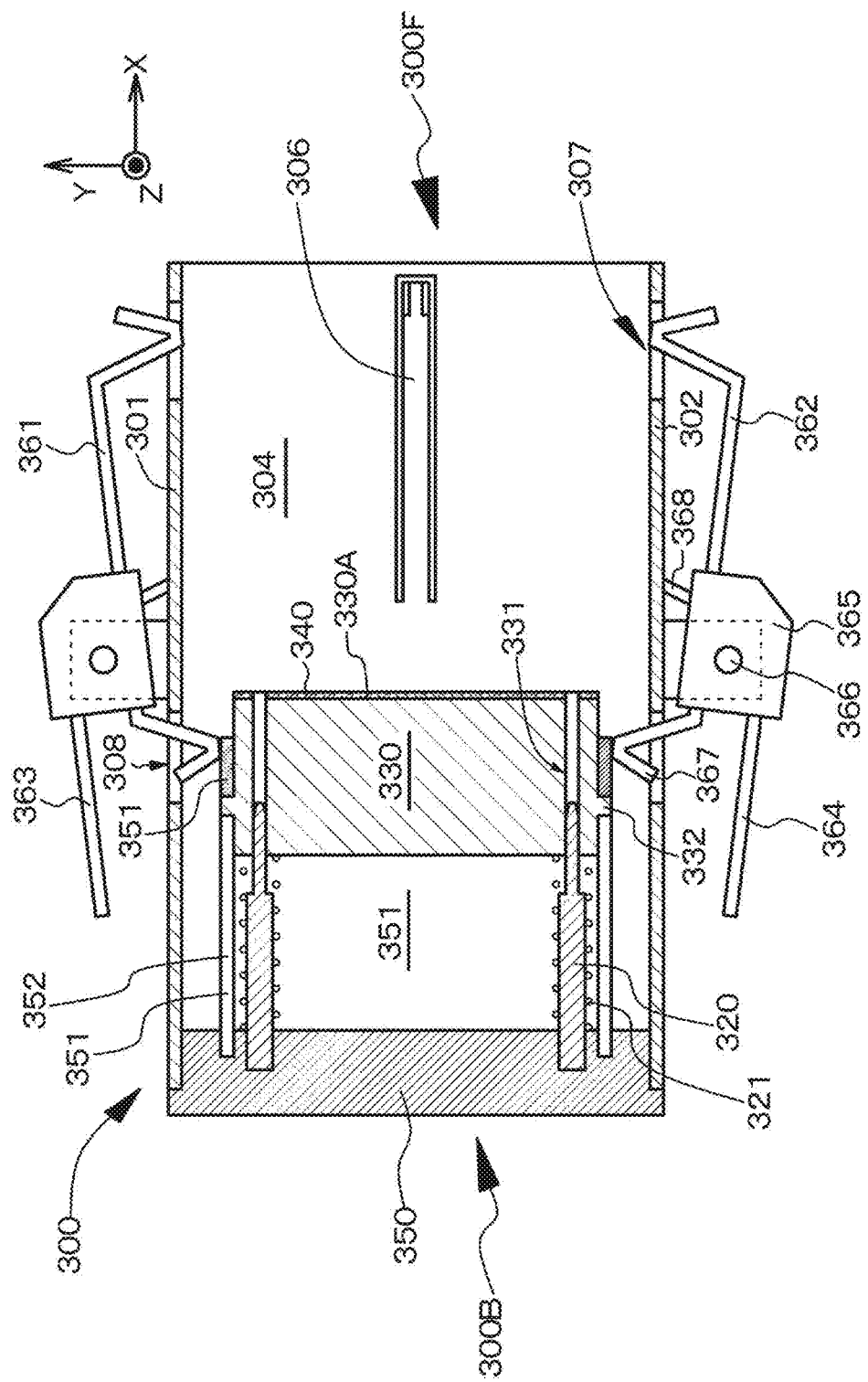
FIG. 12 is a cross-sectional view schematically illustrating the receptacle forming the photoelectric connector according to Embodiment 1 taken along a virtual horizontal plane (however, a cross-sectional view illustrating the receptacle as viewed from the upper side).
Figure 13A:
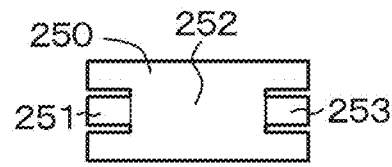
FIGS. 13A, 13B, and 13C are a plan view, a cross-sectional view, and a perspective view schematically illustrating a plug housing biasing means, respectively.
Figure 13B:
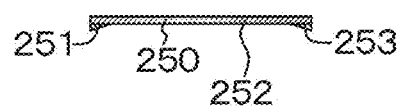
Figure 13C:
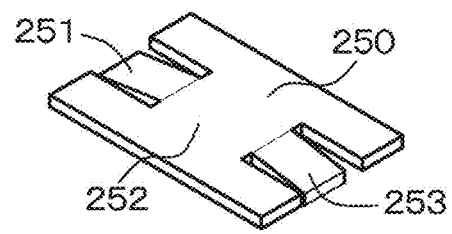
Figure 13D:
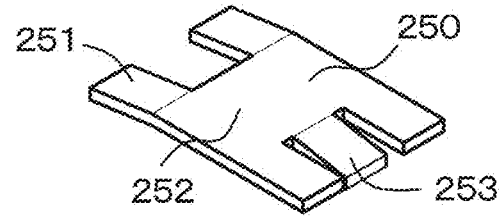
FIGS. 13D and 13E are perspective views schematically illustrating a modification example of the plug housing biasing means.
Figure 13E:
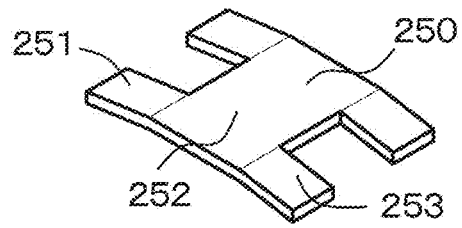
Figure 15A:
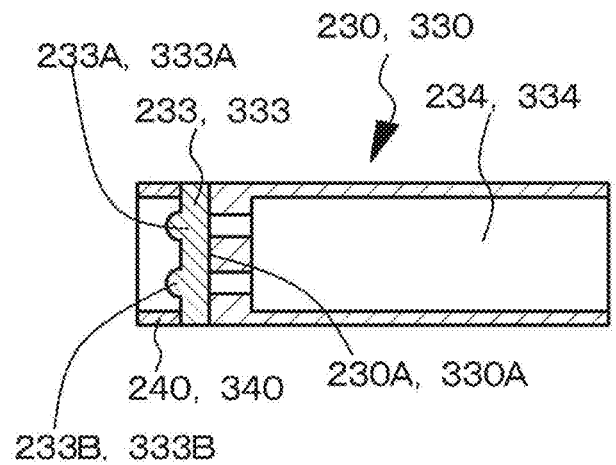
FIG. 15A is a schematic cross-sectional view taken along an arrow A-A of FIG. 14A.
Figure 15B:
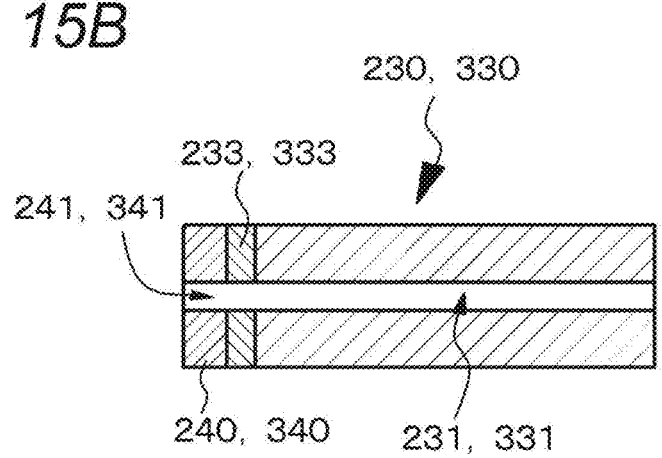
FIG. 15B is a schematic cross-sectional view taken along an arrow B-B of FIG. 14A.
Figure 15C:
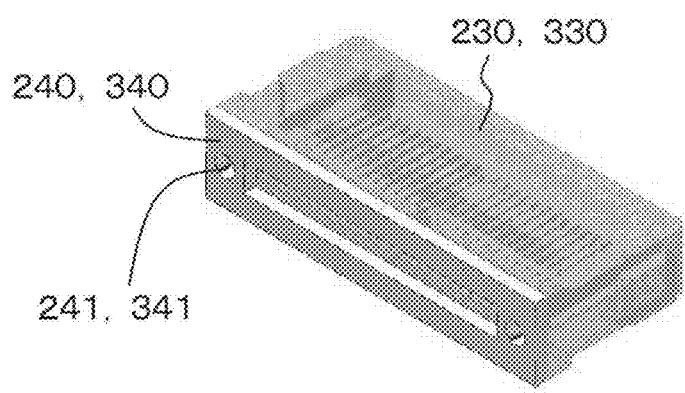
FIG. 15C is a perspective view illustrating the first signal transmitting/receiving member.
Figure 16A:
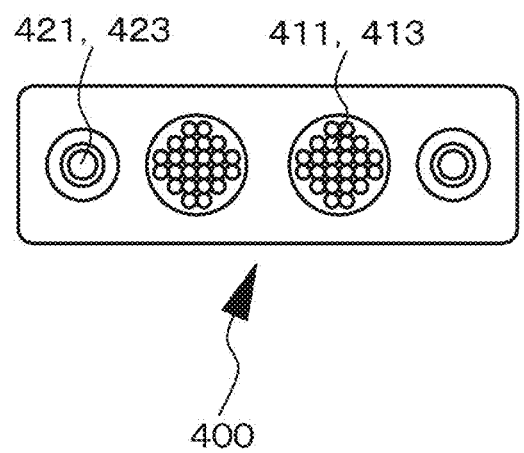
FIGS. 16A and 16B are cross-sectional views schematically illustrating a cable including a signal line and an electric wire.
Figure 16B:
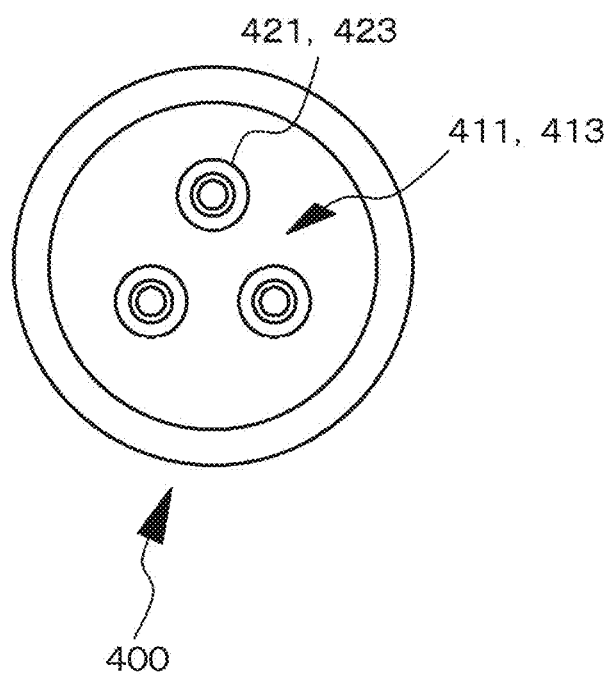

FIG. 1 is a perspective view illustrating a plug and a receptacle forming the photoelectric connector according to Embodiment 1. In addition, FIG. 2 is an exploded perspective view illustrating the plug (a plug cover and a plug housing) forming the photoelectric connector according to Embodiment 1. FIG. 3 is an exploded perspective view illustrating a portion of the plug (the plug cover and the plug housing). FIG. 4 is a cross-sectional view schematically illustrating the plug (the plug cover and the plug housing) taken along a virtual horizontal plane. FIG. 5 is a cross-sectional view schematically illustrating the plug housing taken along a virtual horizontal plane (however, a cross-sectional view illustrating the plug housing as viewed from the upper side). FIG. 6 is a cross-sectional view schematically illustrating the plug housing taken along the virtual horizontal plane (however, a cross-sectional view illustrating the plug housing as viewed from the lower side). FIG. 7 is a cross-sectional view schematically illustrating the plug cover taken along a virtual horizontal plane (however, a cross-sectional view illustrating the plug cover as viewed from the lower side). FIGS. 8A, 8B, and 8C are enlarged perspective views illustrating a first guide pin fixing portion and a first guide pin. FIG. 9 is an exploded perspective view illustrating the receptacle forming the photoelectric connector according to Embodiment 1. FIG. 10 is a perspective view illustrating the receptacle as obliquely viewed from the upper side. FIG. 11 is a perspective view illustrating the receptacle as obliquely viewed from the lower side. FIG. 12 is a cross-sectional view schematically illustrating the receptacle taken along a virtual horizontal plane (however, a cross-sectional view illustrating the receptacle as viewed from the upper side). In addition, FIG. 13A is a plan view schematically illustrating a plug housing biasing means. FIG. 13B is a cross-sectional view schematically illustrating the plug housing biasing means. FIG. 13C is a perspective view schematically illustrating the plug housing biasing means. FIGS. 13D and 13E are perspective views schematically illustrating a modification example of the plug housing biasing means. FIG. 14A is a diagram schematically illustrating a first signal transmitting/receiving member and a second signal transmitting/receiving member as viewed from an opposite surface. FIG. 14B is a diagram schematically illustrating the first signal transmitting/receiving member and the second signal transmitting/receiving member as viewed from a side opposite to the opposite surface (however, a state in which a signal line is removed). FIG. 14C is a diagram schematically illustrating the first signal transmitting/receiving member and the second signal transmitting/receiving member as viewed from the side opposite to the opposite surface (however, a state in which the signal line is attached). FIG. 15A is a schematic cross-sectional view taken along an arrow A-A of FIG. 14A. FIG. 15B is a schematic cross-sectional view taken along an arrow B-B of FIG. 14A. FIG. 15C is a perspective view illustrating the first signal transmitting/receiving member. FIGS. 16A and 16B are cross-sectional views schematically illustrating a cable including a signal line and an electric wire. FIGS. 17A and 17B are diagrams illustrating the movement of a second shutter. FIG. 17A is a cross-sectional view schematically illustrating the receptacle housing forming the photoelectric connector according to Embodiment 1 taken along a virtual horizontal plane (however, a cross-sectional view illustrating the receptacle housing as viewed from the upper side) and FIG. 17B is a side view schematically illustrating the receptacle housing. FIGS. 18A and 18B follow FIGS. 17A and 17B and are diagrams illustrating the movement of the second shutter. FIG. 18A is a cross-sectional view schematically illustrating the receptacle housing forming the photoelectric connector according to Embodiment 1 taken along a virtual horizontal plane (however, a cross-sectional view illustrating the receptacle housing as viewed from the upper side) and FIG. 18B is a side view schematically illustrating the receptacle housing. Note that, in some cases, some of the components of the photoelectric connector according to the embodiment are not illustrated in various drawings.

The photoelectric connector according to Embodiment 1 or Embodiments 2 to 10 which will be described includes
  a plug 11 that is attached to a first signal line 411 and a first electric wire 421 and
  a receptacle 12 that is attached to a second signal line 412 and a second electric wire 422, is fitted to the plug 11, and is optically and electrically connected to the plug 11.

Furthermore, the plug 11 includes:
(A-1) a plug housing 200;
(A-2) a first guide pin 220 that is provided in the plug housing 200, has a rear portion fixed to the plug housing 200, and extends in parallel to an axis line of the plug 11 (that is, extends in the X direction);
(A-3) a first signal transmitting/receiving member 230 that is provided in the plug housing 200, is connected to the first signal line 411, has a first guide pin hole 231 into which the first guide pin 220 is inserted, and is attached to the first guide pin 220 (specifically, is fixed to the first guide pin 220);
(A-4) a first electrode unit 260 which is fixed to the plug housing 200 and to which the first electric wire 421 (not illustrated in some drawings) is attached; and
(A-5) a plug housing biasing means 250 that is provided in the plug housing 200.

The receptacle 12 includes:
(B-1) a receptacle housing 300;
(B-2) a second signal transmitting/receiving member 330 that is provided in the receptacle housing 300, is connected to the second signal line 412, and is movable with respect to the receptacle housing 300;
(B-3) a second electrode unit 360 which is fixed to the receptacle housing 300 and to which the second electric wire 422 (not illustrated in some drawings) is attached; and
(B-4) a second signal transmitting/receiving member biasing means 321 that biases the second signal transmitting/receiving member 330 to the front side of the receptacle 12.

Furthermore, in a state in which the plug 11 is fitted to the receptacle 12,
(a) the first electrode unit 260 and the second electrode unit 360 come into contact with each other and are electrically connected to each other;
(b) an opposite surface 230A of the first signal transmitting/receiving member 230 which faces the second signal transmitting/receiving member 330 and an opposite surface 330A of the second signal transmitting/receiving member 330 which faces the first signal transmitting/receiving member 230 come into contact with each other without being movable relative to each other;
(c) the first signal transmitting/receiving member 230 and the second signal transmitting/receiving member 330 are biased to the rear side of the plug 11 by the second signal transmitting/receiving member biasing means 321; and
(d) the plug housing 200 is biased in a direction perpendicular to the axis line of the plug 11 by the plug housing biasing means 250 and the second electrode unit 360.

The receptacle housing 300 is attached to a board (mother board) (not illustrated) by a claw 310 that is provided in a second surface 304. In contrast, the plug is generally in a free state and the user of the photoelectric connector inserts the plug housing 200 into the receptacle housing 300 to fit the plug to the receptacle.

In the photoelectric connector according to Embodiment 1, the receptacle 12 further includes a second guide pin 320 that is provided in the receptacle housing 300, has a rear portion fixed to the receptacle housing 300, and extends in parallel to the axis line of the receptacle 12. In addition, the second signal transmitting/receiving member 330 has a second guide pin hole 331 into which the second guide pin 320 is inserted. Furthermore, when the plug 11 is fitted to the receptacle 12, the first guide pin 220 passes through the first guide pin hole 231 and is inserted into the second guide pin hole 331. That is, in the photoelectric connector according to Embodiment 1, the signal transmitting/receiving members 230 and 330 are the signal transmitting/receiving members with the second structure. Therefore, the first guide pin 220 can be used to position the first signal transmitting/receiving member 230 and the second signal transmitting/receiving member 330 and a separate component for positioning is not required. As a result, it is possible to reduce the size and cost of the photoelectric connector. A leading end portion 221 of the first guide pin 220 is slightly tapered and can be easily inserted into the second guide pin hole 331. Specifically, a rear portion of the second guide pin 320 is attached to a receptacle protective member 350. Specifically, a rear portion of the first guide pin 220 is attached to a first guide pin fixing portion 214 provided in the plug housing 200. The first guide pin 220 and the second guide pin 320 are made of metal or alloy (for example, stainless steel).

Specifically, as illustrated in an enlarged perspective view of FIG. 8A which illustrates the first guide pin fixing portion 214 and the first guide pin 220, the rear portion of the first guide pin 220 is held and fixed to a holding portion 222 provided in the first guide pin fixing portion 214. Alternatively, as illustrated in enlarged perspective views of FIG. 8B and FIG. 8C which illustrate the first guide pin fixing portion 214 and the first guide pin 220, the rear portion of the first guide pin 220 is held and fixed by a holding member 223 corresponding to the first guide pin fixing portion 214. The holding member 223 is fixed to a first side surface 201 and a second side surface 202 of the plug housing 200. A groove (not illustrated) is formed in the first guide pin 220 and a protrusion (not illustrated) is provided on the inner surface of the first guide pin hole 231 provided in the first signal transmitting/receiving member 230. When the first guide pin 220 is inserted into the first guide pin hole 231, the protrusion is fitted to the groove to attach (fix) the first signal transmitting/receiving member 230 to the first guide pin 220.

The second signal transmitting/receiving member biasing means 321 is a spring (a pressing spring or a compression spring) that is provided between the second guide pin 320 and the second signal transmitting/receiving member 330 and surrounds the outer circumference of the second guide pin 320. That is, in the photoelectric connector according to Embodiment 1, the second signal transmitting/receiving member biasing means is the second signal transmitting/receiving member biasing means with the second structure. Therefore, in a state in which the plug is fitted to the receptacle, it is possible to reliably bias the first signal transmitting/receiving member 230 and the second signal transmitting/receiving member 330 to the rear side of the plug 11 with a simple structure. In addition, the plug 11 further includes a plug cover 100 and the plug housing 200 is provided so as to be movable in the plug cover 100.

The amount of pressure of the second signal transmitting/receiving member biasing means (spring) 321 is a sufficient value to prevent the plug housing 200 fitted to a receptacle housing 300 from being easily taken out and is preferably set to a value that is as great as possible. In this case, when disturbance, such as vibration, is applied to the photoelectric connector, a change in the positional relationship between the first signal transmitting/receiving member 230 and the second signal transmitting/receiving member 330 is prevented. The photoelectric connector according to Embodiment 1 is designed for the transmission of optical signals at a high rate of several tens of gigabits per second to several hundreds of gigabits per second. Therefore, the positional relationship between the first signal transmitting/receiving member 230 and the second signal transmitting/receiving member 330 originally suffers an adverse effect, such as an increase in jitter or a change in optical coupling efficiency, due to the slight deformation of the first signal transmitting/receiving member 230 and the second signal transmitting/receiving member 330 caused by a change in fitting stress (for example, pressing force applied between the first signal transmitting/receiving member 230 and the second signal transmitting/receiving member 330) and resonance. For this reason, in order to avoid the adverse effect, it is important to set the amount of pressure (pressurization) of the second signal transmitting/receiving member biasing means (spring) 321 to the maximum value in the allowable range.

The second signal transmitting/receiving member biasing means 321 biases the second signal transmitting/receiving member 330 to the front side of the receptacle. That is, in a state in which the plug 11 is fitted to the receptacle 12, as described above, the first signal transmitting/receiving member 230 is biased to the rear side of the plug by the second signal transmitting/receiving member biasing means 321.

However, in Embodiment 1, the first signal transmitting/receiving member 230 is fixed to the first guide pin 220. In addition, the second signal transmitting/receiving member 330 is movable with respect to the second guide pin 320. That is, the second signal transmitting/receiving member 330 is in a kind of floating state with respect to the receptacle housing 300. The size of the photoelectric connector is very small. Therefore, in a case where a heavy load is applied to the plug 11, the receptacle 12, the first signal line 411, and the first electric wire 421, that is, for example, in a case where the user who uses the photoelectric connector inserts the plug housing 200 into the receptacle housing 300 with excessive force, there is a concern that distortion will occur in the receptacle housing 300 due to the load. Here, in a case where a structure in which the second signal transmitting/receiving member 330 is fixed to the receptacle housing 300 is used, a slight amount of distortion is transmitted to the high-precision second signal transmitting/receiving member 330. As a result, the second signal transmitting/receiving member 330 is deformed, which has an adverse effect on the transmission of signals. In addition, in a case where a light emitting element or a light receiving element is provided in the receptacle housing which will be described below, the fixation of the second signal transmitting/receiving member 330 means a state in which the light emitting element or the light receiving element is also fixed. The eccentric stress of the receptacle housing 300 is transmitted to the light emitting element or the light receiving element through a printed board having the light emitting element or the light receiving element mounted thereon. The light emitting element or the light receiving element is electrically connected by a minute solder bump with a diameter of, for example, 100 μm or less. There is a concern that the solder bump will be damaged by only the transmission of the slight amount of distortion. For this reason, it is important that the second signal transmitting/receiving member 330 is in a kind of floating state (a state in which the second signal transmitting/receiving member 330 is not fixed to the receptacle housing 300).

Here, in the photoelectric connector according to Embodiment 1 or Embodiments 2 to 10 which will be described below, the plug cover 100 has four surfaces, that is, a first side surface 101 and a second side surface 102 which extend in parallel to the axis line of the plug 11 (that is, extend in the X direction), a first surface 103 that connects one side of the first side surface 101 and one side of the second side surface 102 which extend in parallel to the axis line of the plug 11, and a second surface 104 that connects the other side of the first side surface 101 and the other side of the second side surface 102 which extend in parallel to the axis line of the plug 11. The first side surface 101 and the second side surface 102 are parallel to the XZ plane. In addition, the first surface 103 and the second surface 104 are parallel to the XY plane.

In addition, the plug housing 200 has four surfaces, that is, the first side surface 201 and the second side surface 202 which extend in parallel to the axis line of the plug 11 (that is, extend in the X direction), a first surface 203 that connects one side of the first side surface 201 and one side of the second side surface 202 which extend in parallel to the axis line of the plug 11, and a second surface 204 that connects the other side of the first side surface 201 and the other side of the second side surface 202 which extend in parallel to the axis line of the plug 11. The first side surface 201 and the second side surface 202 are parallel to the XZ plane. In addition, the first surface 203 and the second surface 204 are parallel to the XY plane.

Furthermore, the receptacle housing 300 has four surfaces, that is, a first side surface 301 and a second side surface 302 which extend in parallel to the axis line of the receptacle 12 (that is, extend in the X direction), a first surface 303 that connects one side of the first side surface 301 and one side of the second side surface 302 which extend in parallel to the axis line of the receptacle 12, and a second surface 304 that connects the other side of the first side surface 301 and the other side of the second side surface 302 which extend in parallel to the axis line of the receptacle 12. The first side surface 301 and the second side surface 302 are parallel to the XZ plane. In addition, the first surface 303 and the third surface 204 are parallel to the XY plane.

Furthermore, the plug housing 200 is movable in the receptacle housing 300. That is, the photoelectric connector according to Embodiment 1 is the photoelectric connector according to the first configuration.

The plug cover 100, the plug housing 200, and the receptacle housing 300 are manufactured by processing a metal plate (for example, a stainless steel plate with a thickness of 200 μm to 300 μm). Specifically, the first side surface 201, the second side surface 202, and the second surface 204 of the plug housing 200 are integrally manufactured and form a member having a "U" shape in a cross-sectional view. The first surface 203 of the plug housing 200 is a lid-shaped member. The first surface 203 of the plug housing 200 is fixed to the "U"-shaped member by a screw 213. The first surface 203 of the plug housing 200 may be fixed to the "U"-shaped member by a snap-fit member (elastic locking claw mechanism) or an adhesive. The receptacle housing 300 is a member with a rectangular tube shape obtained by bending a metal plate four times. The plug cover 100 is a member with a rectangular tube shape obtained by bending a metal plate, which is a stainless steel plate with a thickness of, for example, 200 μm to 300 μm, four times and a rear end portion of the plug cover 100 is covered with a resin member 110 which is held by the user.

Further, the first signal transmitting/receiving member 230 and the second signal transmitting/receiving member 330 are manufactured by performing injection molding for a plastic material. The similar protruding portion to a second signal transmitting/receiving member protruding portion 332 may be provided in the first signal transmitting/receiving member 230 and the first signal transmitting/receiving member 230 and the second signal transmitting/receiving member 330 may be configured so as to have the same structure in order to reduce the manufacturing costs of the signal transmitting/receiving members. There is a gap of 50 μm to 100 μm between the first signal transmitting/receiving member 230 and the first side surface 201, the second side surface 202, the first surface 203, and the second surface 204 of the plug housing 200. The first signal transmitting/receiving member 230 is fixed in the plug housing 200. For example, AWG26 cables are applied as the first electric wire 421 and the second electric wire 422 in order to supply about 100 watt (48 volts, 2 amperes). Two or more first electric wires 421 and two or more second electric wires 422 are provided.

Furthermore, in the photoelectric connector according to Embodiment 1 or Embodiments 2 to 10 which will be described below, a front end 100F of the plug cover 100 which faces the receptacle 12 and a rear end 100B of the plug cover 100 which is opposite to the front end 100F of the plug cover 100 are opened. In addition, a front end 200F of the plug housing 200 which faces the receptacle housing 300 and a rear end 200B of the plug housing 200 which is opposite to the front end 200F of the plug housing 200 are opened. Furthermore, a front end 300F of the receptacle housing 300 which faces the plug housing 200 and a rear end 300B of the receptacle housing 300 which faces the front end 300F of the receptacle housing 300 are opened.

In addition, in the photoelectric connector according to Embodiment 1 or Embodiments 2 to 10 which will be described below, the first electrode unit 260 includes contact portions 261 and 262 and the second electrode unit 360 includes contact piece (contacts) 361 and 362 that come into contact with the contact portions 261 and 262 of the first electrode unit 260, respectively. In addition, in a state in which the plug 11 is fitted to the receptacle 12, the plug housing 200 is biased in a direction perpendicular to the axis line of the plug 11 by the contact pieces 361 and 362 of the second electrode unit 360 which come into contact with the contact portions 261 and 262 of the first electrode unit 260, respectively. In the photoelectric connector according to Embodiment 1, the plug housing 200 is specifically biased in the Y direction. That is, the photoelectric connector according to Embodiment 1 is the photoelectric connector according to the 1'-th configuration. The first electrode unit 260 is connected to the first electric wire 421 at a rear end portion 263 of the first electrode unit 260.

That is, in the photoelectric connector according to Embodiment 1, the first electrode unit 260 includes two contact portions 261 and 262 and the two contact portions 261 and 262 of the first electrode unit 260 are a contact portion for a power source and a contact portion for grounding. In addition, the second electrode unit 360 includes two contact pieces 361 and 362 and the two contact pieces 361 and 362 of the second electrode unit 360 are a contact piece for a power source and a contact piece for grounding. Furthermore, the use of this configuration makes it possible to achieve an electrode unit corresponding to a reversible structure. That is, the receptacle 12 and the plug 11 can be fitted to each other such that the first surface 303 of the receptacle housing 300 corresponds to the first surface 203 of the plug housing 200. In addition, the receptacle 12 and the plug 11 can be fitted to each other such that the first surface 303 of the receptacle housing 300 corresponds to the second surface 204 of the plug housing 200.

Specifically, in the photoelectric connector according to Embodiment 1, the plug 11 includes two first electrode units 260 and the receptacle 12 includes two second electrode units 360.

The two first electrode units 260 are fixed to the second surface 204 of the plug housing 200 along the first side surface 201 and the second side surface 202 of the plug housing 200.

The two second electrode units 360 are fixed along the first side surface 301 and the second side surface 302 of the receptacle housing 300. That is, the photoelectric connector according to Embodiment 1 has a side electrode structure. Each of the two first electrode units 260 is fixed in a first electrode unit attachment opening portion 211 that is provided in the second surface 204 of the plug housing 200. Each of the two second electrode units 360 is placed and fixed to a base portion 309 that is provided on the second surface 304 of the receptacle housing 300. The fixation of the first electrode unit 260 to the second surface 204 of the plug housing 200 and the fixation of the second electrode unit 360 to the base portion 309 of the receptacle housing 300 can be performed by, for example, screws, snap-fit members, an adhesive, or the like.

Furthermore, in the photoelectric connector according to Embodiment 1 having the side electrode structure, in a state in which the plug 11 is fitted the receptacle 12, as described above, the side surfaces 201 and 202 of the plug housing 200 are biased by the contact pieces 361 and 362 of the second electrode unit 360, respectively. That is, the plug housing 200 is biased in the Y direction. Plug cover opening portions 105 into which the contact pieces 361 and 362 of the second electrode unit 360 are inserted are provided in the first side surface 101 and the second side surface 102 of the plug cover 100. In addition, plug housing opening portions 212 into which the contact pieces 361 and 362 of the second electrode unit 360 are inserted are provided in the first side surface 201 and the second side surface 202 of the plug housing 200.

Furthermore, in the photoelectric connector according to Embodiment 1, the contact pieces 361 and 362 of the second electrode unit 360 can be rotated on a support point 366 in a direction in which the contact pieces 361 and 362 become closer to the side surfaces 301 and 302 of the receptacle housing 300 and a direction in which the contact pieces 361 and 362 become further away from the side surfaces 301 and 302 of the receptacle housing 300. In addition, contact piece biasing means 368 that bias the contact pieces 361 and 362 of the second electrode unit 360 in the direction in which the contact pieces 361 and 362 become further away from the side surfaces 301 and 302 of the receptacle housing 300 are provided between the contact pieces 361 and 362 of the second electrode unit 360 and the side surfaces 301 and 302 of the receptacle housing 300. A second electrode unit locking member 367 is provided in a portion of the second electrode unit 360 which is opposite to the contact pieces 361 and 362 with the support point 366 interposed therebetween. In addition, a second electrode unit locking recessed portion 206 is provided in a leading end portion 205 of each of the first side surface 201 and the second side surface 202 of the plug housing 200. In addition, when the plug 11 is fitted to the receptacle 12, the second electrode unit locking member 367 and the second electrode unit locking recessed portion 206 come into contact with each other and are engaged with each other (see FIGS. 25 and 27), the contact pieces 361 and 362 of the second electrode unit 360 are rotated to the contact portions 261 and 262 of the first electrode unit 260 on the support point 366, and the contact pieces 361 and 362 of the second electrode unit 360 and the contact portions 261 and 262 of the first electrode unit 260 come into contact with each other. In addition, the plug 11 is fixed to the receptacle 12 by the engagement between the second electrode unit locking member 367 and the second electrode unit locking recessed portion 206. The second electrode unit 360 is connected to the second electric wire 422 at rear end portions 363 and 364 (which are manufactured integrally with the contact pieces 361 and 362) of the second electrode unit 360. The contact pieces 361 and 362, the rear end portions 363 and 364 of the second electrode unit 360, and the second electrode unit locking member 367 are fixed to a second electrode unit main body 365 and the second electrode unit main body 365 is rotated on the support point 366. An opening portion 307 for the contact pieces 361 and 362 and an opening portion 308 for the second electrode unit locking member 367 are provided in the side surfaces 301 and 302 of the receptacle housing 300.

The leading end portions of the contact pieces 361 and 362 of the second electrode unit 360 do not come into contact with any of the plug cover 100 and the plug housing 200 until the contact pieces 361 and 362 of the second electrode unit 360 are rotated to the contact portions 261 and 262 of the first electrode unit 260. Therefore, it is possible to reliably prevent a short circuit between the contact piece 361 and the contact piece 362. In some cases, insulating material layers may be formed on the surfaces (outer surfaces) of the first side surface 101 and the second side surface 102 of the plug cover 100 and the first side surface 201 and the second side surface 202 of the plug housing 200.

Furthermore, in the photoelectric connector according to Embodiment 1 or Embodiments 2 to 10 which will be described below, the receptacle housing 300 further includes a second signal transmitting/receiving member guide member 351 that is attached to the inside (inner surfaces) of the first side surface 301 and the second side surface 302 of the receptacle housing 300. In addition, notched portions 352 are provided in a first side surface of the second signal transmitting/receiving member guide member 351 which faces the first side surface 301 of the receptacle housing 300 and a second side surface of the second signal transmitting/receiving member guide member 351 which faces the second side surface 302 of the receptacle housing 300 so as to extend to the middle of each side surface in parallel to the axis line of the receptacle 12 in the direction from the rear portion of the receptacle 12 to the front portion of the receptacle 12. The second signal transmitting/receiving member protruding portions 332 that are fitted to the notched portions 352 are provided on the side surfaces of the second signal transmitting/receiving member 330. The photoelectric connector having the above-mentioned configuration according to Embodiment 1 or Embodiments 2 to 10 which will be described below is the photoelectric connector according to the eighth configuration. The second signal transmitting/receiving member guide member 351 is manufactured by processing a metal plate (for example, a stainless steel plate).

The first electrode unit 260 including the contact portions 261 and 262 and the rear end portion 263 which are made of a conductive metal or alloy material may be manufactured by a known method. The contact pieces 361 and 362 of the second electrode unit 360 may be made of a conductive and elastic metal or alloy material. The second electrode unit locking member 367 may be manufactured by an elastic metal or alloy material. The contact piece biasing means 368 may be specifically a compression spring (coil spring) or a leaf spring. The contact pieces 361 and 362, the rear end portions 363 and 364 of the second electrode unit 360, and the second electrode unit locking member 367 may be molded integrally with the second electrode unit main body 365 made of a plastic material.

In addition, in the photoelectric connector according to Embodiment 1 or Embodiments 2 to 10 which will be described below, the plug housing biasing means 250 is provided on the outer surface of the second surface 204 of the plug housing 200. That is, the photoelectric connector according to Embodiment 1 or Embodiments 2 to 10 which will be described below is the photoelectric connector according to the second configuration. Specifically, a plug housing recessed portion 215 that is engaged with a biasing portion of the plug housing biasing means 250 is formed in the second surface 204 of the plug housing 200. The plug housing biasing means 250 is accommodated in the plug housing recessed portion 215.

FIGS. 13A, 13B, and 13C are a plan view, a cross-sectional view, and a perspective view schematically illustrating the plug housing biasing means 250, respectively. In addition, FIGS. 13D and 13E are perspective views schematically illustrating modification examples of the plug housing biasing means 250. The plug housing biasing means 250 includes a first portion 251, a second portion 252, and a third portion 253 which are provided in this order from the front side of the plug 11 along the direction (X direction) of the axis line of the plug 11. In addition, the second portion 252 comes into contact with the plug housing recessed portion 215. The first portion 251 and the third portion 253 do not come into contact with the plug housing recessed portion 215 and form the biasing portion. In addition, a plug cover recessed portion 106 that is engaged with the biasing portion (specifically, the first portion 251) of the plug housing biasing means 250 is provided in the second surface 104 of the plug cover 100. An opening portion 107 that faces the plug housing biasing means 250 is provided in the plug cover recessed portion 106. In a state in which the plug cover recessed portion 106 and the biasing portion (specifically, the first portion 251) of the plug housing biasing means 250 are engaged with each other (see FIG. 30A), the plug housing 200 is fixed to the plug cover 100. That is, it is difficult to take off the assembled plug housing 200 from the plug cover 100. However, a small hole (not illustrated) for maintenance may be provided in the plug cover 100 and the plug housing may be disassembled, for example, in a case where repair is needed. This hole is generally covered with, for example, a resin to prevent the user from easily disassembling the plug housing.

Unlocking claws 305 and 306 are provided in the first surface 303 and the second surface 304 of the receptacle housing 300, respectively. When the plug cover 100 is closest to the receptacle housing 300, the unlocking claw 305 or 306 (specifically, one of the unlocking claws 305 and 306) is inserted into the opening portion 107 provided in the plug cover recessed portion 106 and biases the first portion 251 forming the biasing portion of the plug housing biasing means 250 to the first surface 203 of the plug housing 200 to disengage the plug cover recessed portion 106 from the biasing portion 251 of the plug housing biasing means 250 (see FIG. 30B). Furthermore, since the plug cover recessed portion 106 and the biasing portion of the plug housing biasing means 250 are disengaged from each other, the plug housing 200 is movable with respect to the plug cover 100. That is, the plug housing 200 can be moved to the receptacle housing 300 (see FIG. 30C).

In a state in which the plug 11 is fitted to the receptacle 12, the biasing portion (first portion 251) of the plug housing biasing means 250 comes into contact with the second surface 104 of the plug cover 100 and biases the plug housing 200 to the first surface 103 of the plug cover 100 (see FIG. 30C). That is, the plug housing 200 is also biased in the Z direction.

In the photoelectric connector according to Embodiment 1 or Embodiments 2 to 10 which will be described below, the rear end 200B of the plug housing 200 is blocked by a plug protective member 270 or a boot 271 and the rear end 300B of the receptacle housing 300 is blocked by a receptacle protective member 350. That is, the photoelectric connector according to Embodiment 1 or Embodiments 2 to 10 which will be described below is the photoelectric connector according to the sixth configuration. The boot 271 (not illustrated) may cover the plug cover 100 and the plug protective member 270. In this case, when the plug 11 is fitted to the receptacle 12 and when the plug is pulled out of the receptacle, the user is prevented from directly holding the plug cover 100 and the plug 11 can be safely fitted to the receptacle 12. The boot 271 has a known configuration and a known structure and is made of, for example, a hard resin or rubber. The plug protective member 270 is attached to a rear end portion of the plug housing 200 by, for example, a screw, a snap-fit member, or an adhesive. For example, an opening for attaching and detaching an optical fiber or a flexible wiring plate which will be described below is provided in a central portion of the plug protective member 270. The receptacle protective member 350 is attached to a rear end portion of the receptacle housing 300 by, for example, a screw 353, a snap-fit member, or an adhesive. For example, an opening for attaching and detaching an optical fiber or a flexible wiring plate which will be described below is provided in a central portion of the receptacle protective member 350. A boot may be used instead of the receptacle protective member 350. The plug protective member 270 or the receptacle protective member 350 is made of a plastic material.

In the photoelectric connector according to Embodiment 1 or Embodiments 2 to 10 which will be described below, a first shutter 120 is provided in a front portion of the plug cover 100. The first shutter 120 is opened when the plug 11 is fitted to the receptacle 12 and is closed when the plug 11 is pulled out of the receptacle 12. That is, the photoelectric connector according to Embodiment 1 or Embodiments 2 to 10 which will be described below is the photoelectric connector according to the fourth configuration.

A leading end 207 of each of the first side surface 201 and the second side surface 202 of the plug housing 200 has a substantially semicircular shape. A side end portion of the first shutter is engaged with the leading end 207 of each of the first side surface 201 and the second side surface 202 of the plug housing 200. The first shutter 120 includes a first shutter upper component 121 that extends from the first surface 103 of the plug cover 100 to the receptacle and a first shutter lower component 123 that extends from the second surface 104 of the plug cover 100 to the receptacle. The first shutter upper component 121 and the first shutter lower component 123 are made of, for example, a high-elasticity material with a thickness of 10 μm to 100 μm (elastic metal or alloy material). A leading end portion 122 of the first shutter upper component 121 is rounded and a leading end portion 124 of the first shutter lower component 123 is rounded so as to be engaged with the leading end portion 122 of the first shutter upper component 121 on the plug cover side. In addition, the leading end portion 122 of the first shutter upper component 121 has a double structure in which it is folded outward or it is folded back for reinforcement. The reinforcing portion is located outside the plug cover 100 at the position where the first shutter 120 is open and does not physically interfere with the inserted first signal transmitting/receiving member 230. In addition, therefore, it is not necessary to separately prepare a dedicated reinforcing member and thus to obtain a small and simple reinforcing structure. In addition, the tip of the leading end portion 124 of the first shutter lower component 123 is notched such that the first shutter upper component 121 and the first shutter lower component 123 easily and reliably overlap each other. Furthermore, a central portion of the leading end portion 124 of the first shutter lower component 123 is slightly bent inward (to the rear end of the plug cover 100). Therefore, the first shutter upper component 121 and the first shutter lower component 123 can form a shutter structure without any gap therebetween and it is possible to reliably prevent laser light from leaking from a joint between the first shutter upper component 121 and the first shutter lower component 123. In addition, the first shutter 120 is closed by the rear end portion of the first shutter upper component 121 and the first shutter lower component 123 having the above-mentioned structures and the guides on both sides of the components (that is, the leading end portion 205 including the leading ends 207 of the first side surface 201 and the second side surface 202 of the plug housing 200) while the surface contact therebetween is maintained. Therefore, it is possible to improve airtightness, a dustproof performance, and a drip-proof performance. In addition, even when external stress is applied in a state in which the first shutter 120 is closed, it is possible to reliably protect the first signal transmitting/receiving member 230. The rear end portion of the first shutter upper component 121 and the rear end portion of the first shutter lower component 123 are integrally attached to the rear end portion of the plug cover 100. Specifically, the rear end portion of the first shutter upper component 121 and the rear end portion of the first shutter lower component 123 are integrally attached to the rear end portion of the plug cover 100 on the basis of an insert molding technique. An opening portion into which the unlocking claw 305 or 306 is inserted is provided in the first shutter upper component 121 or the first shutter lower component 123 if necessary. In addition, in the photoelectric connector having an upper and lower electrode structure which will be described below, an opening portion into which the contact pieces of the second electrode unit are inserted is provided in each of the first shutter upper component 121 and the first shutter lower component 123.

As illustrated in FIGS. 17A, 17B, 18A, and 18B, in the photoelectric connector according to Embodiment 1 or Embodiments 2 to 10 which will be described below, a second shutter 370 that is opened to the second surface 304 of the receptacle housing 300 and to the rear side of the receptacle housing 300 is provided in a leading end portion of the receptacle housing 300. The second shutter 370 is made of a material with high elasticity (elastic metal or alloy material). The second shutter 370 is opened when the plug 11 is fitted to the receptacle 12 and is closed when the plug 11 is pulled out of the receptacle 12. Second shutter pressing members 371 are provided in the outer surfaces of the first side surface 301 and the second side surface 302 of the receptacle housing 300. Specifically, rear end portions 372 of the second shutter pressing members 371 are inserted into fine holes 374 provided in the first side surface 301 and the second side surface 302 of the receptacle housing 300. In addition, when the second shutter 370 is in a closed state, a leading end portion 370' of the second shutter 370 is pressed by the second shutter pressing member 371 (specifically, by a leading end 373 of the second shutter pressing member 371) so as not to be moved to the second surface 304 of the receptacle housing 300. In this state, the leading ends 373 of the second shutter pressing members 371 protrude to the inside of the receptacle housing 300 through fine holes 375 that are provided in the first side surface 301 and the second side surface 302 of the receptacle housing 300. In contrast, when the plug 11 is fitted to the receptacle 12, the rear end portions 372 of the second shutter pressing members 371 are pressed outward by the first side surface 201 and the second side surface 202 of the plug housing 200. As a result, the leading ends 373 of the second shutter pressing members 371 are also pressed outward and the pressing of the leading end portion 370' of the second shutter 370 by the second shutter pressing members 371 is released. The second shutter 370 is opened to the second surface 304 of the receptacle housing 300 and to the rear side of the receptacle housing 300. That is, the photoelectric connector according to Embodiment 1 or Embodiments 2 to 10 which will be described below is the photoelectric connector according to the fifth configuration. When the second shutter 370 illustrated in FIGS. 18A and 18B is in an open state, the second shutter 370 is returned to the state illustrated in FIGS. 17A and 17B by the elastic force thereof, but is maintained in the state illustrated in FIGS. 18A and 18B by the second surface 204 of the plug housing 200.

In the photoelectric connector according to Embodiment 1, the first signal transmitting/receiving member 230 and the second signal transmitting/receiving member 330 are ferrules. The photoelectric connector according to Embodiment 1 is the photoelectric connector according to the ninth configuration. Here, an optical communication wavelength is, for example, 850 nm.

The first signal transmitting/receiving member 230 includes a first signal transmitting/receiving member insertion hole 234 (see FIG. 14B) which is provided in a portion of the first signal transmitting/receiving member 230 close to the rear end of the plug and into which the first signal line 411, which is an optical fiber assembly, is inserted and a lens (lens unit 233) for the first signal transmitting/receiving member which is provided in a portion of the first signal transmitting/receiving member 230 close to the front end of the plug and collimates light emitted from the optical fibers or light incident on the optical fibers (see FIG. 14A). In contrast, the second signal transmitting/receiving member 330 includes a second signal transmitting/receiving member insertion hole 334 (see FIG. 14B) which is provided in a portion of the second signal transmitting/receiving member 330 close to the rear end of the receptacle and into which the second signal line 412, which is an optical fiber assembly, is inserted and a lens (lens unit 333) for the second signal transmitting/receiving member which is provided in a portion of the second signal transmitting/receiving member 330 close to the front end of the receptacle and collimates light emitted from the optical fibers or light incident on the optical fibers (see FIG. 14A). Specifically, the lens units 233 and 333 are attached to the opposite surface 230A of the first signal transmitting/receiving member 230 and the opposite surface 330A of the second signal transmitting/receiving member 330 by an adhesive, respectively (see FIG. 15A).

The lens units 233 and 333 may be integrally provided in the opposite surface 230A of the first signal transmitting/receiving member 230 and the opposite surface 330A of the second signal transmitting/receiving member 330. In the lens units 233 and 333, for example, a total of 48 lenses are arranged. Specifically, 24 lenses are arranged in the Y direction and two lenses are arranged in the Z direction. That is, the lenses are arranged in a 48-channel (=2×24-channel) array. The pitch between the lenses arranged in the Y direction and the Z direction is 250 µm and only the pitch between the twelfth lens and the thirteenth lens in the Y direction is 500 µm. The lens units 233 and 333 include a plurality of plastic molded microlens 233B and 333B which are formed on the surfaces of lens substrates 233A and 333A, respectively. The surfaces of the lens substrates 233A and 333A opposite to the surfaces on which the plastic molded microlenses are formed are smooth.

A portion of each of the first signal transmitting/receiving member 230 and the second signal transmitting/receiving member 330 has a hollow structure in order to hold the optical fibers. That is, as described above, each of the first signal transmitting/receiving member 230 and the second signal transmitting/receiving member 330 has a ferrule structure. Therefore, when a space corresponding to 2×24 channels is formed in the first signal transmitting/receiving member 230 and the second signal transmitting/receiving member 330, the thickness of each of the first signal transmitting/receiving member 230 and the second signal transmitting/receiving member 330 is reduced and the mechanical strength of the first signal transmitting/receiving member 230 and the second signal transmitting/receiving member 330 is reduced. Ribs 235 and 335 are provided at the centers of the first signal transmitting/receiving member 230 and the second signal transmitting/receiving member 330 in order to reinforce the mechanical strength (see FIG. 14B). That is, the ribs 235 and 335 are formed in portions of the first signal transmitting/receiving member 230 and the second signal transmitting/receiving member 330 corresponding to the space between the twelfth lens and the thirteenth lens. In addition, the accuracy of fixing the optical fibers can be maintained by this structure rather than by the structure in which a space corresponding to 2×24 channels is formed in the first signal transmitting/receiving member 230 and the second signal transmitting/receiving member 330.

Here, an optical design for collimated (parallel light) coupling is used in order to reduce the accuracy of positioning the plug 11 and the receptacle 12. Optical parameters are, for example, as follows:

a lens diameter: 240 µm; and a parallel light diameter: 180 µm.

In addition, the distance from the outer surface of the lens to the leading end of the optical fiber was 714 µm. This value was calculated from the following values: the refractive index of a transparent resin forming the lens: 1.63; and the numerical aperture (NA) of a multi-mode fiber: 0.2. Furthermore, the thickness of a first lens protective member 240 and a second lens protective member 340 was 200 µm and the total thickness of the lens portion was 1000 µm.

The first signal transmitting/receiving member 230 includes the first lens protective member 240 and the second signal transmitting/receiving member 330 includes the second lens protective member 340. The first lens protective member 240 and the second lens protective member 340 have a frame shape. In addition, the first lens protective member 240 made of a metal material (including an alloy; specifically, a stainless steel plate) is attached to the opposite surface 230A of the first signal transmitting/receiving member 230 and the second lens protective member 340 made of a metal material (including an alloy; specifically, a stainless steel plate) is attached to the opposite surface 330A of the second signal transmitting/receiving member 330. Specifically, the first signal transmitting/receiving member 230 and the first lens protective member 240 are bonded to each other by an adhesive and the second signal transmitting/receiving member 330 and the second lens protective member 340 are bonded to each other by an adhesive. Through holes 241 and 341 for the first guide pin 220 and the second guide pin 320 are provided in the first lens protective member 240 and the second lens protective member 340, respectively (see FIG. 15B). The provision of the first lens protective member 240 and the second lens protective member 340 makes it possible to improve the durability and abrasion resistance of the first signal transmitting/receiving member 230 and the second signal transmitting/receiving member 330 and the provision of the through holes 241 and 341 makes it possible to further improve the accuracy of positioning. However, the first lens protective member 240 and the second lens protective member 340 are not necessarily provided and may be omitted.

In the photoelectric connector according to the ninth configuration including the above-mentioned various preferred configurations, the optical fiber assembly forming the first signal line 411 includes four tape core wires, that is, a first tape core wire 411A, a second tape core wire 411B, a third tape core wire 411C, and a fourth tape core wire 411D. Note that, these tape core wires are schematically illustrated in a substantially rectangular shape which is hatched in FIG. 14C. The first signal transmitting/receiving member insertion hole 234 includes a first signal transmitting/receiving member right insertion hole 234R and a first signal transmitting/receiving member left insertion hole 234L that is provided so as to be separated from the first signal transmitting/receiving member right insertion hole 234R. Furthermore, as illustrated in FIG. 14C, the first tape core wire 411A, the second tape core wire 411B, the third tape core wire 411C, and the fourth tape core wire 411D forming the first signal line 411 are attached to a bottom surface of the first signal transmitting/receiving member right insertion hole 234R, a bottom surface of the first signal transmitting/receiving member left insertion hole 234L, atop surface of the first signal transmitting/receiving member right insertion hole 234R, and a top surface of the first signal transmitting/receiving member left insertion hole 234L, respectively. There is a gap between the first tape core wire 411A and the third tape core wire 411C and there is a gap between the second tape core wire 411B and the fourth tape core wire 411D. In addition, the optical fiber assembly forming the second signal line 412 includes four tape core wires, that is, a first tape core wire 412A, a second tape core wire 412B, a third tape core wire 412C, and a fourth tape core wire 412. The second signal transmitting/receiving member insertion hole 334 includes a second signal transmitting/receiving member right insertion hole 334R and a second signal transmitting/receiving member left insertion hole 334L that is provided so as to be separated from the second signal transmitting/receiving member right insertion hole 334R. In addition, the first tape core wire 412A, the second tape core wire 412B, the third tape core wire 412C, and the fourth tape core wire 412D forming the second signal line 412 are attached to a bottom surface of the second signal transmitting/receiving member right insertion hole 334R, a bottom surface of the second signal transmitting/receiving member left insertion hole 334L, a top surface of the second signal transmitting/receiving member right insertion hole 334R, and a top surface of the second signal transmitting/receiving member left insertion hole 334L, respectively. There is a gap between the first tape core wire 412A and the third tape core wire 412C and there is a gap between the second tape core wire 412B and the fourth tape core wire 412.

Here, the tape core wire is a tape core wire for a 12-channel array. The tape core wire has a long hole shape in a cross-sectional view. Note that, an optical fiber core wire which is the tape core wire has a known configuration and a known structure. Specifically, the optical fiber core wire includes, for example, a core (for example, a diameter of 50 μm) made of quartz glass (refractive index $n_c$=1.5) and a clad (for example, a diameter of 125 μm). In addition, 12 cores are arranged in a line at a pitch of 250 μm and a secondary coating is made of a resin material.

Note that, a ferrule including an optical fiber core wire positioning portion may be used.

The first and second signal transmitting/receiving members 230 and 330 and the optical fibers without a coating are formed as an integrated component. Specifically, first, the coating of the optical fiber is removed and the optical fibers are inserted into the first signal transmitting/receiving member insertion hole 234 and the second signal transmitting/receiving member insertion hole 334 and are bonded to the first signal transmitting/receiving member 230 and the second signal transmitting/receiving member 330. Then, the end portions of the optical fibers which protrude from the opposite surfaces 230A and 330A of the first signal transmitting/receiving member 230 and the second signal transmitting/receiving member 330 and the protruding adhesive are removed and the opposite surfaces 230A and 330A are polished and smoothed. Then, the lens units 233 and 333 may be bonded to the opposite surfaces 230A and 330A, respectively. In addition, the coating of the optical fiber may not be removed and the optical fibers may be inserted into the first signal transmitting/receiving member insertion hole 234 and the second signal transmitting/receiving member insertion hole 334.

The first signal line 411 and the first electric wire 421 are integrated into a cable outside the plug 11. The cable has, for example, the cross-sectional structure illustrated in FIG. 16A or FIG. 16B. Note that, in FIGS. 16A and 16B, hatching is omitted. In the example illustrated in FIG. 16A, a maximum of 48 optical fibers 413 (411) are provided close to the center and two electric wires 423 (421) are provided on both sides of the optical fibers 413 (411). In the example illustrated in FIG. 16B, three electric wires 423 (421) are provided at three vertexes of a virtual regular triangle and a bundle of optical fibers 413 (411) is provided in the cable. Note that, the cable illustrated in FIG. 16A has a substantially rectangular shape in a cross-sectional view and the cable illustrated in FIG. 16B has a circular shape in a cross-sectional view. The cross-sectional shape of the latter has higher flexibility. The cable may be provided with a reinforcing wire for improving tension resistance.

Next, an operation for fitting the plug 11 to the receptacle 12 will be described below with reference to the drawings. Note that, in the drawings, a straight line connecting one-dot chain lines A indicates the front end 300F of the receptacle housing 300. The user of the photoelectric connector holds the plug protective member 270 (or the boot 271) in hand inserts the plug 11 into the receptacle 12, and presses the plug 11 against the receptacle 12. In a schematic cross-sectional view illustrating the plug 11 and the receptacle 12 taken along a virtual horizontal plane, the first shutter 120 and the second shutter 370 are not illustrated.

Figure 19:
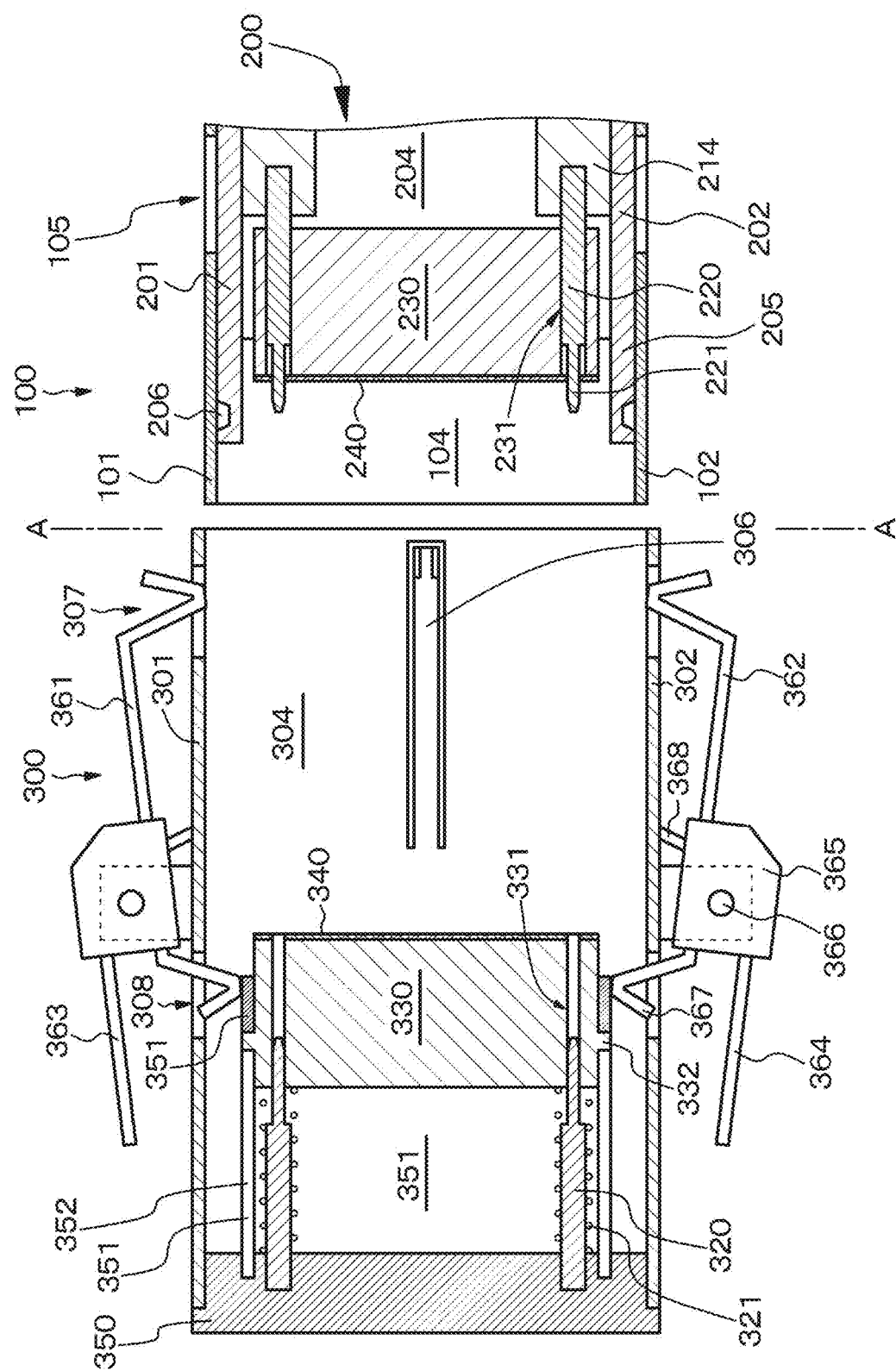
FIG. 19 is a diagram illustrating a fitting between the plug and the receptacle and is a cross-sectional view schematically illustrating the plug and the receptacle forming the photoelectric connector according to Embodiment 1 taken along a virtual horizontal plane.

FIG. 19 is a cross-sectional view schematically illustrating the plug 11 and the receptacle 12 forming the photoelectric connector according to Embodiment 1 immediately before the plug 11 is fitted to the receptacle 12, which is taken along a virtual horizontal plane. FIG. 31A is a side view schematically illustrating the first shutter 120 and the plug housing 200 in the state illustrated in FIG. 19. The first shutter 120 and the second shutter 370 are in a closed state.

Figure 20:
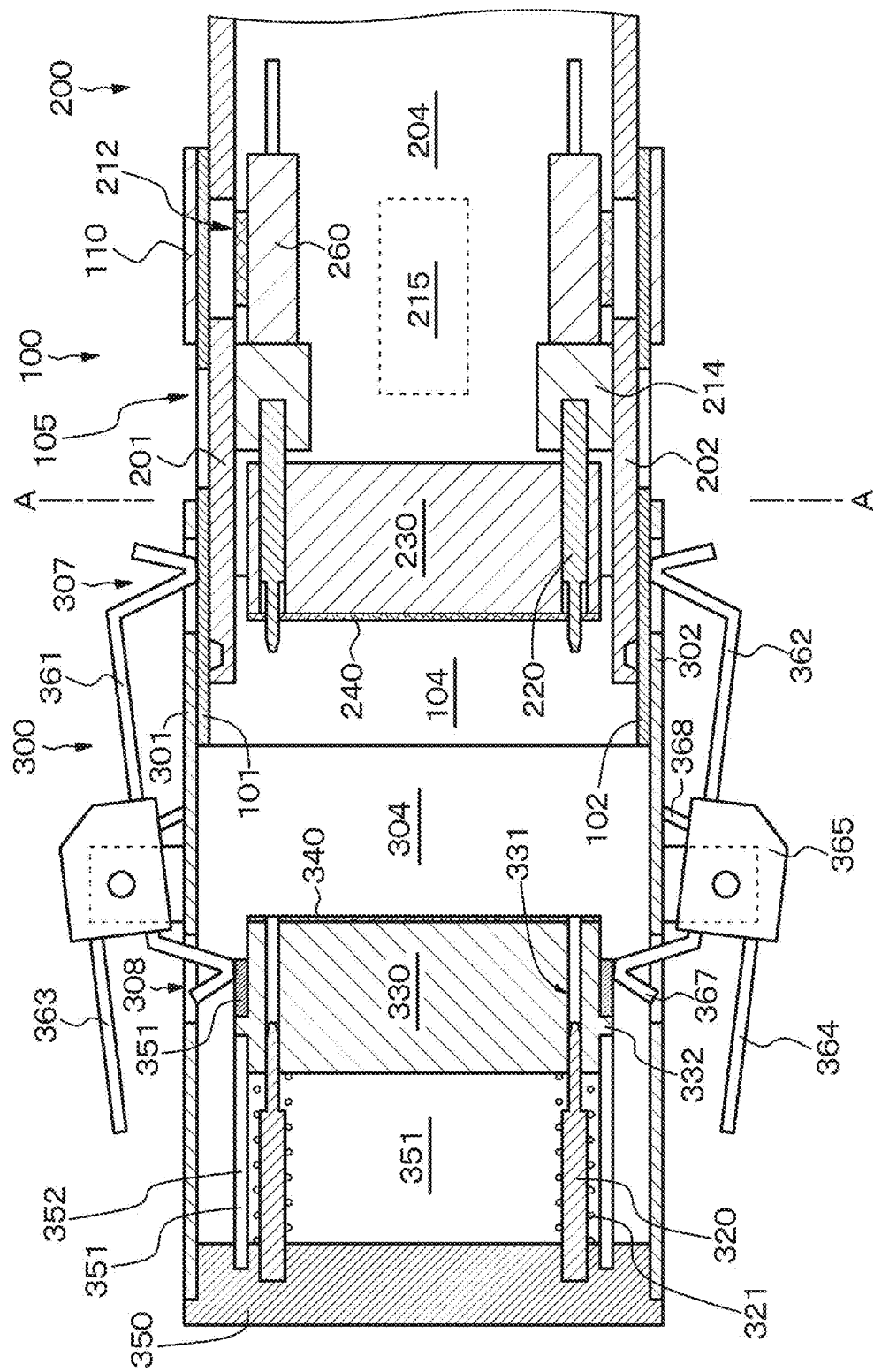
FIG. 20 follows

FIG. 20 is a cross-sectional view schematically illustrating the plug 11 and the receptacle immediately after the fitting between the plug 11 and the receptacle starts, which is taken along a virtual horizontal plane. In addition, FIG. 30A is a cross-sectional view schematically illustrating the plug cover 100 and the plug housing 200 taken along a virtual vertical plane in the state illustrated in FIG. 20. The biasing portion (specifically, the first portion 251) of the plug housing biasing means 250 is engaged with the plug cover recessed portion 106 and the plug housing 200 is fixed to the plug cover 100. In addition, the unlocking claw 306 does not reach the opening portion 107 provided in the plug cover recessed portion 106. Note that, in FIG. 20, FIG. 21, FIG. 22, and FIG. 24, the leading end portions of the contact pieces 361 and 362 of the second electrode unit 360 come into contact with the first side surface 101 and the second side surface 102 of the plug cover 100. However, in practice, they do not come into contact with each other.

However, as described above, the second shutter 370 that is opened to the second surface 304 of the receptacle housing 300 and to the rear side of the receptacle housing 300 is provided in the leading end portion of the receptacle housing 300. When the second shutter 370 is in a closed state, as illustrated in FIGS. 17A and 17B, the leading ends 373 of the second shutter pressing members 371 protrude to the inside of the receptacle housing 300 through the fine holes 375 provided in the first side surface 301 and the second side surface 302 of the receptacle housing 300. Therefore, the leading end portion 370' of the second shutter 370 is pressed so as not to be moved to the second surface 304 of the receptacle housing 300. When the fitting between the plug 11 and the receptacle starts and the plug 11 is inserted into the receptacle 12, the rear end portions 372 of the second shutter pressing members 371 are pressed outward by the first side surface 201 and the second side surface 202 of the plug housing 200. As a result, the leading ends 373 of the second shutter pressing members 371 are also pressed outward. The leading ends 373 of the second shutter pressing members 371 are pressed outward by the leading ends of the first side surface 101 and the second side surface 102 of the plug cover while protruding to the inside of the receptacle housing 300. As a result, the second shutter 370 is opened to the second surface 304 of the receptacle housing 300 and to the rear side of the receptacle housing 300 (see FIGS. 18A and 18B). When the second shutter 370 is in an open state, the second shutter 370 is returned to the state illustrated in FIGS. 17A and 17B by the elastic force thereof, but is maintained in the state illustrated in FIGS. 18A and 18B by the second surface 204 of the plug housing 200.

Figure 21:
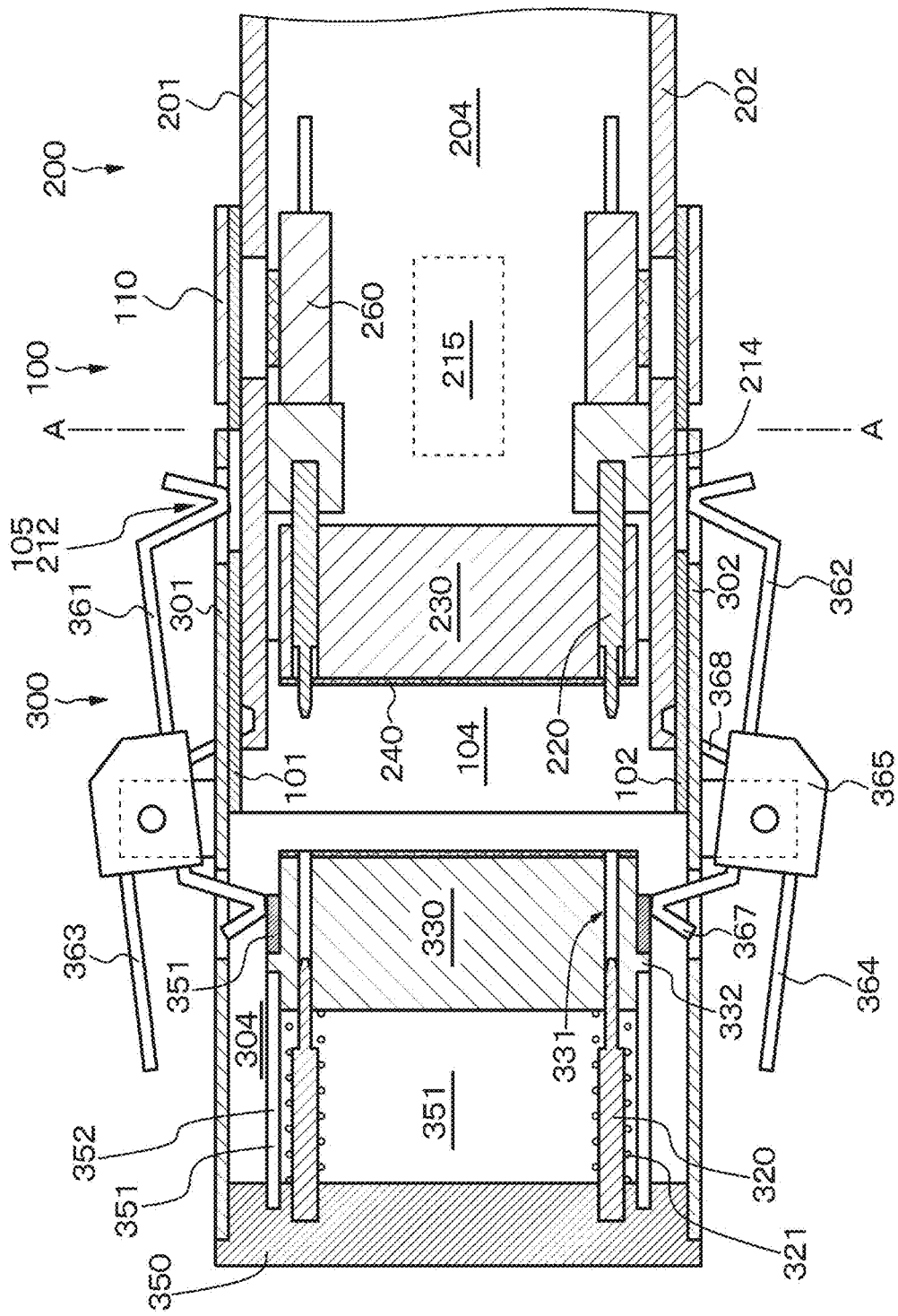
FIG. 21 follows
Figure 22:
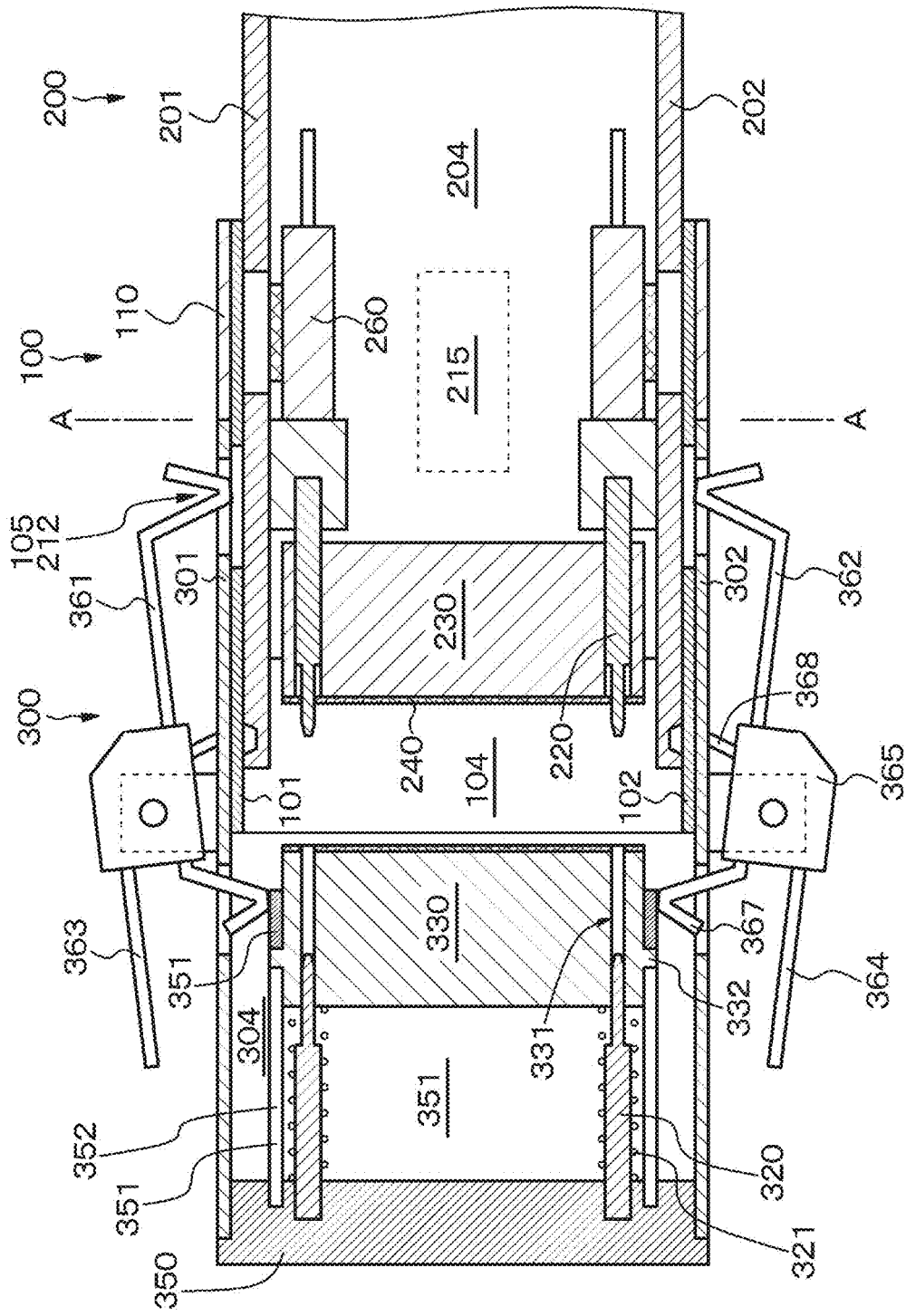
FIG. 22 follows

FIGS. 21, 22, and 24 are cross-sectional views schematically illustrating the plug 11 and the receptacle 12 taken along a virtual horizontal plane in a state in which the plug 11 is further inserted into the receptacle 12. In addition, FIG. 23A is a cross-sectional view schematically illustrating the plug housing 200 taken along a virtual vertical plane in the state illustrated in FIG. 22 and FIGS. 23B and 30B are cross-sectional views schematically illustrating the plug cover 100 and the plug housing 200 taken along a virtual vertical plane. Note that, in FIG. 23B, the unlocking claw 306 is not illustrated unlike FIG. 30B.

Furthermore, in the state illustrated in FIG. 22, the plug cover 100 is closest to the receptacle housing 300. The front end 300F of the receptacle housing 300 and the resin member 110 come into contact with each other. Alternatively, a means (not illustrated) for positioning a deepest portion of the plug cover 100 is provided in the receptacle housing 300 and the plug cover 100 comes into contact with the deepest portion positioning means. In the state illustrated in FIG. 22, the leading end portions of the contact pieces 361 and 362 of the second electrode unit 360 are inserted into the plug cover opening portion 105. In addition, the unlocking claw 306 reaches the opening portion 107 provided in the plug cover recessed portion 106 (see FIG. 30B). Then, the unlocking claw 306 is inserted into the opening portion 107 provided in the plug cover recessed portion 106 and biases the first portion 251 forming the biasing portion of the plug housing biasing means 250 to the first surface 203 of the plug housing 200. As a result, the biasing portion 251 of the plug housing biasing means 250 is disengaged from the plug cover recessed portion 106 and the plug housing 200 is movable with respect to the plug cover 100. That is, the plug housing 200 is movable to the receptacle housing 300 and the movement of the plug housing 200 starts (see FIG. 24).

When the movement of the plug housing 200 starts, the first shutter 120 is opened. That is, the leading ends 207 of the first side surface 201 and the second side surface 202 of the plug housing 200 press the leading end portion 122 of the first shutter upper component 121 and the leading end portion 124 of the first shutter lower component 123 to the receptacle housing. In a state in which the side end portions of the first shutter comes into contact with the end portions of the first surface 203 and the second surface 204 of the plug housing 200, the leading end portion 122 of the first shutter upper component 121 starts to move upward and the leading end portion 124 of the first shutter lower component 123 starts to move downward.

Figure 25:
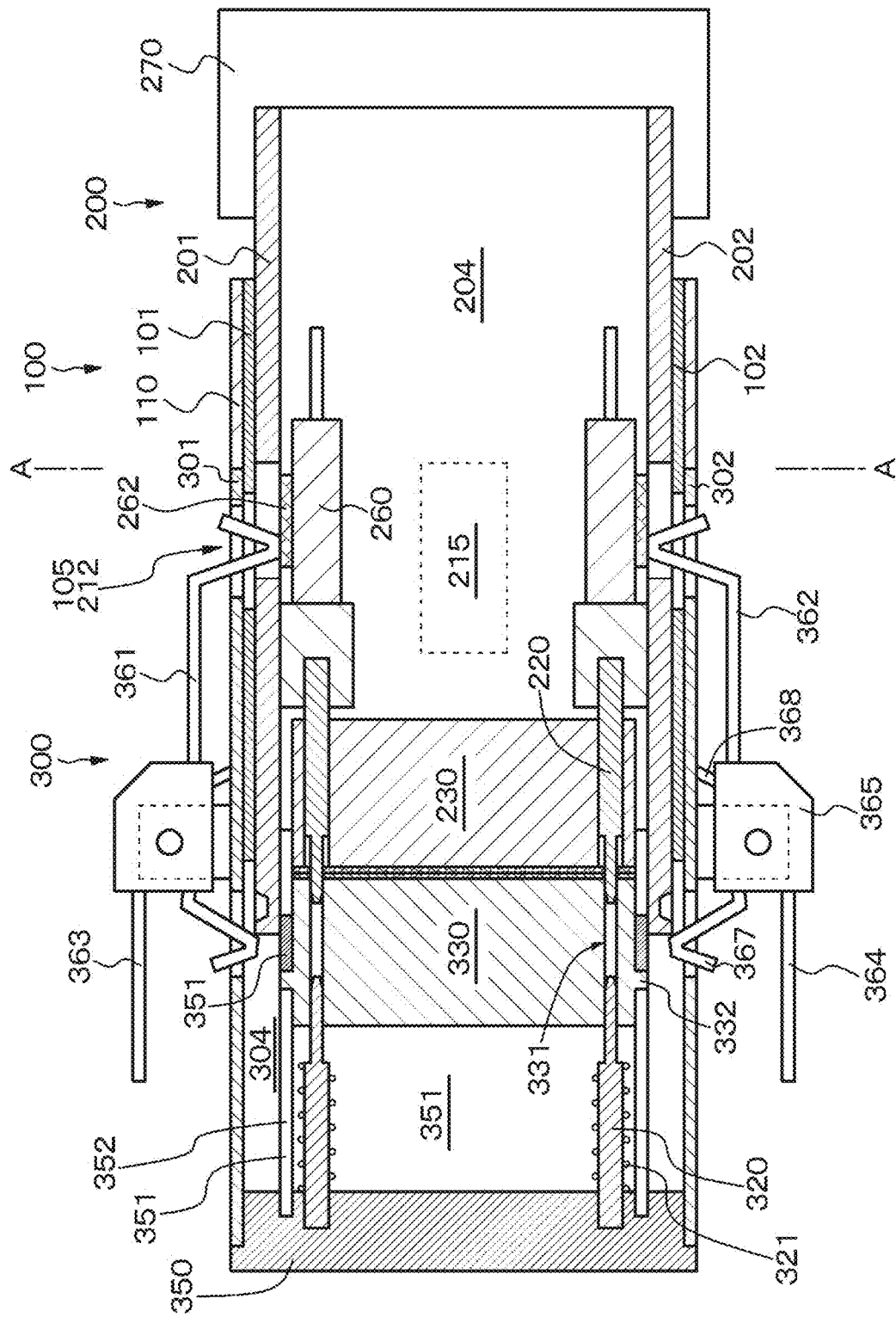
FIG. 25 follows
Figure 26:
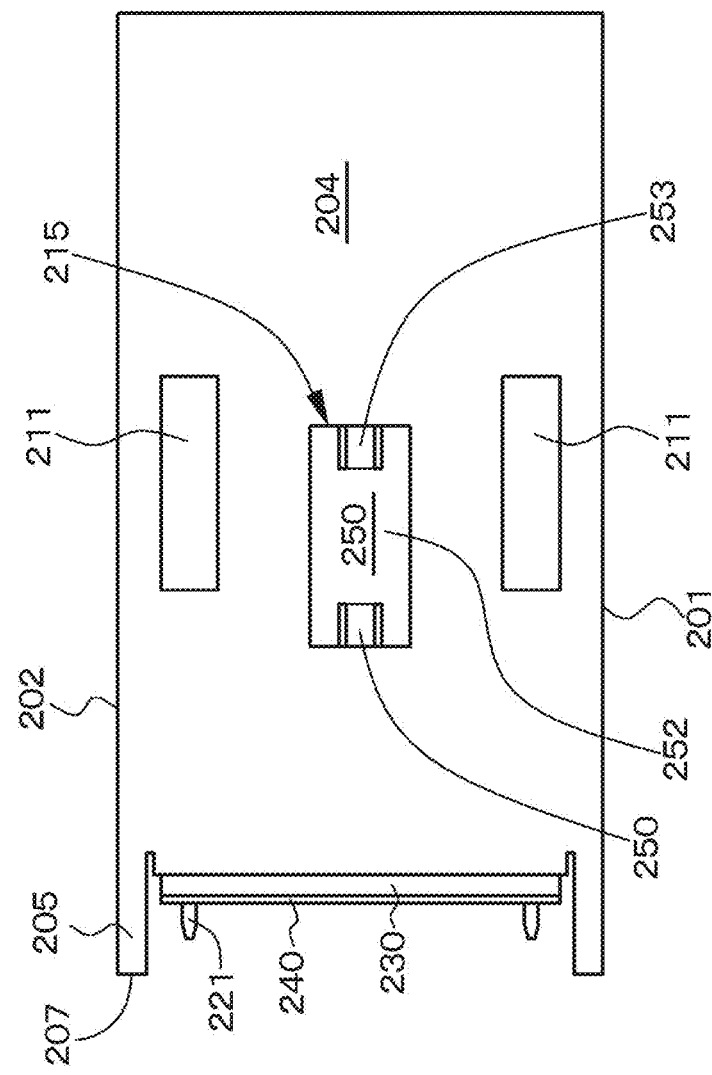
FIG. 26 is a plan view schematically illustrating a rear surface of the plug housing in the state illustrated in FIG. 25 in which the plug and the receptacle are being fitted to each other.

FIG. 25 is a cross-sectional view schematically illustrating a state in which the plug 11 is further inserted into the receptacle 12 and the first lens protective member 240 comes into contact with the second lens protective member 340. There is a gap between the lens unit 233 and the lens unit 333. In addition, FIG. 26 is a plan view schematically illustrating the rear surface of the plug housing 200 in the state illustrated in FIG. 25. The leading end 207 of the plug housing 200 collides with the second electrode unit locking member 367. The contact pieces 361 and 362 of the second electrode unit 360 are rotated on the support point 366 in a direction in which they become closer to the side surfaces 301 and 302 of the receptacle housing 300. The leading end portions of the contact pieces 361 and 362 of the second electrode unit 360 are inserted into the plug housing opening portion 212 and come into contact with the contact portions 261 and 262 of the first electrode unit, respectively. However, the second electrode unit locking members 367 have not yet been inserted into the second electrode unit locking recessed portions 206 provided in the leading end portions 205 of the first side surface and the second side surface of the plug housing.

Figure 27:
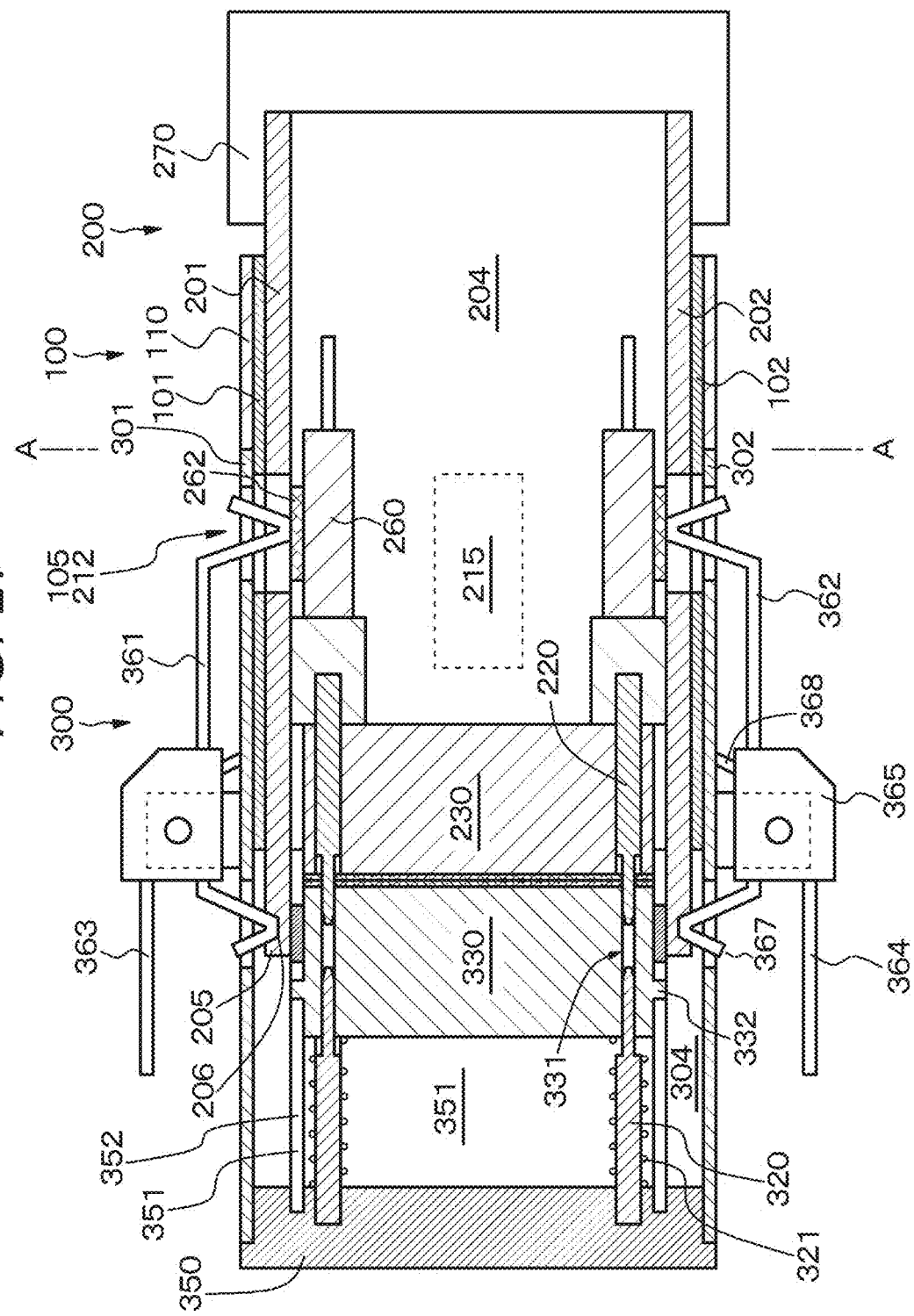
FIG. 27 follows
Figure 28:
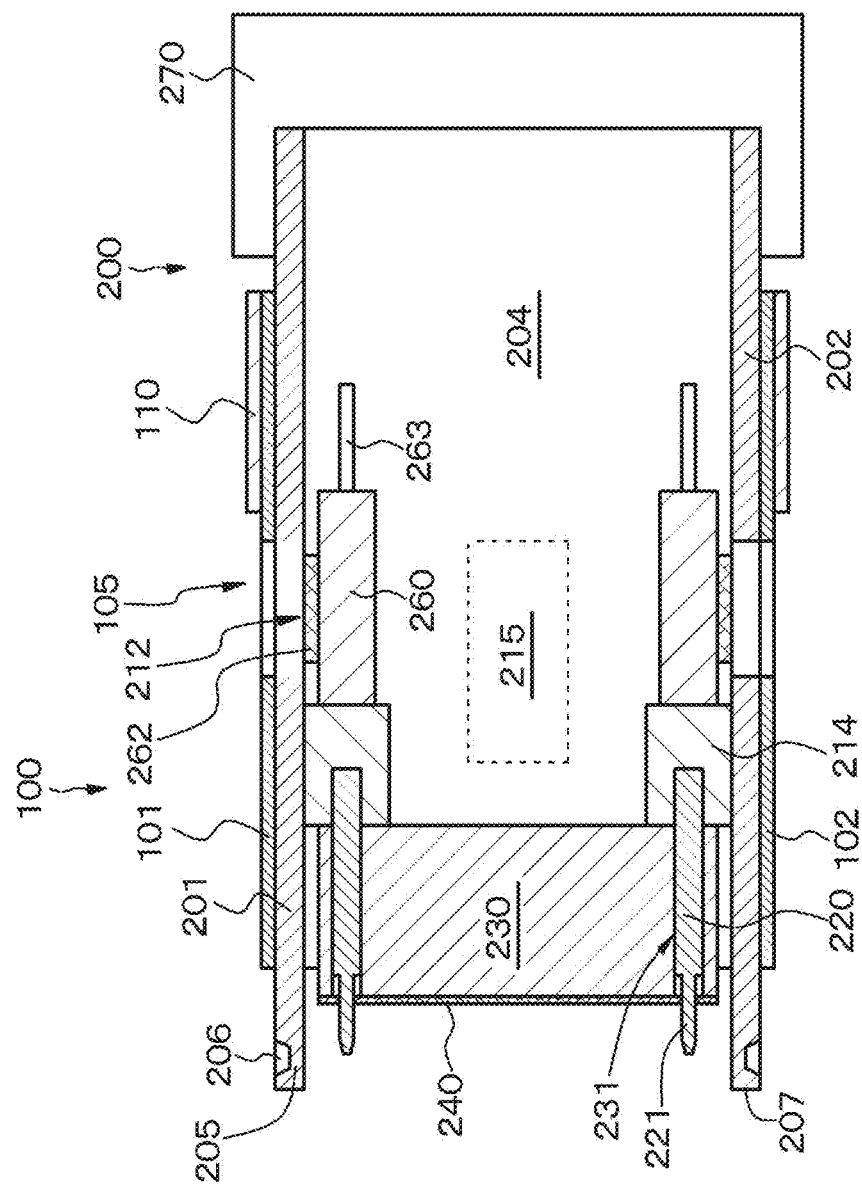
FIG. 28 is a cross-sectional view schematically illustrating the plug taken along a virtual horizontal plane in the state illustrated in FIG. 27 in which the plug and the receptacle are fitted to each other.
Figure 29A:
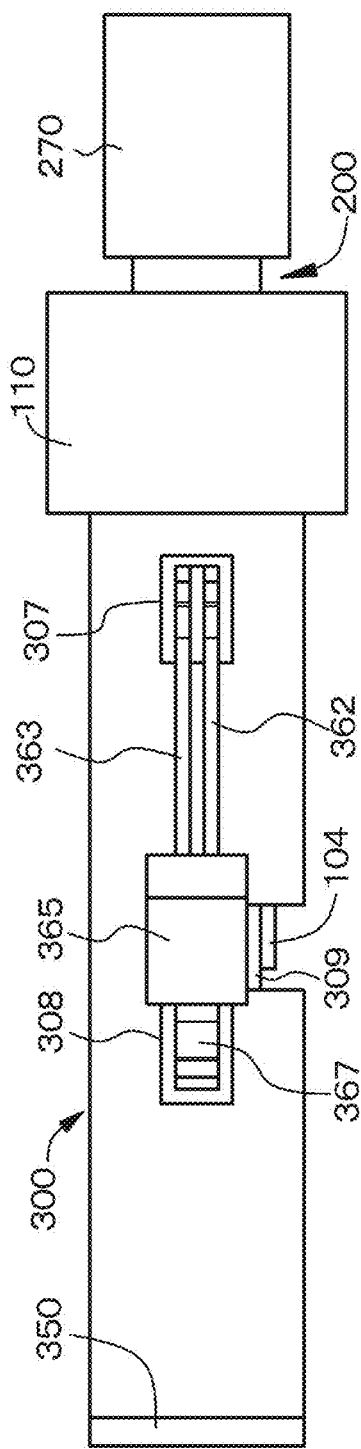
FIG. 29A is a side view schematically illustrating the plug and the receptacle.
Figure 29B:
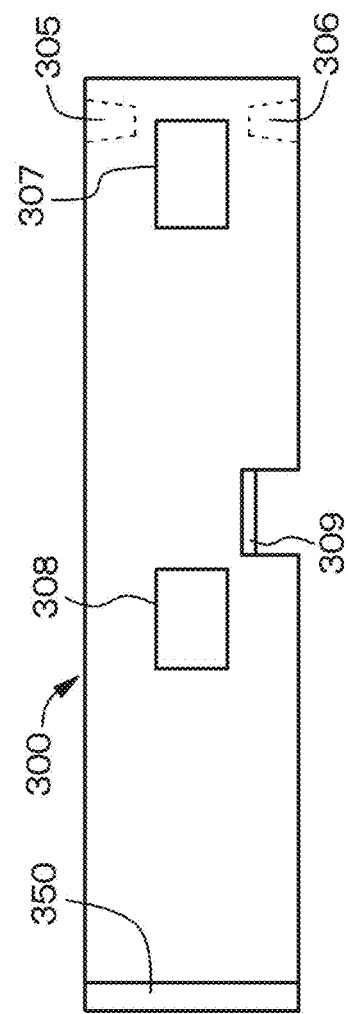
FIG. 29B is a side view schematically illustrating the receptacle.
Figure 29C:
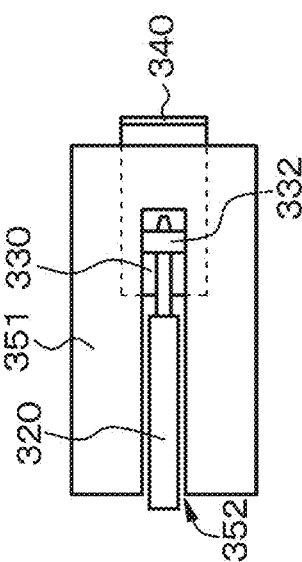
FIG. 29C is a side view schematically illustrating the second signal transmitting/receiving member or the second signal transmitting/receiving member biasing means, in the state illustrated in FIG. 27 in which the plug and the receptacle forming the photoelectric connector according to Embodiment 1 are fitted to each other.

FIG. 27 is a cross-sectional view schematically illustrating the plug 11 and the receptacle 12 in a state in which the plug 11 is fitted to the receptacle 12, which is taken along a virtual horizontal plane. FIG. 28 is a cross-sectional view schematically illustrating the plug 11 taken along a virtual horizontal plane in the fitted state illustrated in FIG. 27. FIG. 29A is a side view schematically illustrating the plug 11 and the receptacle 12, FIG. 29B is a side view schematically illustrating the receptacle 12, and FIG. 29C is a side view schematically illustrating, for example, the second signal transmitting/receiving member or the second signal transmitting/receiving member biasing means, in the fitted state. In addition, FIG. 30C is a cross-sectional view schematically illustrating the plug cover 100 and the plug housing 200. FIG. 31B is side view schematically illustrating the first shutter 120 and the plug housing 200. There is a gap between the lens unit 233 and the lens unit 333 and collimated (parallel light) coupling are achieved. The contact between the leading end portions of the contact pieces 361 and 362 of the second electrode unit 360 and the contact portions 261 and 262 of the first electrode unit is maintained. In addition, the second electrode unit locking members 367 are inserted into the second electrode unit locking recessed portions 206 provided in the leading end portions 205 of the first side surface and the second side surface of the plug housing. Therefore, the plug 11 is not easily taken out of the receptacle 12.

When the plug 11 is pulled out of the receptacle 12, the above-mentioned operation may be performed in reverse order. That is, the plug 11 is pulled out of the receptacle 12 to release the fitting between the plug 11 and the receptacle 12.

In the photoelectric connector according to Embodiment 1, in a state in which the plug is fitted to the receptacle, the opposite surface of the first signal transmitting/receiving member which faces the second signal transmitting/receiving member and the opposite surface of the second signal transmitting/receiving member which faces the first signal transmitting/receiving member come into contact with each other so as not to be movable with respect to each other. The first signal transmitting/receiving member and the second signal transmitting/receiving member are biased to the rear side of the plug by the second signal transmitting/receiving member biasing means. The plug housing is biased in a direction perpendicular to the axis line of the plug by the plug housing biasing means and the second electrode unit. Therefore, even in a case where vibration is applied to the plug and the receptacle, it is possible to prevent a change in the fitted state between the plug and the receptacle with a simple structure and to obtain high firmness. For example, it is possible to reliably and stably transmit optical signals at a high rate of several tens of gigabits per second to several hundreds of gigabits per second and to easily respond to multi channels. In addition, in the state in which the plug is fitted to the receptacle, the first electrode unit and the second electrode unit come into contact with each other and are electrically connected to each other. Therefore, the photoelectric connector can have a power feeding function. In addition, it is easy to attach and detach the plug to and from the receptacle. Furthermore, the photoelectric connector has high dustproof performance, satisfies a laser safety standard, responds to, for example, an electrode unit corresponding to a reversible structure, and has high safety. It is possible to achieve a portable and small photoelectric connector that can respond to mobile devices. In addition, since the photoelectric connector has a simple structure, it is possible to reduce manufacturing costs. Further, the user can freely select the function of the receptacle by selecting a receptacle with compatibility. In addition, when several fold safety mechanisms and safety check flows, such as a mechanical lock, a cover, electrical connection, and an ID check when hands shake, are provided, it is possible to provide a photoelectric connector with higher safety.

Embodiment 2

Embodiment 2 is a modification of Embodiment 1. In Embodiment 1, the tape core wire is used as the signal line. In contrast, in Embodiment 2, the signal line has a waveguide unit structure. FIG. 32A is a diagram schematically illustrating a first signal transmitting/receiving member and a second signal transmitting/receiving member provided with the signal lines having the waveguide unit structure in Embodiment 2 as viewed from the side opposite to the opposite surface. FIG. 32B is a cross-sectional view schematically illustrating one of the waveguide unit structures (however, a cross-sectional view taken along the YZ plane). FIG. 32C is a cross-sectional view schematically illustrating one of the waveguide unit structures (however, acrosssectional view taken along the XZ plane).

Specifically, a tape core wire 500 according to Embodiment 2 includes:
- a base resin sheet 501;
- a plurality of core members 502 that are provided side by side on the base resin sheet 501; and
- a covering member 503 that covers the base resin sheet 501 and the plurality of core members 502.

The base resin sheet 501 is made of, for example, polyethylene terephthalate (PET) and has a nominal thickness of, for example, 50 µm to 200 µm. Note that, in some cases, a thin covering member is stacked on the base resin sheet 501 in advance. At that time, the thickness of the covering member is in the range of, for example, 10 µm to 100 µm. For example, 12 core members 502 which are made of an ultraviolet-curable optical low-loss resin have a rectangular shape with a width of 30 µm to 200 µm and a height of 30 µm to 200 µm in a cross-sectional view. The pitch between the core members 502 is equal to the pitch between the lens units 233 and 333 or is 1 over an integer multiple of the pitch between the lens units 233 and 333. Here, the pitch between the core members in the Y direction is 250 µm. The covering member 503 is made of an ultraviolet-curable optical lowloss resin. A second surface 501B of the base resin sheet 501 on which the plurality of core members 502 are to be arranged is smooth and the height of an uneven portion of the second surface 501B is, for example, equal to or less than 10 µm. Note that, a surface opposite to the second surface 501B of the base resin sheet 501 is referred to as a first surface 501A. However, when the base resin sheet 501 and the plurality of core members 502 are covered with the covering member 503, a slight wave is generated in the surface of the covering member 503 by the unevenness of the core members 502 and the height of the uneven portion in the surface is, for example, equal to or greater than 10 µm. A smoothing process can be performed on the surface of the covering member 503, which leads to an increase in costs.

In Embodiment 2, similarly to the example illustrated in FIG. 14B, the tape core wires 500 are attached to the bottom surface of the first signal transmitting/receiving member right insertion hole 234R, the bottom surface of the first signal transmitting/receiving member left insertion hole 234L, the top surface of the first signal transmitting/receiving member right insertion hole 234R, the top surface of the first signal transmitting/receiving member left insertion hole 234L, the bottom surface of the second signal transmitting/receiving member right insertion hole 334R, the bottom surface of the second signal transmitting/receiving member left insertion hole 334L, the top surface of the second signal transmitting/receiving member right insertion hole 334R, and the top surface of the second signal transmitting/receiving member left insertion hole 334L. Specifically, the tape core wires 500 are attached through the first surface 501A of the base resin sheet 501. In this state, there is a gap between the tape core wire 500 attached to the bottom surface of the first signal transmitting/receiving member right insertion hole 234R and the tape core wire 500 attached to the top surface of the first signal transmitting/receiving member right insertion hole 234R. In addition, there is a gap between the tape core wire 500 attached to the bottom surface of the first signal transmitting/receiving member left insertion hole 234L and the tape core wire 500 attached to the top surface of the first signal transmitting/receiving member left insertion hole 234L. There is a gap between the tape core wire 500 attached to the bottom surface of the second signal transmitting/receiving member right insertion hole 334R and the tape core wire 500 attached to the top surface of the second signal transmitting/receiving member right insertion hole 334R. There is a gap between the tape core wire 500 attached to the bottom surface of the second signal transmitting/receiving member left insertion hole 334L and the tape core wire 500 attached to the top surface of the second signal transmitting/receiving member left insertion hole 334L. The use of the above-mentioned configuration and structure makes it possible to maintain the pitch between the core members in the Y direction at 250 µm and to position both components. Therefore, it is easy to improve the accuracy of adhesion. In addition, of course, four tape core wires 500 may be integrally attached. Alternatively, two tape core wires 500 may be integrally attached to the top surface of the first signal transmitting/receiving member insertion hole 234 and the top surface of the second signal transmitting/receiving member insertion hole 334 and two tape core wires 500 may be integrally attached to the bottom surface of the first signal transmitting/receiving member insertion hole 234 and the bottom surface of the second signal transmitting/receiving member insertion hole 334.

Embodiment 3

Figure 33:
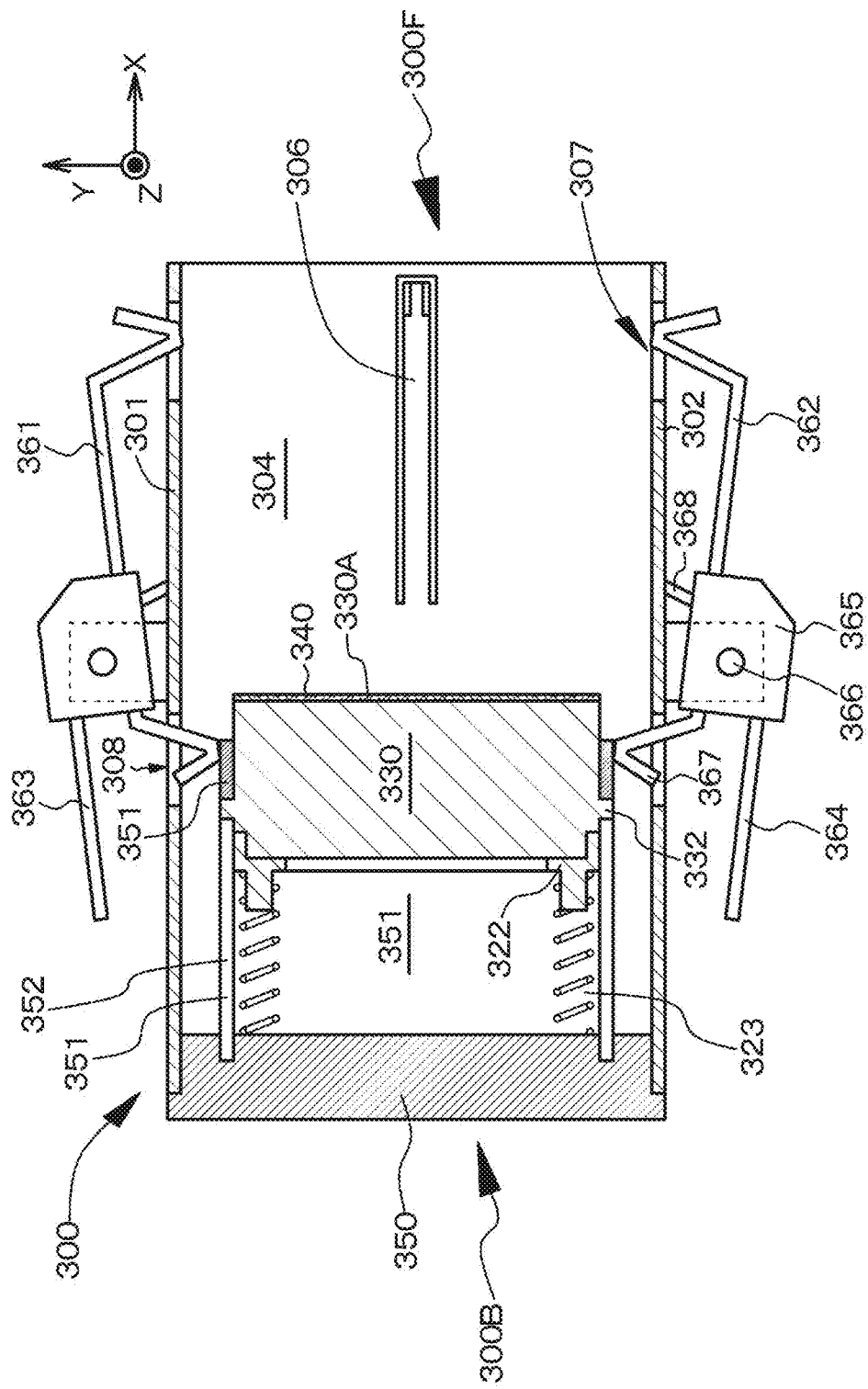
FIG. 33 is a cross-sectional view schematically illustrating a receptacle housing forming a photoelectric connector according to Embodiment 3 taken along a virtual horizontal plane (however, a cross-sectional view illustrating the plug housing as viewed from the upper side).

Embodiment 3 is a modification of Embodiments 1 and 2 and relates to the second signal transmitting/receiving member biasing means with the first structure. FIG. 33 is a cross-sectional view schematically illustrating a receptacle housing forming a photoelectric connector according to Embodiment 3 taken along a virtual horizontal plane (however, a cross-sectional view illustrating the plug housing as viewed from the upper side).

In Embodiment 3, the receptacle 12 further includes a spring bush 322 that is provided in the receptacle housing 300 and is attached to a rear portion of the second signal transmitting/receiving member 330. The second signal transmitting/receiving member biasing means is a spring (compression spring) 323 that has a rear end portion attached to the receptacle housing 300 and a leading end portion attached to the spring bush 322. The use of this configuration makes it possible to reliably bias the first signal transmitting/receiving member 230 and the second signal transmitting/receiving member 330 to the rear side of the plug with a simple structure in a state in which the plug 11 is fitted to the receptacle 12. The spring bush 322 may be formed by, for example, plastic molding.

Embodiment 4

Embodiment 4 is a modification of Embodiments 1 to 3 and relates to the signal transmitting/receiving member with the first structure. FIG. 34A is a diagram schematically illustrating a first signal transmitting/receiving member and a second signal transmitting/receiving member in a photoelectric connector according to Embodiment 4 as viewed from the opposite surface. FIG. 34B is a cross-sectional view schematically illustrating the first signal transmitting/receiving member taken along an arrow B-B of FIG. 34A (however, a cross-sectional view taken along the YZ plane). FIG. 34C is a cross-sectional view schematically illustrating the second signal transmitting/receiving member taken along the arrow B-B of FIG. 34A (however, a cross-sectional view taken along the YZ plane).

In the photoelectric connector according to Embodiment 4, a protruding portion 242 and a recessed portion 243 are formed in one (for example, the first signal transmitting/receiving member 230, specifically, the first lens protective member 240) of the opposite surface 230A of the first signal transmitting/receiving member 230 and the opposite surface 330A of the second signal transmitting/receiving member 330 and a recessed portion 243 and a protruding portion 342 are provided in the other opposite surface (for example, the second signal transmitting/receiving member 330, specifically, the second lens protective member 340). In addition, when the plug 11 is fitted to the receptacle 12, the protruding portions 242 and 342 are fitted to the recessed portions 243 and 343. The use of this configuration makes it possible to easily position the first signal transmitting/receiving member 230 and the second signal transmitting/receiving member 330. A component for positioning is not required and it is possible to further reduce the size and cost of the photoelectric connector. In the photoelectric connector according to Embodiment 4, the second guide pin and the second guide pin hole according to Embodiment 1 can be omitted. In addition, in a case where the second guide pin is provided, when the plug is fitted to the receptacle, it is not necessary to insert the first guide pin which has passed through the first guide pin hole into the second guide pin hole.

Embodiment 5

Embodiment 5 is a modification of Embodiments 1 to 4 and relates to a photoelectric connector with an upper and lower electrode structure. In addition, Embodiment 5 relates to the photoelectric connector according to the third configuration.

Figure 35:
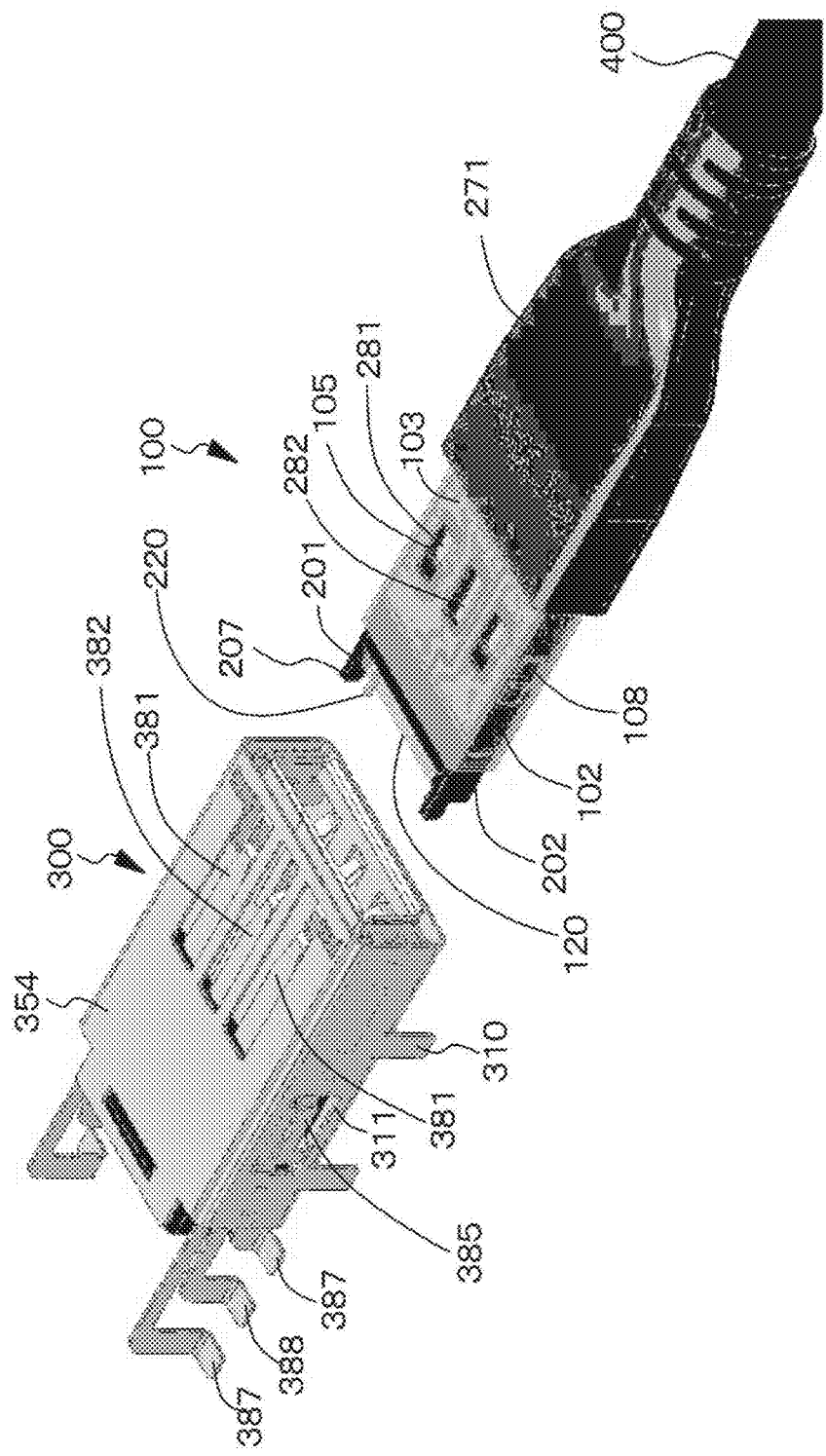
FIG. 35 is a perspective view illustrating a plug and a receptacle forming a photoelectric connector according to Embodiment 5 (however, in a case where the plug and the receptacle are fitted to each other).
Figure 36:
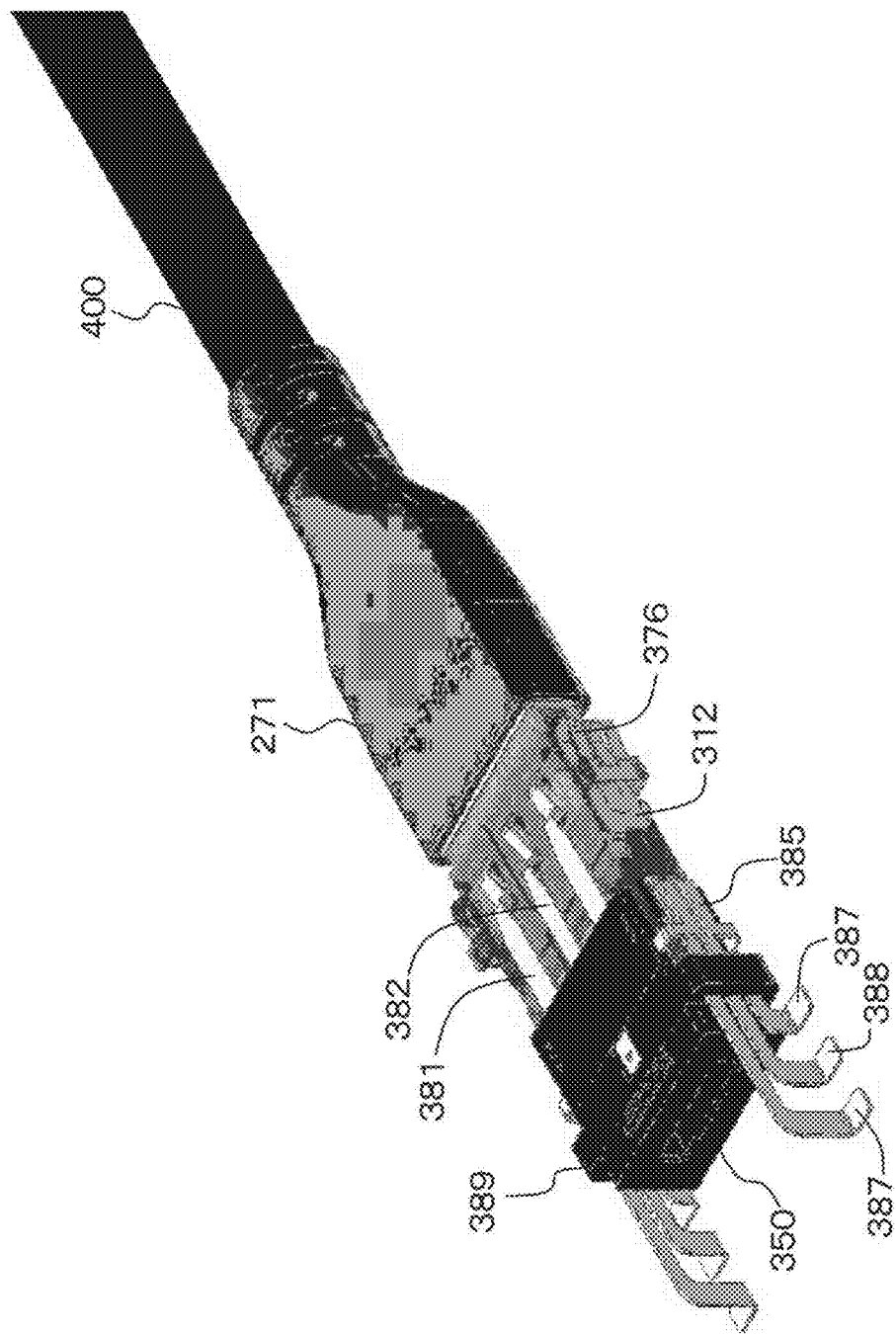
FIG. 36 is a perspective view illustrating the plug and the receptacle forming the photoelectric connector according to Embodiment 5 as viewed from an angle different from that in FIG. 35.
Figure 37:
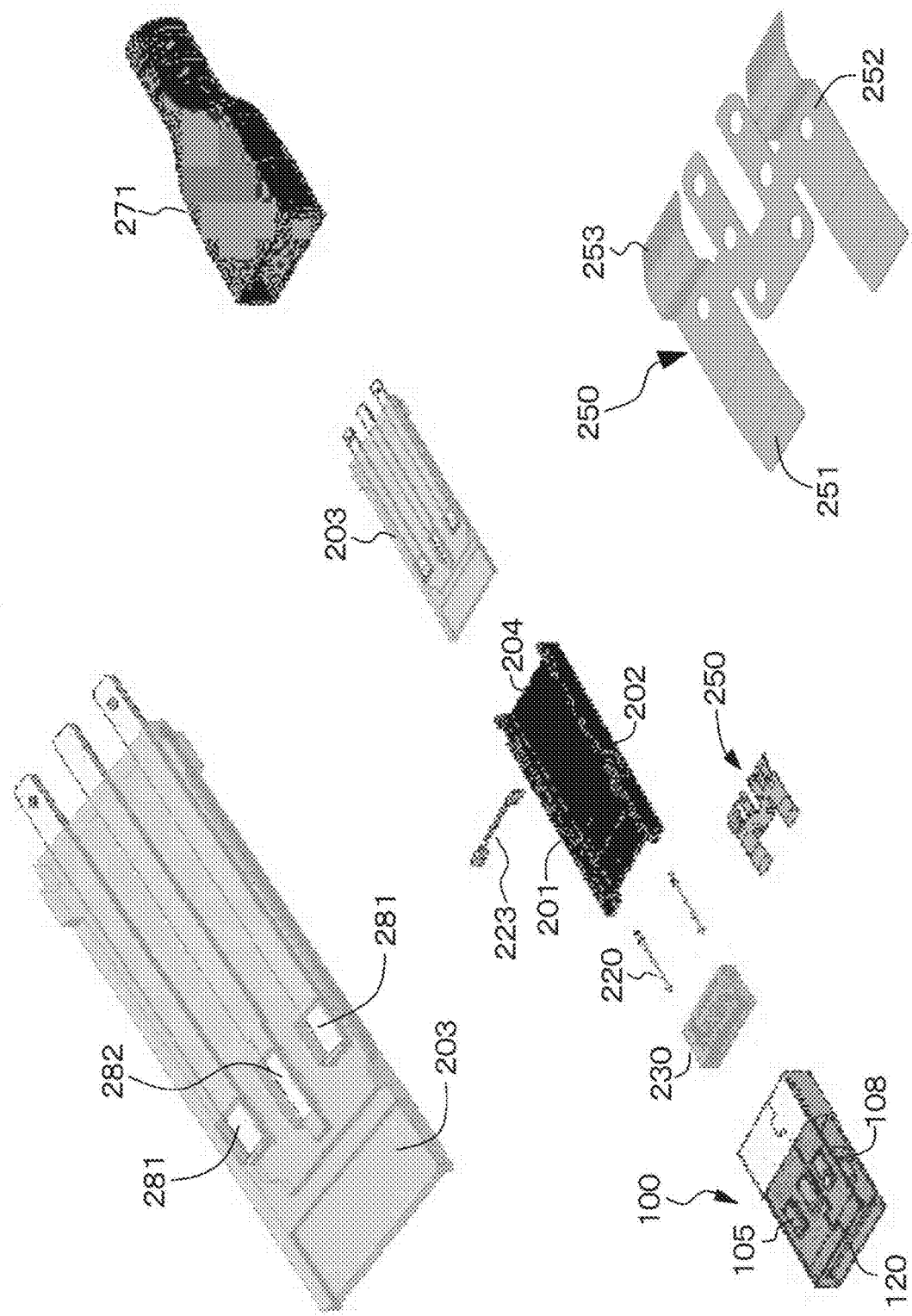
FIG. 37 is an exploded perspective view illustrating the plug (a plug cover and a plug housing) forming the photoelectric connector according to Embodiment 5, a perspective view illustrating a plug housing biasing means, and a perspective view illustrating a first surface and a first electrode unit forming the plug housing.
Figure 39:
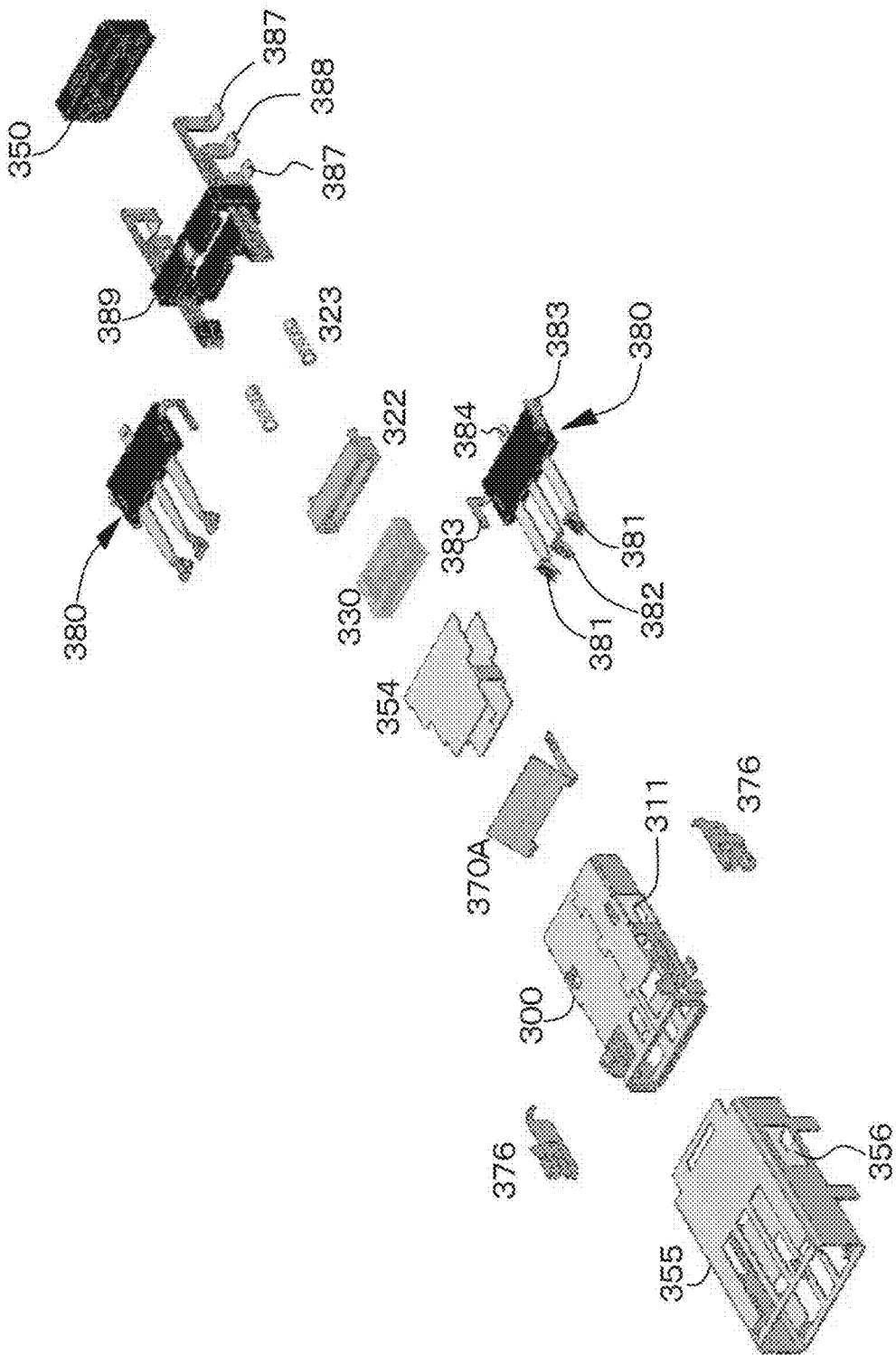
FIG. 39 is an exploded perspective view illustrating the receptacle forming the photoelectric connector according to Embodiment 5.
Figure 40:
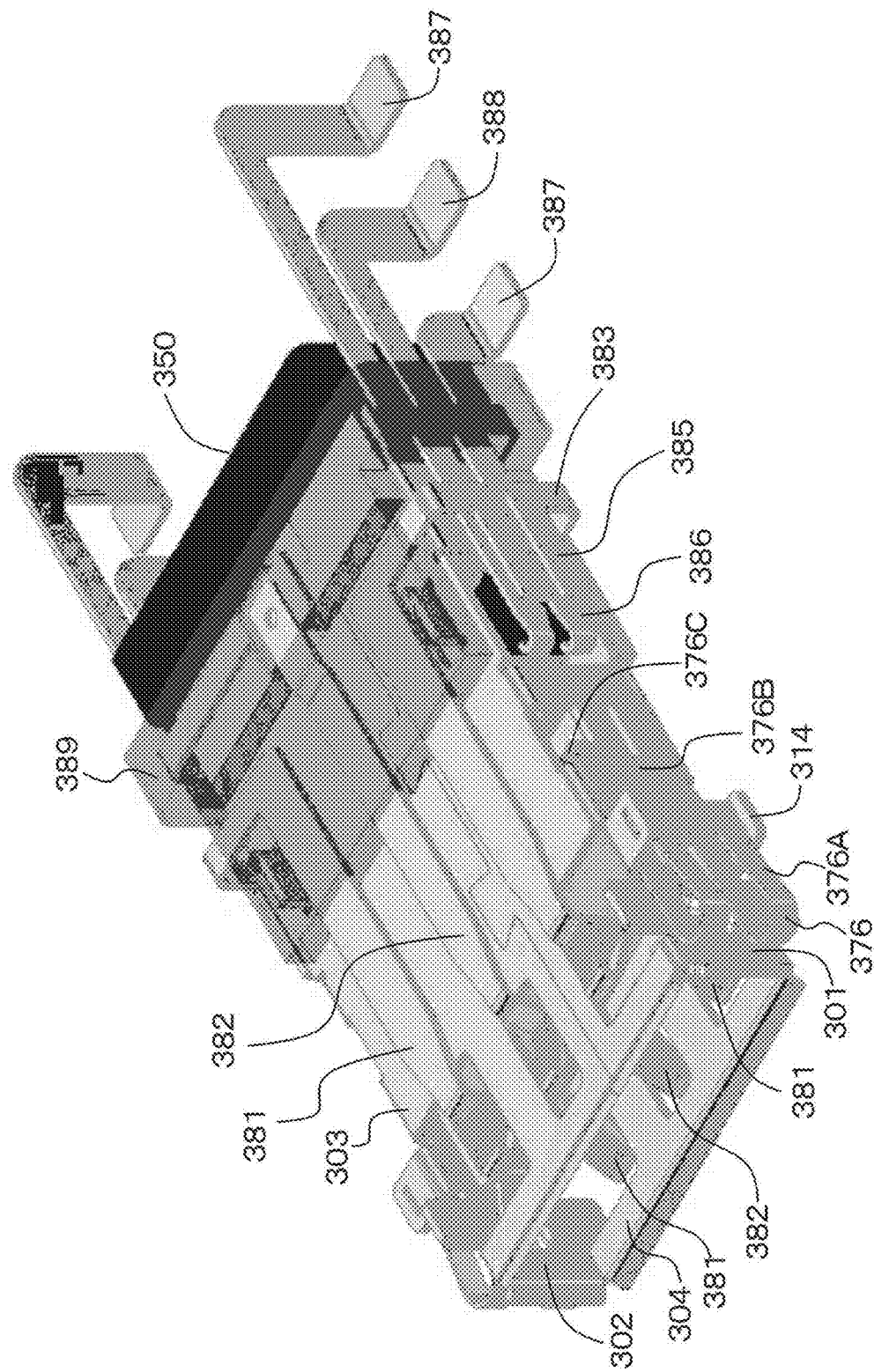
FIG. 40 is a perspective view illustrating the receptacle forming the photoelectric connector according to Embodiment 5 as obliquely viewed from the upper side.
Figure 41:
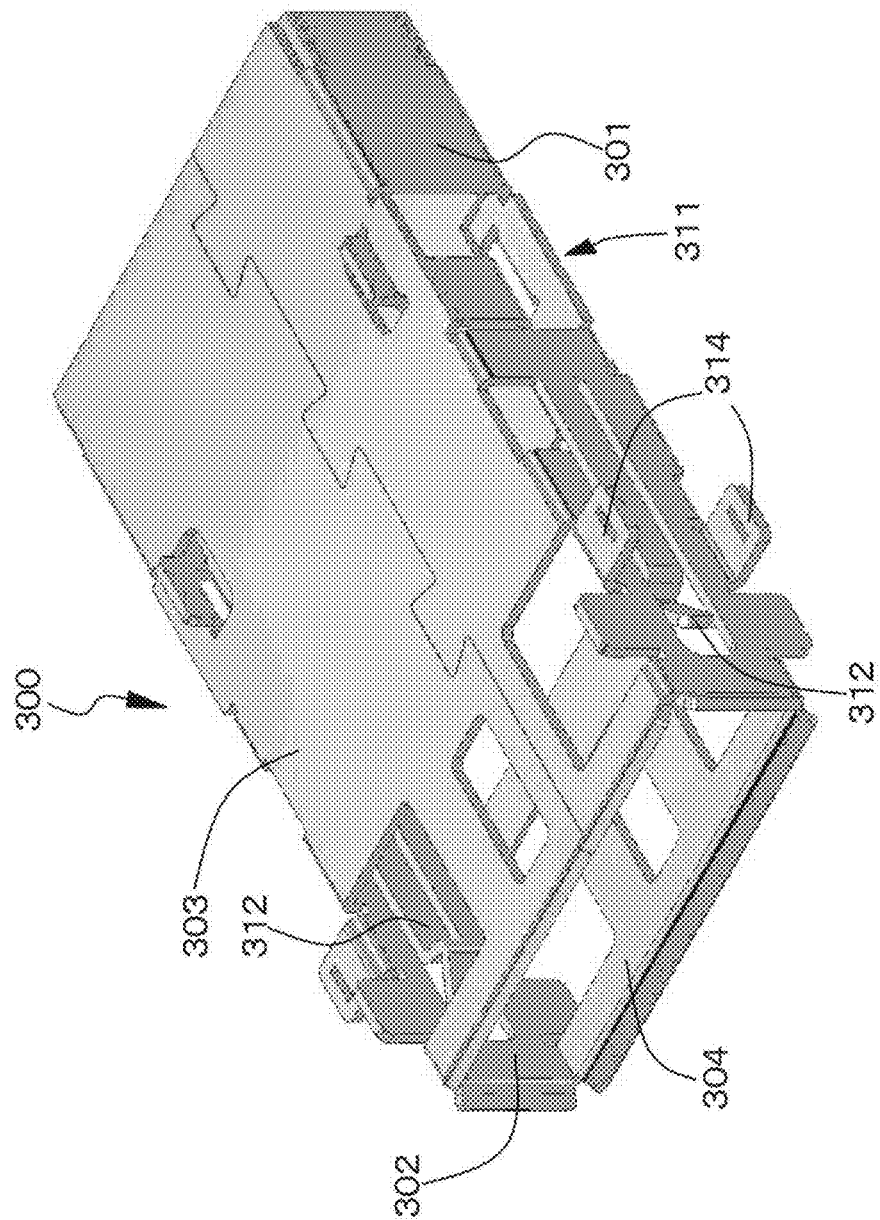
FIG. 41 is a perspective view illustrating a receptacle housing forming the photoelectric connector according to Embodiment 5 as obliquely viewed from the upper side.
Figure 42:
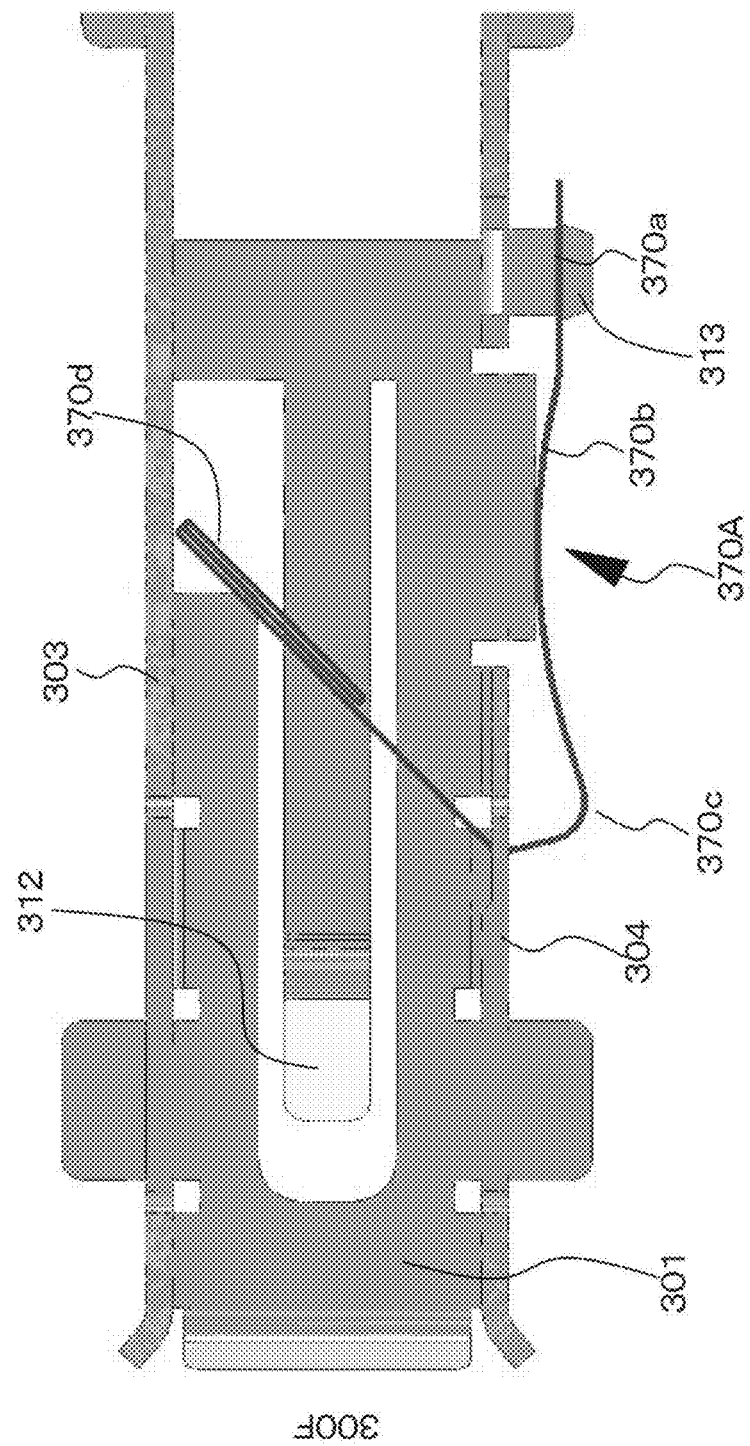
FIG. 42 is a diagram illustrating an arrangement relationship between the receptacle housing and a second shutter forming the photoelectric connector according to Embodiment 5.
Figures 43A, 43B:
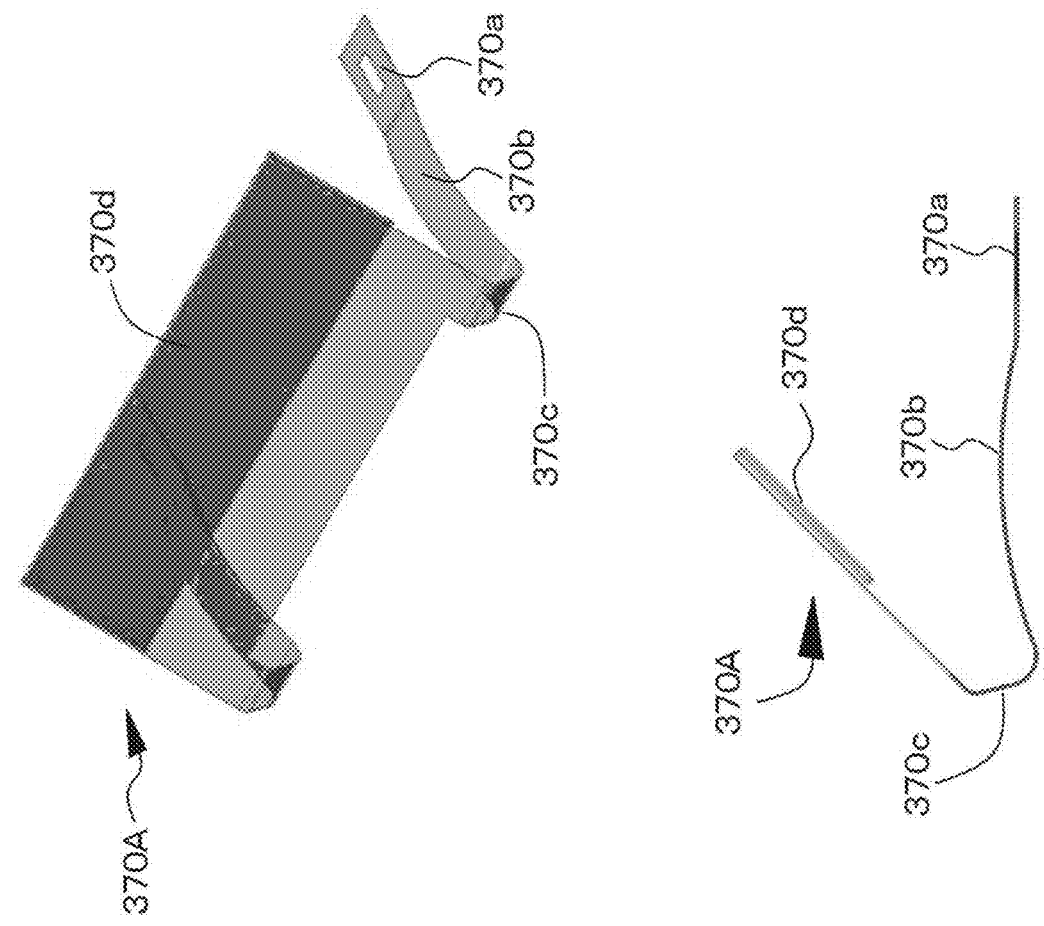
FIGS. 43A and 43B are a perspective view and a side view illustrating the second shutter forming the photoelectric connector according to Embodiment 5, respectively.
Figure 44A:
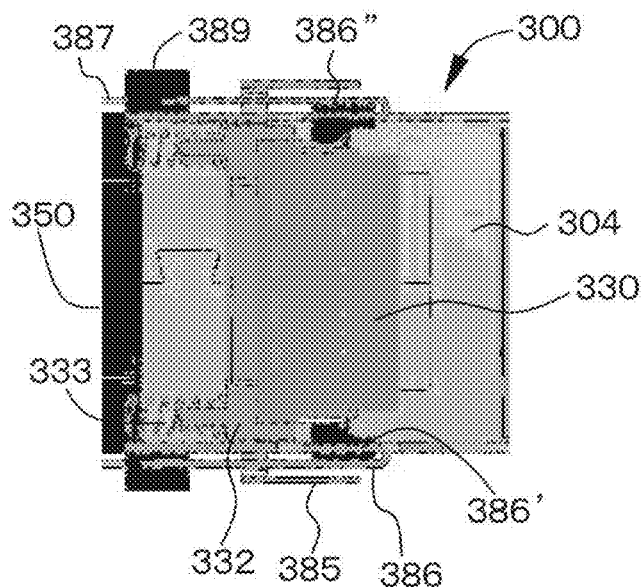
FIG. 44A is a diagram illustrating the receptacle housing forming the photoelectric connector according to Embodiment 5 (however, a diagram illustrating the receptacle housing as viewed from the upper side)
Figure 44B:
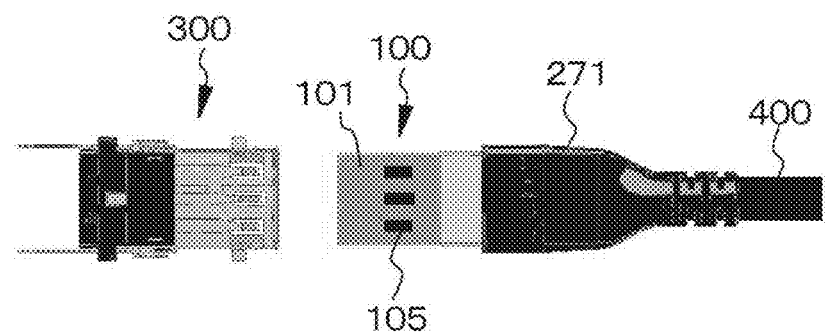
FIG. 44B is a plan view illustrating the plug and the receptacle before the plug and the receptacle are fitted to each other.
Figure 44C:
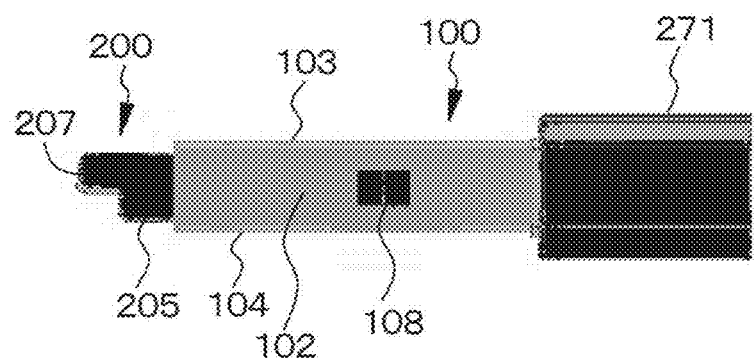
FIG. 44C is a side view illustrating a leading end portion of the plug when the plug and the receptacle are fitted to each other.
Figure 45A:
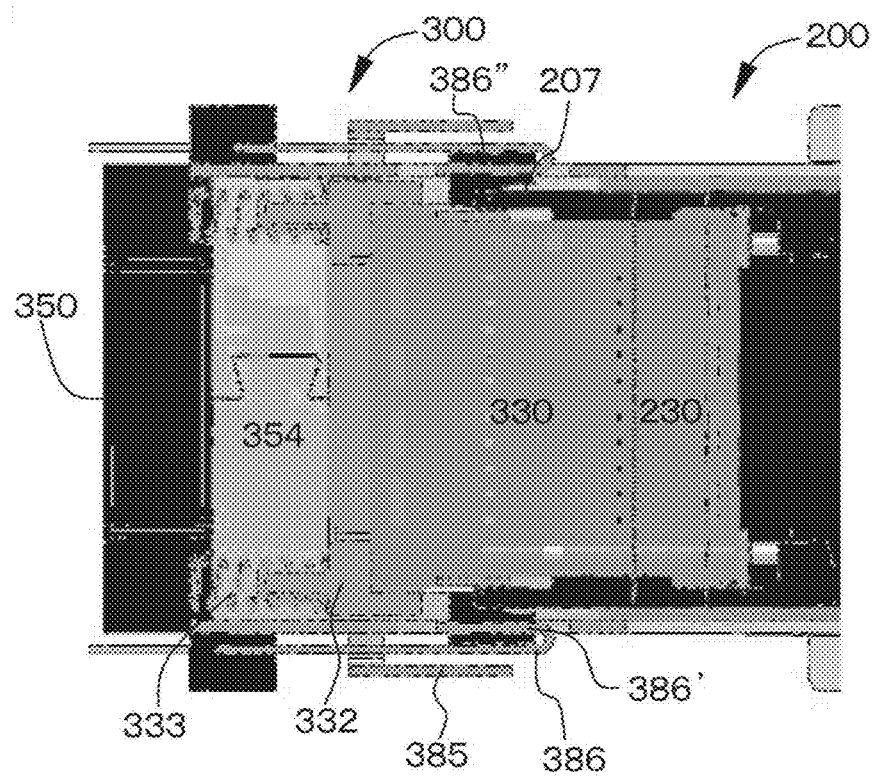
FIG. 45A is a diagram illustrating the plug housing and the receptacle housing in a state in which the plug and the receptacle forming the photoelectric connector according to Embodiment 5 are fitted to each other (however, a diagram illustrating the receptacle housing as viewed from the upper side)
Figure 45B:
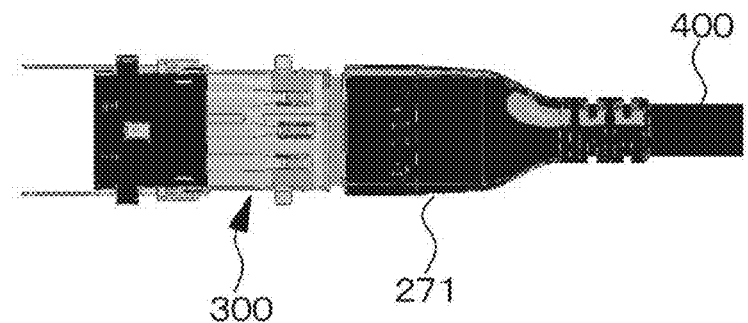
FIG. 45B is a plan view illustrating the plug and the receptacle.
Figure 46A:
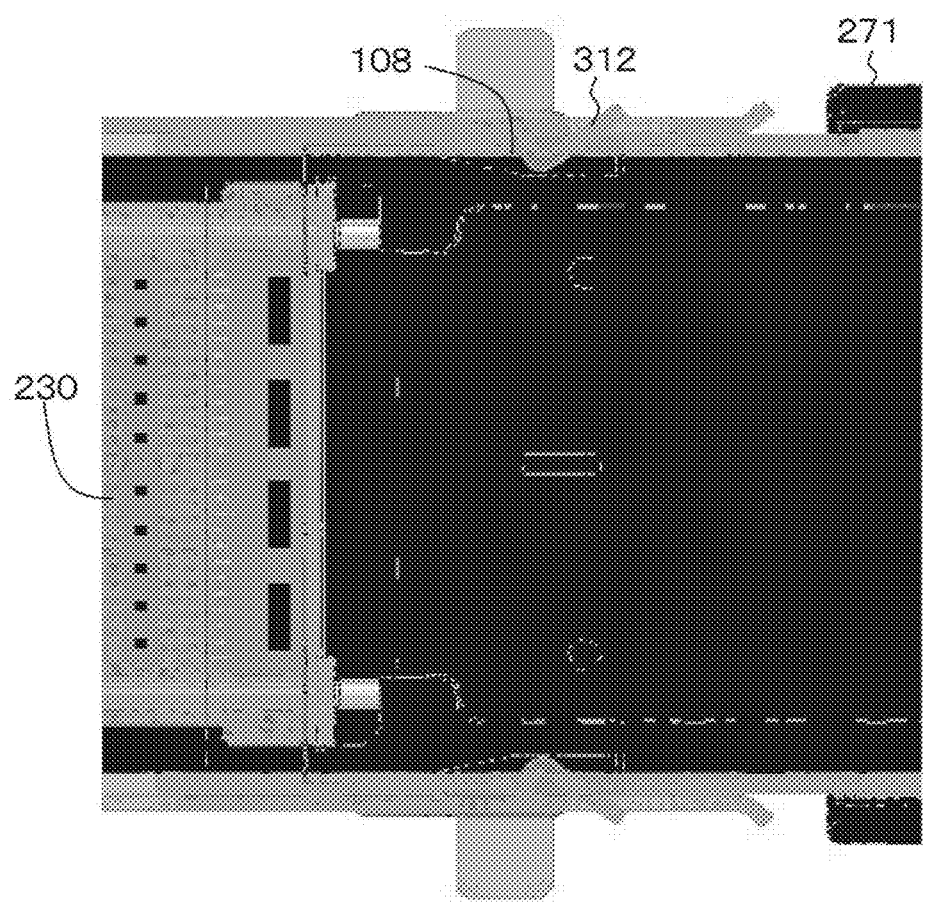
FIG. 46A is a diagram illustrating portions of the plug housing and the receptacle housing in a state in which the plug and the receptacle forming the photoelectric connector according to Embodiment 5 are fitted to each other (however, a diagram illustrating the receptacle housing and the plug housing as viewed from the upper side)
Figure 46B:
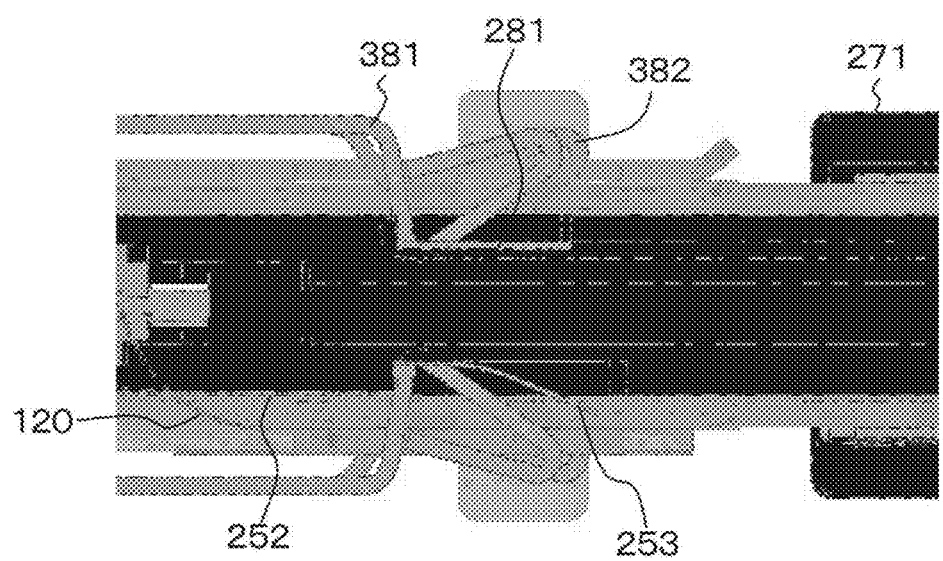
FIG. 46B is a cross-sectional view illustrating the receptacle housing and the plug housing in a state in which the plug and the receptacle are fitted to each other, as viewed from the side.
Figure 47A:
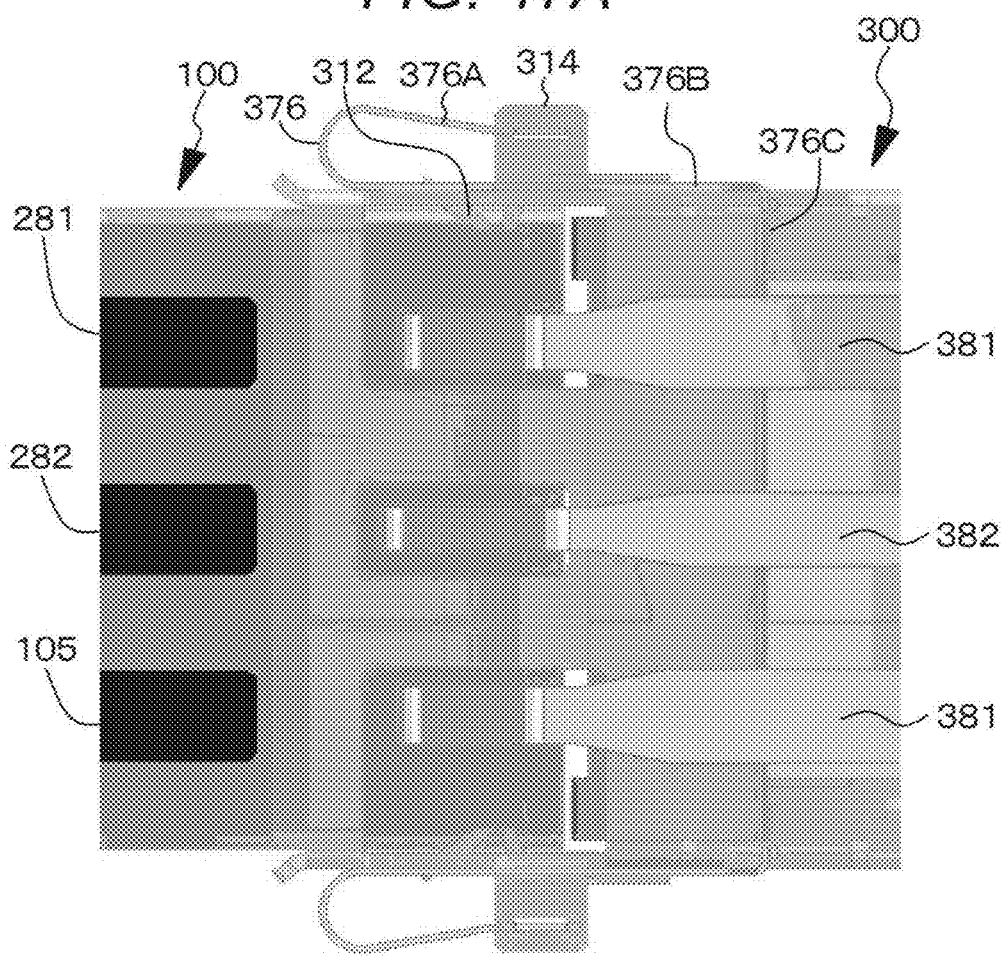
FIG. 47A is a diagram illustrating portions of the plug housing and the receptacle housing in a state in which the plug and the receptacle forming the photoelectric connector according to Embodiment 5 are fitted to each other (however, a diagram illustrating the receptacle housing and the plug housing as viewed from the upper side)
Figure 47B:
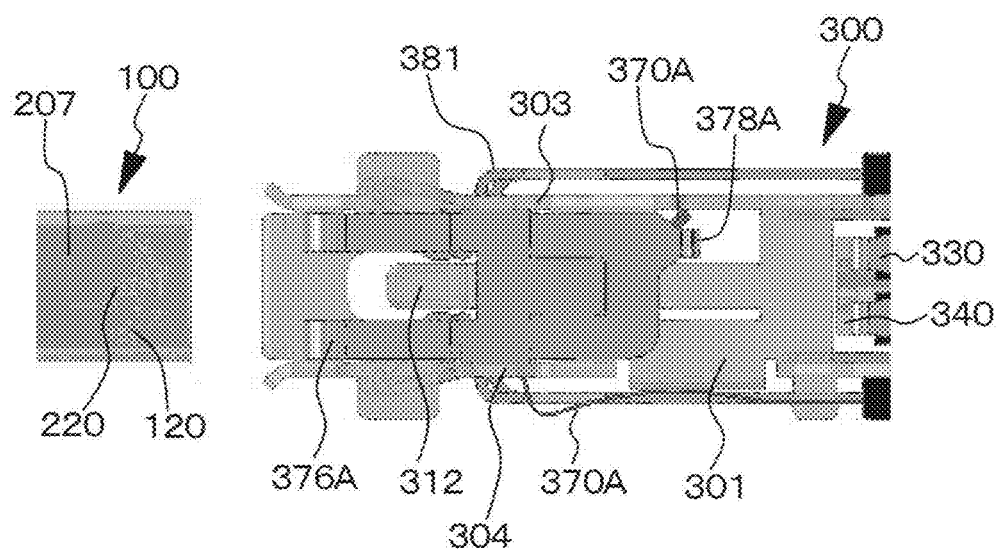
FIG. 47B is a cross-sectional view illustrating the receptacle housing and the plug housing before the plug and the receptacle are fitted to each other, as viewed from the side.

FIG. 35 is a perspective view illustrating a plug and a receptacle forming the photoelectric connector according to Embodiment 5 (however, in a case where the plug is fitted to the receptacle). FIG. 36 is a perspective view illustrating the plug and the receptacle as viewed from an angle different from that in FIG. 35. In addition, FIG. 37 is an exploded perspective view illustrating the plug (a plug cover and a plug housing) forming the photoelectric connector according to Embodiment 5, a perspective view illustrating a plug housing biasing means, and a perspective view illustrating a first surface and a first electrode unit forming the plug housing. FIGS. 38A and 38B are a perspective view and a plan view illustrating the plug, respectively. Furthermore, FIG. 39 is an exploded perspective view illustrating the receptacle forming the photoelectric connector according to Embodiment 5. FIG. 40 is a perspective view illustrating the receptacle as obliquely viewed from the upper side. FIG. 41 is a perspective view illustrating a receptacle housing as obliquely viewed from the upper side. FIG. 42 is a diagram illustrating the arrangement relationship between the receptacle housing and a second shutter. FIGS. 43A and 43B are a perspective view and a side view illustrating the second shutter, respectively. FIG. 44A is a diagram illustrating the receptacle housing (however, a diagram illustrating the receptacle housing as viewed from the upper side). FIG. 44B is a plan view illustrating the plug and the receptacle before the plug is fitted to the receptacle. FIG. 44C is a side view illustrating a leading end portion of the plug when the plug is fitted to the receptacle. FIG. 45A is a diagram illustrating the plug housing and the receptacle housing in a state in which the plug is fitted to the receptacle (however, a diagram illustrating the receptacle housing as viewed from the upper side). FIG. 45B is a plan view illustrating the plug and the receptacle. FIG. 46A is a diagram illustrating portions of the plug housing and the receptacle housing in a state in which the plug is fitted to the receptacle (however, a diagram illustrating the receptacle housing and the plug housing as viewed from the upper side). FIG. 46B is a cross-sectional view illustrating the receptacle housing and the plug housing in a state in which the plug is fitted to the receptacle as viewed from the side. FIG. 47A is a diagram illustrating portions of the plug housing and the receptacle housing in a state in which the plug is fitted to the receptacle (however, a diagram illustrating the receptacle housing and the plug housing as viewed from the upper side). FIG. 47B is a cross-sectional view illustrating the receptacle housing and the plug housing before the plug is fitted to the receptacle as viewed from the side.

In the photoelectric connector according to Embodiment 5,
    the plug 11 includes one first electrode unit 280 and the receptacle 12 includes two second electrode units 380.

The first electrode unit 280 is attached to the first surface 203 of the plug housing 200.

The two second electrode units 380 are attached to the first surface 303 and the second surface 304 of the receptacle housing 300. The use of this configuration makes it possible to achieve an electrode unit corresponding to a reversible structure. That is, the plug 11 can be fitted to the receptacle 12 such that the first surface 303 of the receptacle housing 300 corresponds to the first surface 203 of the plug housing 200. In addition, the plug 11 can be fitted to the receptacle 12 such that the first surface 303 of the receptacle housing 300 corresponds to the second surface 204 of the plug housing 200. The first electrode unit 280 can be attached to the first surface 203 of the plug housing 200 by, for example, a screw or a snap-fit member (elastic locking claw mechanism) or can be directly attached to the first surface 203 of the plug housing 200 on the basis of an insert molding method (see FIG. 37). The second electrode units 380 are also used as the unlocking claws 305 and 306 in Embodiment 1.

The plug housing 200 and the plug cover 100 can have substantially the similar configuration and structure to the plug housing 200 and the plug cover 100 according to Embodiment 1 except the structure of the first electrode unit 280 and the structure of the leading end 207 of the plug housing 200. The receptacle housing 300 can have substantially the similar configuration and structure to the receptacle housing 300 described in Embodiment 3 except the structure of the first electrode unit 280, the structure of a plug cover locking member 312, and the structure of the second shutter 370A. Therefore, the detailed description thereof will not be repeated.

The receptacle housing 300 is manufactured by bending a metal plate. However, at that time, a joint is generated. Therefore, the first surface 303 and the second surface 304 of the receptacle housing 300 are covered with the second electrode units 380, which makes it possible to improve a dustproof performance without preparing a dedicated component. In addition, since the receptacle 12 is small, it is difficult to increase rigidity. Therefore, the structure in which the first surface 303 and the second surface 304 of the receptacle housing 300 are covered with the second electrode units 380 makes is possible to increase the overall rigidity of the receptacle 12. Furthermore, in the photoelectric connector, an optical signal is transmitted between the lens units that do not come into contact with each other to establish communication. For example, when droplets are attached to the lens units 233 and 333, an optical path is distorted. In the worst case, optical communication is cut. The structure in which the first surface 303 and the second surface 304 of the receptacle housing 300 are covered with the second electrode units 380 makes is possible to prevent dew condensation, without providing, for example, a special cover component. In addition, when vibration is applied to the lens units 233 and 333 by disturbance, the waveform is distorted, which has an adverse effect on optical communication. The structure in which the first surface 303 and the second surface 304 of the receptacle housing 300 are covered with the second electrode units 380 makes it possible to disperse and suppress a resonance frequency, without preparing a special component for suppressing resonance.

In the photoelectric connector having an upper and lower electrode structure, in a state in which the plug 11 is fitted to the receptacle 12, the first surface 203 and the second surface 204 of the plug housing 200 are biased by contact pieces 381 and 382 of the second electrode unit 380. That is, the first surface 203 and the second surface 204 are biased in the Z direction. Plug cover opening portions 105 into which the contact pieces 381 and 382 of the second electrode units 380 are inserted are provided in the first surface 103 and the second surface 104 of the plug cover 100. In addition, in a state in which the plug 11 is fitted to the receptacle 12, the contact pieces 381 and 382 of one second electrode unit 380 come into contact with contact portions 281 and 282 of the first electrode unit 280 through the plug cover opening portions 105 provided in the first surface 103 of the plug cover 100 and bias the plug housing 200 to the second surface 104 of the plug cover 100. The contact pieces 381 and 382 of the other second electrode unit 380 come into contact with the second surface 204 of the plug housing 200 through the plug cover opening portions 105 provided in the second surface 104 of the plug cover 100 and bias the plug housing 200 to the first surface 103 of the plug cover 100. That is, the contact pieces 381 and 382 bias the plug housing 200 in the Z direction. In addition, the force of the contact pieces 381 and 382 of the one second electrode unit 380 biasing the plug housing 200 to the second surface 104 of the plug cover 100 is different from the force of the contact pieces 381 and 382 of the other second electrode unit 380 biasing the plug housing 200 to the first surface 103 of the plug cover 100. As such, since the holding structures of the contact pieces 381 and 382 of the second electrode units 380 are different from each other, the biasing forces are different from each other and the plug housing 200 is reliably pressed and held by different forces in the vertical direction. In addition, as described above, when rigidity increases in a floating state, the outer surface of the first surface 103 of the plug cover 100 is pressed against the inner surface of the first surface 303 of the receptacle housing 300 or the outer surface of the second surface 104 of the plug cover 100 is pressed against the inner surface of the second surface 304 of the receptacle housing 300, which depends on various conditions. As a result, it is possible to further increase vibration resistance in a state in which the plug 11 is fitted to the receptacle 12.

In the photoelectric connector according to Embodiment 5, the first electrode unit 280 has three contact portions 281, 282, and 281. The three contact portions 281, 282, and 281 of the first electrode unit 280 are arranged in the order of a contact portion 281 for a power source, a contact portion 282 for grounding, and a contact portion 281 for a power source. In addition, the second electrode unit 380 has three contact pieces 381, 382, and 381. The three contact pieces 381, 382, and 381 of the second electrode unit 380 are arranged in the order of a contact piece 381 for a power source, a contact piece 382 for grounding, and a contact piece 381 for a power source.

Furthermore, in the photoelectric connector according to Embodiments, the second electrode unit 380 (specifically, an electrode unit for a power source in the second electrode unit) of the receptacle housing 300 includes a first portion 385 and a second portion 386 that faces the first portion 385 with a gap therebetween. The electrode unit for a power source in the second electrode unit includes the contact piece 381 that extends in the X direction, a rear end portion 383 that extends from the contact piece 381 in the X direction and sequentially extends in the Y direction and the Z direction, the first portion 385 that extends from the rear end portion 383 to the front end of the receptacle housing along the side surfaces 301 and 302 in the X direction, the second portion 386 that is separated from the first portion 385 and extends along the side surfaces 301 and 302 in the X direction, a second portion extension portion 386' that is folded back at a leading end of the second portion 386 which is close to the front side of the receptacle housing and extends to the rear end of the receptacle housing along the side surfaces 301 and 302 in the X direction, and a leg portion 387 that is provided in an end portion of the second portion extension portion 386'. The second portion 386 and the second portion extension portion 386' are connected by a connection member 386" made of plastic. In contrast, an electrode unit for grounding in the second electrode unit includes the contact piece 382 that extends in the X direction, a rear end portion 384 that extends from the contact piece 382 in the X direction, a leg portion 388, and a portion (not illustrated) that connects the rear end portion 384 and the leg portion 387. A portion of the electrode unit for a power source in the second electrode unit and a portion of the electrode unit for grounding in the second electrode unit are attached to a second electrode unit fixing member 389. Specifically, they are integrally molded. The leg portions 387 and 388 are connected to the second electric wires.

The second electrode unit fixing member 389 is fitted and fixed to the outer surface of the receptacle housing 300. A second electrode unit attachment member 354 is attached to the inside of the receptacle housing 300. In addition, the entire receptacle housing 300 is covered by a receptacle cover 355. Opening portions 311 for the connection members 386" are provided in the first side surface 301 and the second side surface 302 of the receptacle housing 300. In addition, opening portions 356 are provided in the receptacle cover 355 at positions facing the opening portions 311.

Furthermore, when the plug 11 is fitted to the receptacle 12, the second portion 386 comes into contact with the outer surface (outside) of the plug housing 200, specifically, the side surfaces 201 and 202. Then, the second portion 386 is biased to the first portion 385. Then, the first portion 385 and the second portion 386 come into contact with each other and are electrically connected to each other. Specifically, the leading end 207 of the plug housing 200 comes into contact with the connection member 386" and presses the connection member 386" outward. As a result, the first portion 385 and the second portion 386 come into contact with each other and are electrically connected to each other. The first portion 385 and the second portion 386 do not come into contact with each other before the plug 11 is fitted to the receptacle 12. Therefore, it is possible to reliably control the conduction/non-conduction of the contact piece for a power source and to prevent the occurrence of a short circuit. Here, notched portions are provided at the leading ends 207 of the side surfaces 201 and 202 of the plug housing 200 (see FIG. 44C) and only one of two second portions 386 is biased to the first portion 385. FIGS. 44A and 44B illustrate a state before the plug 11 is fitted to the receptacle 12 and FIGS. 45A and 45B illustrate a state immediately before the fitting between the plug 11 and the receptacle 12 ends.

In addition, in the photoelectric connector according to Embodiment 5, the plug cover locking members 312 are provided in the first side surface and the second side surface of the receptacle housing 300. In contrast, plug cover locking member recessed portions 108 for locking the plug cover locking members 312 are provided in the first side surface 101 and the second side surface 102 of the plug cover 100. In addition, when the plug cover 100 is closest to the receptacle housing 300, the plug cover locking members 312 are locked to the plug cover locking member recessed portions 108 (see FIG. 46A). That is, the photoelectric connector according to Embodiment 5 is the photoelectric connector according to the third configuration. In the example illustrated in the drawings, a portion of the plug cover locking member 312 locked to the plug cover locking member recessed portion 108 is provided on the front side of the receptacle housing 300. However, on the contrary, the plug cover locking member 312 may be provided on the rear side of the receptacle housing 300.

As illustrated in FIG. 42 and FIGS. 43A and 43B, the second shutter 370A that is opened to the second surface 304 of the receptacle housing 300 and to the rear side of the receptacle housing 300 is provided in the leading end portion of the receptacle housing 300. Similarly to the second shutter 370, the second shutter 370A is made of a material with high elasticity (elastic metal or alloy material). The second shutter 370A is opened when the plug 11 is fitted to the receptacle 12 and is closed when the plug 11 is pulled out of the receptacle 12.

The second shutter 370A includes an attachment portion 370a, a bottom portion 370b that extends from the attachment portion 370a, a bent portion 370c that extends from the bottom portion 370b, and a closing portion 370d that extends from the bent portion 370c. In the closing portion 370d, a plate material forming the second shutter 370A is folded two times or three times in order to increase strength. The attachment portion 370a is attached to a second shutter fixing portion 313 that is provided on the second surface 304 of the receptacle housing 300.

In addition, as illustrated in FIG. 47A, on the outer surfaces of the first side surface 301 and the second side surface 302 of the receptacle housing 300, end portions 376A of second shutter pressing members 376 are attached to second shutter pressing member attachment portions 314 provided on the first side surface 301 and the second side surface 302 of the receptacle housing 300. The second shutter pressing members 376 extend from the end portions 376A of the second shutter pressing members 376 to the front side of the receptacle and are then bent inward to the first side surface 301 and the second side surface 302 of the receptacle housing 300. Portions 376B of the second shutter pressing members 376 extend to the rear end of the receptacle housing 300 along the first side surface 301 and the second side surface 302 and further end portions 376C are bent to the inside of the receptacle housing 300. In this state, the end portion 376C of the second shutter pressing member 376 is engaged with the closing portion 370d of the second shutter 370A and the second shutter 370A is closed.

When the plug 11 is fitted to the receptacle 12, the leading end of the plug cover 100 comes into contact with the plug cover locking member 312 and the end portion 376C of the second shutter pressing member 376 is moved outward. As a result, the end portion 376C of the second shutter pressing member 376 is disengaged from the closing portion 370d of the second shutter 370A and the plug cover 100 is moved to the rear end of the receptacle housing 300. Then, the closing portion 370d of the second shutter 370A is bent toward the second surface 304 of the receptacle housing 300. In addition, finally, the closing portion 370d of the second shutter 370A is located below the second surface 204 of the plug housing 200. In addition, when the second shutter 370A is in an open state, the second shutter 370 is returned to the state illustrated in FIG. 42 by the elastic force thereof, but is kept below the second surface 204 by the second surface 204 of the plug housing 200.

Figure 48A:
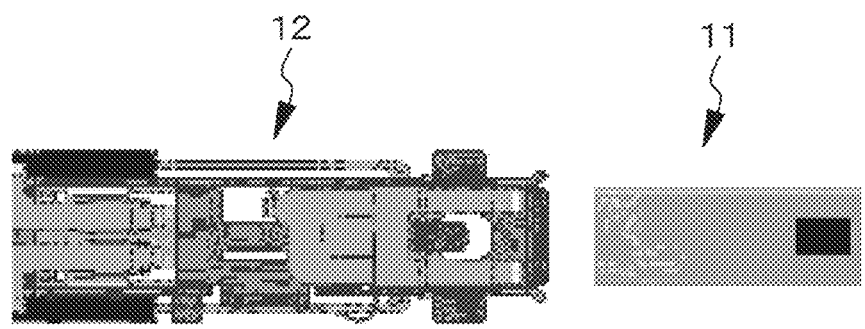
FIGS. 48A and 48B are diagrams illustrating the fitting between the plug and the receptacle and are diagrams illustrating the plug and the receptacle forming the photoelectric connector according to Embodiment 5 as viewed from the side and the top, respectively.
Figure 48B:
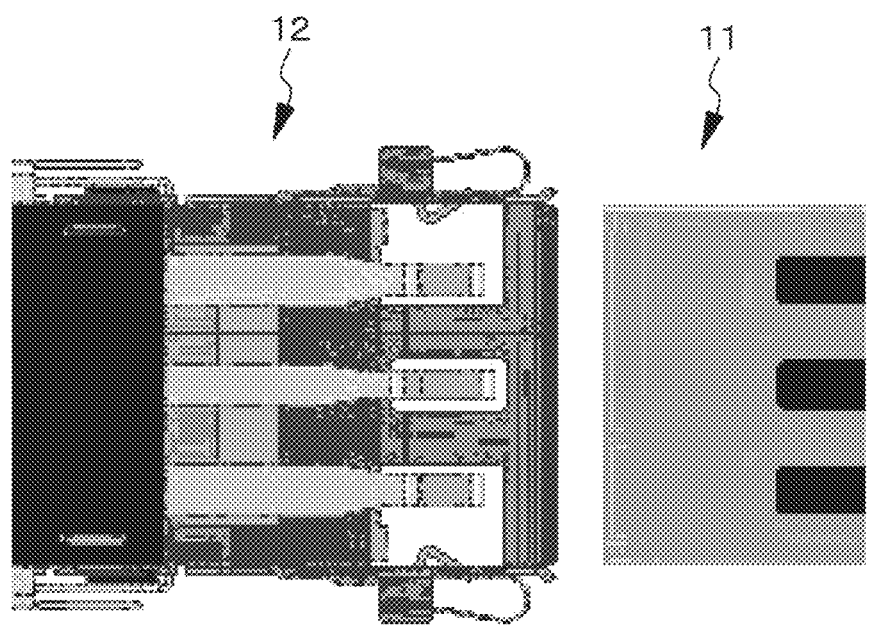

FIGS. 48A and 48B are diagrams illustrating the plug 11 and the receptacle 12 forming the photoelectric connector immediately before the fitting between the plug 11 and the receptacle 12 starts, as viewed from the side and the top, respectively. The first shutter 120 and the second shutter 370A are in a closed state.

Figure 49A:
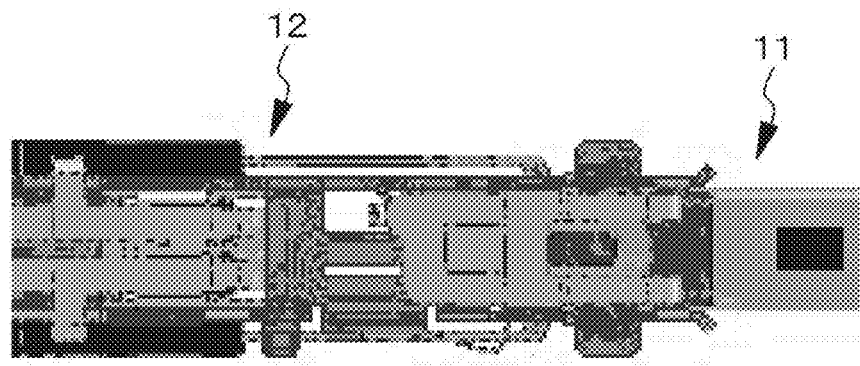
FIGS. 49A and 49B follow
Figure 49B:
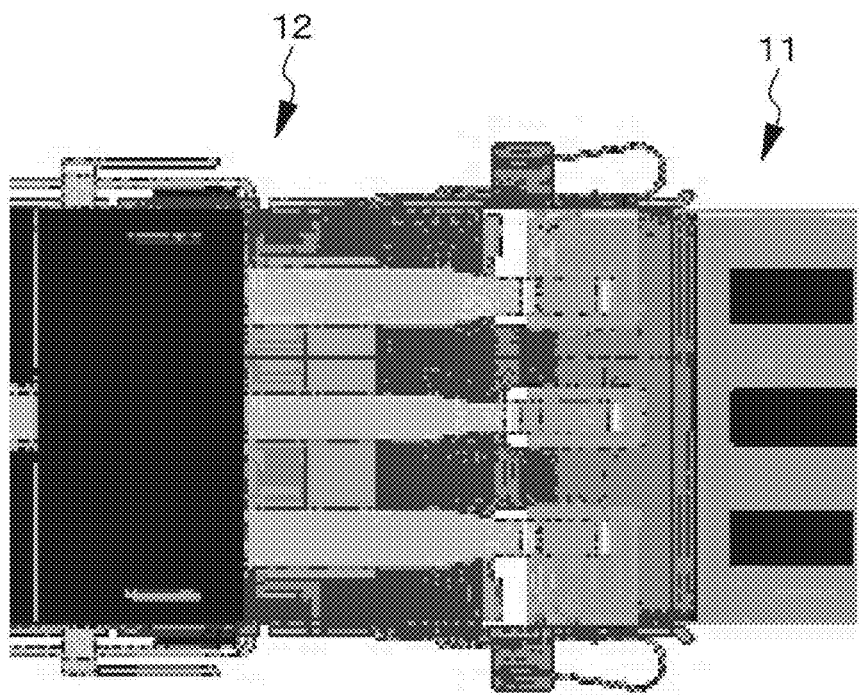

FIGS. 49A and 49B are diagrams illustrating the plug 11 and the receptacle 12 forming the photoelectric connector immediately before the fitting between the plug 11 and the receptacle 12 starts, as viewed from the side and the top, respectively. The second shutter 370A is in an open state.

Figure 50A:
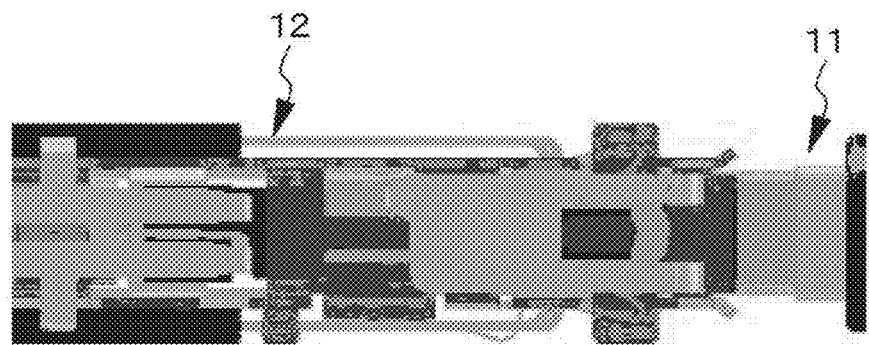
FIGS. 50A and 50B follow
Figure 50B:
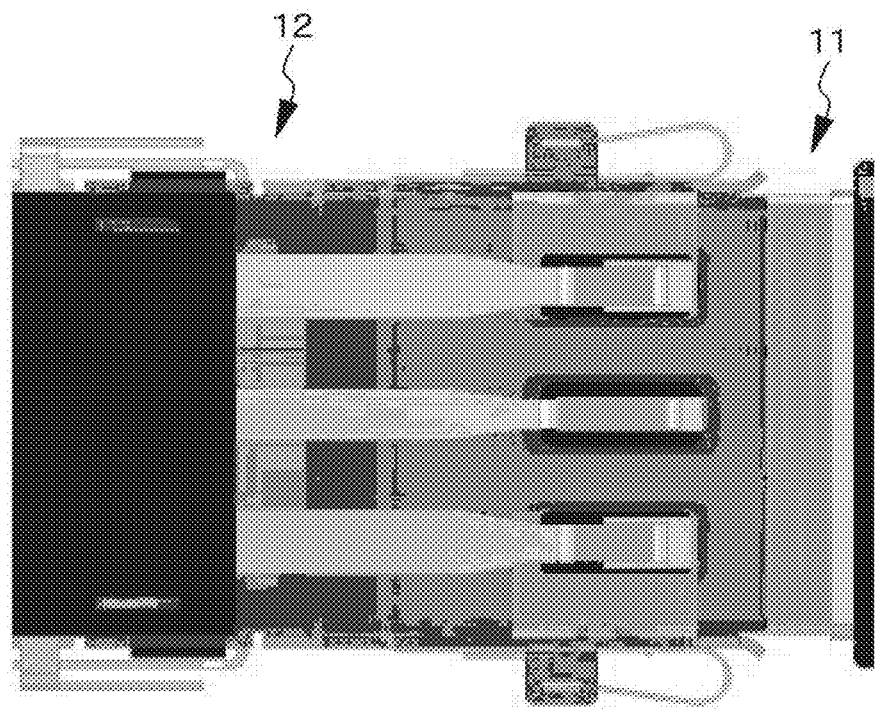

FIGS. 50A and 50B are diagrams illustrating the plug 11 and the receptacle 12 forming the photoelectric connector when the plug 11 continues to be fitted to the receptacle 12, as viewed from the side and the top, respectively. Note that, the plug cover 100 is closest to the receptacle housing 300. The plug cover locking member 312 is locked to the plug cover locking member recessed portion 108 (see FIG. 46A). The contact piece 382 of the second electrode unit 380 is also used as the unlocking claw 306 in Embodiment 1. One of the contact pieces 382 of the second electrode units 380 (the contact piece 382 on the first surface side of the plug housing 200) comes into contact with the contact portion 282 of the first electrode unit 280 (see FIG. 46B). In addition, the other contact piece 382 of the second electrode unit 380 (the contact piece 382 on the second surface side of the plug housing 200) is inserted into the opening portion provided in the plug cover recessed portion and biases the first portion forming the biasing portion of the plug housing biasing means to the first surface of the plug housing. As a result, the plug cover recessed portion is disengaged from the biasing portion of the plug housing biasing means and the plug housing is movable with respect to the plug cover. That is, the plug housing is movable to the receptacle housing and the plug housing starts to move. The first shutter is opened.

Figure 51A:
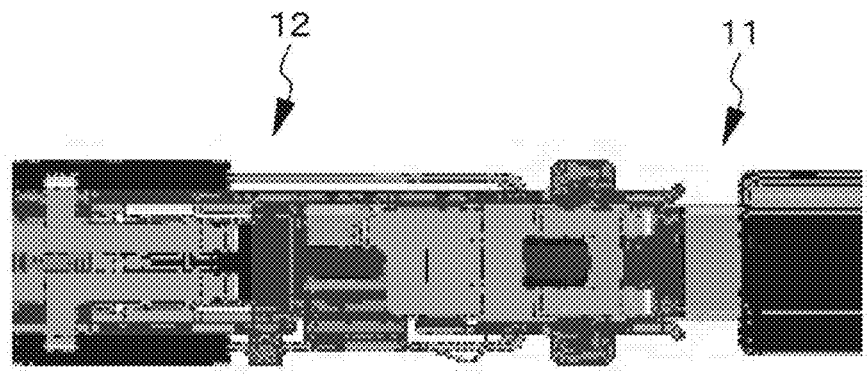
FIGS. 51A and 51B follow
Figure 51B:
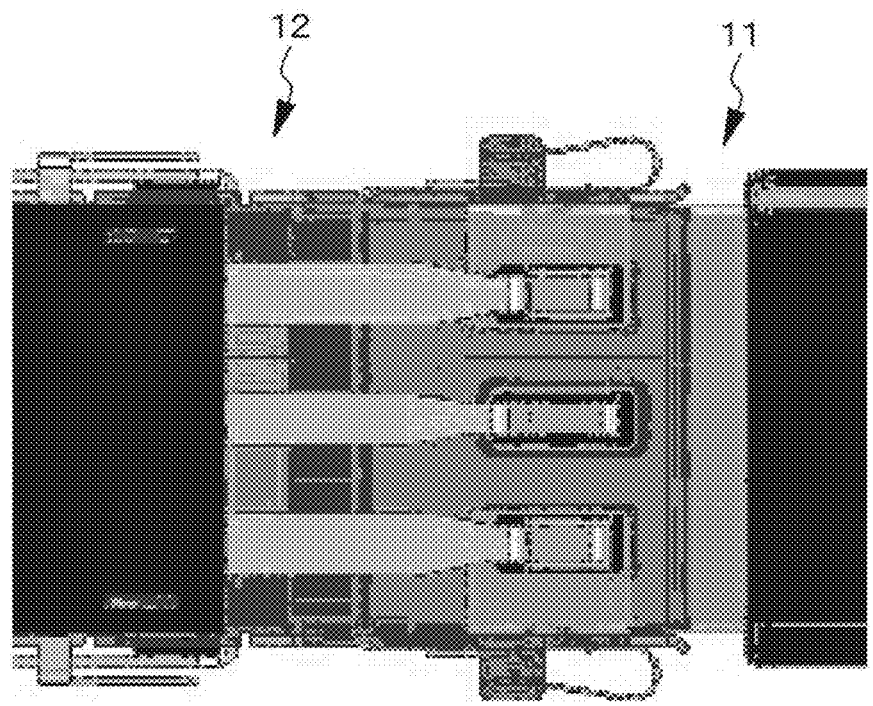

FIGS. 51A and 51B are diagrams illustrating the plug 11 and the receptacle 12 forming the photoelectric connector in a state in which the plug 11 is fitted to the receptacle 12, as viewed from the side and the top, respectively. The first portion 385 and the second portion 386 of the second electrode unit 380 come into contact with each other and are electrically connected to each other (see FIG. 45A).

When the plug 11 is pulled out of the receptacle 12, the above-mentioned operation may be performed in reverse order. That is, the plug 11 is pulled out of the receptacle 12 to release the fitting between the plug 11 and the receptacle 12.

Embodiment 6

Figure 52:
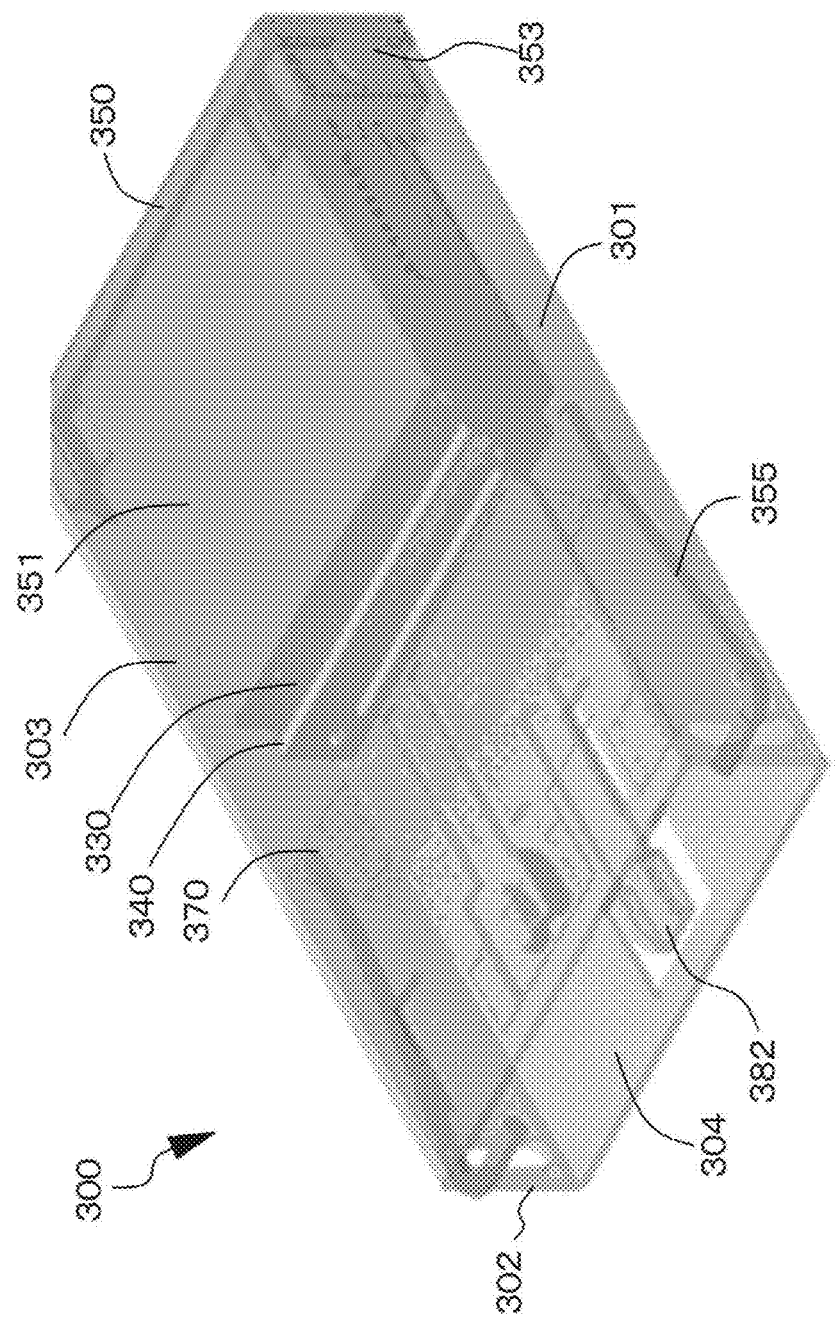
FIG. 52 is a perspective view illustrating a receptacle housing forming a photoelectric connector according to Embodiment 6.
Figure 53:
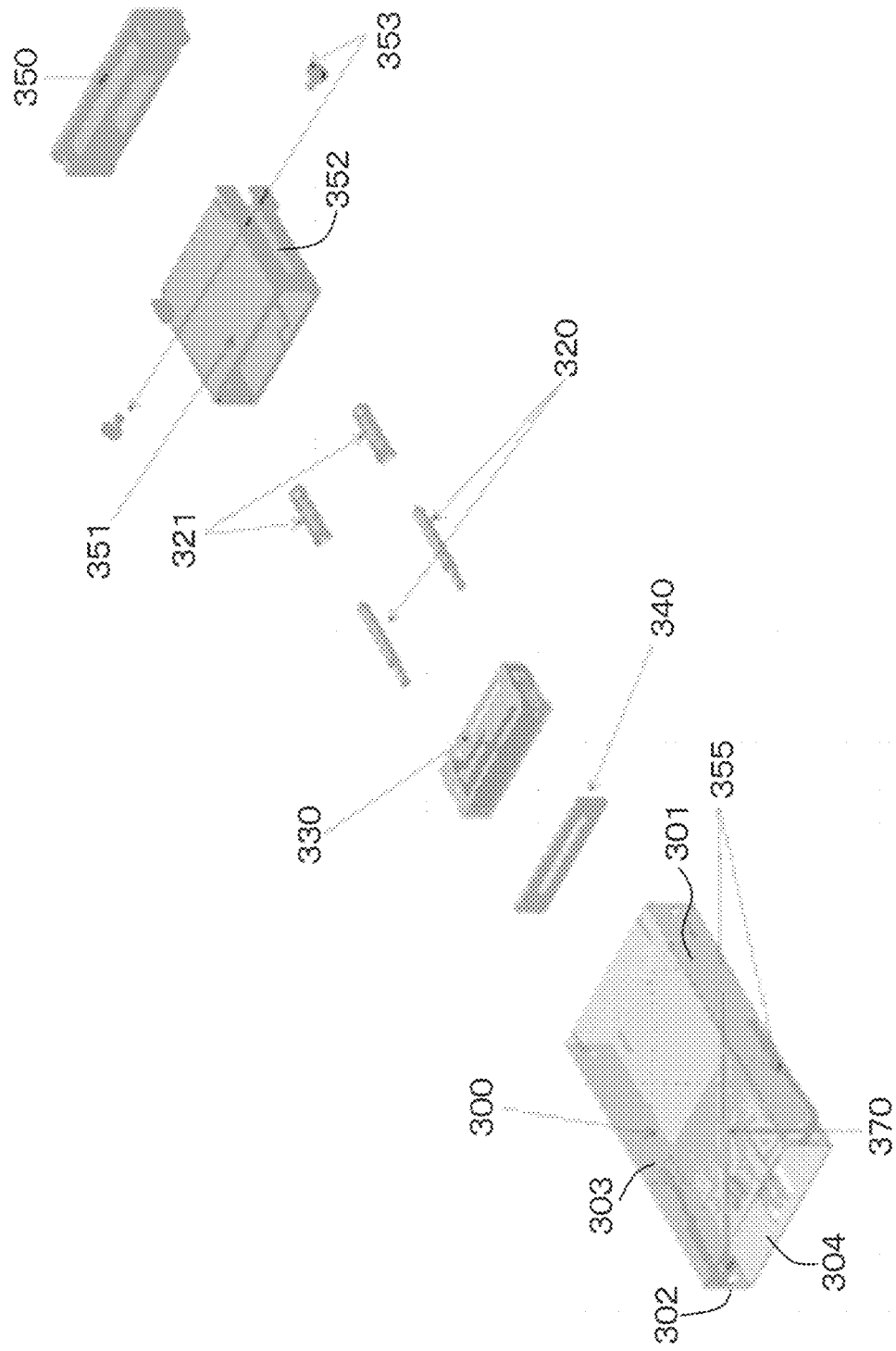
FIG. 53 is an exploded perspective view illustrating the receptacle housing forming the photoelectric connector according to Embodiment 6.
Figure 61A:
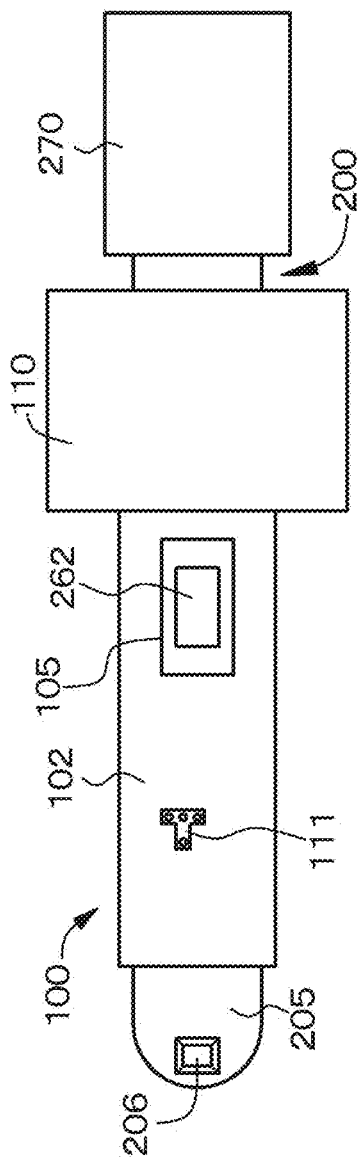
FIGS. 61A and 61B are a side view schematically illustrating the plug (a plug cover and a plug housing) and a side view schematically illustrating the plug housing, in the state illustrated in FIG. 59 in which the plug and the receptacle forming the photoelectric connector according to Embodiment 6 are fitted to each other, respectively.
Figure 61B:
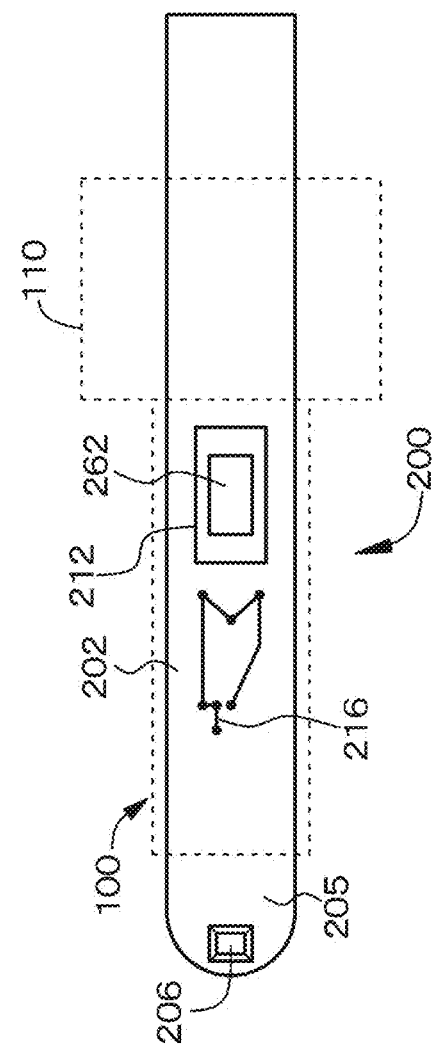

Embodiment 6 is a modification of Embodiment 5. In Embodiment 5, the plug cover locking member 312 is locked to the plug cover locking member recessed portion 108. In contrast, a push-in/push-out fitting method is used in Embodiment 6. FIG. 52 is a perspective view illustrating a receptacle housing forming a photoelectric connector according to Embodiment 6 and FIG. 53 is an exploded perspective view illustrating the receptacle housing. In addition, FIGS. 61A and 61B are side views schematically illustrating a plug (a plug cover and the plug housing) and the plug housing in a state in which the plug and the receptacle forming the photoelectric connector according to Embodiment 6 illustrated in FIG. 59 which will be described below are fitted to each other, respectively. FIG. 62 is a side view schematically illustrating a portion of the plug housing forming the photoelectric connector according to Embodiment 6 illustrated in FIG. 59.

Specifically, in the photoelectric connector according to Embodiment 6, hole portions 111 with a "T" shape are provided in the first side surface 101 and the second side surface 102 of the plug cover 100 and guide groove portions 216 are provided in the outer surface of the leading end portion 205 of the first side surface 201 and the outer surface of the leading end portion 205 of the second side surface 202 of the plug housing 200. In addition, engaging bars 315 that are engaged with the guide groove portions 216 through the "T"-shaped hole portions 111 provided in the first side surface and the second side surface of the plug cover are provided on the outer surface of the first side surface 301 and the outer surface of the second side surface 302 of the receptacle housing 300. The use of this configuration makes it possible to achieve a push-in/push-out fitting method. A plurality of recessed portions 216a, 216b, 216c, 216d, 216e, 216f, and 216g with which a leading end of the engaging bar 315 is engaged are provided in the guide groove portion 216.

The fitting between the plug 11 and the receptacle 12 in the photoelectric connector according to Embodiment 6 in which the structure of the receptacle housing 300 is similar to the structure of the receptacle housing 300 described in Embodiment 1 will be described.

Figure 54:
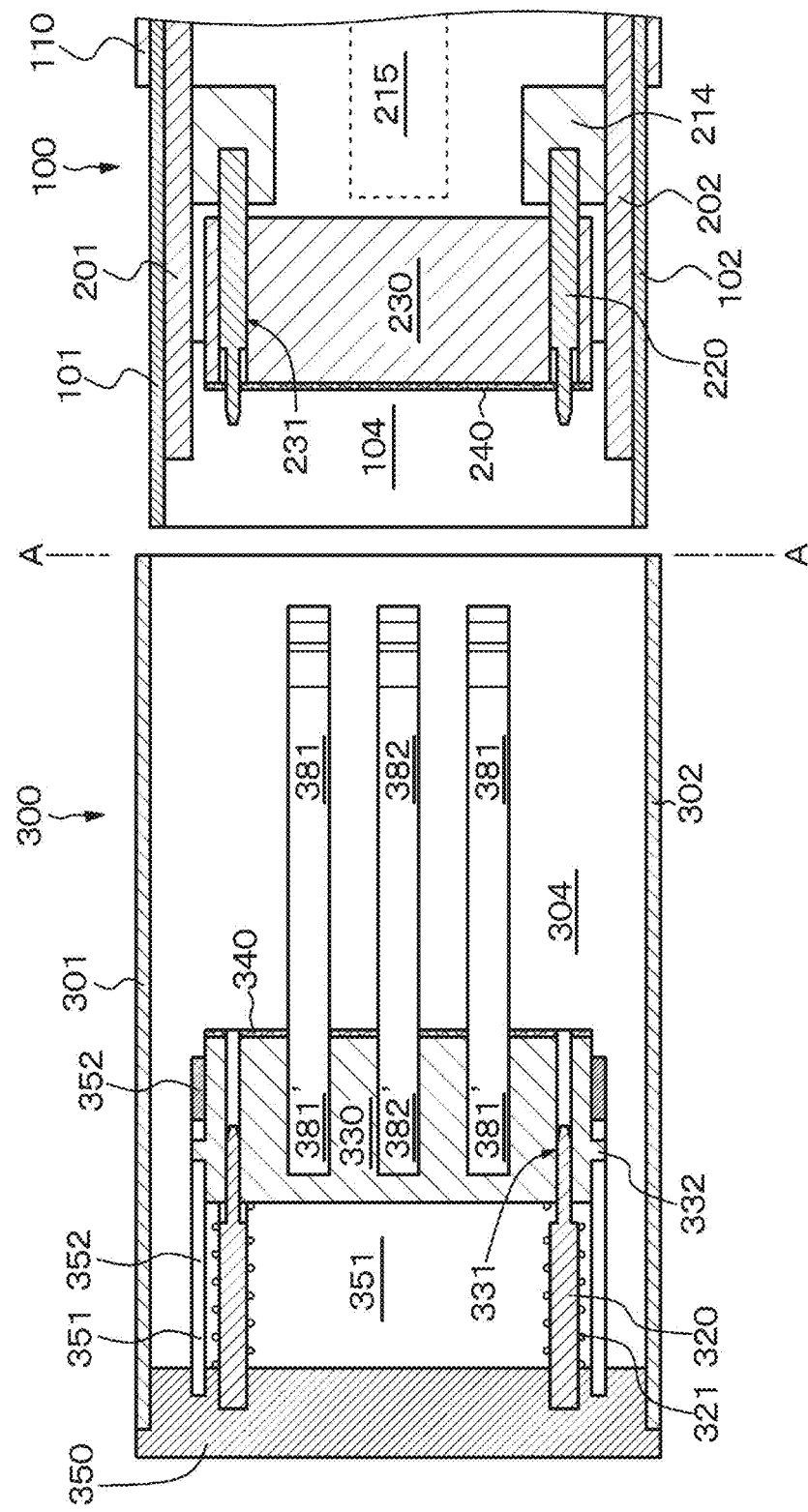
FIG. 54 is a diagram illustrating the fitting between a plug and a receptacle and is a cross-sectional view schematically illustrating the plug and the receptacle forming the photoelectric connector according to Embodiment 6 taken along a virtual horizontal plane.

FIG. 54 is a cross-sectional view schematically illustrating the plug 11 and the receptacle 12 forming the photoelectric connector immediately before the fitting between the plug 11 and the receptacle 12 starts, which is taken along a virtual horizontal plane. FIG. 56A is a cross-sectional view schematically illustrating the photoelectric connector taken along a virtual vertical plane. The first shutter 120 and the second shutter 370 which are not illustrated are in a closed state.

FIG. 55 is a cross-sectional view schematically illustrating the plug 11 and the receptacle 12 forming the photoelectric connector immediately after the fitting between the plug 11 and the receptacle 12 starts, which is taken along a virtual horizontal plane. FIG. 56B is a cross-sectional view schematically illustrating the photoelectric connector taken along a virtual vertical plane. The second shutter 370 which is not illustrated is in an open state.

Figure 57:
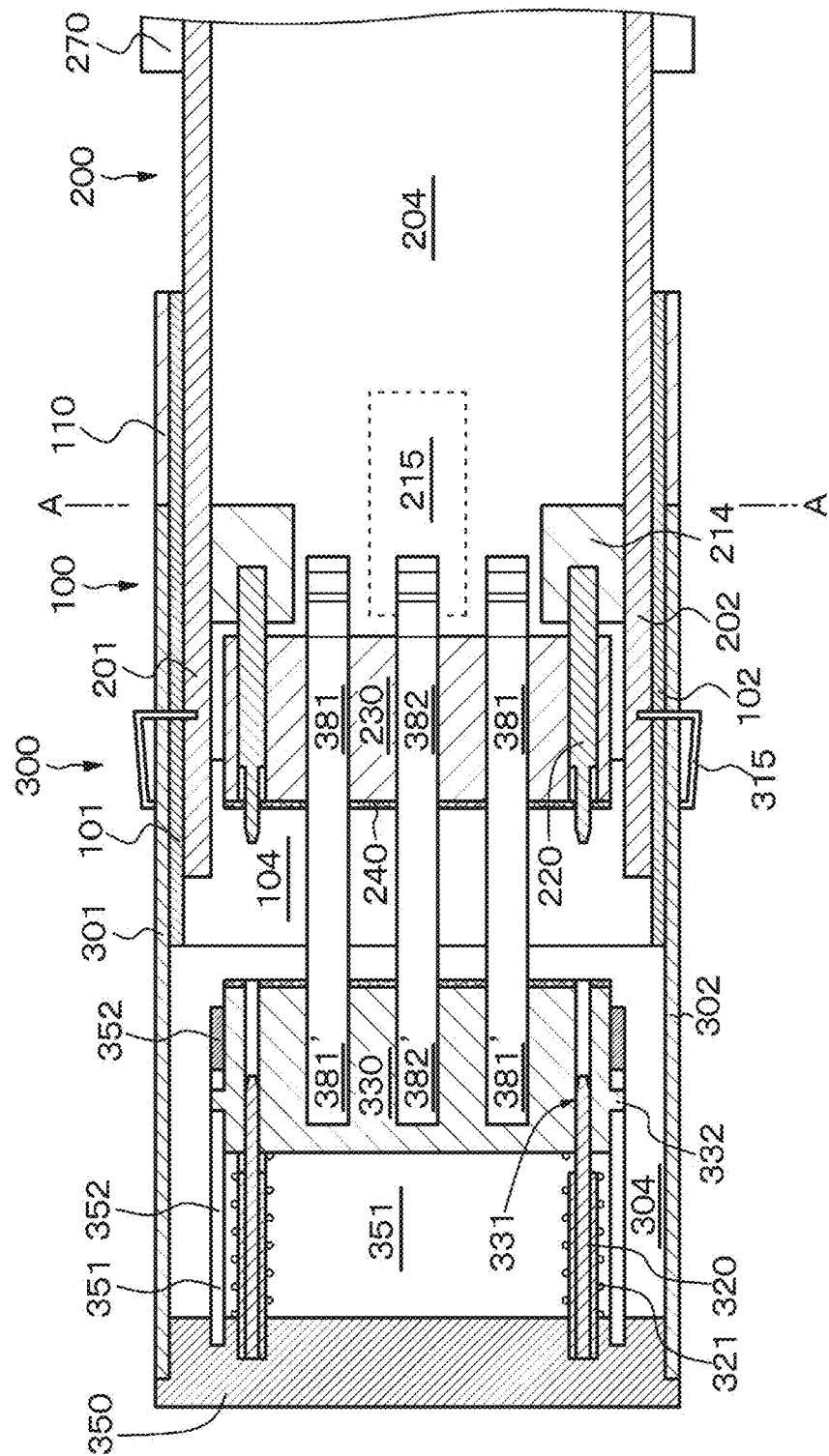
FIG. 57 follows

FIG. 57 is a cross-sectional view schematically illustrating the plug 11 and the receptacle 12 forming the photoelectric connector when the plug 11 continues to be fitted to the receptacle 12, which is taken along a virtual horizontal plane. FIG. 60A is a cross-sectional view schematically illustrating the photoelectric connector taken along a virtual vertical plane. The plug cover 100 is closest to the receptacle housing 300. The front end 300F of the receptacle housing 300 and the resin member 110 come into contact with each other. Alternatively, a means (not illustrated) for positioning a deepest portion of the plug cover 100 is provided in the receptacle housing 300 and the plug cover 100 comes into contact with the deepest portion positioning means. In addition, in the state illustrated in FIG. 57, the leading end portion of the contact piece 382 (which is also used as an unlocking claw) of the second electrode unit 380 is inserted into the plug cover opening portion 105 and reaches the opening portion 107 provided in the plug cover recessed portion 106. Then, the contact piece 382 of the second electrode unit 380 which is also used as the unlocking claw is inserted into the opening portion 107 provided in the plug cover recessed portion 106 and biases the first portion 251 forming the biasing portion of the plug housing biasing means 250 to the first surface 203 of the plug housing 200. As a result, the biasing portion 251 of the plug housing biasing means 250 is disengaged from the plug cover recessed portion 106 and the plug housing 200 is movable with respect to the plug cover 100. That is, the plug housing 200 is movable to the receptacle housing 300 and the movement of the plug housing 200 starts. When the movement of the plug housing 200 starts, the first shutter 120 (not illustrated) is opened. In addition, the leading ends of the engaging bars 315 are engaged with recessed portions 216a of the guide groove portions 216 provided in the outer surface of the leading end portion 205 of the first side surface 201 and the outer surface of the leading end portion 205 of the second side surface 202 of the plug housing 200 through the "T"-shaped hole portions 111 provided in the first side surface and the second side surface of the plug cover. Note that, the description of the plug housing biasing means which has been made above can be applied to the description of the operation of, for example, the plug housing biasing means in FIGS. 50A and 50B in Embodiment 5. Note that, rear end portions 381' and 382' of the contact pieces 381 and 382 of the second electrode unit 380 are connected to the second electric wire. In addition, the contact pieces 381 and 382 of the second electrode unit 380 are fixed to the second electrode unit fixing member 389 and the second electrode unit fixing member 389 is attached to the first surface 303 of the receptacle housing 300.

Figure 58:
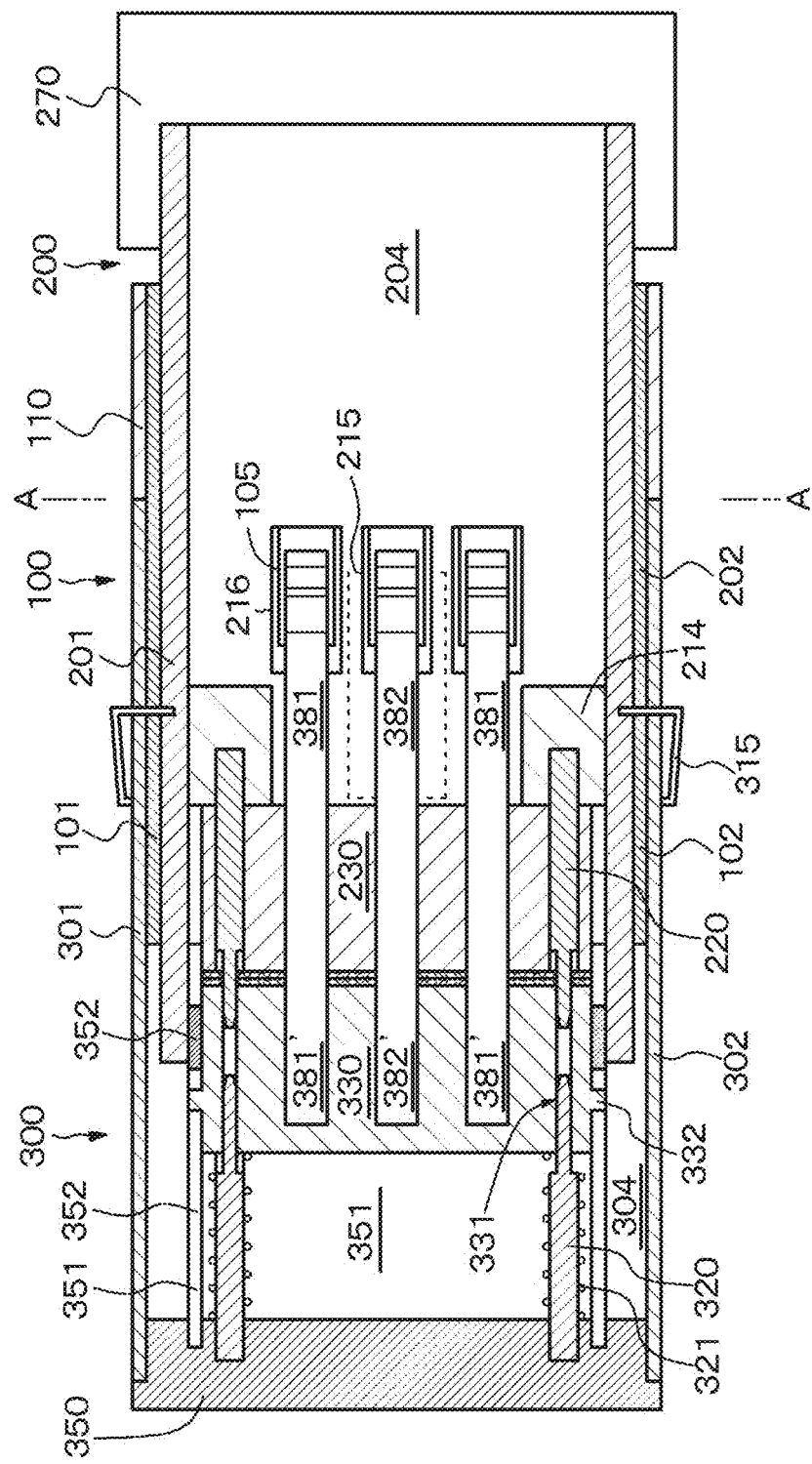
FIG. 58 follows

FIG. 58 is a cross-sectional view schematically illustrating the plug 11 and the receptacle 12 forming the photoelectric connector immediately before the plug 11 is fitted to the receptacle 12, which is taken along a virtual horizontal plane. The first lens protective member 240 comes into contact with the second lens protective member 340. The second electrode unit 380 and the first electrode unit 280 come into contact with each other and are electrically connected to each other.

Figure 59:
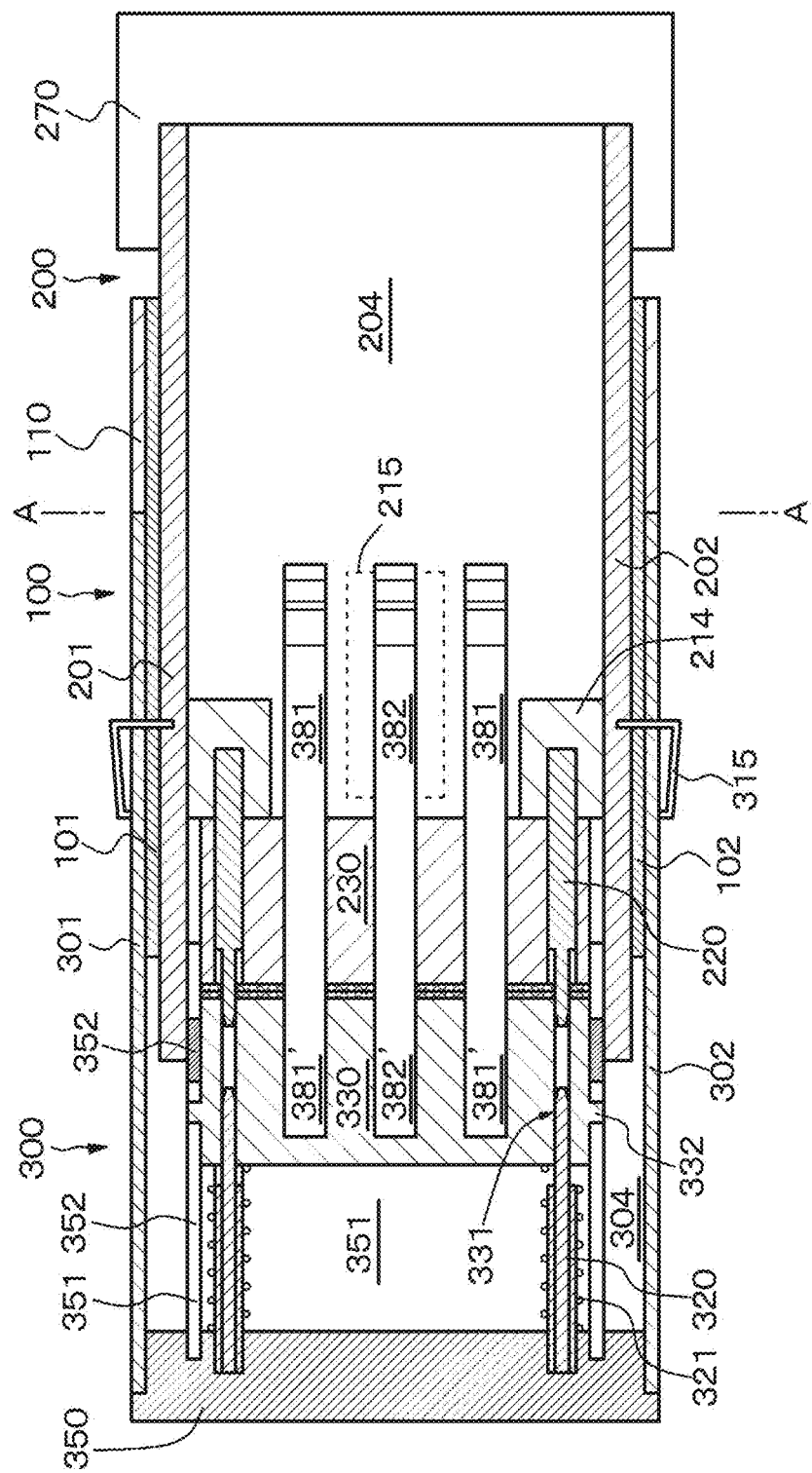
FIG. 59 follows

FIG. 59 is a cross-sectional view schematically illustrating the plug 11 and the receptacle 12 forming the photoelectric connector in a state in which the plug 11 is fitted to the receptacle 12, which is taken along a virtual horizontal plane. FIG. 60B is a cross-sectional view schematically illustrating the photoelectric connector taken along a virtual horizontal plane.

Note that, in the photoelectric connector according to Embodiment 6, the plug 11 is further pressed into the receptacle through a final fitting position between the plug 11 and the receptacle 12. Then, the leading end of the engaging bar 315 is moved in the guide groove portion 216 and is engaged with the recessed portion 216b. Then, the user takes the hand off the plug 11. Then, the plug 11 is moved in a direction in which it becomes further away from the receptacle 12 and the plug 11 and the receptacle 12 are located at the final fitting position. The leading end of the engaging bar 315 is moved in the guide groove portion 216 and is engaged with the recessed portion 216c.

When the plug 11 is pulled out of the receptacle 12, the above-mentioned operation is performed in reverse order. That is, the plug 11 is further pressed into the receptacle. Then, the leading end of the engaging bar 315 is moved in the guide groove portion 216 and is engaged with the recessed portion 216d. Then, the plug 11 is pulled out of the receptacle 12 to release the fitting between the plug 11 and the receptacle 12. The leading end of the engaging bar 315 is moved in the guide groove portion 216, is sequentially engaged with the recessed portion 216e, the recessed portion 216f, and the recessed portion 216g, and is taken out of the "T"-shaped hole portion 111. Note that, in the guide groove portion 216, a step or an inclination is provided in a side wall of the recessed portion (inflection point) and the leading end of the engaging bar 315 can be moved from the first recessed portion 216a to only the last recessed portion 216g.

The use of the push-in/push-out fitting method makes is possible to further improve the reliability of the fitting between the plug 11 and the receptacle 12.

Embodiment 7

Embodiment 7 is a modification of Embodiment 5 and Embodiment 6. FIG. 63A is a cross-sectional view schematically illustrating a photoelectric connector according to Embodiment 7 when the photoelectric connector is cut along a virtual vertical plane in the state illustrated in FIG. 57 in which the plug and the receptacle are being fitted to each other. FIG. 63B is a cross-sectional view illustrating the photoelectric connector according to Embodiment 7 when the photoelectric connector is cut along a virtual vertical plane in the state illustrated in FIG. 59 in which the plug is fitted to the receptacle.

In Embodiment 5, the second electrode unit 380 includes the first portion 385 and the second portion 386 and the second portions 386 come into contact with the first side surface 201 and the second side surface 202 of the plug housing 200 when the plug 11 is fitted to the receptacle 12. In contrast, in Embodiment 7, a second electrode unit 380, specifically, a contact piece (a contact piece for a power source) 381 forming the second electrode unit 380 includes a first portion 395, and a second portion 396 that faces the first portion 395, with a gap therebetween, and includes a protruding portion 396' protruding toward the inside of the receptacle housing 300. In addition, when the plug 11 is fitted to the receptacle 12, the protruding portion 396' of the second portion 396 comes into contact with the first surface 203 of the plug housing 200. Then, the second portion 396 is biased to the first portion 395. The first portion 395 and the second portion 396 come into contact with each other and are electrically connected to each other. The use of this configuration makes it possible to reliably control the conduction/non-conduction of the contact piece 381 for a power source and to prevent the occurrence of a short circuit. Preferably, an insulating layer is formed on at least a portion of the first surface 203 of the plug housing 200 and/or at least a portion of the protruding portion 396' such that a short circuit does not occur in two protruding portions 396' through the first surface 203 of the plug housing 200.

Embodiment 8

Embodiment 8 is a modification of Embodiments 1 to 7. In a photoelectric connector according to Embodiment 8, a connector is connected to the rear end of the plug housing 200. That is, the photoelectric connector according to Embodiment 8 is the photoelectric connector according to the seventh configuration. In addition, a connector is connected to the rear end of the receptacle housing 300. As such, in the case of the configuration in which the connector is connected to the rear end of the plug housing 200, the plug or the receptacle is replaced with plugs or receptacles with different connectors to select a plurality of different types of functions.

Embodiment 9

Embodiment 9 is a modification of Embodiments 1 to 8. In a photoelectric connector according to Embodiment 9, the first signal transmitting/receiving member 230 includes a light emitting element and a light receiving element (specifically, a plurality of light emitting elements and a plurality of light receiving elements) and the second signal transmitting/receiving member 330 includes a light emitting element and a light receiving element (specifically, a plurality of light emitting elements and a plurality of light receiving elements). That is, the photoelectric connector according to Embodiment 9 is the photoelectric connector according to the tenth configuration. In addition, the photoelectric connector according to Embodiment 9 is the photoelectric connector according to the eleventh configuration. In addition, in Embodiment 9, in the first signal transmitting/receiving member 230 and the second signal transmitting/receiving member 330, an electric signal is converted into an optical signal and an optical signal is converted into an electric signal.

Figure 64A:
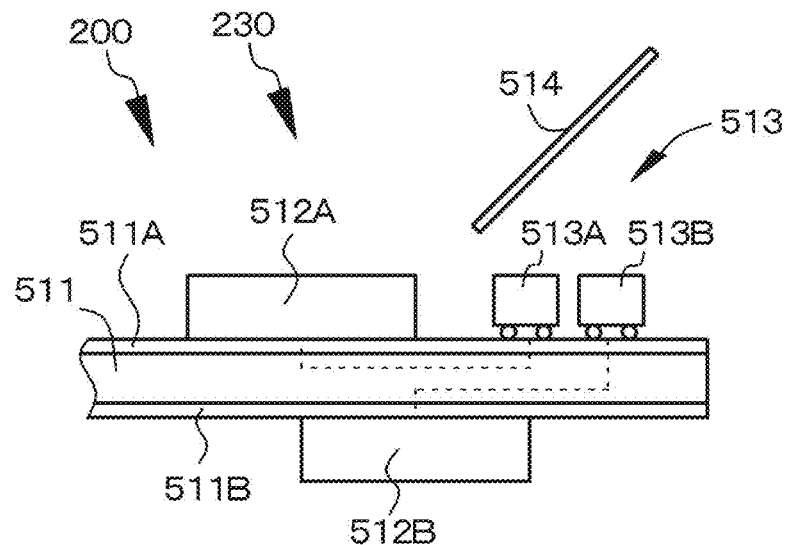
FIGS. 64A and 64B are conceptual diagrams illustrating a first signal transmitting/receiving member and a second signal transmitting/receiving member in a photoelectric connector according to Embodiment 9, respectively.
Figure 64B:
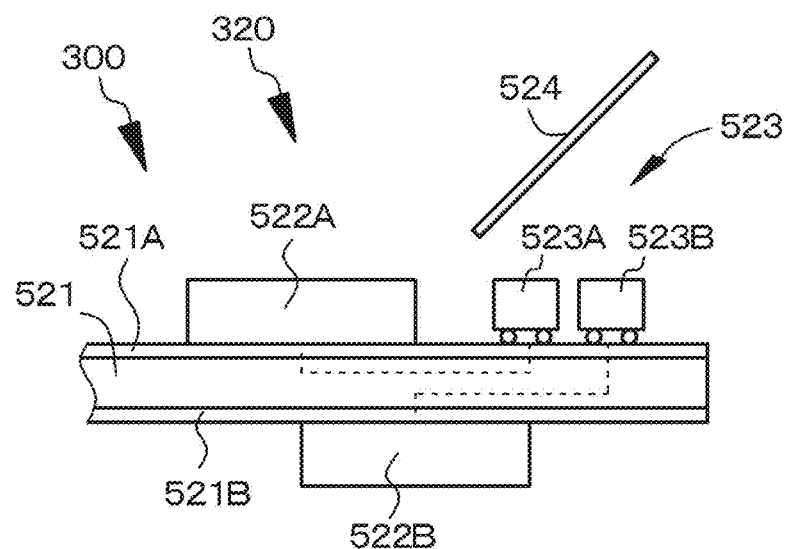

In the photoelectric connector according to Embodiment 9, as illustrated in conceptual diagrams of FIG. 64A and FIG. 64B, the plug housing 200 and the receptacle housing 300 are provided with semiconductor chips 512A, 512B, 522A, and 522B for driving light emitting elements and light receiving elements. Specifically, the light emitting element is a surface-emitting semiconductor laser element (vertical cavity surface emitting laser (VCSEL)) and the light receiving element is a photodiode.

In addition, as illustrated in the conceptual diagram of FIG. 64A, in the plug housing 200, light emitting elements/light receiving elements 513 include a first light emitting element/light receiving element group 513A and a second light emitting element/light receiving element group 513B. The first light emitting element/light receiving element group 513A, the second light emitting element/light receiving element group 513B, the first semiconductor chip 512A for driving the first light emitting element/light receiving element group 513A, and the second semiconductor chip 512B for driving the second light emitting element/light receiving element group 513B are mounted on a printed board 511. The printed board 511 is provided on the second surface 204 of the plug housing 200.

In addition, as illustrated in the conceptual diagram of FIG. 64B, in the receptacle housing 300, light emitting elements/light receiving elements 523 include a first light emitting element/light receiving element group 523A and a second light emitting element/light receiving element group 523B. The first light emitting element/light receiving element group 523A, the second light emitting element/light receiving element group 523B, the first semiconductor chip 522A for driving the first light emitting element/light receiving element group 523A, and the second semiconductor chip 522B for driving the second light emitting element/light receiving element group 523B are mounted on a printed board 521. The printed board 521 is provided on the second surface 304 of the receptacle housing 300.

Each of the light emitting element/light receiving element groups 513A and 513B includes, for example, 12 light emitting elements and 12 light receiving elements which are arranged in a line. That is, the light emitting elements and the light receiving elements are arranged so as to be divided in a direction perpendicular to the plane of paper of the drawings. Specifically, 12 channels are arranged in a line on the front side and 12 channels are arranged in a lone on the rear side in the direction perpendicular to the plane of paper of the drawings. Note that, the light emitting elements and the light receiving elements may be arranged in the mixed state (including a state in which they are randomly mixed) or the light emitting elements and the light receiving elements may be integrated.

Here, the printed board 511 is a double-sided rigid printed board (may be a multi-layer rigid printed board). The first light emitting element/light receiving element group 513A, the second light emitting element/light receiving element group 513B, and the first semiconductor chip 512A are mounted on one surface (wiring surface) 511A of the double-sided rigid printed board 511. The second semiconductor chip 512B is mounted on the other surface (wiring surface) 512B of the double-sided rigid printed board 511. The above-mentioned arrangement of the first light emitting element/light receiving element group 513A, the second light emitting element/light receiving element group 513B, the first semiconductor chip 512A, and the second semiconductor chip 512B makes it possible to equalize the length of a wire (represented by a dotted line) between the first semiconductor chip 512A and the first light emitting element/light receiving element group 513A which is most dedicated in a high-frequency transmission plane to the length of a wire (represented by a dotted line) between the second light emitting element/light receiving element group 513B and the second semiconductor chip 512B and to reduce the length of the wire. For example, wiring surfaces 511A and 511B and a through hole for connecting the second semiconductor chip 512B and the wiring surface 511B can be formed by a known method.

In addition, the printed board 521 is also a double-sided rigid printed board (may be a multi-layer rigid printed board). The first light emitting element/light receiving element group 523A, the second light emitting element/light receiving element group 523B, and the first semiconductor chip 522A are mounted on one surface (wiring surface) 521A of the double-sided rigid printed board 521. The second semiconductor chip 522B is mounted on the other surface (wiring surface) 522B of the double-sided rigid printed board 521. The above-mentioned arrangement of the first light emitting element/light receiving element group 523A, the second light emitting element/light receiving element group 523B, the first semiconductor chip 522A, and the second semiconductor chip 522B makes it possible to equalize the length of a wire (represented by a dotted line) between the first semiconductor chip 522A and the first light emitting element/light receiving element group 523A which is most dedicated in a high-frequency transmission plane to the length of a wire (represented by a dotted line) between the second light emitting element/light receiving element group 523B and the second semiconductor chip 522B and to reduce the length of the wire. For example, wiring surfaces 521A and 521B and a through hole for connecting the second semiconductor chip 522B and the wiring surface 521B can be formed by a known method.

The plug housing 200 includes a first mirror unit 514. The optical path of light emitted from a component (in Embodiment 9, specifically, the light emitting element) forming the first signal transmitting/receiving member 230 is changed by the first mirror unit 514 and the light travels to a component (in Embodiment 9, specifically, the light receiving element) forming the second signal transmitting/receiving member 330. In addition, the optical path of light emitted from a component (in Embodiment 9, specifically, the light emitting element) forming the second signal transmitting/receiving member 330 is changed by the first mirror unit 514 and the light travels to a component (in Embodiment 9, specifically, the light receiving element) forming the first signal transmitting/receiving member 230. The first mirror unit 514 is provided above the light emitting elements/light receiving elements 513. The first signal transmitting/receiving member 230 includes the first mirror unit 514, the light receiving element 513, the semiconductor chips 512A and 512B, and the printed board 511.

The receptacle housing 300 includes a second mirror unit 524. The optical path of light emitted from a component (in Embodiment 9, specifically, the light emitting element) forming the first signal transmitting/receiving member 230 is changed by the second mirror unit 524 and the light travels to a component (in Embodiment 9, specifically, the light receiving element) forming the second signal transmitting/receiving member 330. In addition, the optical path of light emitted from a component (in Embodiment 9, specifically, the light emitting element) forming the second signal transmitting/receiving member 330 is changed by the second mirror unit 524 and the light travels to a component (in Embodiment 9, specifically, the light receiving element) forming the first signal transmitting/receiving member 230. The second mirror unit 524 is provided above the light emitting elements/light receiving elements 523. The second signal transmitting/receiving member 330 includes the second mirror unit 524, the light emitting elements/light receiving elements 523, the semiconductor chips 522A and 522B, and the printed board 521.

Furthermore, the second signal transmitting/receiving member 330 is biased to the front end of the receptacle 12 by the second signal transmitting/receiving member biasing means described in Embodiment 1, Embodiment 3, and Embodiment 4. In addition, the first signal transmitting/receiving member 230 is biased to the rear end of the plug 11, as in Embodiment 1, Embodiment 3, and Embodiment 4.

Figure 66:
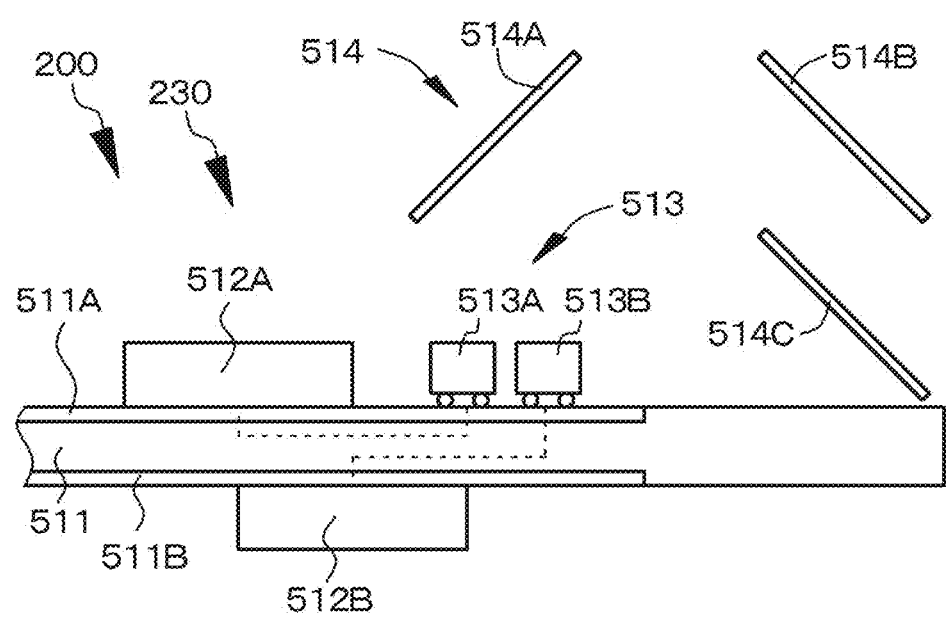
FIG. 66 is a conceptual diagram illustrating a modification example of the first signal transmitting/receiving member in the photoelectric connector according to Embodiment 9.

The first mirror unit 514 may include one mirror or a plurality of mirrors 514A, 514B, and 514C (see FIG. 66). Similarly, the second mirror unit 524 may include one mirror or a plurality of mirrors, similarly to the structure illustrated in FIG. 66.

In the plug housing 200, the printed board 511 is connected to the first signal line through a flexible wiring plate or wires. In addition, in the receptacle housing 300, the printed board 521 is connected to a circuit that is formed on a substrate (mother board) (not illustrated) through a flexible wiring plate or wires. A rigid flexible composite board into which the printed board and the flexible wiring plate are integrated may be used. For example, a flexible radiation sheet may be attached to the surfaces of the semiconductor chips 512A, 512B, 522A, and 522B opposite to bump surfaces, which is not illustrated in the drawings. In this case, it is possible to effectively dissipate heat from the semiconductor chips.

Since the light emitting elements and the light receiving elements are provided, it is possible to reduce the number of positions where an optical loss of about 1 dB to 2 dB occurs in the lens coupling portion described in Embodiment 1. In addition, therefore, the overall loss of the photoelectric connector is reduced and it is possible to reduce the power consumption of the entire device or the entire system. In addition, since the number of components is reduced, it is possible to obtain the considerable advantage that the overall costs of the system can be reduced.

In some cases, an opening may be provided in the second surface 304 of the receptacle housing 300, the light emitting elements/light receiving elements 523, the semiconductor chips 522A and 522B, and the printed board 521 may be provided below the second surface 304 of the receptacle housing 300, and the second mirror unit 514 may be provided in the receptacle housing 300.

Alternatively, as illustrated in the conceptual diagram of FIG. 65A, in the plug housing 200, the printed board is a flexible printed board 531.

A first semiconductor chip 532A that drives a first light emitting element/light receiving element group 533A is mounted on a first region 531A of one surface of the flexible printed board 531.

A second semiconductor chip 532B that drives a second light emitting element/light receiving element group 533B is mounted on a second region 531B of one surface of the flexible printed board 531.

The first light emitting element/light receiving element group 533A and the second light emitting element/light receiving element group 533B are mounted on a third region 531C of one surface of the flexible printed board 531 which is located between the first region 531A and the second region 531B.

In addition, as illustrated in the conceptual diagram of FIG. 65B, in the receptacle housing 300, the printed board is a flexible printed board 541.

A first semiconductor chip 542A that drives a first light emitting element/light receiving element group 543A is mounted on a first region 541A of one surface of the flexible printed board 541.

A second semiconductor chip 542B that drives a second light emitting element/light receiving element group 543B is mounted on a second region 541B of one surface of the flexible printed board 541.

The first light emitting element/light receiving element group 543A and the second light emitting element/light receiving element group 543B are mounted on a third region 541C of one surface of the flexible printed board 541 which is located between the first region 541A and the second region 541B.

The flexible printed boards 531 and 541 are provided so as to wrap bases 534 and 544, respectively.

Furthermore, the base 534 is provided in parallel to the second surface 204 above the second surface 204 of the plug housing 200. The third region 531C of one surface of the flexible printed board 531 is located on an end surface of the base 534. The light emitting element provided in the plug housing 200 emits laser light to the receptacle 12. The light receiving element provided in the plug housing 200 receives laser light from the receptacle 12. The first signal transmitting/receiving member 230 includes the light emitting element/light receiving element groups 533A and 533B, the semiconductor chips 532A and 532B, the flexible printed board 531, and the base 534. In addition, for example, similarly to the above description, the light emitting element/light receiving element groups 533A and 533B include 12 light emitting elements and 12 light receiving elements which are arranged in a line, respectively. The first signal transmitting/receiving member 230 is biased to the rear end of the plug 11, as in Embodiment 1, Embodiment 3, and Embodiment 4.

In addition, the base 544 is provided in parallel to the second surface 304 above the second surface 304 of the receptacle housing 300. The third region 541C of one surface of the flexible printed board 541 is located on an end surface of the base 544. The light emitting element provided in the receptacle housing 300 emits laser light to the plug 11. The light receiving element provided in the receptacle housing 300 receives laser light from the plug 11. The second signal transmitting/receiving member 330 includes the light emitting element/light receiving element groups 543A and 543B, the semiconductor chips 542A and 542B, and the flexible printed board 541. For example, similarly to the above description, the light emitting element/light receiving element groups 543A and 543B include 12 light emitting elements and 12 light receiving elements which are arranged in a line, respectively. In addition, the second signal transmitting/receiving member 330 is biased to the front end of the receptacle 12 by the second signal transmitting/receiving member biasing means described in Embodiment 1, Embodiment 3, and Embodiment 4.

A positioning hole is provided in the end surface of the base 534. Furthermore, after the light emitting element/light receiving element groups 533A and 533B and the semiconductor chips 532A and 532B are mounted on the flexible printed board 531, the flexible printed board 531 is bonded to the base 534 on the basis of the positioning hole provided in the end surface of the base 534. The similar assembly process can be performed for the receptacle housing. In the receptacle housing, the flexible printed board 531 may extend to the outside and may be connected to, for example, a mother board by an electric connector or ACF bonding. For example, a flexible radiation sheet may be attached to the surfaces of the semiconductor chips 532A, 532B, 542A, and 542B opposite to bump surfaces, which is not illustrated in the drawings. In this case, it is possible to effectively dissipate heat from the semiconductor chips.

In this configuration, the flexible printed board is used and the light emitting elements and the light receiving elements are mounted on the flexible printed board. Therefore, the light emitting elements and the light receiving elements are arranged so as to be vertically completely symmetric with respect to the horizontal plane of the plug housing 200 and the receptacle housing 300. This arrangement is very effective in a circuit that performs high-frequency transmission at a rate of several tens of gigabits per second to several hundreds of gigabits per second, as in the photoelectric connector according to the present disclosure. In addition, since the photoelectric connector according to the present disclosure performs optical transmission, it is necessary to limit the length of a wire between the light emitting element or the light receiving element and a driving circuit to about 1 mm or less. When the length of the wire is greater than the above-mentioned value, there is a concern that the quality of a transmission waveform will be significantly degraded. The flexible printed board can be deformed in a "U" shape and the layout can be set so as to be vertically completely symmetric. In addition, the photoelectric connector according to Embodiment 10 of which the total thickness can be reduced to 3 mm or less has a very simple structure and is epochal. Furthermore, since the light emitting element or the light receiving element can be directly provided, it is possible to reduce the number of components and to prevent loss. Therefore, it is possible to reduce costs and power consumption.

Embodiment 10

Embodiment 10 is a modification of Embodiments 1 to 9 and relates to the photoelectric connector according to the 10'-th configuration and the photoelectric connector according to the eleventh configuration. In a photoelectric connector according to Embodiment 10, one of the first signal transmitting/receiving member 230 and the second signal transmitting/receiving member 330 includes a light emitting element (specifically, a plurality of light emitting elements) and the other signal transmitting/receiving member includes a light receiving element (specifically, a plurality of light receiving elements). In addition, in Embodiment 10, the first signal transmitting/receiving member 230 and the second signal transmitting/receiving member 330 convert an electric signal into an optical signal or convert an optical signal into an electric signal. That is, the photoelectric connector according to Embodiment 10 is the photoelectric connector according to the 10'-th configuration.

Figure 67A:
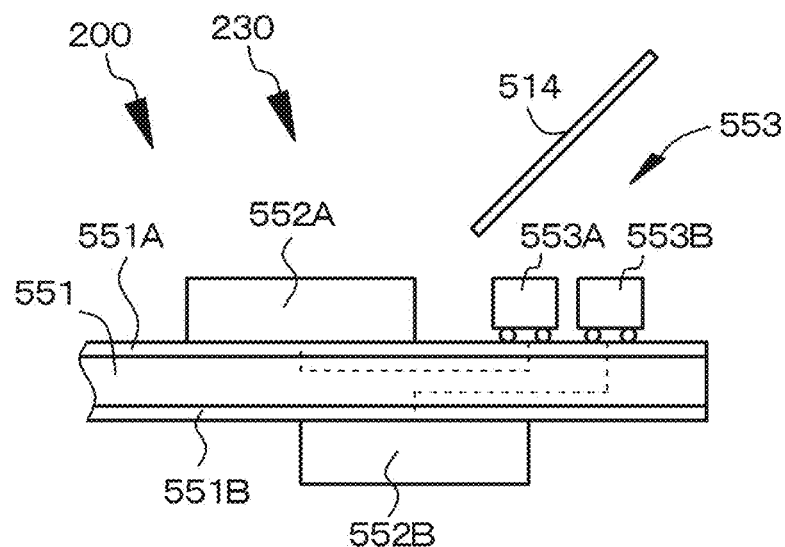
FIGS. 67A and 67B are conceptual diagrams illustrating a first signal transmitting/receiving member and a second signal transmitting/receiving member in a photoelectric connector according to Embodiment 10, respectively.

In the photoelectric connector according to Embodiment 10, as illustrated in the conceptual diagram of FIG. 67A, the plug housing 200 or the receptacle housing 300 including the light emitting element (in Embodiment 10, specifically, the plug housing 200 including a plurality of light receiving elements 553 which are photodiodes) is provided with semiconductor chips 555A and 552B for driving the light receiving elements. In addition, the plurality of light receiving elements 553 include a first light receiving element group 553A and a second light receiving element group 553B. The first light receiving element group 553A, the second light receiving element group 553B, the first semiconductor chip 552A for driving the first light receiving element group 553A, and the second semiconductor chip 552B for driving the second light receiving element group 553B are mounted on a printed board 551. Each of the light receiving element groups 553A and 553B includes, for example, 24 light receiving elements that are arranged in a line. Here, the printed board 551 is a double-sided rigid printed board (or a multi-layer rigid printed board). The first light receiving element group 553A, the second light receiving element group 553B, and the first semiconductor chip 552A are mounted on one surface (wiring surface) 551A of the double-sided rigid printed board 551. The second semiconductor chip 552B is mounted on the other surface (wiring surface) 551B of the double-sided rigid printed board 551.

Figure 67B:
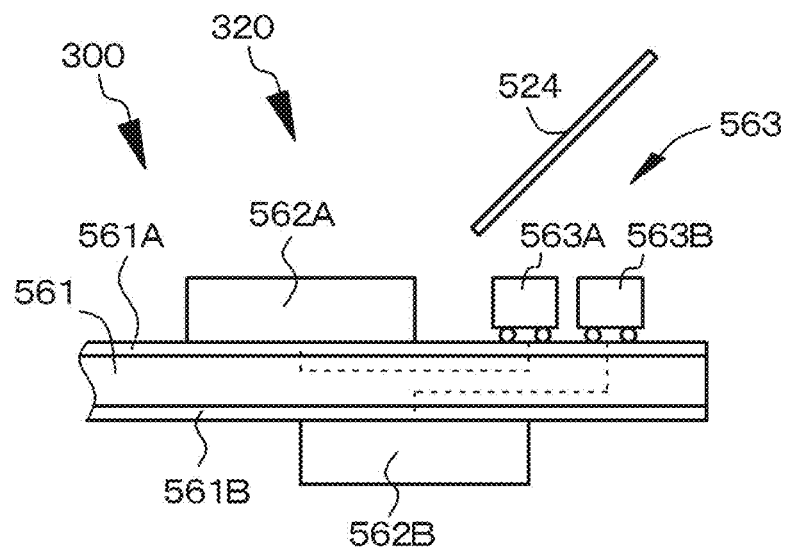

In addition, as illustrated in the conceptual diagram of FIG. 67B, the plug housing 200 or the receptacle housing 300 including the light emitting element (in Embodiment 10, specifically, the receptacle housing 300 including a plurality of light emitting elements 563 which are surface-emitting semiconductor laser elements) is provided with semiconductor chips 562A and 562B for driving the light emitting elements. In addition, the plurality of light emitting elements 563 include a first light emitting element group 563A and a second light emitting element group 563B. The first light emitting element group 563A, the second light emitting element group 563B, the first semiconductor chip 562A for driving the first light emitting element group 563A, and the second semiconductor chip 562B for driving the second light emitting element group 563B are mounted on a printed board 561. Each of the light emitting element groups 563A and 563B includes, for example, 24 light emitting elements that are arranged in a line. Here, the printed board 561 is a double-sided rigid printed board (or a multi-layer rigid printed board). The first light emitting element group 563A, the second light emitting element group 563B, and the first semiconductor chip 562A are mounted on one surface (wiring surface) 561A of the double-sided rigid printed board 561. The second semiconductor chip 562B is mounted on the other surface (wiring surface) 562B of the double-sided rigid printed board 561.

Figure 68A:
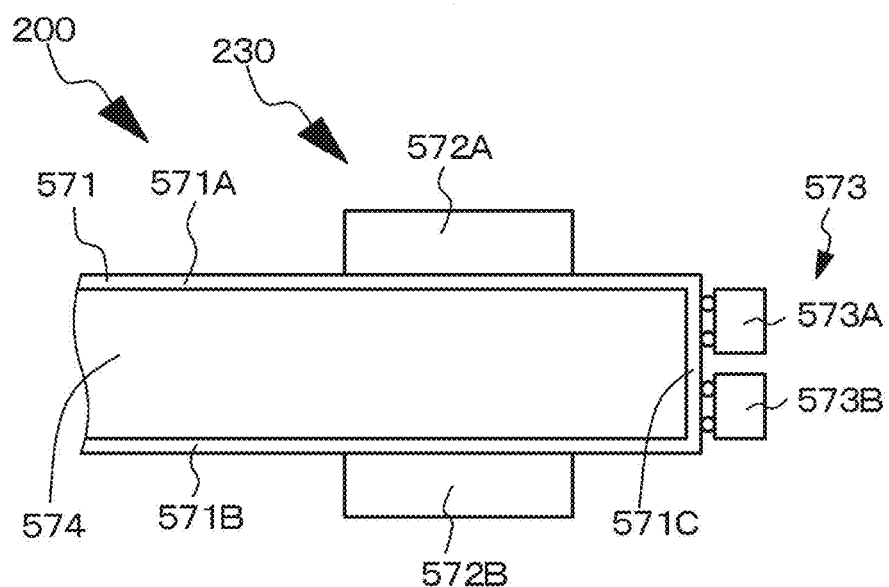
FIGS. 68A and 68B are conceptual diagrams illustrating a first signal transmitting/receiving member and a second signal transmitting/receiving member in a modification example of the photoelectric connector according to Embodiment 10, respectively.

Alternatively, as illustrated in the conceptual diagram of FIG. 68A, in the plug housing 200, the printed board is a flexible printed board 571.

A first semiconductor chip 572A for driving a first light receiving element group 573A is mounted on a first region 571A of one surface of the flexible printed board 571.

A second semiconductor chip 572B for driving a second light receiving element group 573B is mounted on a second region 571B of one surface of the flexible printed board 571.

Figure 68B:
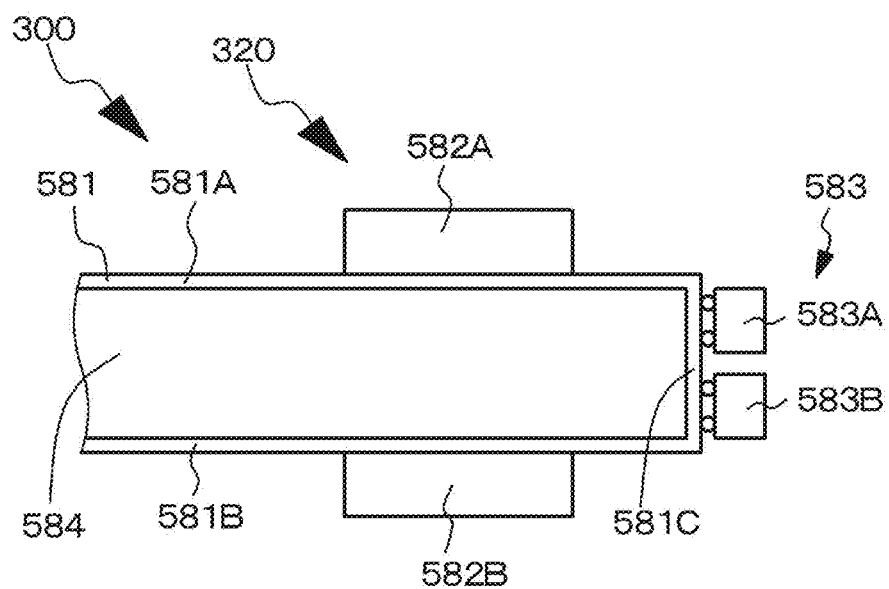

The first light receiving element group 573A and the second light receiving element group 573B are mounted on a third region 571C of one surface of the flexible printed board 571 which is located between the first region 571A and the second region 571B. In addition, as illustrated in the conceptual diagram of FIG. 68B, in the receptacle housing 300, the printed board is a flexible printed board 581.

A first semiconductor chip 582A for driving a first light emitting element group 583A is mounted on a first region 581A of one surface of the flexible printed board 581.

A second semiconductor chip 582B for driving a second light emitting element group 583B is mounted on a second region 581B of one surface of the flexible printed board 581.

The first light emitting element 583A and the second light emitting element group 583B are mounted on a third region 581C of one surface of the flexible printed board 581 which is located between the first region 581A and the second region 581B.

The flexible printed boards 571 and 581 are provided so as to wrap bases 574 and 584, respectively.

Furthermore, the base 574 is provided in parallel to the second surface 204 above the second surface 204 of the plug housing 200. The third region 571C of one surface of the flexible printed board 571 is located on an end surface of the base 574. The light receiving element provided in the plug housing 200 receives laser light from the receptacle 12. The first signal transmitting/receiving member 230 includes the light receiving element groups 573A and 573B, the semiconductor chips 572A and 572B, the flexible printed board 571, and the base 574. For example, each of the light receiving element groups 573A and 573B includes, for example, 24 light receiving elements that are arranged in a line. In addition, the first signal transmitting/receiving member 230 is biased to the rear end of the plug 11 as in Embodiment 1, Embodiment 3, and Embodiment 4.

Furthermore, the base 584 is provided in parallel to the second surface 304 above the second surface 304 of the receptacle housing 300. The third region 581C of one surface of the flexible printed board 581 is located on an end surface of the base 584. The light emitting element emits laser light to the plug 11. The second signal transmitting/receiving member 330 includes the light emitting element groups 583A and 583B, the semiconductor chips 582A and 582B, and the flexible printed board 581. Each of the light emitting element groups 583A and 583B includes, for example, 24 light emitting elements that are arranged in a line. In addition, the second signal transmitting/receiving member 330 is biased to the front end of the receptacle 12 by the second signal transmitting/receiving member biasing means described in Embodiment 1, Embodiment 3, and Embodiment 4.

The photoelectric connector according to the present disclosure has been described above on the basis of the preferred embodiments. However, the photoelectric connector according to the present disclosure is not limited to the embodiments. The photoelectric connector described in the embodiments and various components of the photoelectric connector, such as the plug, the plug cover, the plug housing, the first electrode unit, the receptacle, and the receptacle housing, are illustrative and can be appropriately changed. The plug housing may be provided with active electronic components. Alternatively, the receptacle housing may be provided with active electronic components. Alternatively, the plug housing and the receptacle housing may be provided with active electronic components. Examples of the active electronic component include, specifically, a memory, a communication element, such as a Wi-Fi (registered trademark) element or a Bluetooth (registered trademark) element, and a light emitting element, such as an LED. The photoelectric connector may function as a small storage, a wireless module, or a display device. Alternatively, for example, the plug housing or the receptacle housing may be provided with a micro-adhesive or a brush. The components of the photoelectric connector according to the present disclosure may be applied to other electronic devices according to circumstances. For example, the tape core wire with a waveguide unit structure may be applied to other electronic devices. In addition, the plug of the photoelectric connector according to the present disclosure may be independently configured as an invention, the receptacle of the photoelectric connector according to the present disclosure may be independently configured as an invention, and various components of the photoelectric connector according to the present disclosure may be independently configured as inventions. In addition, the printed board (the rigid printed board or the flexible printed board) having the light emitting element or the light receiving element mounted thereon which has been described in Embodiment 9 may be independently configured as an invention.

Note that, the present disclosure may have the following configurations.

[A01] <<Photoelectric Connector>>

A photoelectric connector including:
a plug that is attached to a first signal line and a first electric wire; and
a receptacle that is attached to a second signal line and a second electric wire, is fitted to the plug, and is optically and electrically connected to the plug,
in which the plug includes:
(A-1) a plug housing;
(A-2) a first guide pin that is provided in the plug housing, has a rear portion fixed to the plug housing, and extends in parallel to an axis line of the plug;
(A-3) a first signal transmitting/receiving member that is provided in the plug housing, is connected to the first signal line, has a first guide pin hole into which the first guide pin is inserted, and is attached to the first guide pin;
(A-4) a first electrode unit which is fixed to the plug housing and to which the first electric wire is attached; and
(A-5) a plug housing biasing means that is provided in the plug housing, the receptacle includes:
(B-1) a receptacle housing;
(B-2) a second signal transmitting/receiving member that is provided in the receptacle housing, is connected to the second signal line, and is movable with respect to the receptacle housing;
(B-3) a second electrode unit which is fixed to the receptacle housing and to which the second electric wire is attached; and
(B-4) a second signal transmitting/receiving member biasing means that biases the second signal transmitting/receiving member to a front side of the receptacle, and
in a state in which the plug is fitted to the receptacle,
(a) the first electrode unit and the second electrode unit come into contact with each other and are electrically connected to each other;
(b) an opposite surface of the first signal transmitting/receiving member which faces the second signal transmitting/receiving member and an opposite surface of the second signal transmitting/receiving member which faces the first signal transmitting/receiving member come into contact with each other in a state in which the opposite surfaces are not movable relative to each other;
(c) the first signal transmitting/receiving member and the second signal transmitting/receiving member are biased to a rear side of the plug by the second signal transmitting/receiving member biasing means; and
(d) the plug housing is biased in a direction perpendicular to the axis line of the plug by the plug housing biasing means and the second electrode unit.

[A02] <<Signal Transmitting/Receiving Member with First Structure>>

In the photoelectric connector described in [A01],
a protruding portion is provided on one of the opposite surface of the first signal transmitting/receiving member and the opposite surface of the second signal transmitting/receiving member and a recessed portion is provided in the other opposite surface, and
when the plug is fitted to the receptacle, the protruding portion is fitted to the recessed portion.

[A03] <<Signal Transmitting/Receiving Member with Second Structure>>

In the photoelectric connector described in [A01],
the receptacle further includes a second guide pin that is provided in the receptacle housing, has a rear portion fixed to the receptacle housing, and extends in parallel to an axis line of the receptacle,
the second signal transmitting/receiving member has a second guide pin hole into which the second guide pin is inserted, and
when the plug is fitted to the receptacle, the first guide pin passes through the first guide pin hole and is inserted into the second guide pin hole.

[A04] <<Second Signal Transmitting/Receiving Member Biasing Means with First Structure>>

In the photoelectric connector described in [A02] or [A03],
the receptacle further includes a spring bush that is provided in the receptacle housing and is attached to a rear portion of the second signal transmitting/receiving member, and
the second signal transmitting/receiving member biasing means is a spring that has a rear end portion attached to the receptacle housing and a leading end portion attached to the spring bush.

[A05] <<Second Signal Transmitting/Receiving Member Biasing Means with Second Structure>>

In the photoelectric connector described in [A03],
the second signal transmitting/receiving member biasing means is a spring that is provided between the second guide pin and the second signal transmitting/receiving member and surrounds an outer circumference of the second guide pin.

[A06] In the photoelectric connector described in any one of [A01] to [A05],
the plug further includes a plug cover, and
the plug housing is provided so as to be movable in the plug cover.

[A07] <<Definition of Plug Cover>>

In the photoelectric connector described in [A06],
the plug cover has four surfaces, that is, a first side surface and a second side surface that extend in parallel to the axis line of the plug, a first surface connecting one side of the first side surface and one side of the second side surface which extend in parallel to the axis line of the plug, and a second surface connecting the other side of the first side surface and the other side of the second side surface which extend in parallel to the axis line of the plug,
the plug housing has four surfaces, that is, a first side surface and a second side surface that extend in parallel to the axis line of the plug, a first surface connecting one side of the first side surface and one side of the second side surface which extend in parallel to the axis line of the plug, and a second surface connecting the other side of the first side surface and the other side of the second side surface which extend in parallel to the axis line of the plug,
the receptacle housing has four surfaces, that is, a first side surface and a second side surface that extend in parallel to the axis line of the receptacle, a first surface connecting one side of the first side surface and one side of the second side surface which extend in parallel to the axis line of the receptacle, and a second surface connecting the other side of the first side surface and the other side of the second side surface which extend in parallel to the axis line of the receptacle, and
the plug housing is movable in the receptacle housing.

[A08] In the photoelectric connector described in [A07], a front end of the plug cover facing the receptacle and a rear end of the plug cover which is opposite to the front end of the plug cover are opened.

A front end of the plug housing facing the receptacle housing and a rear end of the plug housing which is opposite to the front end of the plug housing are opened.

A front end of the receptacle housing facing the plug housing and a rear end of the receptacle housing which is opposite to the front end of the receptacle housing are opened.

[A09] <<Definition of First Electrode Unit and Second Electrode Unit>>

In the photoelectric connector described in [A07] or [A08],
the first electrode unit includes a contact portion,
the second electrode unit includes a contact piece that comes into contact with the contact portion of the first electrode unit, and
in a state in which the plug is fitted to the receptacle, the plug housing is biased in the direction perpendicular to the axis line of the plug by the contact piece of the second electrode unit which comes into contact with the contact portion of the first electrode unit.

[A10] <<Upper Electrode/Lower Electrode Structure>>

In the photoelectric connector described in [A09],
the plug includes one first electrode unit,
the receptacle includes two second electrode units,
the first electrode unit is attached to the first surface of the plug housing, and
the two second electrode units are attached to the first surface and the second surface of the receptacle housing.

[A11] In the photoelectric connector described in [A10], in a state in which the plug is fitted to the receptacle, the first surface and the second surface of the plug housing are biased by the contact pieces of the second electrode units.

[A12] In the photoelectric connector described in [A10] or [A11], plug cover opening portions into which the contact pieces of the second electrode units are inserted are provided in the first surface and the second surface of the plug cover.

[A13] In the photoelectric connector described in [A12], in a state in which the plug is fitted to the receptacle,
the contact piece of one of the second electrode units comes into contact with the contact portion of the first electrode unit through the plug cover opening portion provided in the first surface of the plug cover and biases the plug housing to the second surface of the plug cover.

The contact piece of the other second electrode unit comes into contact with the second surface of the plug housing through the plug cover opening portion provided in the second surface of the plug cover and biases the plug housing to the first surface of the plug cover.

[A14] In the photoelectric connector described in any one of [A11] to [A13], the force of the contact piece of the one second electrode unit biasing the plug housing to the second surface of the plug cover is different from the force of the contact piece of the other second electrode unit biasing the plug housing to the first surface of the plug cover.

[A15] In the photoelectric connector described in any one of [A10] to [A14], the first electrode unit has three contact portions.

The three contact portions of the first electrode unit are arranged in the order of a contact portion for a power source, a contact portion for grounding, and a contact portion for a power source.

The second electrode unit has three contact pieces.

The three contact pieces of the second electrode unit are arranged in the order of a contact piece for a power source, a contact piece for grounding, and a contact piece for a power source.

[A16] In the photoelectric connector described in any one of [A10] to [A15],
the second electrode unit includes a first portion and a second portion that faces the first portion with a gap therebetween, and
when the plug is fitted to the receptacle, the second portion comes into contact with an outer surface of the plug housing and is biased to the first portion, and the first portion and the second portion come into contact with each other and are electrically connected to each other.

[A17] In the photoelectric connector described in [A16], the second portion comes into contact with a side surface of the plug housing.

[A18] In the photoelectric connector described in [A17], a notched portion is provided at a leading end of the side surface of the plug housing.

[A19] In the photoelectric connector described in [A16], the second portion has a protruding portion that protrudes to the inside of the receptacle housing.

When the plug is fitted to the receptacle, the protruding portion of the second portion comes into contact with the first surface of the plug housing and the second portion is biased to the first portion. The first portion and the second portion come into contact with each other and are electrically connected to each other.

[A20] In the photoelectric connector described in any one of [A10] to [A19], a "T"-shaped hole portion is provided in each of the first side surface and the second side surface of the plug cover.

A guide groove portion is provided in each of an outer surface of a leading end portion of the first side surface and an outer surface of a leading end portion of the second side surface of the plug housing.

Engaging bars that are engaged with the guide groove portions through the "T"-shaped hole portions provided in the first side surface and the second side surface of the plug cover are provided on an outer surface of the first side surface and an outer surface of the second side surface of the receptacle housing.

[A21] In the photoelectric connector described in [A20], a plurality of recessed portions are provided in the guide groove portion. A step or an inclination is provided in a side wall of the recessed portion. A leading end of the engaging bar is movable only in a direction from a first recessed portion to a last recessed portion.

[A22] <<Side Electrode Structure>>

In the photoelectric connector described in [A09],
the plug includes two first electrode units,
the receptacle includes two second electrode units,
the two first electrode units are fixed to the second surface of the plug housing along the first side surface and the second side surface of the plug housing, and
the two second electrode units are fixed along the first side surface and the second side surface of the receptacle housing.

[A23] In the photoelectric connector described in [A22], in a state in which the plug is fitted to the receptacle, the side surfaces of the plug housing are biased by the contact pieces of the second electrode units.

[A24] In the photoelectric connector described in [A22] or [A23], the plug cover opening portions into which the contact pieces of the second electrode units are inserted are provided in the first side surface and the second side surface of the plug cover.

[A25] In the photoelectric connector described in any one of [A22] to [A24], the contact piece of the second electrode unit can be rotated on a support point in a direction in which the contact piece becomes closer to the side surface of the receptacle housing and a direction in which the contact piece becomes further away from the side surface of the receptacle housing.

A contact piece biasing means that biases the contact piece of the second electrode unit in the direction in which the contact piece becomes further away from the side surface of the receptacle housing is provided between the contact piece of the second electrode unit and the side surface of the receptacle housing.

A second electrode unit locking member is provided in a portion of the second electrode unit which is opposite to the contact piece with the support point interposed therebetween.

A second electrode unit locking recessed portion is provided in a leading end portion of each of the first side surface and the second side surface of the plug housing.

When the plug is fitted to the receptacle, the second electrode unit locking member and the second electrode unit locking recessed portion are engaged with each other. The contact piece of the second electrode unit is rotated to the contact portion of the first electrode unit on the support point and the contact piece of the second electrode unit and the contact portion of the first electrode unit come into contact with each other.

[A26] In the photoelectric connector described in any one of [A22] to [A25], the first electrode unit includes two contact portions.

The two contact portions of the first electrode unit are a contact portion for a power source and a contact portion for grounding.

The second electrode unit includes two contact pieces.

The two contact pieces of the second electrode unit are a contact piece for a power source and a contact piece for grounding.

[A27] <<Plug Cover Stopper>>

In the photoelectric connector described in any one of [A07] to [A26], the plug housing biasing means is provided on the outer surface of the second surface of the plug housing.

[A28] In the photoelectric connector described in [A27], a plug housing recessed portion is formed in the second surface of the plug housing and the plug housing biasing means is accommodated in the plug housing recessed portion.

[A29] In the photoelectric connector described in [A28], the plug housing biasing means includes a first portion, a second portion, and a third portion which are provided in this order from the front side of the plug along the direction of the axis line of the plug.

The second portion comes into contact with the plug housing recessed portion.

The first portion and the third portion do not come into contact with the plug housing recessed portion and form a biasing portion.

[A30] In the photoelectric connector described in [A28] or [A29], a plug cover recessed portion that is engaged with the biasing portion of the plug housing biasing means is provided in the second surface of the plug cover and an opening portion that faces the plug housing biasing means is provided in the plug cover recessed portion.

[A31] In the photoelectric connector described in [A30], in a case where the plug cover recessed portion and the biasing portion of the plug housing biasing means are engaged with each other, the plug housing is fixed to the plug cover.

[A32] In the photoelectric connector described in any one of [A29] to [A31], unlocking claws are provided in the first surface and the second surface of the receptacle housing.

When the plug cover is closest to the receptacle housing, the unlocking claw is inserted into the opening portion provided in the plug cover recessed portion and biases the first portion forming the biasing portion of the plug housing biasing means to the first surface of the plug housing to disengage the plug cover recessed portion from the biasing portion of the plug housing biasing means.

[A33] In the photoelectric connector described in [A32], the plug cover recessed portion and the biasing portion of the plug housing biasing means are disengaged from each other such that the plug housing is movable with respect to the plug cover.

[A34] In the photoelectric connector described in any one of [A29] to [A33], in a state in which the plug is fitted to the receptacle, the biasing portion of the plug housing biasing means comes into contact with the second surface of the plug cover and biases the plug housing to the first surface of the plug cover.

[A35] <<Plug Cover Lock>>

In the photoelectric connector described in any one of [A07] to [A34],
 plug cover locking members are provided in the first side surface and the second side surface of the receptacle housing,
 plug cover locking member recessed portions that lock the plug cover locking members are provided in the first side surface and the second side surface of the plug cover, and
 when the plug cover is closest to the receptacle housing, the plug cover locking members are locked to the plug cover locking member recessed portions.

[A36] <<First Shutter>>

In the photoelectric connector described in any one of [A07] to [A35],
 a first shutter is provided in a front portion of the plug cover, and
 the first shutter is opened when the plug is fitted to the receptacle and is closed when the plug is pulled out of the receptacle.

[A37] In the photoelectric connector described in [A36], a leading end of each of the first side surface and the second side surface of the plug housing has a substantially semicircular shape.

A side end portion of the first shutter is engaged with the leading end of each of the first side surface and the second side surface of the plug housing.

[A38] In the photoelectric connector described in [A37], the first shutter includes a first shutter upper component that extends from the first surface of the plug cover to the receptacle and a first shutter lower component that extends from the second surface of the plug cover to the receptacle.

[A39] In the photoelectric connector described in [A38], a leading end portion of the first shutter upper component is rounded and a leading end portion of the first shutter lower component is rounded so as to be engaged with the leading end portion of the first shutter upper component on the plug cover side.

[A40] In the photoelectric connector described in [A38] or [A39], the leading end portion of the first shutter upper component is folded outward or is folded back.

[A41] In the photoelectric connector described in any one of [A38] to [A40], the tip of the leading end portion of the first shutter lower component is notched.

[A42] In the photoelectric connector described in any one of [A38] to [A41], a rear end portion of the first shutter upper component and a rear end portion of the first shutter lower component are integrally attached to the rear end portion of the plug cover.

[A43] In the photoelectric connector described in [A42], the rear end portion of the first shutter upper component and the rear end portion of the first shutter lower component are integrally attached to the rear end portion of the plug cover on the basis of an insert molding technique.

[A44] <<Second Shutter>>

In the photoelectric connector described in any one of [A07] to [A43], a second shutter that is opened to the second surface of the receptacle housing and to the rear side of the receptacle housing is provided in a leading end portion of the receptacle housing.

[A45] In the photoelectric connector described in [A44], the second shutter is opened when the plug is fitted to the receptacle and is closed when the plug is pulled out of the receptacle.

[A46] In the photoelectric connector described in [A44] or [A45], second shutter pressing members are attached to the outer surface of the first side surface and the outer surface of the second side surface of the receptacle housing.

When the second shutter is in a closed state, a leading end portion of the second shutter is pressed by the second shutter pressing member so as not to be moved to the second surface of the receptacle housing.

When the plug is fitted to the receptacle, the pressing of the leading end portion of the second shutter by the second shutter pressing members is released by the leading ends of the first side surface and the second side surface of the plug housing. The second shutter is opened to the second surface of the receptacle housing and to the rear side of the receptacle housing.

[A47] In the photoelectric connector described in any one of [A07] to [A46], the rear end of the plug housing is blocked by a boot and
 the rear end of the receptacle housing is blocked by a receptacle protective member.

[A48] In the photoelectric connector described in [A47], the boot covers the plug cover.

[A49] In the photoelectric connector described in any one of [A07] to [A46], a connector is attached to the rear end of the plug housing.

[A50] In the photoelectric connector described in any one of [A07] to [A46], a connector is attached to the rear end of the receptacle housing.

[A51] In the photoelectric connector described in [A50], a connector is attached to the rear end of the plug housing.

[A52] In the photoelectric connector described in any one of [A07] to [A50], the receptacle housing further includes a second signal transmitting/receiving member guide member that is attached to the inside (inner surfaces) of the first side surface and the second side surface of the receptacle housing.

Notched portions are provided in a first side surface of the second signal transmitting/receiving member guide member which faces the first side surface of the receptacle housing and a second side surface of the second signal transmitting/receiving member guide member which faces the second side surface of the receptacle housing so as to extend to the middle of each side surface in parallel to the axis line of the receptacle in a direction from the rear side of the receptacle to the front side of the receptacle.

Second signal transmitting/receiving member protruding portions that are fitted to the notched portions are provided on the side surfaces of the second signal transmitting/receiving member.

[A53] <<First Signal Transmitting/Receiving Member and Second Signal Transmitting/Receiving Member>>

In the photoelectric connector described in any one of [A01] to [A52],
 the first signal transmitting/receiving member and the second signal transmitting/receiving member are ferrules,
 the first signal transmitting/receiving member includes a first signal transmitting/receiving member insertion hole which is provided in a portion of the first signal transmitting/receiving member close to a rear end of the plug and into which the first signal line, which is an optical fiber assembly, is inserted and a lens for the first signal transmitting/receiving member which is provided in a portion of the first signal transmitting/receiving member close to a front end of the plug and collimates light emitted from optical fibers or light incident on the optical fibers, and the second signal transmitting/receiving member includes a second signal transmitting/receiving member insertion hole which is provided in a portion of the second signal transmitting/receiving member close to a rear end of the receptacle and into which the second signal line, which is an optical fiber assembly, is inserted and a lens for the second signal transmitting/receiving member which is provided in a portion of the second signal transmitting/receiving member close to a front end of the receptacle and collimates light emitted from optical fibers or light incident on the optical fibers.

[A54] In the photoelectric connector described in [A53], the first signal transmitting/receiving member includes a first lens protective member and the second signal transmitting/receiving member includes a second lens protective member.

The first lens protective member made of metal is attached to the opposite surface of the first signal transmitting/receiving member.

The second lens protective member made of metal is attached to the opposite surface of the second signal transmitting/receiving member.

[A55] <<Structure of Tape Core Wire>>

In the photoelectric connector described in [A53] or [A54], an optical fiber assembly forming a first signal line includes four tape core wires, that is, a first tape core wire, a second tape core wire, a third tape core wire, and a fourth tape core wire.

The first signal transmitting/receiving member insertion hole includes a first signal transmitting/receiving member right insertion hole and a first signal transmitting/receiving member left insertion hole that is provided so as to be separated from the first signal transmitting/receiving member right insertion hole.

The first tape core wire, the second tape core wire, the third tape core wire, and the fourth tape core wire forming the first signal line are attached to the bottom surface of the first signal transmitting/receiving member right insertion hole, the bottom surface of the first signal transmitting/receiving member left insertion hole, the top surface of the first signal transmitting/receiving member right insertion hole, and the top surface of the first signal transmitting/receiving member left insertion hole, respectively.

There is a gap between the first tape core wire and the third tape core wire and there is a gap between the second tape core wire and the fourth tape core wire. In addition, an optical fiber assembly forming the second signal line includes four tape core wires, that is, a first tape core wire, a second tape core wire, a third tape core wire, and a fourth tape core wire.

The second signal transmitting/receiving member insertion hole includes a second signal transmitting/receiving member right insertion hole and a second signal transmitting/receiving member left insertion hole that is provided so as to be separated from the second signal transmitting/receiving member right insertion hole.

The first tape core wire, the second tape core wire, the third tape core wire, and the fourth tape core wire forming the second signal line are attached to the bottom surface of the second signal transmitting/receiving member right insertion hole, the bottom surface of the second signal transmitting/receiving member left insertion hole, the top surface of the second signal transmitting/receiving member right insertion hole, and the top surface of the second signal transmitting/receiving member left insertion hole, respectively.

There is a gap between the first tape core wire and the third tape core wire and there is a gap between the second tape core wire and the fourth tape core wire.

[A56] <<Structure of Waveguide Unit>>

In the photoelectric connector described in [A55], a tape core wire includes:

a base resin sheet;
a plurality of core members that are provided side by side on the base resin sheet; and
a covering member that covers the base resin sheet and the plurality of core members.

[A57] <<Light Emitting Element/Light Receiving Element>>

In the photoelectric connector described in any one of [A01] to [A52], the first signal transmitting/receiving member includes light emitting elements and light receiving elements and the second signal transmitting/receiving member includes light emitting elements and light receiving elements.

[A58] In the photoelectric connector described in [A57], the plug housing and the receptacle housing are provided with semiconductor chips for driving the light emitting elements and the light receiving elements.

[A59] In the photoelectric connector described in [A57] or [A58], the light emitting elements and the light receiving elements include a first light emitting element/light receiving element group and a second light emitting element/light receiving element group.

The first light emitting element/light receiving element group, the second light emitting element/light receiving element group, a first semiconductor chip for driving the first light emitting element/light receiving element group, and a second semiconductor chip for driving the second light emitting element/light receiving element group are mounted on a printed board.

[A60] In the photoelectric connector described in [A59], the printed board is a double-sided rigid printed board.

The first light emitting element group, the second light emitting element group, and the first semiconductor chip are mounted on one surface of the double-sided rigid printed board.

The second semiconductor chip is mounted on the other surface of the double-sided rigid printed board.

[A61] In the photoelectric connector described in [A59], the printed board is a flexible printed board.

A first semiconductor chip for driving the first light emitting element group is mounted on a first region of one surface of the flexible printed board.

A second semiconductor chip for driving the second light emitting element group is mounted on a second region of one surface of the flexible printed board.

The first light emitting element group and the second light emitting element group are mounted on a third region of one surface of the flexible printed board which is located between the first region and the second region.

[A62] In the photoelectric connector described in any one of [A01] to [A52], one of the first signal transmitting/receiving member and the second signal transmitting/receiving member includes light emitting elements and the other signal transmitting/receiving member includes light receiving elements.

[A63] In the photoelectric connector described in [A62], the plug housing or the receptacle housing including the light emitting elements is provided with semiconductor chips for driving the light emitting elements.

[A64] In the photoelectric connector described in [A63], the light emitting elements include a first light emitting element group and a second light emitting element group.

The first light emitting element group, the second light emitting element group, a first semiconductor chip for driving the first light emitting element group, and a second semiconductor chip for driving the second light emitting element group are mounted on a printed board.

[A65] In the photoelectric connector described in [A64], the printed board is a double-sided rigid printed board.

The first light emitting element group, the second light emitting element group, and the first semiconductor chip are mounted on one surface of the double-sided rigid printed board.

The second semiconductor chip is mounted on the other surface of the double-sided rigid printed board.

[A66] In the photoelectric connector described in [A64], the printed board is a flexible printed board.

The first semiconductor chip for driving the first light emitting element group is mounted on a first region of one surface of the flexible printed board.

The second semiconductor chip for driving the second light emitting element group is mounted on a second region of one surface of the flexible printed board.

The first light emitting element group and the second light emitting element group are mounted on a third region of one surface of the flexible printed board which is located between the first region and the second region.

[A67] In the photoelectric connector described in any one of [A62] to [A66], the plug housing or the receptacle housing including the light receiving elements is provided with semiconductor chips for driving the light receiving elements.

[A68] In the photoelectric connector described in [A67], the light receiving elements include a first light receiving element group and a second light receiving element group.

The first light receiving element group, the second light receiving element group, a first semiconductor chip for driving the first light receiving element group, and a second semiconductor chip for driving the second light receiving element group are mounted on a printed board.

[A69] In the photoelectric connector described in [A68], the printed board is a double-sided rigid printed board.

The first light receiving element group, the second light receiving element group, and the first semiconductor chip are mounted on one surface of the double-sided rigid printed board.

The second semiconductor chip is mounted on the other surface of the double-sided rigid printed board.

[A70] In the photoelectric connector described in [A68], the printed board is a flexible printed board.

The first semiconductor chip for driving the first light receiving element group is mounted on a first region of one surface of the flexible printed board.

The second semiconductor chip for driving the second light receiving element group is mounted on a second region of one surface of the flexible printed board.

The first light receiving element group and the second light receiving element group are mounted on a third region of one surface of the flexible printed board which is located between the first region and the second region.

[A71] In the photoelectric connector described in any one of [A57] to [A70], the light emitting element is a surface-emitting semiconductor laser element.

[A72] In the photoelectric connector described in any one of [A57] to [A71], the plug housing includes a first mirror unit.

The optical path of light emitted from the first signal transmitting/receiving member is changed by the first mirror unit and the light travels to the second signal transmitting/receiving member. Alternatively, the optical path of light emitted from the second signal transmitting/receiving member is changed by the first mirror unit and the light travels to the first signal transmitting/receiving member.

[A73] In the photoelectric connector described in [A72], the first mirror unit includes one mirror or a plurality of mirrors.

[A74] In the photoelectric connector described in any one of [A57] to [A73], the receptacle housing includes a second mirror unit. The optical path of light emitted from the first signal transmitting/receiving member is changed by the second mirror unit and the light travels to the second signal transmitting/receiving member. Alternatively, the optical path of light emitted from the second signal transmitting/receiving member is changed by the second mirror unit and the light travels to the first signal transmitting/receiving member.

[A75] In the photoelectric connector described in [A74], the second mirror unit includes one mirror or a plurality of mirrors.

[A76] <<Active Electronic Component>>

In the photoelectric connector described in any one of [A01] to [A75], the plug housing, the receptacle housing, or the plug housing and the receptacle housing are provided with an active electronic component.

REFERENCE SIGNS LIST

11 Plug
12 Receptacle
100 Plug cover
100F Front end of plug cover
100B Rear end of plug cover
101 First side surface of plug cover
102 Second side surface of plug cover
103 First surface of plug cover
104 Second surface of plug cover
105 Plug cover opening portion
106 Plug cover recessed portion
107 Opening portion
108 Plug cover locking member recessed portion
110 Resin member
111 "T"-shaped hole portion
120 First shutter
121 First shutter upper component
122 Leading end portion of first shutter upper component
123 First shutter lower component
124 Leading end portion of first shutter lower component
200 Plug housing
200F Front end of plug housing
200B Rear end of plug housing
201 First side surface of plug housing
202 Second side surface of plug housing
203 First surface of plug housing
204 Second surface of plug housing
205 Leading end portions of first side surface and second side surface of plug housing
206 Second electrode unit locking recessed portion
207 Leading ends of first side surface and second side surface of plug housing
211 First electrode unit attachment opening portion
212 Plug housing opening portion
213 Screw
214 First guide pin fixing portion 215 Plug housing recessed portion
216 Guide groove portion
216a, 216b, 216c, 216d, 216e, 216f, 216g Recessed portion
220 First guide pin
221 Leading end portion of first guide pin
222 Holding portion
223 Holding member
230 First signal transmitting/receiving member
230A Opposite surface of first signal transmitting/receiving member
231 First guide pin hole
233 Lens unit
234 First signal transmitting/receiving member insertion hole
234R First signal transmitting/receiving member right insertion hole
234L First signal transmitting/receiving member left insertion hole
235 Rib
240 First lens protective member
241 Through hole
242 Protruding portion
243 Recessed portion
250 Plug housing biasing means
251 First portion of plug housing biasing means
252 Second portion of plug housing biasing means
253 Third portion of plug housing biasing means
260 First electrode unit
261, 262 Contact portion of first electrode unit
263 Rear end portion of first electrode unit
270 Plug protective member
271 Boot
280 First electrode unit
281 Contact portion (contact portion for power source)
282 Contact portion (contact portion for grounding)
300 Receptacle housing
300F Front end of receptacle housing
300B Rear end of receptacle housing
301 First side surface of receptacle housing
302 Second side surface of receptacle housing
303 First surface of receptacle housing
304 Second surface of receptacle housing
305, 306 Unlocking claw
307 Opening portion for contact piece
308 Opening portion for second electrode unit locking member
309 Base portion
310 Claw
311 Opening portion
312 Plug cover locking member
313 Second shutter fixing portion
314 Second shutter pressing member attachment portion
315 Engaging bar
320 Second guide pin
321 Second signal transmitting/receiving member biasing means
322 Spring bush
323 Spring (second signal transmitting/receiving member biasing means)
330 Second signal transmitting/receiving member
330A Opposite surface of second signal transmitting/receiving member
331 Second guide pin hole
332 Second signal transmitting/receiving member protruding portion
333 Lens unit
334 Second signal transmitting/receiving member insertion hole
334R Second signal transmitting/receiving member right insertion hole
334L Second signal transmitting/receiving member left insertion hole
335 Rib
340 Second lens protective member
341 Through hole
342 Protruding portion
343 Recessed portion
350 Receptacle protective member
351 Second signal transmitting/receiving member guide member
352 Notched portion
353 Screw
354 Second electrode unit attachment member
355 Receptacle cover
356 Opening portion of receptacle cover
360 Second electrode unit
361, 362 Contact piece of second electrode unit
363, 364 Rear end portion of second electrode unit
365 Second electrode unit main body
366 Support point
367 Second electrode unit locking member
368 Contact piece biasing means
370 Second shutter
370' Leading end portion of second shutter
371 Second shutter pressing member
372 Rear end portion of second shutter pressing member
373 Leading end of second shutter pressing member
374, 375 Fine holes provided in first side surface and second side surface of receptacle housing
370 Second shutter
370a Attachment portion of second shutter
370b Bottom portion of second shutter
370c Bent portion of second shutter
370d Closing portion of second shutter
376 Second shutter pressing member
376A End portion of second shutter pressing member
376B Portion of second shutter pressing member
376C End portion of second shutter pressing member
380 Second electrode unit
381 Contact piece (contact piece for power source)
381' Rear end portion of contact piece (contact piece for power source)
382 Contact piece (contact piece for grounding)
382' Rear end portion of contact piece (contact piece for grounding)
383 Rear end portion of contact piece for power source
384 Rear end portion of contact piece for grounding
385, 395 First portion of second electrode unit
386, 396 Second portion of second electrode unit
386' Extension portion of second portion
387, 388 Leg portion
389 Second electrode unit fixing member
386" Connection member
411 First signal line
411A, 411B, 411C, 411D, 412A, 412B, 412C, 412D Tape core wire
412 Second signal line
421 First electric wire
422 Second electric wire
413 Optical fiber
423 Electric wire
500 Tape core wire
501 Base resin sheet 501A First surface of base resin sheet
501B Second surface of base resin sheet
502 Core member
503 Covering member
511, 521, 531, 541, 551, 561, 571, 581 Printed board
511A, 511B, 521A, 521B, 551A, 551B, 561A, 561B Wiring surface
531A, 541A, 571A, 581B First region
531B, 541B, 571B, 581B Second region
531C, 541C, 571C, 581C Third region
512A, 512B, 522A, 522B, 532A, 532B, 542A, 542B, 552A, 552B, 562A, 562B,
572A, 572B, 582A, 582B Semiconductor chip
513, 523, 533, 543 Light emitting element and light receiving element
513A, 513B, 523A, 523B, 533A, 533B, 543A, 543B Light emitting element/light receiving element group
553, 573 Light receiving element
563, 583 Light emitting element
553A, 553B, 573A, 573B Light receiving element group
563A, 563B, 583A, 583B Light emitting element group
534, 544 Base
514 First mirror unit
514a, 514b, 514c Mirror
524 Second mirror unit

The invention claimed is:

1. A photoelectric connector, comprising:
a plug attached to each of a first signal line and a first electric wire; and
a receptacle attached to each of a second signal line and a second electric wire, wherein
the receptacle is fitted to the plug, and is optically and electrically connected to the plug,
the plug includes:
a plug housing;
a first guide pin in the plug housing, wherein
the first guide pin has a rear portion fixed to the plug housing, and
the first guide pin extends in parallel to an axis line of the plug;
a first signal transmitting/receiving member in the plug housing, wherein
the first signal transmitting/receiving member is connected to the first signal line,
the first signal transmitting/receiving member has a first guide pin hole,
the first guide pin is insertable in the first guide pin hole, and
the first signal transmitting/receiving member is attached to the first guide pin;
at least one first electrode unit fixed to the plug housing, wherein
the first electric wire is attached to the at least one first electrode unit; and
a plug housing biasing in the plug housing,
the receptacle includes:
a receptacle housing;
a second guide pin in the receptacle housing, wherein the second guide pin has a rear portion fixed to the receptacle housing;
a second signal transmitting/receiving member in the receptacle housing, wherein
the second signal transmitting/receiving member is connected to the second signal line,
the second signal transmitting/receiving member has a second guide pin hole,
the second guide pin is insertable in the second guide pin hole, and
the second signal transmitting/receiving member is movable with respect to the receptacle housing;
at least one second electrode unit fixed to the receptacle housing, wherein the second electric wire is attached to the at least one second electrode unit; and
a signal transmitting/receiving member bias that surrounds an outer circumference of the second guide pin, wherein
the signal transmitting/receiving member bias is configured to bias the second signal transmitting/receiving member to a front side of the receptacle, and
in a first state in which the plug is fitted to the receptacle,
the at least one first electrode unit is electrically connected to the at least one second electrode unit,
a first surface of the first signal transmitting/receiving member comes in contact with a second surface of the second signal transmitting/receiving member based on a second state in which the first surface of the first signal transmitting/receiving member is not movable relative to the second surface of the second signal transmitting/receiving member, wherein the first surface of the first signal transmitting/receiving member faces the second signal transmitting/receiving member, and
the second surface of the second signal transmitting/receiving member faces the first signal transmitting/receiving member,
the signal transmitting/receiving member bias is configured to bias the first signal transmitting/receiving member and the second signal transmitting/receiving member to a rear side of the plug, and
each of the plug housing biasing and the at least one second electrode unit is configured to bias the plug housing in a direction perpendicular to the axis line of the plug.

2. The photoelectric connector according to claim 1, wherein
one of the first surface of the first signal transmitting/receiving member or the second surface of the second signal transmitting/receiving member comprises a protruding portion,
the other of the first surface of the first signal transmitting/receiving member or the second surface of the second signal transmitting/receiving member comprises a recessed portion, and
in the first state in which the plug is fitted to the receptacle, the protruding portion is fitted to the recessed portion.

3. The photoelectric connector according to claim 1, wherein
the second guide pin extends in parallel to an axis line of the receptacle, and
in the first state in which the plug is fitted to the receptacle, the first guide pin passes through the first guide pin hole.

4. The photoelectric connector according to claim 2, wherein the receptacle further includes a spring bush in the receptacle housing, the spring bush is attached to a rear portion of the second signal transmitting/receiving member, the signal transmitting/receiving member bias is a spring that has a rear end portion and a leading end portion, the rear end portion of the spring is attached to the receptacle housing, and the leading end portion of the spring is attached to the spring bush.

5. The photoelectric connector according to claim 2, wherein the signal transmitting/receiving member bias is a spring, the spring is between the second guide pin and the second signal transmitting/receiving member, and the spring surrounds the outer circumference of the second guide pin.

6. The photoelectric connector according to claim 1, wherein the plug further includes a plug cover, and the plug housing is movable in the plug cover.

7. The photoelectric connector according to claim 6, wherein the plug cover has four surfaces, a first side surface of the four surfaces of the plug cover and a second side surface of the four surfaces of the plug cover extend in parallel to the axis line of the plug, a first surface of the four surfaces of the plug cover connects one side of the first side surface of the plug cover and one side of the second side surface of the plug cover, a second surface of the four surfaces of the plug cover connects the other side of the first side surface of the plug cover and the other side of the second side surface of the plug cover, the plug housing has four surfaces, a first side surface of the four surfaces of the plug housing and a second side surface of the four surfaces of the plug housing extend in parallel to the axis line of the plug, a first surface of the four surfaces of the plug housing connects one side of the first side surface of the plug housing and one side of the second side surface of the plug housing, a second surface of the four surfaces of the plug housing connects the other side of the first side surface of the plug housing and the other side of the second side surface of the plug housing, the receptacle housing has four surfaces, a first side surface of the four surfaces of the receptacle housing and a second side surface of the four surfaces of the receptacle housing extend in parallel to the axis line of the receptacle, a first surface of the four surfaces of the receptacle housing connects one side of the first side surface of the receptacle housing and one side of the second side surface of the receptacle housing, a second surface of the four surfaces of the receptacle housing connects the other side of the first side surface of the receptacle housing and the other side of the second side surface of the receptacle housing, and the plug housing is movable in the receptacle housing.

8. The photoelectric connector according to claim 7, wherein the at least one first electrode unit includes a contact portion, the at least one second electrode unit includes a contact piece, the contact piece of the at least one second electrode unit is configured to come into contact with the contact portion of the at least one first electrode unit, and in the first state in which the plug is fitted to the receptacle, the contact piece of the at least one second electrode unit is configured to bias the plug housing in the direction perpendicular to the axis line of the plug.

9. The photoelectric connector according to claim 8, wherein the at least one second electrode unit includes two second electrode units, the at least one first electrode unit is attached to the first surface of the plug housing, one of the two second electrode units is attached to one of the first surface of the receptacle housing or the second surface of the receptacle housing, and the other of the two second electrode units is attached to the other of the first surface of the receptacle housing or the second surface of the receptacle housing.

10. The photoelectric connector according to claim 9, wherein each second electrode unit of the two second electrode units includes a first portion and a second portion, the second portion faces the first portion with a gap therebetween, and in the first state in which the plug is fitted to the receptacle:

the second portion is biased to the first portion, the second portion comes into contact with an outer surface of the plug housing, and the first portion is electrically connected to the second portion.

11. The photoelectric connector according to claim 8, wherein the at least one first electrode unit includes two first electrode units, the at least one second electrode unit includes two second electrode units, one of the two first electrode units is fixed to the second surface of the plug housing along the first side surface of the plug housing, the other of the two first electrode units is fixed to the second surface of the plug housing along the second side surface of the plug housing, one of the two second electrode units is fixed along the first side surface of the receptacle housing, and the other of the two second electrode units is fixed along the second side surface of the receptacle housing.

12. The photoelectric connector according to claim 7, wherein the plug housing biasing is on an outer surface of the second surface of the plug housing.

13. The photoelectric connector according to claim 7, wherein each of the first side surface of the receptacle housing and the second side surface of the receptacle housing includes plug cover locking members, the first side surface of the plug cover and the second side surface of the plug cover includes plug cover locking member recessed portions, the plug cover locking member recessed portions are configured to lock the plug cover locking members, and in a third state in which the plug cover is at a specific proximity to the receptacle housing, the plug cover locking members are locked to the plug cover locking member recessed portions.

14. The photoelectric connector according to claim 7, wherein
a front portion of the plug cover includes a first shutter,
the first shutter is opened in the first state in which the plug is fitted to the receptacle, and
the first shutter is closed in a fourth state in which the plug is pulled out of the receptacle.

15. The photoelectric connector according to claim 7, wherein
a leading end portion of the receptacle housing includes a second shutter, and
the second shutter is opened to the second surface of the receptacle housing and to a rear side of the receptacle housing.

16. The photoelectric connector according to claim 1, wherein
the first signal transmitting/receiving member and the second signal transmitting/receiving member are ferrules,
the first signal transmitting/receiving member includes a first signal transmitting/receiving member insertion hole and a first lens,
the first signal transmitting/receiving member insertion hole is in a first portion of the first signal transmitting/receiving member,
the first portion of the first signal transmitting/receiving member is in a specific proximity to a rear end of the plug,
the first signal line is insertable in the first signal transmitting/receiving member insertion hole,
the first signal line is a first optical fiber assembly,
the first lens is in a second portion of the first signal transmitting/receiving member,
the second portion of the first signal transmitting/receiving member is in a specific proximity to a front end of the plug,
the first lens collimates light emitted from first optical fibers or light incident on the first optical fibers,
the second signal transmitting/receiving member includes a second signal transmitting/receiving member insertion hole and a second lens,
the second signal transmitting/receiving member insertion hole is in a first portion of the second signal transmitting/receiving member,
the first portion of the second signal transmitting/receiving member is in a specific proximity to a rear end of the receptacle,
the second signal line is insertable in the second signal transmitting/receiving member insertion hole,
the second signal line is a second optical fiber assembly,
the second lens is in a second portion of the second signal transmitting/receiving member,
the second portion of the second signal transmitting/receiving member is in a specific proximity to a front end of the receptacle, and
the second lens collimates light emitted from second optical fibers or light incident on the second optical fibers.

17. The photoelectric connector according to claim 16, wherein
the first signal line includes four tape core wires,
the four tape core wires of the first signal line include a first tape core wire, a second tape core wire, a third tape core wire, and a fourth tape core wire,
the first signal transmitting/receiving member insertion hole includes:
a first signal transmitting/receiving member right insertion hole; and
a first signal transmitting/receiving member left insertion hole that is separated from the first signal transmitting/receiving member right insertion hole,
the first tape core wire of the four tape core wires of the first signal line is attached to a bottom surface of the first signal transmitting/receiving member right insertion hole,
the second tape core wire of the four tape core wires of the first signal line is attached to a bottom surface of the first signal transmitting/receiving member left insertion hole,
the third tape core wire of the four tape core wires of the first signal line is attached to a top surface of the first signal transmitting/receiving member right insertion hole,
the fourth tape core wire of the four tape core wires of the first signal line is attached to a top surface of the first signal transmitting/receiving member left insertion hole,
the first signal line includes a cavity between the first tape core wire of the four tape core wires of the first signal line and the third tape core wire of the four tape core wires of the first signal line, and a cavity between the second tape core wire of the four tape core wires of the first signal line and the fourth tape core wire of the four tape core wires of the first signal line,
the second signal line includes four tape core wires,
the four tape core wires of the second signal line include a first tape core wire, a second tape core wire, a third tape core wire, and a fourth tape core wire,
the second signal transmitting/receiving member insertion hole includes:
a second signal transmitting/receiving member right insertion hole; and
a second signal transmitting/receiving member left insertion hole that is separated from the second signal transmitting/receiving member right insertion hole,
the first tape core wire of the four tape core wires of the second signal line is attached to a bottom surface of the second signal transmitting/receiving member right insertion hole,
the second tape core wire of the four tape core wires of the second signal line is attached to a bottom surface of the second signal transmitting/receiving member left insertion hole,
the third tape core wire of the four tape core wires of the second signal line is attached to a top surface of the second signal transmitting/receiving member right insertion hole,
the third tape core wire of the four tape core wires of the second signal line is attached to a top surface of the second signal transmitting/receiving member left insertion hole, and
the second signal line includes a cavity between the first tape core wire of the four tape core wires of the second signal line and the third tape core wire of the four tape core wires of the second signal line, and a cavity between the second tape core wire of the four tape core wires of the second signal line and the fourth tape core wire of the four tape core wires of the second signal line.

18. The photoelectric connector according to claim 17, wherein
each tape core wire of the four tape core wires of each of the first signal line and the second signal line includes:
a base resin sheet;
a plurality of core members that are side by side on the base resin sheet; and
a covering member that covers the base resin sheet and the plurality of core members.

19. The photoelectric connector according to claim 1, wherein
the first signal transmitting/receiving member further includes a first light emitting element and a first light receiving element, and
the second signal transmitting/receiving member further includes a second light emitting element and a second light receiving element.

20. The photoelectric connector according to claim 1, wherein
at least one of the plug housing or the receptacle housing comprises an active electronic component.

21. The photoelectric connector according to claim 1, wherein
each of the first signal transmitting/receiving member and the second signal transmitting/receiving member further includes a rib, and
the rib is at a center portion of each of the first signal transmitting/receiving member and the second signal transmitting/receiving member.

* * * * *